(12) United States Patent
Lyons et al.

(10) Patent No.: US 10,888,191 B1
(45) Date of Patent: Jan. 12, 2021

(54) PORTABLE BEVERAGE CONTAINER SYSTEMS AND METHODS FOR ADJUSTING THE COMPOSITION OF A BEVERAGE

(71) Applicant: LifeFuels, Inc., Reston, VA (US)

(72) Inventors: Mark Lyons, Reston, VA (US); Abraham MacLean, Reston, VA (US)

(73) Assignee: LifeFuels, Inc., Reston, VA (US)

( * ) Notice: Subject to any disclaimer, the term of this patent is extended or adjusted under 35 U.S.C. 154(b) by 0 days.

(21) Appl. No.: 16/664,624

(22) Filed: Oct. 25, 2019

Related U.S. Application Data

(63) Continuation of application No. 16/663,219, filed on Oct. 24, 2019.
(Continued)

(51) Int. Cl.
*A47J 31/00* (2006.01)
*B65D 81/32* (2006.01)
(Continued)

(52) U.S. Cl.
CPC ............ *A47J 31/005* (2013.01); *A47J 43/27* (2013.01); *B01F 13/0022* (2013.01);
(Continued)

(58) Field of Classification Search
CPC .. A47J 43/0716; A47J 43/046; A47J 43/0727; A47J 19/02; A47J 31/005;
(Continued)

(56) References Cited

U.S. PATENT DOCUMENTS

D95,559 S  5/1935  Vogel
D97,347 S  10/1935  Gambell
(Continued)

FOREIGN PATENT DOCUMENTS

CN  1942392  4/2007
DE  3428178  2/1986
(Continued)

OTHER PUBLICATIONS

Space Linear Acceleration Mass Measurement Device (SLAMMD); NASA Life Sciences Data Archive; https://lsda.jsc.nasa.gov/Hardware/hardw/963? / Date Jul. 15, 2004.

*Primary Examiner* — Charles Cooley
(74) *Attorney, Agent, or Firm* — Kenealy Vaidya LLP

(57) ABSTRACT

A beverage apparatus, the beverage apparatus being hand-holdable by a user of the beverage apparatus to be portable, can include a beverage chamber housing that includes a chamber for storing a consumable liquid. The beverage apparatus can include a dispensing assembly that includes a receptacle. The receptacle can retain a vessel. The vessel can include an electronic tag and can contain an additive. The dispensing assembly can be operatively controllable by a controller to output the additive from the vessel into the consumable liquid. The beverage apparatus can include one or more sensors, devices, or assemblies that can be used to detect a volume of liquid in the chamber or a liquid level in the chamber. The beverage apparatus can include an apparatus processing portion (ACP) and an apparatus database portion.

19 Claims, 78 Drawing Sheets

Related U.S. Application Data

(60) Provisional application No. 62/900,511, filed on Sep. 14, 2019.

(51) Int. Cl.

| | | |
|---|---|---|
| *G01S 19/52* | (2010.01) | |
| *G01F 23/296* | (2006.01) | |
| *G01C 9/00* | (2006.01) | |
| *B65D 23/14* | (2006.01) | |
| *A47J 43/27* | (2006.01) | |
| *B01F 13/00* | (2006.01) | |
| *B01F 15/00* | (2006.01) | |

(52) U.S. Cl.
CPC ........ *B01F 15/00155* (2013.01); *B65D 23/14* (2013.01); *B65D 81/3205* (2013.01); *G01C 9/00* (2013.01); *G01F 23/296* (2013.01); *G01S 19/52* (2013.01); *B01F 2215/0022* (2013.01)

(58) Field of Classification Search
CPC ... A47J 43/27; H04B 5/0056; G06K 7/10297; G06K 19/07788; B65D 81/3205; B65D 83/06; B65D 2203/10; B65D 23/14; B01F 3/1271; B01F 15/00155; B01F 13/0022; B01F 2215/0022; G01F 23/2962; G01F 23/296; B67D 1/0019; B67D 1/0888; B67D 1/1238; B67D 1/1243; B67D 1/0882; G01C 9/00; G01S 19/52
USPC ........................................................ 366/130
See application file for complete search history.

(56) References Cited

U.S. PATENT DOCUMENTS

| | | |
|---|---|---|
| 2,071,399 A | 2/1937 | Gambell |
| D157,486 S | 2/1950 | Glowacki |
| 2,682,355 A | 6/1954 | Robbins |
| D192,814 S | 5/1962 | Edwin |
| 3,319,637 A | 5/1967 | Gore |
| 3,548,657 A | 12/1970 | Panerai |
| D225,364 S | 12/1972 | Antoni |
| 3,727,803 A | 4/1973 | Cobb |
| D242,132 S | 11/1976 | Hasegawa |
| 4,051,726 A | 10/1977 | Hastbacka |
| 4,087,024 A | 5/1978 | Martin |
| 4,125,187 A | 11/1978 | Vecchiotti |
| 4,133,457 A | 1/1979 | Klassen |
| 4,450,722 A | 5/1984 | Keyes, IV |
| D279,621 S | 7/1985 | Richer |
| 4,688,701 A | 8/1987 | Sedam |
| 4,728,006 A | 3/1988 | Drobish |
| D295,954 S | 5/1988 | Kirchhoff |
| D296,302 S | 6/1988 | Weber |
| 4,898,306 A | 2/1990 | Pardes |
| 4,938,387 A | 7/1990 | Kervefors |
| 4,964,541 A | 10/1990 | Gueret |
| 5,080,260 A | 1/1992 | Doring |
| 5,119,279 A | 6/1992 | Makowsky |
| 5,139,169 A | 8/1992 | Boyer |
| 5,174,458 A | 12/1992 | Segati |
| 5,182,084 A | 1/1993 | Plester |
| D336,216 S | 6/1993 | Rohrbeck |
| 5,325,765 A | 7/1994 | Sylvan |
| D352,204 S | 11/1994 | Hayes |
| 5,377,877 A | 1/1995 | Brown et al. |
| 5,379,916 A | 1/1995 | Martindale |
| 5,398,853 A | 3/1995 | Latham |
| 5,474,211 A | 12/1995 | Hellenberg |
| D372,867 S | 8/1996 | Lambelet |
| D382,808 S | 8/1997 | Fenton |
| D383,383 S | 9/1997 | Prestia |
| D387,992 S | 12/1997 | Kotoucek |
| 5,725,125 A | 3/1998 | Bessette |
| 5,747,824 A | 5/1998 | Jung |
| D396,603 S | 8/1998 | Gasser |
| 5,810,062 A | 9/1998 | Bonora |
| D399,098 S | 10/1998 | Yang |
| D400,050 S | 10/1998 | Littmann |
| D404,253 S | 1/1999 | Littmann |
| 5,938,080 A | 8/1999 | Haaser |
| 6,077,579 A | 6/2000 | De Laforcade |
| 6,142,063 A | 11/2000 | Beaulieu |
| 6,170,712 B1 | 1/2001 | Kasboske |
| 6,230,884 B1 | 5/2001 | Coory |
| 6,422,422 B1 | 7/2002 | Forbes |
| 6,446,049 B1 | 9/2002 | Janning |
| 6,504,481 B2 | 1/2003 | Teller |
| 6,529,446 B1 | 3/2003 | de la Huerga |
| D477,791 S | 7/2003 | Wells |
| D478,073 S | 8/2003 | Topinka |
| 6,615,881 B2 | 9/2003 | Bartholomew |
| 6,644,471 B1 | 11/2003 | Anderson |
| 6,703,935 B1 | 3/2004 | Chung |
| 6,722,530 B1 | 4/2004 | King |
| 6,761,318 B2 | 7/2004 | Dudek |
| D499,603 S | 12/2004 | Nikkhah |
| D500,936 S | 1/2005 | Nikkhah |
| 6,889,872 B2 | 5/2005 | Herman |
| 6,921,911 B2 | 7/2005 | Siepmann |
| 6,925,871 B2 | 8/2005 | Frank |
| 6,935,493 B2 | 8/2005 | Cho |
| D514,385 S | 2/2006 | Smith |
| 7,004,213 B2 | 2/2006 | Hansen |
| D517,852 S | 3/2006 | Jalet |
| 7,009,519 B2 | 3/2006 | Leonard |
| 7,032,818 B2 | 4/2006 | Thomas |
| D522,860 S | 6/2006 | LaFortune |
| D523,332 S | 6/2006 | McEldowney |
| D525,135 S | 7/2006 | Bakic |
| 7,104,184 B2 | 9/2006 | Biderman |
| 7,107,838 B2 | 9/2006 | Chai |
| D529,340 S | 10/2006 | Laib |
| D530,968 S | 10/2006 | Bodum |
| D533,018 S | 12/2006 | Berg |
| 7,172,095 B2 | 2/2007 | Marshall |
| 7,196,624 B2 | 3/2007 | Teller |
| D541,106 S | 4/2007 | Spiegel |
| D541,596 S | 5/2007 | Hicks |
| 7,228,879 B2 | 6/2007 | Miller |
| 7,319,523 B2 | 1/2008 | Chiarello |
| D565,350 S | 4/2008 | Gauger |
| 7,387,239 B2 | 6/2008 | Thomas |
| D572,588 S | 7/2008 | Osborn |
| D573,464 S | 7/2008 | Kogure |
| 7,439,859 B2 * | 10/2008 | Humphrey .......... G06Q 20/105 222/1 |
| D582,767 S | 12/2008 | Batton |
| 7,464,811 B2 | 12/2008 | Patterson |
| 7,501,933 B2 | 3/2009 | Rousso |
| D591,599 S | 5/2009 | Okin |
| D593,411 S | 6/2009 | Bizzell |
| D596,487 S | 7/2009 | Batton |
| 7,612,675 B2 | 11/2009 | Miller |
| 7,614,496 B2 | 11/2009 | Dvorak |
| D608,637 S | 1/2010 | Getsy |
| D611,298 S | 3/2010 | Freeman |
| D613,183 S | 4/2010 | Overgaard |
| 7,710,567 B1 | 5/2010 | Mentzer |
| 7,715,277 B2 | 5/2010 | de la Huerga |
| D618,963 S | 7/2010 | Freeman |
| 7,762,181 B2 | 7/2010 | Boland |
| D621,283 S | 8/2010 | Overgaard |
| 7,798,373 B1 | 9/2010 | Wroblewski |
| 7,825,804 B2 | 11/2010 | Malik |
| D634,157 S | 3/2011 | Hoff |
| D635,823 S | 4/2011 | Mauffette |
| D635,864 S | 4/2011 | Lee |
| D639,607 S | 6/2011 | Bracq |
| RE42,937 E | 11/2011 | Lasher |
| 8,083,055 B2 | 12/2011 | Simonian |
| D651,474 S | 1/2012 | Gut |
| 8,091,735 B2 | 1/2012 | Girard |

(56) References Cited

U.S. PATENT DOCUMENTS

| | | |
|---|---|---|
| 8,141,700 B2 | 3/2012 | Simonian |
| D658,982 S | 5/2012 | Pauser |
| D659,472 S | 5/2012 | D'Amato |
| 8,196,776 B2 | 6/2012 | Doglioni Majer |
| 8,210,396 B2 | 7/2012 | Girard |
| 8,240,508 B2 | 8/2012 | Wegelin |
| 8,302,795 B2 | 11/2012 | Van den Broek |
| 8,361,527 B2 | 1/2013 | Winkler |
| 8,378,830 B2 | 2/2013 | Moran |
| 8,397,519 B2 | 3/2013 | Loibl |
| 8,417,377 B2 | 4/2013 | Rothschild |
| 8,463,447 B2 | 6/2013 | Newman |
| 8,464,633 B2 | 6/2013 | Anson |
| 8,485,359 B2 | 7/2013 | Anderson |
| D688,531 S | 8/2013 | Ceder |
| 8,515,574 B2 | 8/2013 | Studor |
| 8,522,968 B2 | 9/2013 | Middleman |
| 8,523,837 B2 | 9/2013 | Wiggins |
| D690,990 S | 10/2013 | Boggs |
| D690,991 S | 10/2013 | Boggs |
| 8,556,127 B2 | 10/2013 | Olson |
| 8,584,691 B2 | 11/2013 | Hammonds |
| 8,584,840 B2 | 11/2013 | Kim |
| 8,590,753 B2 | 11/2013 | Marina |
| D699,106 S | 2/2014 | Glaser |
| D699,996 S | 2/2014 | De Leo |
| D700,008 S | 2/2014 | Ehrenhaus |
| 8,678,183 B2 | 3/2014 | Jones |
| D702,474 S | 4/2014 | Scherer |
| 8,684,231 B2 | 4/2014 | Lane |
| 8,695,420 B1 | 4/2014 | Korman |
| 8,701,906 B1 | 4/2014 | Anderson |
| 8,717,182 B1 | 5/2014 | Brashears |
| 8,718,819 B2 | 5/2014 | Hyde |
| 8,754,769 B2 | 6/2014 | Stein |
| 8,757,227 B2 | 6/2014 | Girard |
| D709,387 S | 7/2014 | Marina |
| 8,794,485 B2 | 8/2014 | Lunn |
| 8,801,688 B2 | 8/2014 | Wiggins |
| 8,833,607 B2 | 9/2014 | Wegelin |
| 8,851,740 B1 * | 10/2014 | Mills ............... A47J 43/042 222/132 |
| 8,919,613 B2 | 12/2014 | Mileti |
| 8,940,163 B2 | 1/2015 | Bassett |
| 8,945,374 B2 | 2/2015 | Chase |
| 8,977,389 B2 | 3/2015 | Witchell |
| 8,979,539 B1 | 3/2015 | Snyder |
| 8,985,395 B2 | 3/2015 | Tansey |
| 8,989,673 B2 | 3/2015 | Sandy |
| 8,991,648 B2 | 3/2015 | Smith |
| D727,171 S | 4/2015 | Marina |
| 9,014,846 B2 * | 4/2015 | Newman ............ B67D 1/0878 700/233 |
| 9,020,635 B2 | 4/2015 | Hortin |
| D729,571 S | 5/2015 | Wilson |
| 9,031,689 B1 | 5/2015 | Fink |
| 9,035,222 B2 | 5/2015 | Alexander |
| 9,035,765 B2 | 5/2015 | Engelhard |
| D731,242 S | 6/2015 | Machovina |
| D731,243 S | 6/2015 | Machovina |
| 9,102,441 B1 | 8/2015 | Orvik |
| 9,111,324 B2 | 8/2015 | Hyde |
| 9,126,738 B2 | 9/2015 | Boggs |
| 9,134,020 B1 | 9/2015 | Wells |
| 9,138,091 B2 | 9/2015 | Zhao |
| 9,151,605 B1 | 10/2015 | Sweeney |
| 9,161,654 B2 | 10/2015 | Belmont |
| 9,169,112 B2 | 10/2015 | Chase |
| D742,691 S | 11/2015 | Zhang |
| D746,046 S | 12/2015 | Lee |
| D748,955 S | 2/2016 | Oliver |
| 9,254,250 B1 | 2/2016 | Orofino |
| D751,865 S | 3/2016 | Harris |
| D752,391 S | 3/2016 | Hatherell |
| D752,396 S | 3/2016 | Tu |
| 9,290,309 B1 | 3/2016 | Pabon |
| D758,868 S | 6/2016 | Bretschneider |
| 9,357,887 B2 | 6/2016 | Wegelin |
| D760,537 S | 7/2016 | Hertaus |
| D768,507 S | 10/2016 | Hotell |
| 9,506,798 B2 | 11/2016 | Saltzgiver |
| D779,881 S | 2/2017 | Lee |
| D813,049 S | 3/2018 | Richmond |
| 9,932,217 B2 * | 4/2018 | Perrelli ............... G06F 19/3475 |
| D826,052 S | 8/2018 | Harris |
| 10,095,972 B2 | 10/2018 | Bhatia |
| D836,385 S | 12/2018 | Arzunyan |
| D837,594 S | 1/2019 | Palese |
| 10,231,567 B2 * | 3/2019 | Perrelli ............... B67D 1/0017 |
| 10,328,402 B2 * | 6/2019 | Kolar ................... H04L 12/281 |
| 10,363,530 B2 * | 7/2019 | Kolar ..................... G08C 17/02 |
| D856,083 S * | 8/2019 | Lawson-Shanks ........... D7/507 |
| 10,413,131 B2 * | 9/2019 | Kolar ................... A47J 43/0777 |
| 10,512,358 B1 * | 12/2019 | Perrelli ............... B67D 1/0019 |
| D878,864 S * | 3/2020 | Lawson-Shanks ........... D7/507 |
| 10,674,857 B2 * | 6/2020 | Lyons .................. A47J 31/005 |
| 2002/0070861 A1 | 6/2002 | Teller |
| 2002/0090426 A1 | 7/2002 | Denny |
| 2002/0129663 A1 | 9/2002 | Hoyt |
| 2005/0284302 A1 | 12/2005 | Levin |
| 2007/0137643 A1 | 6/2007 | Bonney |
| 2007/0214055 A1 | 9/2007 | Temko |
| 2008/0023488 A1 | 1/2008 | Guerreroe |
| 2008/0190958 A1 | 8/2008 | Wyner |
| 2009/0069930 A1 | 3/2009 | Peters |
| 2009/0120815 A1 | 5/2009 | Mitchell |
| 2009/0205506 A1 | 8/2009 | Lin |
| 2009/0206084 A1 | 8/2009 | Woolf |
| 2009/0228367 A1 | 9/2009 | Hughes |
| 2009/0272274 A1 | 11/2009 | De Graaff |
| 2010/0055252 A1 | 3/2010 | Marina |
| 2010/0163567 A1 | 7/2010 | Chiang |
| 2010/0183776 A1 | 7/2010 | Gruenwald |
| 2010/0219151 A1 | 9/2010 | Risheq |
| 2011/0006071 A1 | 1/2011 | Koumans |
| 2011/0024537 A1 | 2/2011 | Gonzalez |
| 2011/0049161 A1 | 3/2011 | Savinsky |
| 2011/0050431 A1 | 3/2011 | Hood |
| 2011/0052764 A1 | 3/2011 | Bulgin |
| 2011/0166910 A1 | 7/2011 | Marina |
| 2011/0180563 A1 | 7/2011 | Fitchett |
| 2012/0017766 A1 | 1/2012 | Anson |
| 2012/0035761 A1 | 2/2012 | Tilton |
| 2012/0094261 A1 | 4/2012 | Hayn |
| 2012/0097567 A1 | 4/2012 | Zhao |
| 2012/0104023 A1 | 5/2012 | Anselmino |
| 2012/0173164 A1 | 7/2012 | Steuerwald |
| 2012/0230149 A1 * | 9/2012 | Martin ................ A47J 43/0727 366/205 |
| 2012/0234183 A1 | 9/2012 | Edwards |
| 2012/0267320 A1 | 10/2012 | Baccigalopi |
| 2013/0001244 A1 | 1/2013 | Wegelin |
| 2013/0037506 A1 | 2/2013 | Wahlstrom |
| 2013/0043304 A1 | 2/2013 | Agan |
| 2013/0092567 A1 | 4/2013 | Lok |
| 2013/0127748 A1 | 5/2013 | Vertegaal |
| 2013/0139703 A1 | 6/2013 | Hogarth |
| 2013/0156904 A1 | 6/2013 | Nosler |
| 2013/0186779 A1 | 7/2013 | Kambouris |
| 2013/0226337 A1 | 8/2013 | Leech |
| 2013/0240079 A1 | 9/2013 | Petrini |
| 2013/0247770 A1 | 9/2013 | Wilder |
| 2013/0319915 A1 | 12/2013 | Gellibolian |
| 2014/0044837 A1 | 2/2014 | Weisman |
| 2014/0079856 A1 | 3/2014 | Hatherell |
| 2014/0110476 A1 | 4/2014 | Sheehan |
| 2014/0114469 A1 | 4/2014 | Givens |
| 2014/0269154 A1 * | 9/2014 | Kolar ..................... A47J 43/08 366/142 |
| 2014/0272019 A1 * | 9/2014 | Schuh ................... A47J 31/407 426/115 |
| 2014/0273925 A1 | 9/2014 | Burgett |
| 2014/0277707 A1 | 9/2014 | Akdogan |

(56) References Cited

U.S. PATENT DOCUMENTS

| | | | |
|---|---|---|---|
| 2014/0303790 A1* | 10/2014 | Huang | G06Q 50/22 700/281 |
| 2014/0305952 A1 | 10/2014 | Harris | |
| 2014/0312247 A1 | 10/2014 | McKee | |
| 2014/0324585 A1 | 10/2014 | Mederos | |
| 2014/0335490 A1 | 11/2014 | Baarman | |
| 2014/0352843 A1 | 12/2014 | Solera et al. | |
| 2014/0354438 A1 | 12/2014 | Hazen | |
| 2014/0372045 A1* | 12/2014 | Keski-Pukkila | A61B 5/4875 702/19 |
| 2014/0374438 A1 | 12/2014 | Carpenter | |
| 2015/0014369 A1 | 1/2015 | Hatton | |
| 2015/0024349 A1 | 1/2015 | Bischoff | |
| 2015/0088304 A1 | 3/2015 | Ameye | |
| 2015/0115158 A1 | 4/2015 | Fu | |
| 2015/0060482 A1 | 5/2015 | Murray | |
| 2015/0122688 A1* | 5/2015 | Dias | A47G 19/025 206/459.1 |
| 2015/0173488 A1 | 6/2015 | Witchell | |
| 2015/0175400 A1 | 6/2015 | Newman | |
| 2015/0182797 A1* | 7/2015 | Wernow | G06F 19/3418 434/247 |
| 2015/0183627 A1 | 7/2015 | Tansey, Jr. | |
| 2015/0223623 A1 | 8/2015 | Davis | |
| 2015/0272394 A1 | 10/2015 | Lin | |
| 2015/0284163 A1 | 10/2015 | Manwani | |
| 2016/0159632 A1* | 6/2016 | Wheatley | G06F 19/3475 222/1 |
| 2016/0174470 A1 | 6/2016 | Shaffer | |
| 2016/0220973 A1* | 8/2016 | Kolar | A47J 43/07 |
| 2016/0251234 A1 | 9/2016 | Hayslett | |
| 2016/0257554 A1 | 9/2016 | Manwani | |
| 2016/0317985 A1 | 11/2016 | Mutschler | |
| 2016/0376140 A1 | 12/2016 | Tansey | |
| 2017/0087524 A1* | 3/2017 | Deshpande | B01F 13/0022 |
| 2017/0156540 A1* | 6/2017 | Wheatley | A47J 31/002 |
| 2017/0303744 A1* | 10/2017 | Sutton | A47J 43/0772 |
| 2017/0361984 A1 | 12/2017 | Fouad | |
| 2018/0020875 A1* | 1/2018 | Kolar | B01F 13/047 366/279 |
| 2018/0059790 A1* | 3/2018 | Kolar | A47J 43/0722 |
| 2018/0072553 A1* | 3/2018 | Lyons | A45F 3/18 |
| 2018/0099850 A1* | 4/2018 | Lyons | A47J 31/002 |
| 2018/0168385 A1* | 6/2018 | Boone | A47J 31/18 |
| 2018/0177325 A1* | 6/2018 | Lyons | A47J 31/005 |
| 2018/0208447 A1 | 7/2018 | Perrelli | |
| 2018/0344070 A1 | 12/2018 | Perrelli | |
| 2019/0001288 A1* | 1/2019 | Ciepiel | A47J 43/0716 |
| 2019/0015803 A1 | 1/2019 | Goodson | |
| 2019/0060849 A1* | 2/2019 | Waggoner | B01F 13/0022 |
| 2019/0208948 A1 | 7/2019 | Perrelli | |
| 2020/0113374 A1* | 4/2020 | Perrelli | A47J 31/521 |
| 2020/0122992 A1* | 4/2020 | Lyons | B67D 1/0871 |

FOREIGN PATENT DOCUMENTS

| | | | |
|---|---|---|---|
| EP | 1793326 | 6/2007 | |
| EP | 1671568 | 1/2008 | |
| GB | 860987 | 2/1961 | |
| WO | WO 2008 / 111072 | 9/2008 | |
| WO | WO-2016201305 A1 * | 12/2016 | B67D 1/0016 |
| WO | WO 2016201305 A1 | 12/2016 | |

* cited by examiner

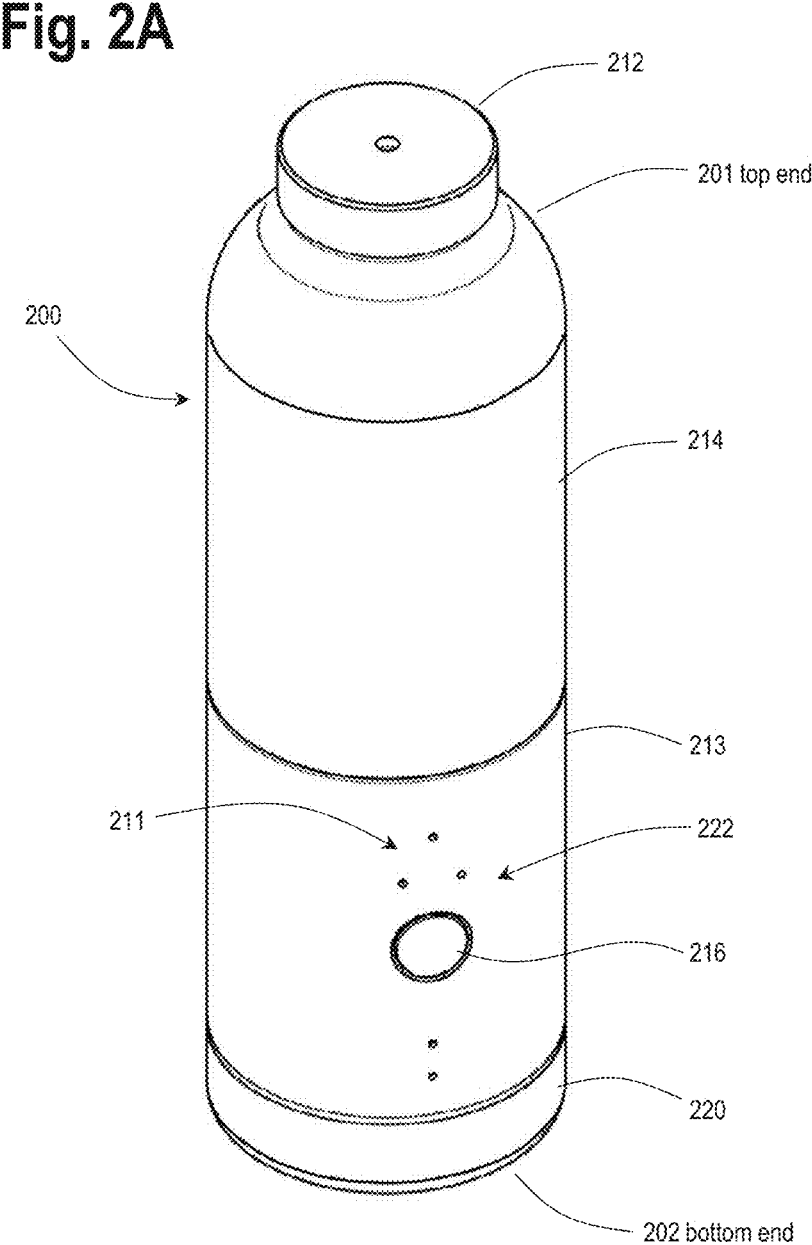

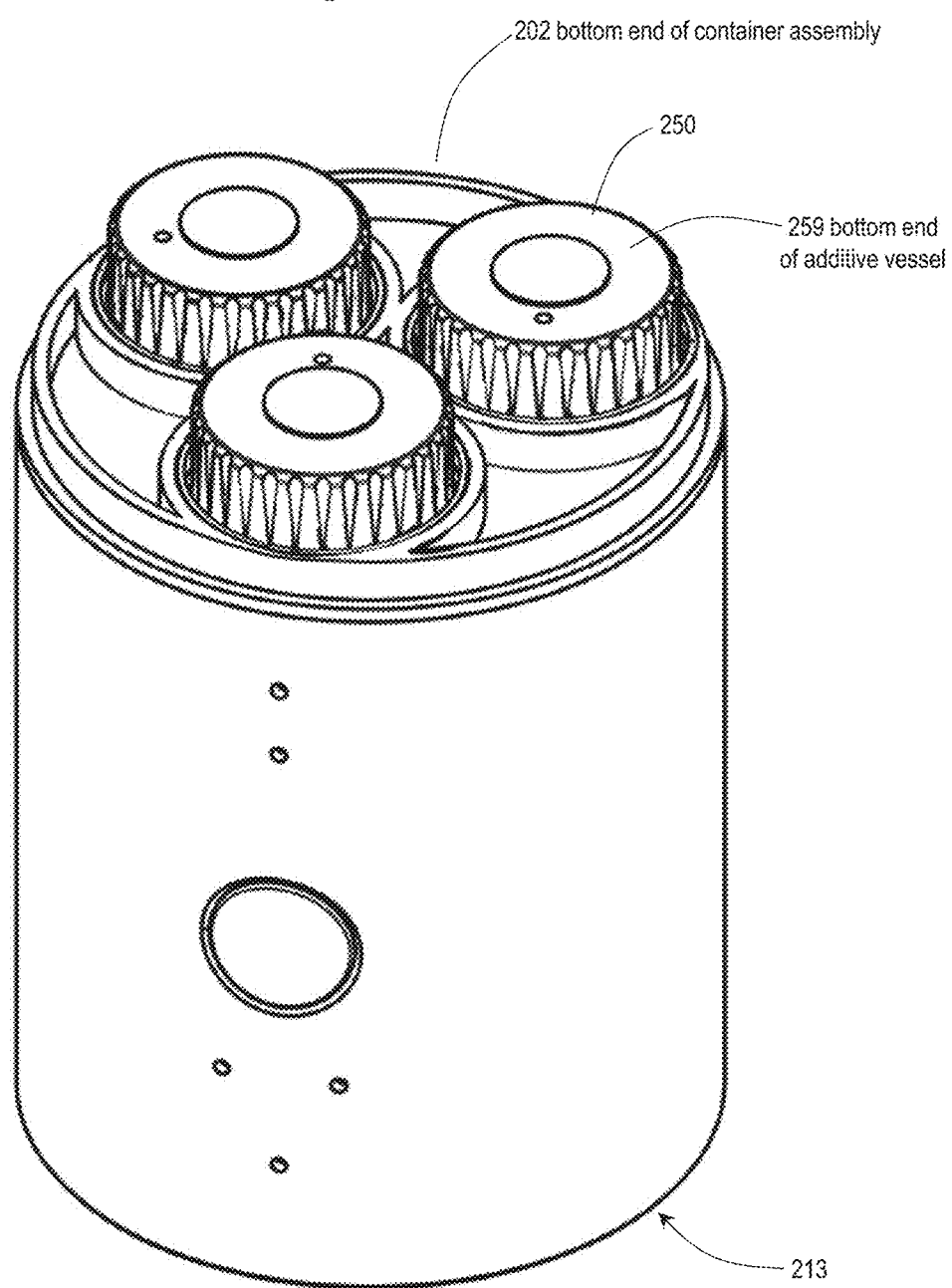

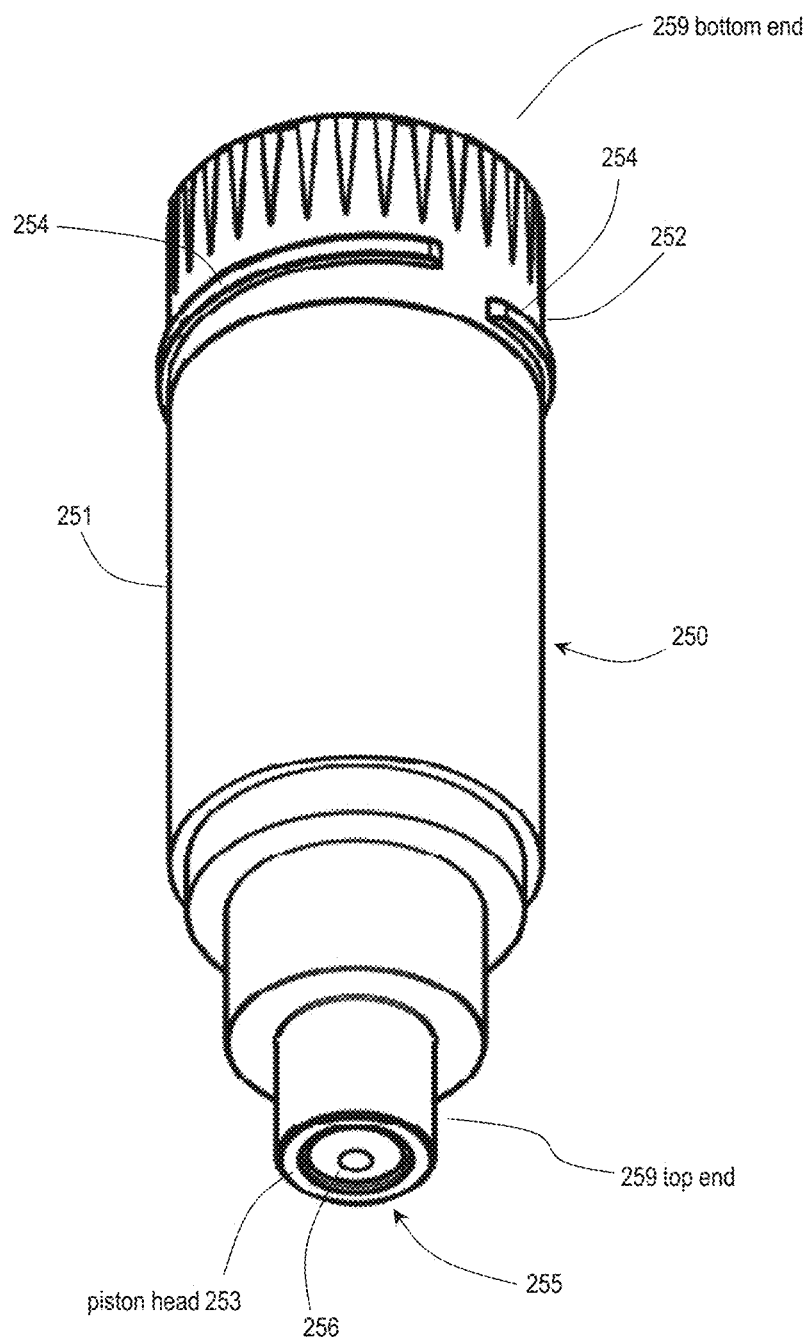

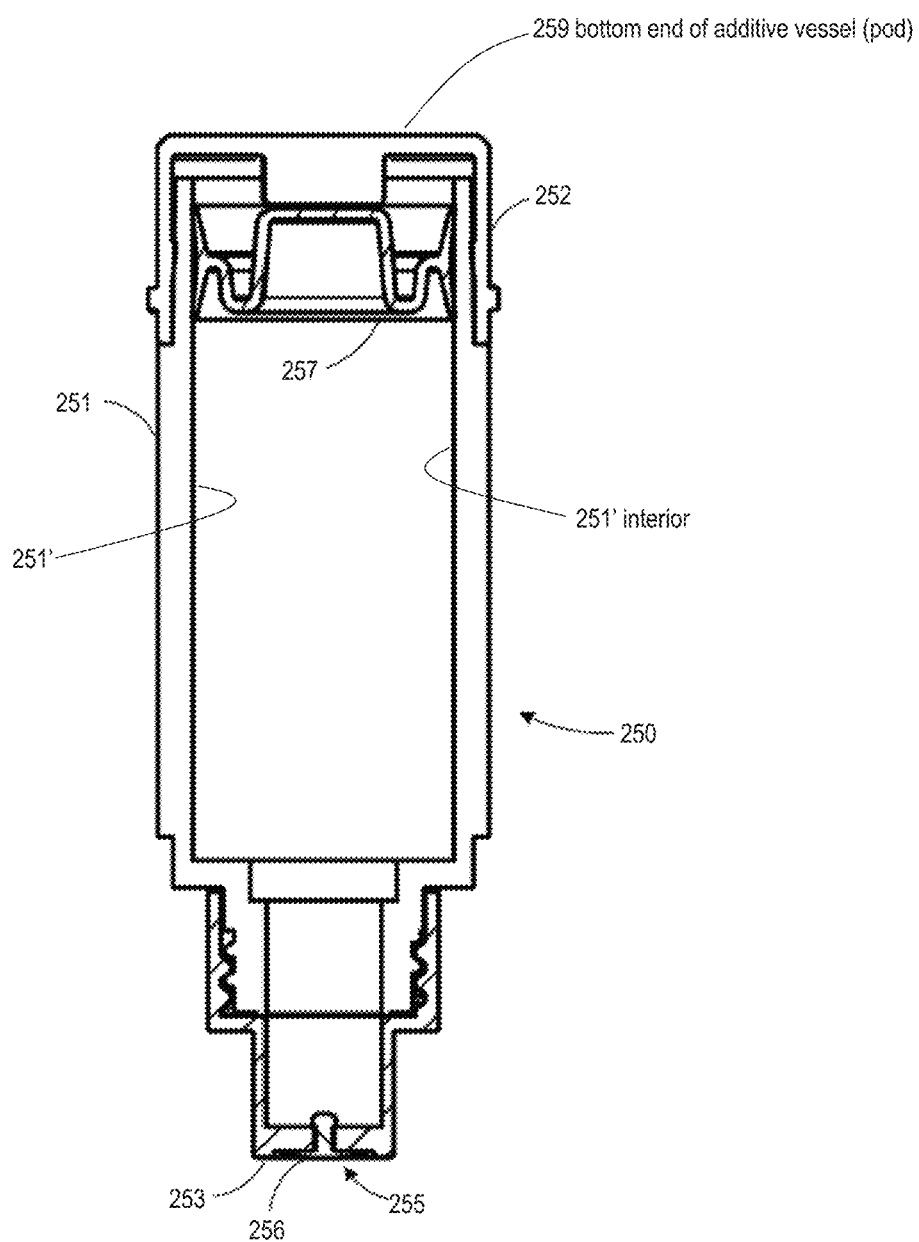

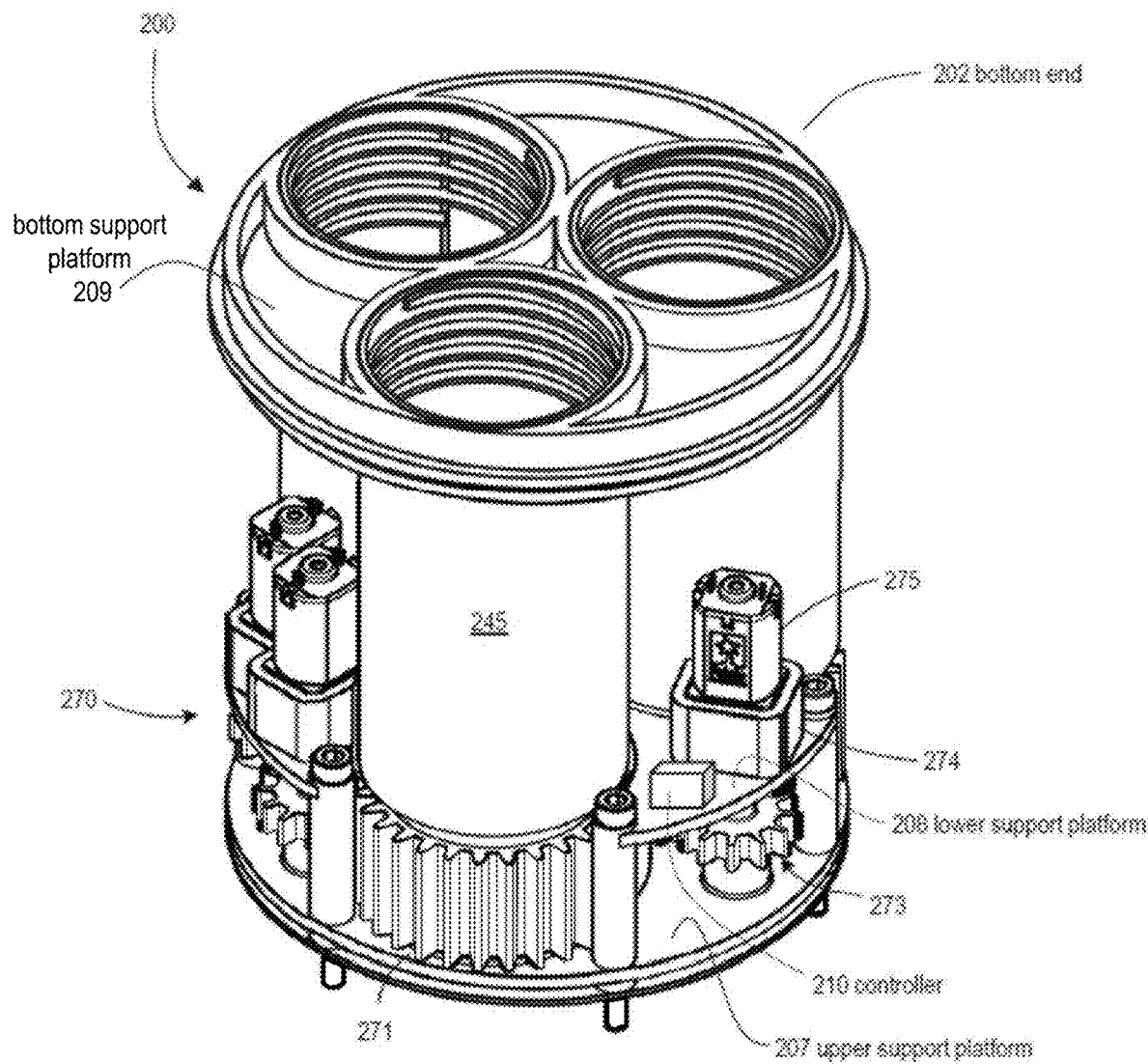

Fig. 15A
Fig. 15B
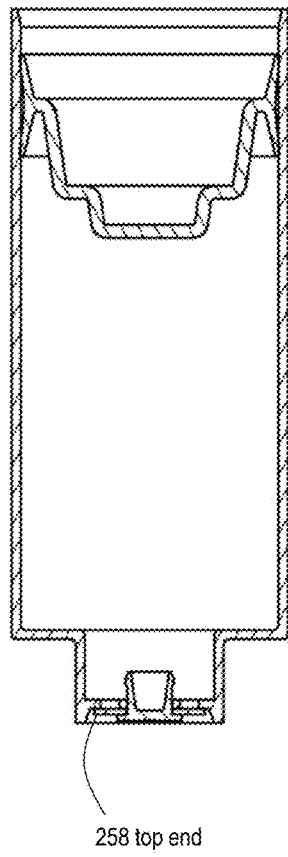
258 top end
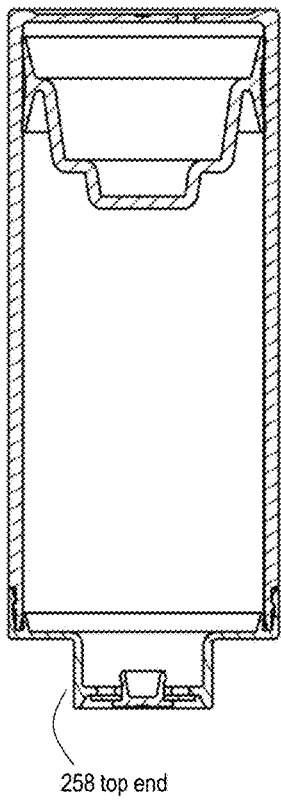
258 top end
Fig. 15C
Fig. 15D
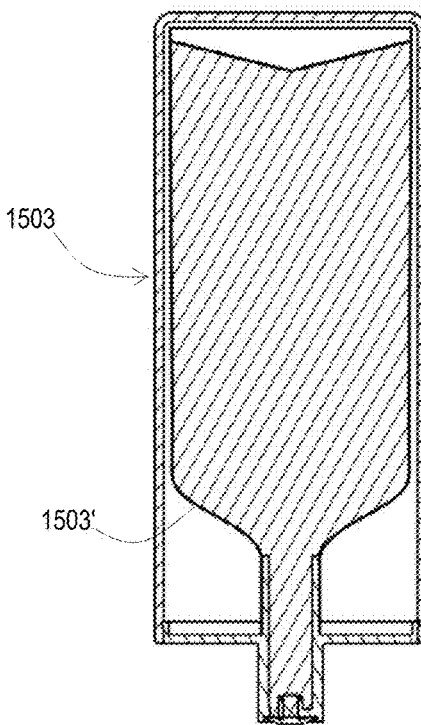
1503
1503'
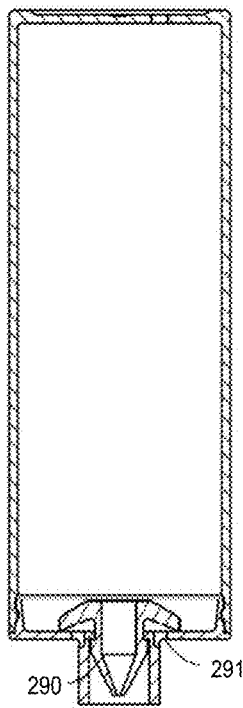
290   291

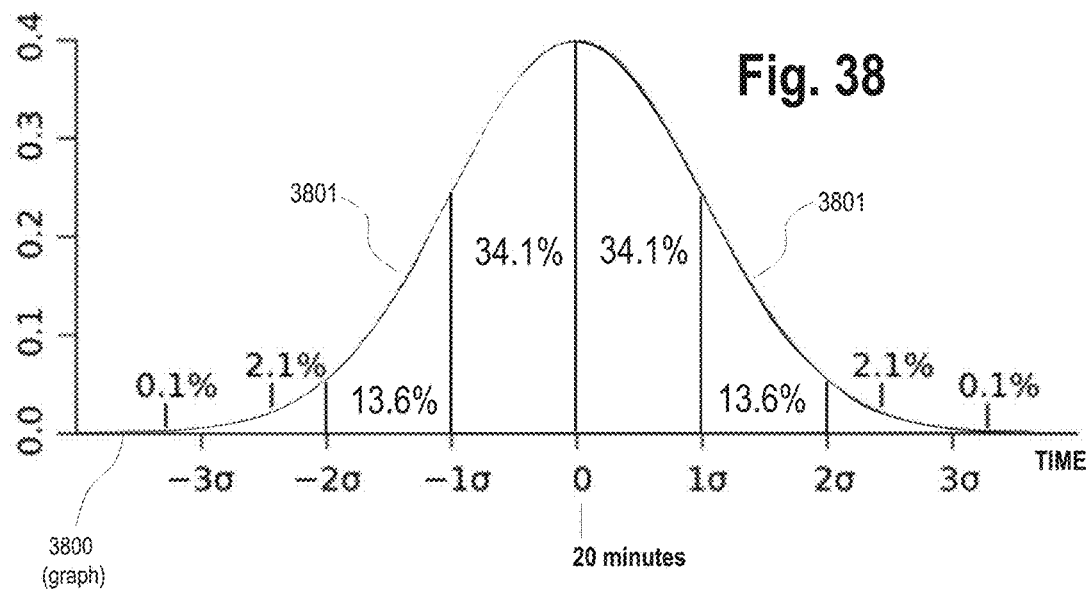
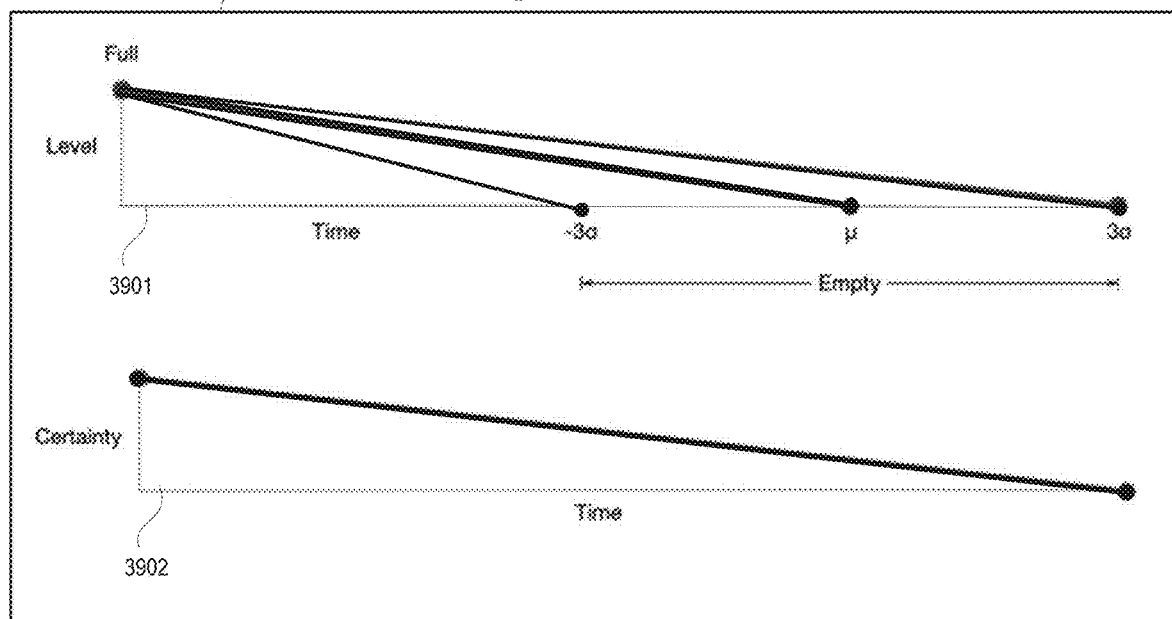

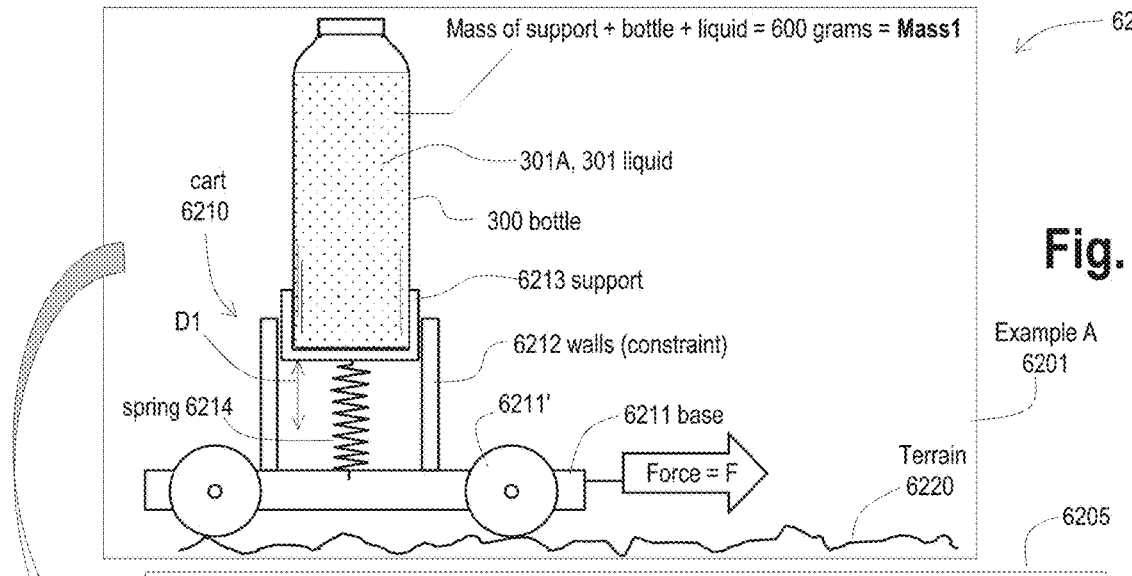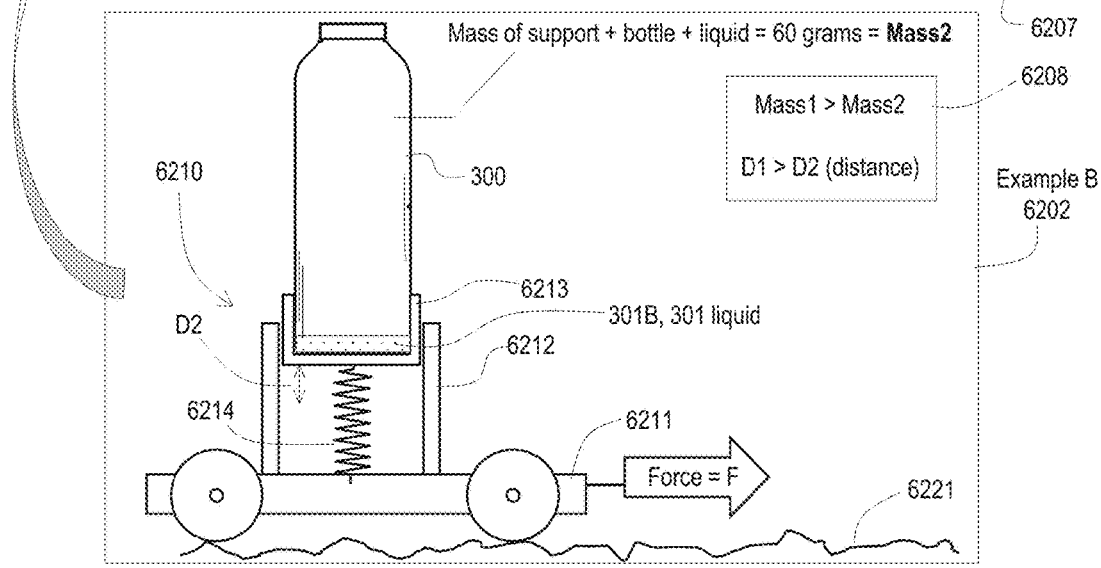
Fig. 62

Fig. 70
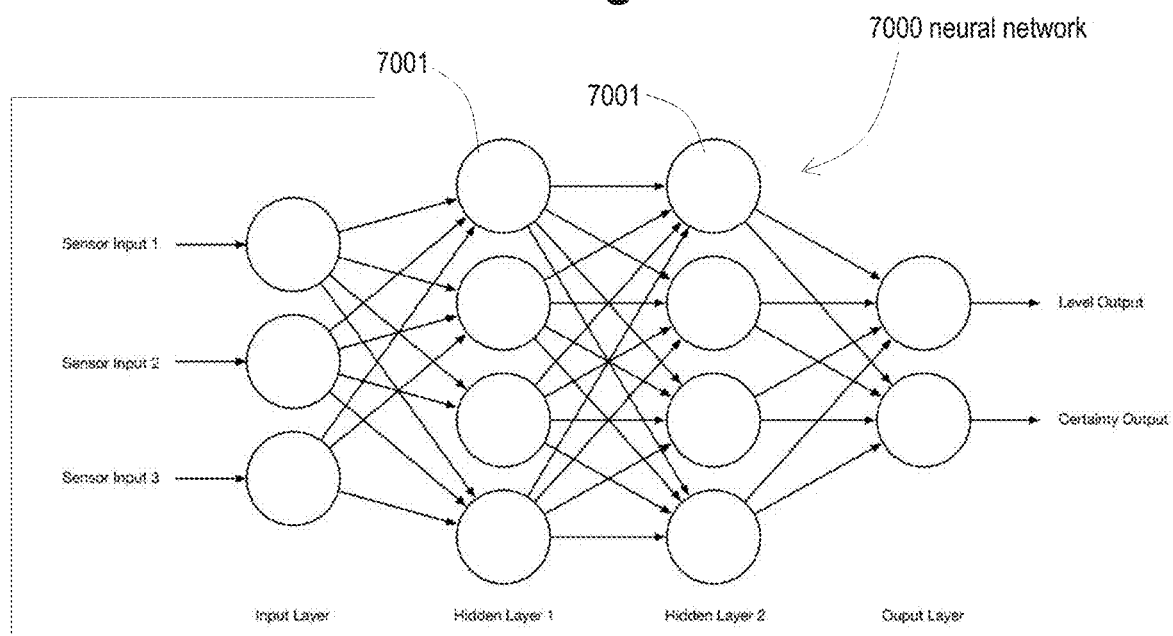
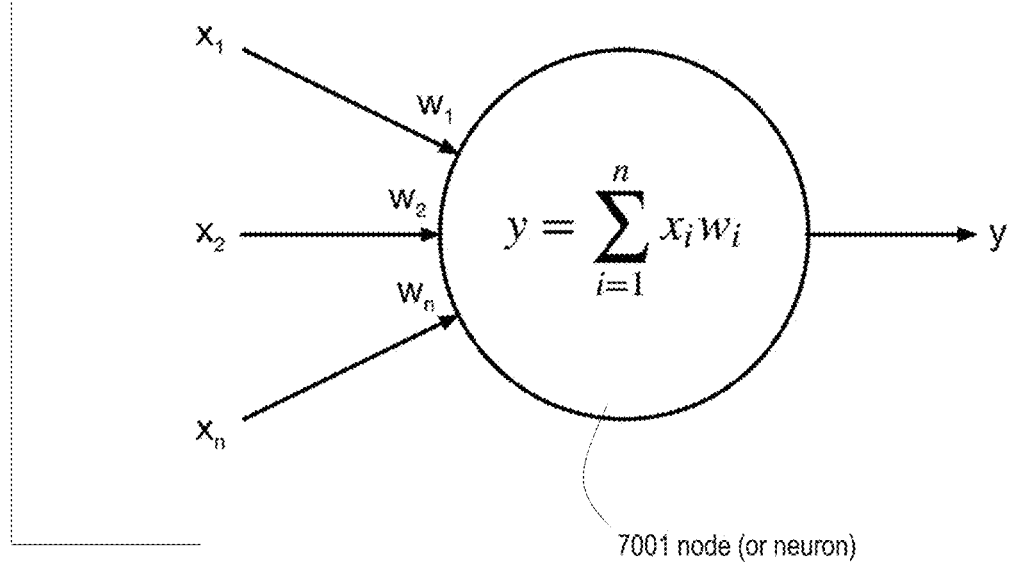

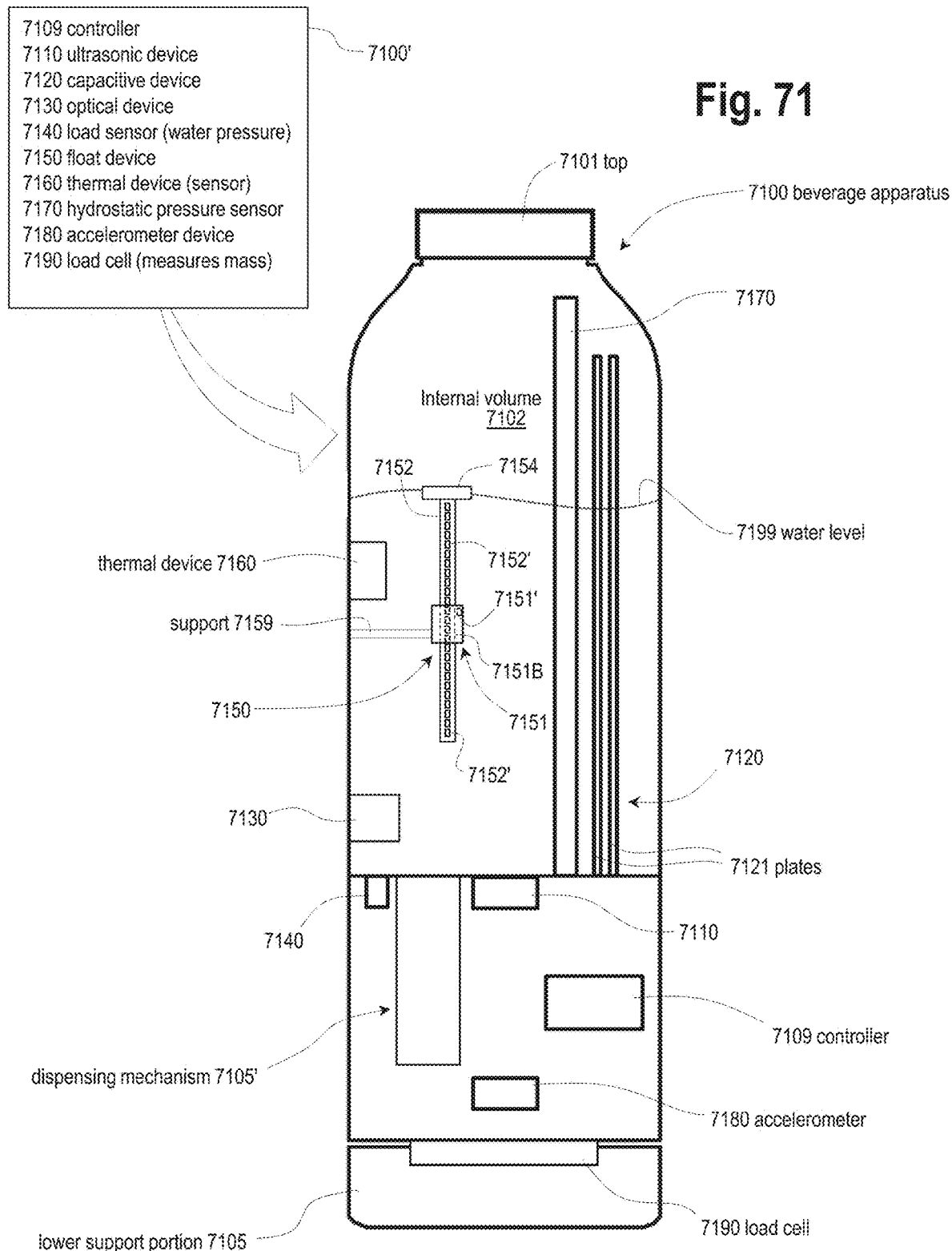

PORTABLE BEVERAGE CONTAINER SYSTEMS AND METHODS FOR ADJUSTING THE COMPOSITION OF A BEVERAGE

RELATED APPLICATIONS

This application is a continuation of, and claims priority to, U.S. application Ser. No. 16/663,219, filed Oct. 24, 2019, the entire disclosure of which is hereby incorporated by reference. Such U.S. application Ser. No. 16/663,219 claims priority to U.S. Provisional Patent Application Ser. No. 62/900,511 filed Sep. 14, 2019 the entire disclosure of which is hereby incorporated by reference.

The subject matter of this application is related to U.S. application Ser. No. 15/694,659, filed Sep. 1, 2017 (U.S. Publication 2018/0099850), the entire disclosure of which is hereby incorporated by reference. This application is related to U.S. application Ser. No. 15/179,709, filed Jun. 10, 2016 (U.S. Publication 2017/0156540 and now U.S. Pat. No. 10,231,567), the entire disclosure of which is hereby incorporated by reference. This application is related to U.S. application Ser. No. 15/862,206, filed Jan. 4, 2018 (U.S. Publication 2018/0177325), the entire disclosure of which is hereby incorporated by reference.

This application is related to U.S. Provisional Patent Application Ser. No. 62/442,039, filed Jan. 4, 2017, the entire disclosure of which is hereby incorporated by reference.

The subject matter of this application is related to U.S. application Ser. No. 14/960,109, filed Dec. 4, 2015 and published Jun. 9, 2016 (U.S. Publication 2016/0159632 and now U.S. Pat. No. 9,932,217), which claims priority to U.S. Provisional Patent Application Ser. No. 62/174,935, filed Jun. 12, 2015; U.S. Provisional Patent Application Ser. No. 62/174,466, filed Jun. 11, 2015; U.S. Provisional Patent Application Ser. No. 62/174,415, filed Jun. 11, 2015; and U.S. Provisional Patent Application Ser. No. 62/088,189, filed Dec. 5, 2014, the entire disclosures of which are hereby incorporated by reference. The subject matter of this application is also related to International Application Ser. No. PCT/US2015/063974, filed Dec. 4, 2015 and published Jun. 9, 2016, the entire disclosure of which is hereby incorporated by reference.

The subject matter of this application is related to U.S. application Ser. No. 15/179,709, filed Jun. 10, 2016, which claims priority to U.S. Provisional Patent Application Ser. No. 62/174,935, filed Jun. 12, 2015; U.S. Provisional Patent Application Ser. No. 62/174,466, filed Jun. 11, 2015; U.S. Provisional Patent Application Ser. No. 62/174,459, filed Jun. 11, 2015; U.S. Provisional Patent Application Ser. No. 62/174,453, filed Jun. 11, 2015; U.S. Provisional Patent Application Ser. No. 62/174,447, filed Jun. 11, 2015; U.S. Provisional Patent Application Ser. No. 62/174,427, filed Jun. 11, 2015; U.S. Provisional Patent Application Ser. No. 62/174,415, filed Jun. 11, 2015; U.S. Provisional Patent Application Ser. No. 62/174,343, filed Jun. 11, 2015; U.S. Provisional Patent Application Ser. No. 62/174,336, filed Jun. 11, 2015; U.S. Provisional Patent Application Ser. No. 62/174,254, filed Jun. 11, 2015; and U.S. Provisional Patent Application Ser. No. 62/174,440, filed Jun. 11, 2015, the entire disclosures of which are hereby incorporated by reference. The subject matter of this application is also related to International Application Ser. No. PCT/US2016/036992, filed Jun. 10, 2016 and published Dec. 15, 2016, the entire disclosure of which is hereby incorporated by reference.

BACKGROUND

Portable refillable bottles and other containers used for water and other beverages are widely used and are important for health and hydration. Such bottles and containers are used with increasing frequency to consume functional ingredients, such as, for example, energy, protein, and sleep supplements. However, one limitation of many of such bottles and other hydration containers is that the consumable contents remain constant and unchanged except for changes in quantity as the contents (frequently, but not exclusively water) are consumed and subsequently replenished.

Other problems and limitations exist with known bottles, as well as with systems and methods that are used with such known bottles and other containers.

SUMMARY OF THE DISCLOSURE

A beverage apparatus, the beverage apparatus being hand-holdable by a user of the beverage apparatus to be portable, can include a beverage chamber housing that includes a chamber for storing a consumable liquid. The beverage apparatus can include a dispensing assembly that includes a receptacle. The receptacle can retain a vessel.

The vessel can include an electronic tag and can contain an additive. The dispensing assembly can be operatively controllable by a controller to output the additive from the vessel into the consumable liquid. The beverage apparatus can include one or more sensors, devices, or assemblies that can be used to detect a volume of liquid in the chamber or a liquid level in the chamber. The beverage apparatus can include an apparatus computer processor (ACP) and an apparatus database portion (ADP). The apparatus database portion can include instructions that are performed by the ACP in operation of the beverage apparatus. The ACP can be configured to control the dispensing assembly to perform dispensing of the additive from the vessel into the consumable liquid. The ACP can communicate with the electronic tag of the vessel so as to input data from and output data to the electronic tag. The ACP can communicate with the electronic tag to determine state of the additive in the vessel and processing can be performed based on the state of the additive in the vessel. The beverage apparatus of the disclosure can include various additional features. Related systems and methods are disclosed.

BRIEF DESCRIPTION OF THE DRAWINGS

These and other objects, features, advantages, and characteristics of the present disclosure will become more apparent to those skilled in the art upon consideration of the following Detailed Description, taken in conjunction with the accompanying claims and drawings, all of which form a part of the present disclosure.

In the drawings:

FIG. 2A illustrates a beverage container assembly, according to principles of the disclosure.

FIG. 4A illustrates a bottom view of the dispensing assembly with a base cover removed and with additive vessels, according to principles of the disclosure.

FIG. 5A illustrates an isometric perspective view of an additive container, according to principles of the disclosure.

FIG. 5B illustrates a cross section cutaway view of an additive container, according to principles of the disclosure.

FIGS. 8A and 8B illustrate views of a drive mechanism for actuating a receptacle and associated piston of a pumping mechanism, according to principles of the disclosure.

FIGS. 15A-15D illustrate different configurations of containers, vessels or pods for liquid additives that can be used in accordance with various embodiments.

FIG. 38 is a graph illustrating aspects of utilizing the passage of time to estimate or determine liquid level in a beverage apparatus, according to principles of the disclosure.

FIG. 39 is a further diagram showing graphs, according to principles of the disclosure.

FIG. 62 is a diagram illustrating processing features relating to forces exerted on a bottle, according to principles of the disclosure.

FIG. 70 is a diagram illustrating the use of neural networks according to principles of the disclosure.

FIG. 71 is a schematic diagram showing a beverage apparatus with liquid level sensors according to principles of the disclosure.

Figure 1:
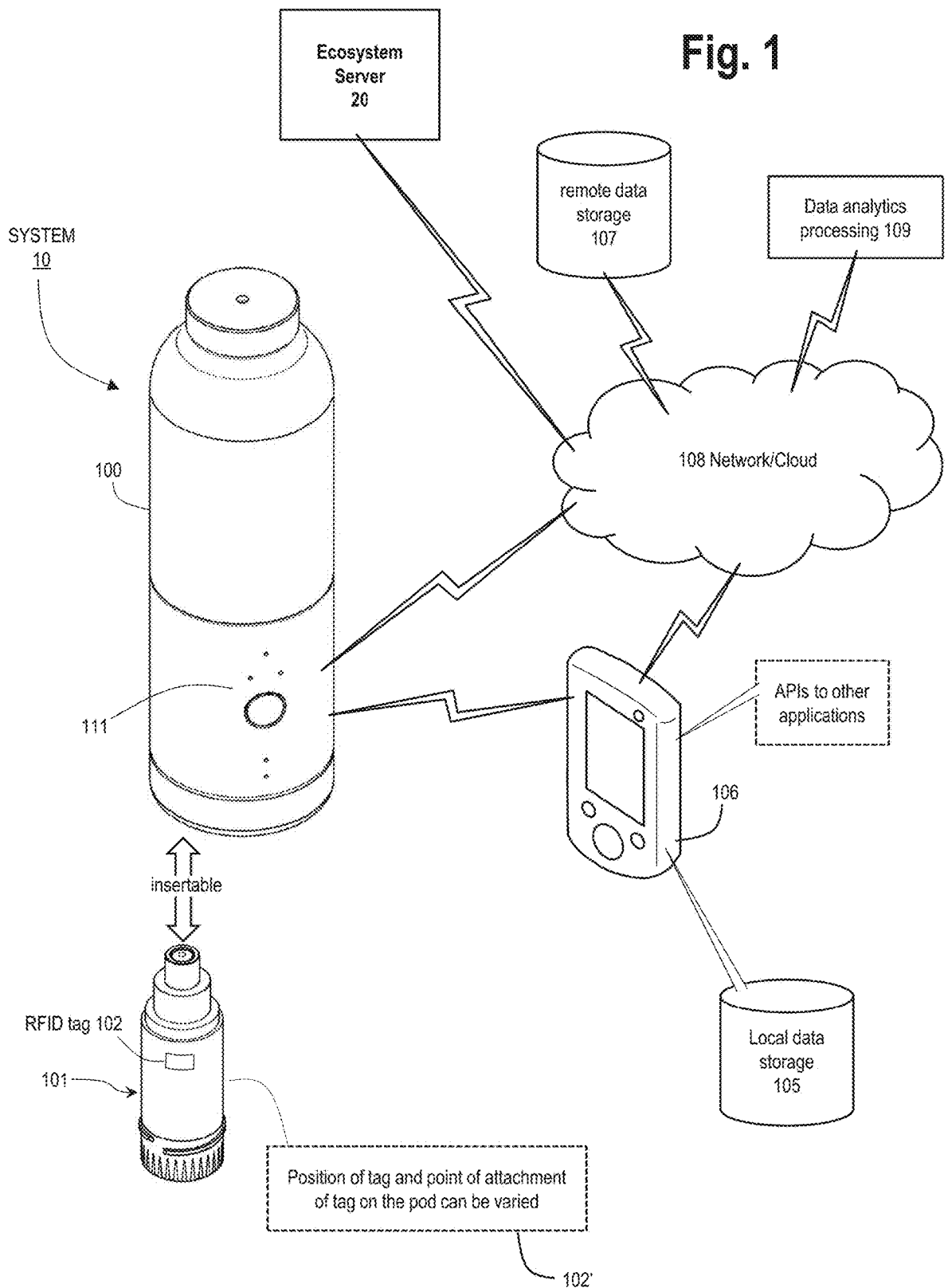
FIG. 1 is a block diagram illustrating an example high-level hydration ecosystem according to principles of the disclosure.

The headings provided herein are for convenience only and do not necessarily affect the scope or meaning of what is claimed in the present disclosure.

In the drawings, same reference numerals and acronyms have been used to identify same or similar structure, components or functionality for ease of understanding and convenience.

DETAILED DESCRIPTION OF THE DISCLOSURE

A few inventive aspects of the disclosed embodiments are explained in detail below with reference to the various drawing figures. Exemplary embodiments are described to illustrate the disclosed subject matter, not to limit its scope, which is defined by the claims. Those of ordinary skill in the art will recognize a number of equivalent variations of the various features provided in the description that follows.

In the following description, references are made to various embodiments in accordance with which the disclosed subject matter can be practiced. Multiple references to "one embodiment" or "an embodiment" do not necessarily refer to the same embodiment. Particular features, structures or characteristics associated with such embodiments can be combined in any suitable manner in various embodiments. Various examples and embodiments are described. The following description provides specific details for a thorough understanding and enabling description of these examples. One skilled in the relevant art will understand, however, that one or more embodiments described herein may be practiced without many of these details. Likewise, one skilled in the relevant art will also understand that one or more embodiments of the present disclosure can include many other obvious features not described in detail herein.

Additionally, some well-known structures or functions may not be shown or described in detail below, so as to avoid unnecessarily obscuring the relevant description.

In at least one embodiment, the present disclosure provides a portable, self-contained beverage apparatus comprising a container assembly having a known storage capacity for storing a consumable liquid and a dispensing assembly.

The dispensing assembly can be disposed within the container assembly that dispenses variable, non-zero quantities of additives into the consumable liquid stored in the container assembly. The dispensing assembly can include a plurality of apertures structured and arranged to retain vessels or "pods". The vessel or pods can contain respective additives to be dispensed into the consumable liquid.

In at least one embodiment, the portable, self-contained beverage apparatus further includes a controller that controls the dispensing by the dispensing assembly of the variable, non-zero quantities of the additives into the consumable liquid stored in the container assembly. The controller can include one to more processors and one or more databases.

In at least one embodiment, the controller of the portable, self-contained beverage apparatus controls dispensing by the dispensing assembly to maintain a targeted concentration of an additive in the consumable liquid stored in the container assembly, wherein the controlling can be based on tracked consumable liquid level and the quantity of the at least one additive. In at least one embodiment, the portable, self-contained beverage apparatus includes respective vessels retained, in the plurality of apertures, that contain the additives to be dispensed into the consumable liquid stored in the container assembly. The controller of the portable, self-contained beverage apparatus can control dispensing by the dispensing assembly to maintain a desired concentration of an additive in the consumable liquid stored.

Portable hydration containers may be filled in the morning, or other time of day, and topped-off throughout the day as liquid is consumed. It can be neither practical nor desirable to require that a user fill multiple compartments of a container with multiple different consumable liquids or mixtures for consumption throughout the course of the day.

It is also not desirable to require a user to carry around separate additive vessels—and to insert additives contained therein into a hydration container when needed by the user. Therefore, a more practical and desirable solution is to dispense a selection, sequence or combination of different additives from one or more additive vessels into a consumable liquid at the appropriate time in response to a signal or signals. The signal can be from the beverage apparatus and/or from a mobile or wearable device, processor or application that is associated with the beverage apparatus. Such arrangement can be used in conjunction with various other features and functionality.

The "beverage apparatus" as disclosed herein can also be described as a "bottle" or "container assembly" of the disclosure. The beverage apparatus, bottle, or container assembly can include various functionality as described herein.

Accordingly, one or more embodiments of the present disclosure relate to a consumable container having a dispensing module assembly with a number of apertures into which additive vessels can be inserted by a user. Each of these additive vessels can have an RFID tag attached to the vessel. An RFID transceiver can be mounted on the dispensing assembly or other structure of the beverage apparatus so as to interface with the RFID tag—and specifically with an antenna of the RFID tag. The RFID transceiver can including a reader, an antenna, and/or other elements for communicating, including writing and reading, with one or more RFID tags on the vessels. The RFID transceiver, on the dispensing assembly, can be mounted on a surface of a dispensing module located on a central axis of the consumable container. In other embodiments, a plurality of RFID transceivers can be provided and each RFID transceiver (of the dispensing assembly) can be positioned in a respective static relationship relative to a respective RFID tag (on a respective additive vessel that is inserted into the beverage apparatus). The arrangement can provide access to data about the contents of the additive vessel from the RFID tag of the additive vessel. The methods, systems, and apparatuses of the disclosure can be designed to access various data about the contents of an additive vessel. One having ordinary skill in the art will recognize that a passive data system such as RFID may be ideal due to its passive nature, read/write capability, and low-cost. However, other functionality, arrangements, and methods could provide similar results, including but not limited to physical key-based methods, or optical methods.

As will be described in greater detail below, the methods, systems, and apparatus of the present disclosure can be designed to present information to a user regarding the additives consumed and/or vessel(s) inserted in the beverage apparatus. For example, according to principles of the disclosure, the portable container may display (e.g., on a user interface screen of the container) information or generate an alert to the user when one or more of the additive vessels inserted in the beverage apparatus is, or will soon become empty. In another example, the container may be configured to predict a future date when one or more of the additive vessels inserted in the beverage apparatus will become empty. Such a feature serves to recommend and/or automate future purchases. Such a system might also function to adjust or otherwise modify dispensing protocol to ensure that the additive does not become depleted on or before a targeted time.

In accordance with at least one embodiment, the methods, systems, and apparatuses may be designed to provide for direct or indirect communication of an instruction from a central control application to a container assembly. Such a direct or indirect communication may be, for example, an instruction to dispense an additive, may include a dispensing schedule and/or protocol, or may indicate that an additive (e.g., medication, pharmaceutical, or the like) has, or has not, been dispensed by the dispensing apparatus within the container. Data associated with the dispensing event (or lack thereof) might also be collected and communicated directly or indirectly between the dispensing device and the aforementioned central control application. In accordance with at least one embodiment, Bluetooth low energy may be used as the primary transmission method of such data. However, other transmission technology, channels and/or protocols can be used to provide communication between a vessel and a container assembly.

Also disclosed herein are methods and apparatuses for the precise and continuously variable dispensing of a removable additive vessel through the use of a discretely adjustable piston or actuator. Adjustment of a dispensed additive can be provided by a variable stroke length of the piston or actuator. Such adjustment can be controlled by a user—such as through a sequence of buttons pressed on a user interface. For example, a particular button can be associated with a dispense of a particular additive/additive vessel. As the user's finger is held on the particular button a longer amount of time, the dispense can be extended thus dispensing more additive. The arrangement can provide a dispensing event that is precise and repeatable. Passive electronics or other electronics measuring which additive vessel, dispensing quantity, and how many dispensing events are initiated can log the user's consumption activity and behaviors.

Embodiments of some or all of the methods disclosed herein may be represented as instructions embodied on transitory or non-transitory processor-readable storage media such as optical or magnetic memory or represented as a propagated signal provided to a processor or data processing device via a communication network. The communication network can be, for example, an Internet or telephone connection, or other communication channel.

FIG. 1 shows an illustrative diagram of an overall ecosystem or system 10, according to principles of the disclosure.

FIG. 1 includes a beverage apparatus 100 that can be portable. The beverage apparatus 100 can be hand-holdable by a user so as to provide portability. The beverage apparatus 100 can contain a consumable (e.g., a liquid) into which liquid, powder, and/or other forms of consumable additives may be dispensed from one or more separate removable additive vessels 101. Data about the additives within each additive vessel 101 may be encoded within an RFID or similar active, passive, or other type tag 102 mounted on or otherwise attached or affixed to or associated with the additive vessel 101. Such data about the additives contained within the additive vessel or vessel 101 can be read from the RFID or similar type tag 102 by, for example, an RFID transceiver with antenna that is a component of the beverage apparatus 100. For example, in accordance with at least one embodiment, the beverage apparatus 100 may include an RFID antenna (not shown in FIG. 1) that rotates around or that is positioned around a central axis of the beverage apparatus 100 to individually and/or sequentially read data from the additive vessels 101. The additive vessels 101 can be inserted in a circular arrangement around the central axis of the beverage apparatus. In other embodiments, a plurality of RFID readers or RFID transceivers can be provided and each RFID reader can be static relative to a respective RFID tag (on a respective additive vessel). There can be one or more than one additive vessel 101. Data about the additives contained in the additive vessels 101, can be collected, analyzed, and/or communicated by the beverage apparatus 100 (e.g., by a processor and/or other components of the beverage apparatus 100), and made available to one or more user devices 106, local data storage 105, remote data storage 107, and other data resources, such as data analytics processor 109. Such information may be presented to the user using a display 111 mounted on the beverage apparatus 100 and/or using a display on the user device 106. The user device 106 can be a cell phone or smart phone, for example. Communications may be performed or provided between the various components of the system 10 over a network 108. The network 108 may be provided using a cloud based architecture or other network.

Figure 2B:
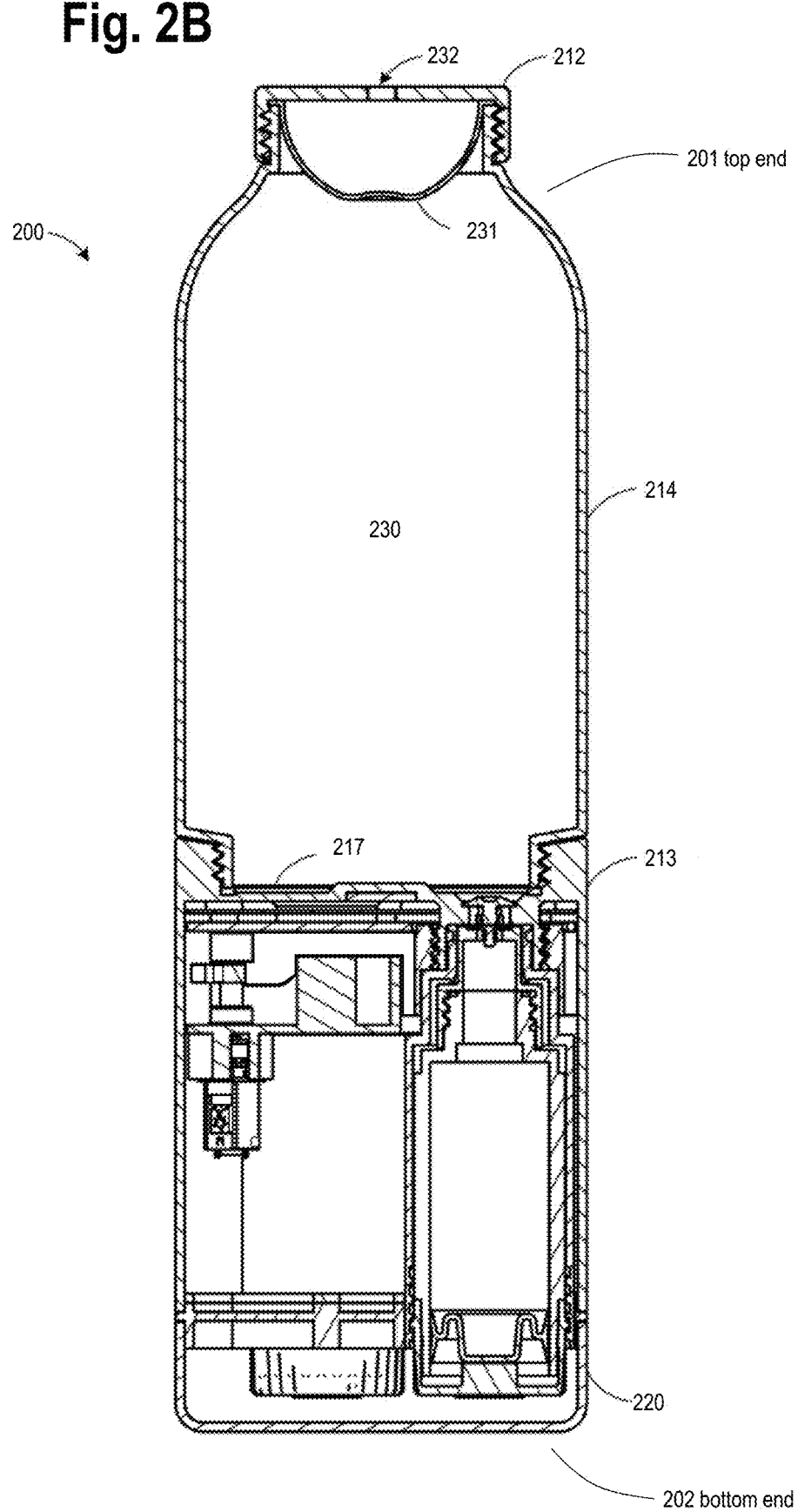
FIG. 2B is a cross section view of a beverage container assembly, according to principles of the disclosure.

FIGS. 2A and 2B illustrate a beverage apparatus 200, in accordance with at least one embodiment, that will be shown in further detail in subsequent FIGS. 3-12 and described in the description that follows. As will be understood by one skilled in the art, the various features and functionality described above and elsewhere in this disclosure can be applied, combined and used in conjunction with the beverage apparatus 200 in accordance with the various embodiments described below. The beverage apparatus 200 may be of similar or same construction as the beverage apparatus 100 of FIG. 1. The beverage apparatus 200 can include a controller 210 that controls operations of the beverage apparatus 200.

FIG. 2A illustrates a perspective view while FIG. 2B illustrates a cross section cutaway view of the beverage container assembly or beverage apparatus 200, according to principles of the disclosure. The beverage apparatus 200 includes a beverage chamber housing 214, which forms a portion of a chamber 230 to contain a beverage. The beverage chamber housing 214 can be configured with an open threaded base that threads onto a top end of a dispensing assembly 213. A top portion of the dispensing assembly 213 can include a platform 217, which can form a bottom half or portion of the chamber 230 to contain the beverage. The dispensing assembly 213 can house one or more containers of additives, i.e. vessels of additives, to be dispensed into the chamber 230, a dispensing mechanism or dispensing assembly configured to control the addition of the additives from the vessels, and electronics configured to control the dispensing mechanism. A removable base cover 220 can be configured to thread on to and off of a bottom end of the dispensing assembly 213 in order to provide access so as to insert and remove containers or vessels of additives. As described herein, each of these containers of additives can be referred to herein as an additive vessel, a vessel, or a "pod" 250, as shown in FIGS. 4A, 5A and 5B, for example.

As shown in FIG. 2A, the beverage apparatus 200 includes a top end 201 and a bottom end 202. It should be appreciated that the various illustrative drawings of embodiments of the disclosure are shown in an upright orientation and in various illustrative drawings of embodiments of the disclosure are shown in an upside down or inverted orientation. Accordingly, labeling of top end and bottom end are provided for clarity.

The beverage apparatus 200 can include a removable cap 212, which, in the illustrated embodiment, seals a top opening of the beverage chamber housing 214 to complete the chamber 230. The cap 212 can be configured to thread or snap onto a top end of the beverage chamber housing 214. Referring to FIG. 2B, in one embodiment, the cap 212 can include a compressible bladder 231 formed of silicone or other suitable rubber or material, that allows for deformation of the bladder so as to accommodate the addition of liquid additives into the chamber 230 by the dispensing assembly 213. The cap 212 also includes an air passageway 232 to allow air to escape from behind the bladder 231 so that the bladder can compress to accommodate the addition of the liquid additives.

Referring to FIG. 2A, the dispensing assembly 213 can be further configured with a user interface 222, which can include a display 211 and one or more user input buttons 216. In the illustrated embodiment of FIG. 2, the display 211 includes five LEDs (Light Emitting Diodes), with three LEDs in a triangle that can be configured to indicate selection of one of three additive vessels, for example. Another LED can be configured to indicate a power on or wake up condition of the dispensing assembly, and yet another LED that can be configured to indicate that a dispensing of an additive to the beverage chamber housing 214 has been selected. The LEDs may use specific lensing or may be embedded behind a micro-perforated material to abstract the user from the physical components of the LEDs. In one embodiment, a single user input button can be configured as a multi-function button to perform different actions depending on the amount of pressure applied to it by the user, by duration of press(es), sequence or pattern of presses, and/or by quantity of presses, for example. The button of the buttons 216 can also be configured to accommodate partial or complete depression of the button, which can be differentiated by a perceptible detent or click, for example. Such arrangement can provide further varied functionality. The user interface 222 can provide an arrangement for the user to, for example, dispense an additive from an additive vessel or display the current battery level of the system and apparatus.

Figure 3:
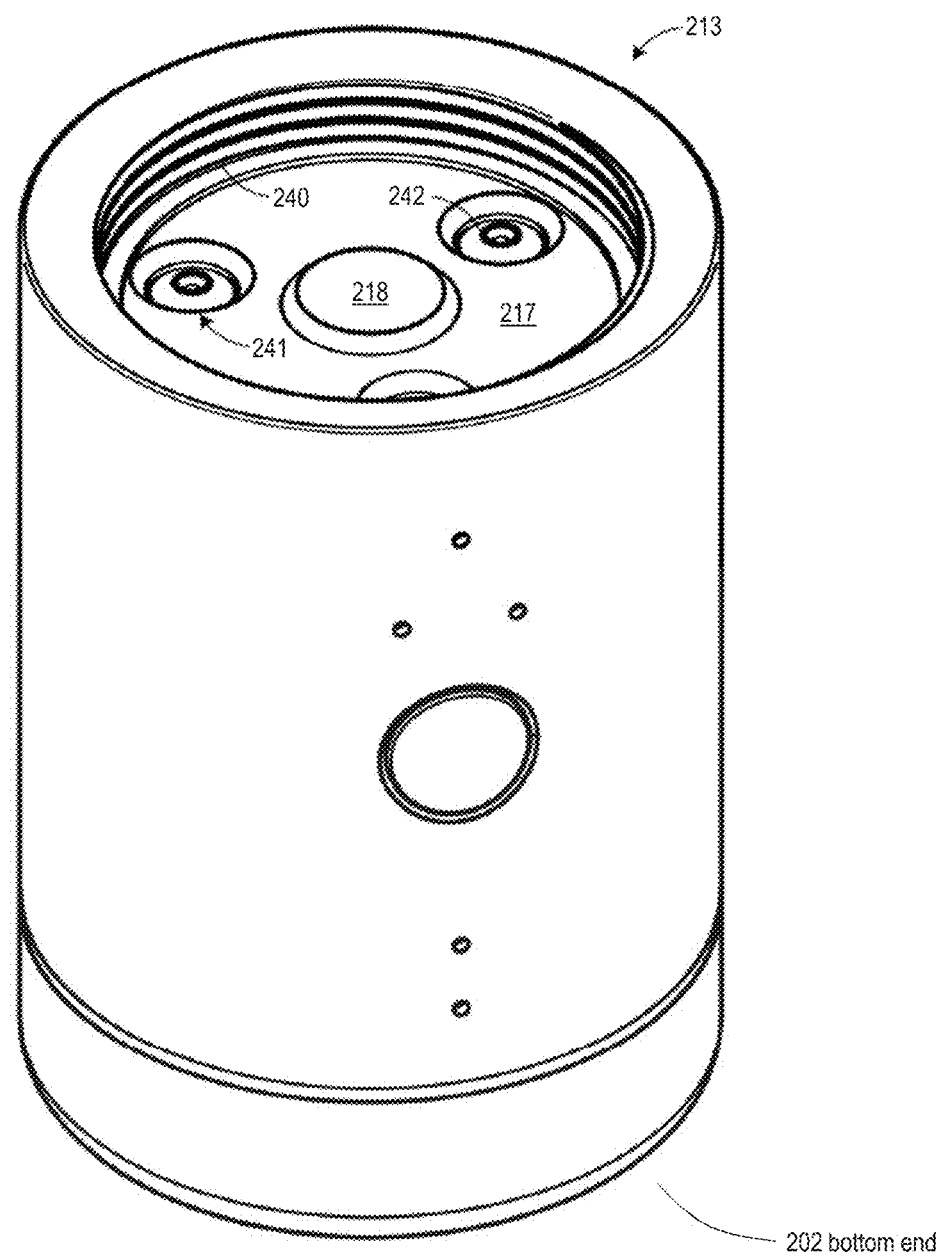
FIG. 3 illustrates a view of a dispensing assembly with a beverage chamber housing removed and with additive vessels, according to principles of the disclosure.

FIG. 3 illustrates a view of the dispensing assembly 213 with the beverage chamber housing 214 removed. A top portion of the dispensing assembly 213 includes an annular wall with threads 240 that engage with matching threads on the beverage chamber housing 214. The top portion of the dispensing assembly 213 can also include the platform 217 to form a base for the beverage chamber housing 214 in order to contain the beverage within the chamber 230. The platform 217 can include one or more outlet ports 241 through which additives are added to the beverage in the chamber, and in the illustrated embodiment of FIG. 3, three (3) such ports 241 are shown. In one embodiment, each port 241 can be sealed by a one-way valve 242 (e.g. an umbrella valve of rubber or silicone) that permits one-way passage of a liquid additive into the chamber from the vessel. As will be discussed below, each one-way valve 242 can form part of a pumping mechanism 260 (FIG. 6) that injects liquid additives into the chamber. In one embodiment, the pumping mechanism 260 can be a reciprocating positive displacement pump.

FIG. 3 also illustrates an ultrasonic fluid level sensor 218 disposed on or within the platform 217. In accordance with one embodiment, the fluid level sensor 218 uses "round trip time" for a reflected sound wave(s) to measure the height of a fluid or water column within the chamber 230 and thereby infer or determine fill volume. Other arrangements can be used to sense level of liquid in a container assembly of the disclosure.

Figure 4B:
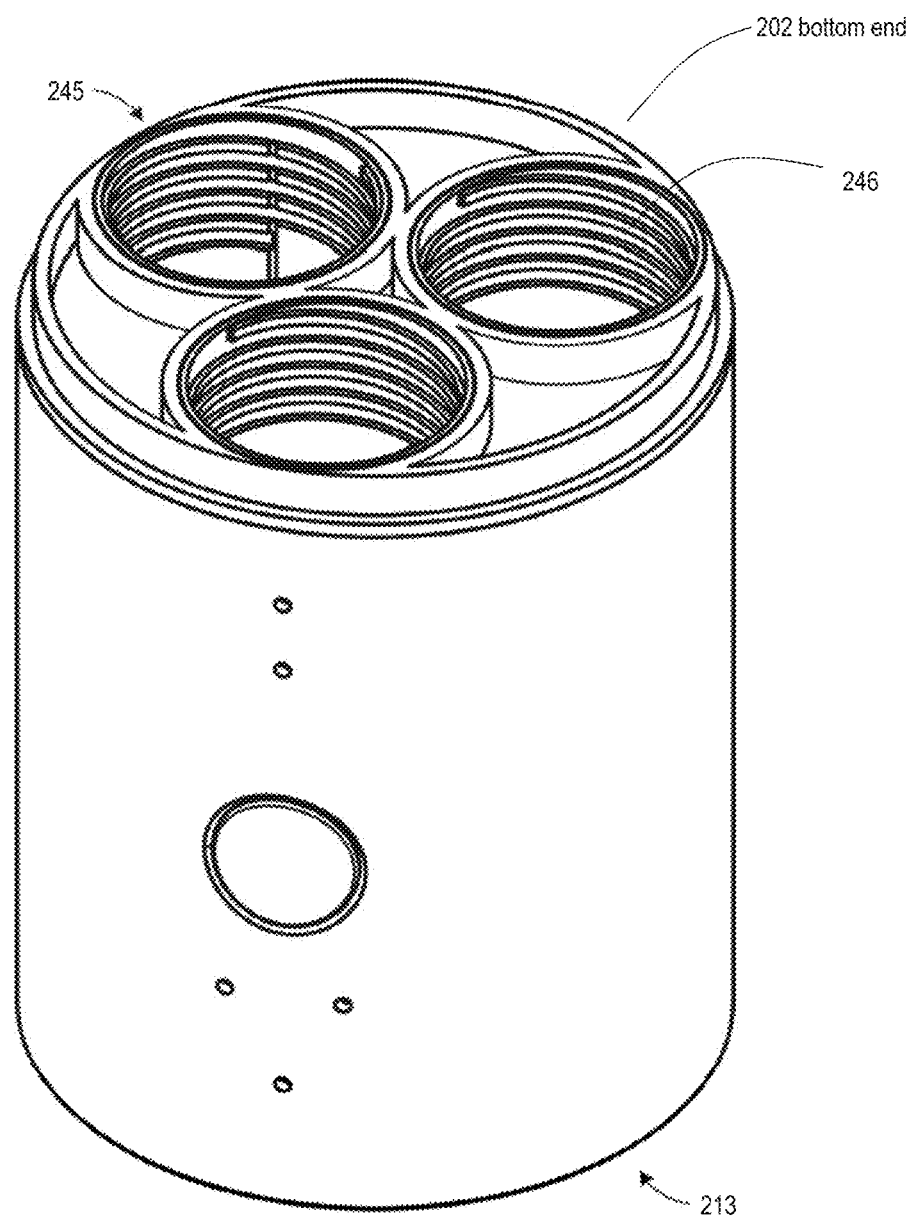
FIG. 4B illustrates a bottom view of the dispensing assembly with a base cover removed and with additive vessels removed, according to principles of the disclosure.

FIGS. 4A and 4B illustrate a bottom view of the dispensing assembly 213 with the base cover 220 removed. FIG. 4A shows the ends of each of three additive vessels 250 that are threaded into three corresponding receptacles or apertures 245 as shown in FIG. 4B. While the term "receptacle" is used in the description that follows, for the purpose of consistency with various embodiments described above, the receptacles 245 can also be referred to as "apertures" 245.

FIGS. 5A and 5B illustrate a perspective view and a cross section cutaway view, respectively, of an additive vessel 250 in accordance with one embodiment. FIG. 5A shows a top end 258 of the additive vessel 250 and a bottom end 259 of the additive vessel 250, as such additive vessel would be positioned in routine use in a container assembly or beverage apparatus, such as is shown in FIG. 2A. The additive vessel 250 can include a housing or body 251, which can be cylindrical in shape to fit into a corresponding cylindrically shaped receptacle or aperture 245 and engage with threads 246. At a first end or proximal end, the housing 251 can be covered with a cap 252 with threads 254.

The cap 252 can be snapped or clicked onto the housing 251. The cap 252 can be integrally formed with the housing or body 251 of the vessel 250. The threads 254 of the vessel 250 can be provided on the housing or body 251. The threads 254 of the vessel 250 can be provided on any portion or surface of the vessel and/or connected structure so as to secure the vessel 250 into a respective receptacle 245.

The threads 254 can engage with threads or receiving threads 246 in a receptacle 245 so as to lock the additive vessel 250 into place within the dispensing assembly 213. At a second end or distal end, the vessel 250 can include a piston head 253 that includes a port 255 that is capped or closed by a one-way valve 256 (e.g. an umbrella valve of rubber or silicone). The port 255 and one-way valve 256 function to permit additive to flow in only one direction from the vessel 250, i.e. out of the additive vessel and into a pumping chamber 261 of the pumping mechanism 260, as shown in FIG. 6 and described below.

Referring to FIG. 5B, a slideable plunger 257 is disposed within an interior or interior surface 251' of the housing 251. The interior 251' of the housing 251 and the exterior of the plunger 257 can be a matching cylindrical shape such that the plunger 257 can slide along the length of the housing 251, from a first end to the second end of the housing, as additive contained within the housing is dispensed from the vessel. The plunger 257 is preferably formed of soft plastic such as LDPE (low density polyethylene) that seals against the interior of the housing and moves so that no air is allowed into the vessel 250 during dispensing of the additive.

Figure 6:
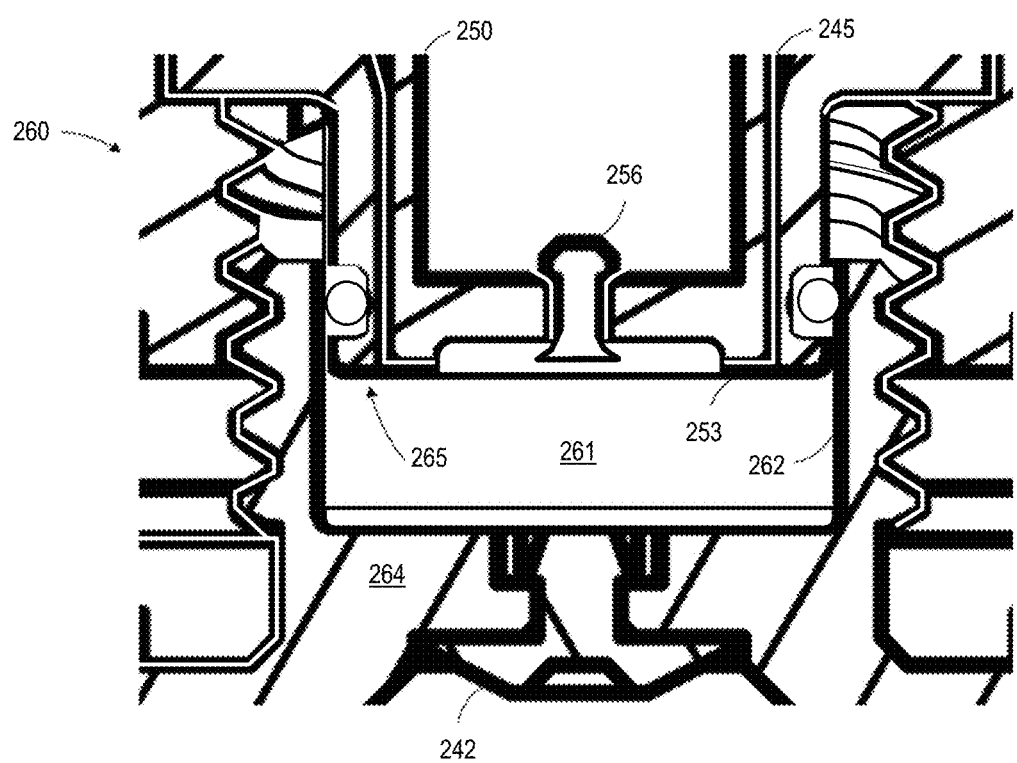
FIG. 6 illustrates a cutaway cross section of the dispensing assembly showing the operation of a pumping mechanism for an additive container, according to principles of the disclosure.
Figure 7A:
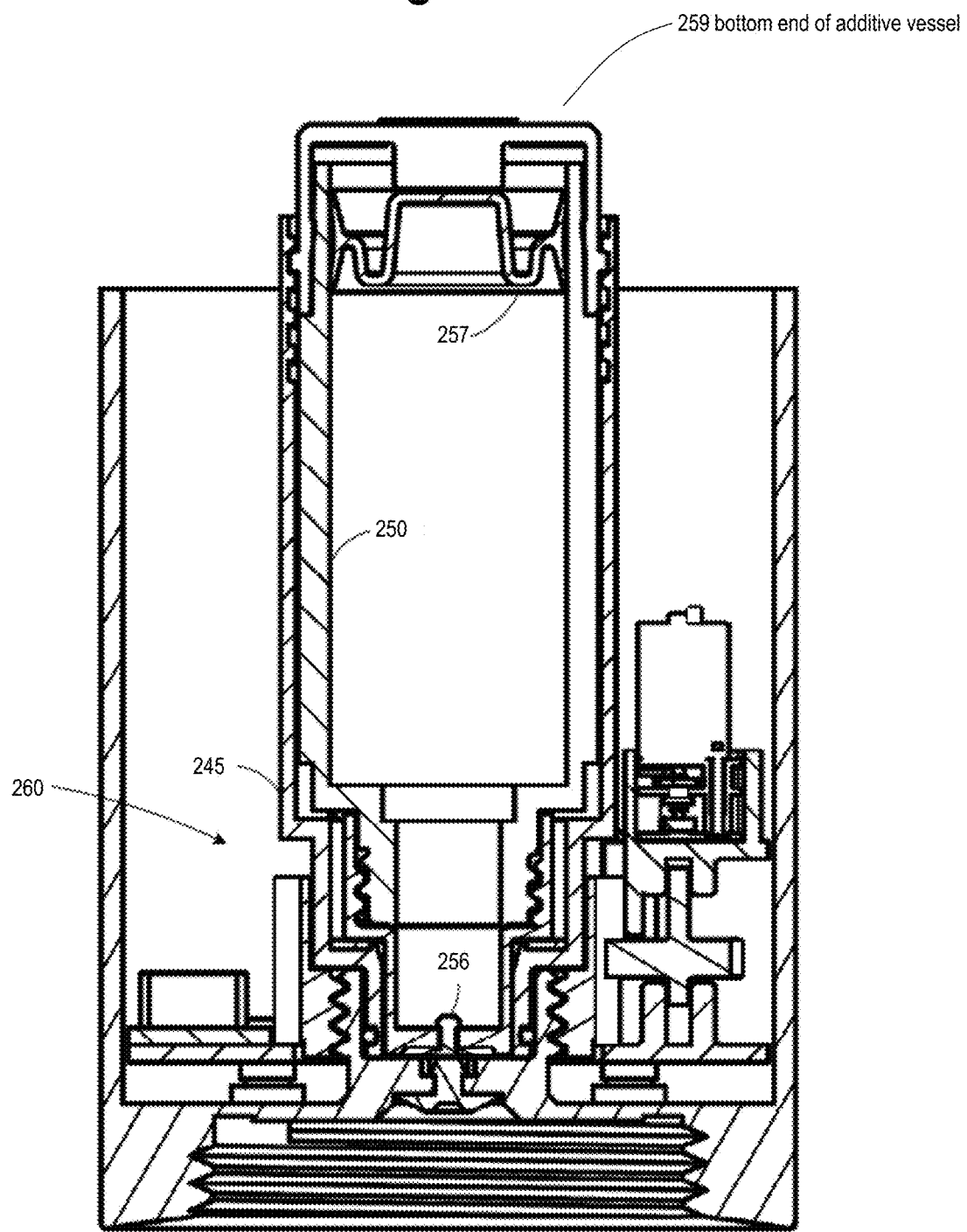
FIGS. 7A-7C illustrate a cutaway cross section of the dispensing assembly showing the operation of a pumping mechanism for an additive container, according to principles of the disclosure.
Figure 7B:
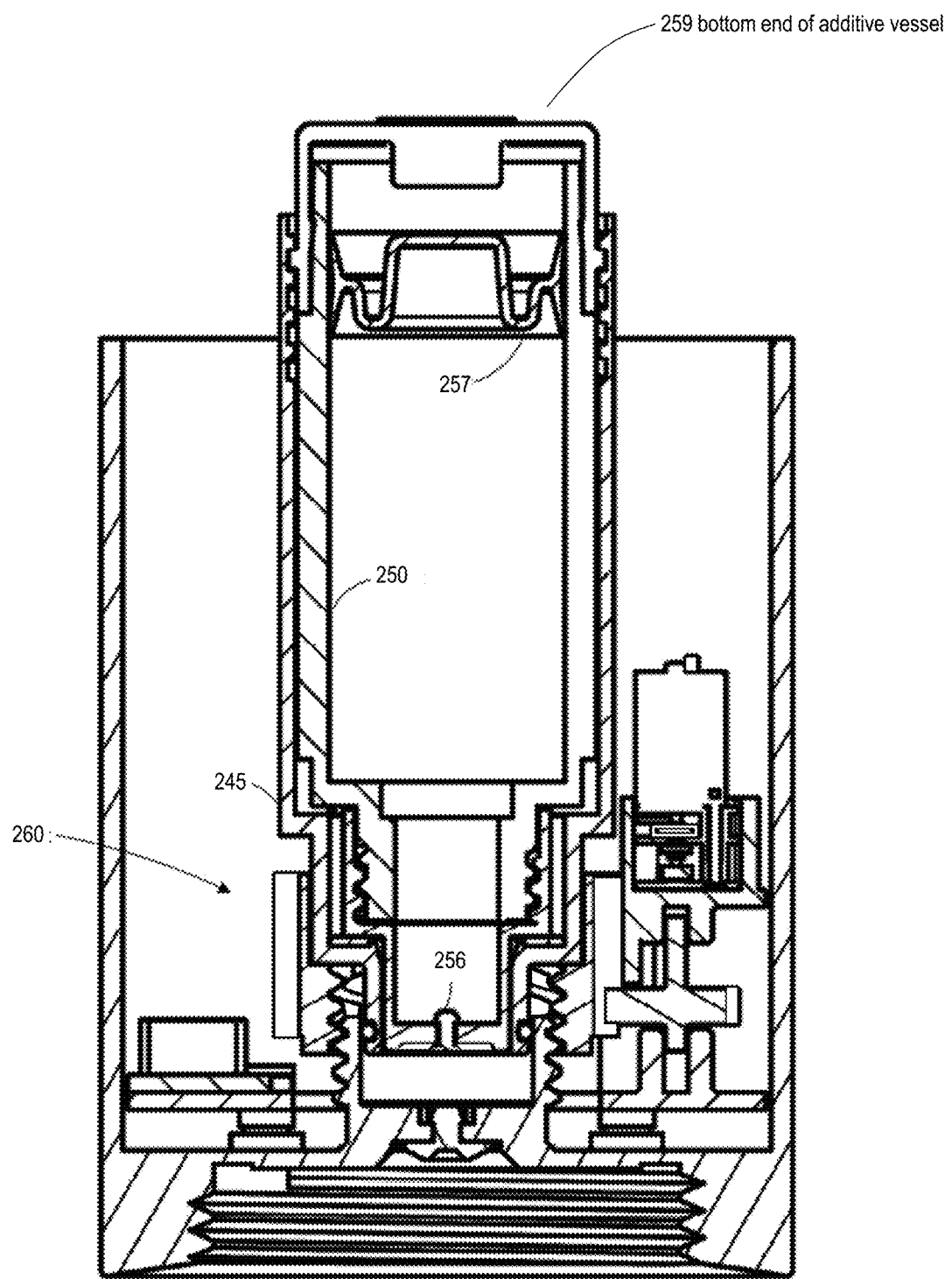

FIGS. 6 and 7A-C illustrate a cutaway cross section of the dispensing assembly showing the operation of the pumping mechanism 260 for an additive vessel 250. FIG. 6 shows an enlarged view of a portion of FIG. 7B showing the pumping mechanism 260 in a partially actuated state, according to principles of the disclosure. As illustrated, the vessel 250 is threaded into the receptacle 245 such that the piston head 253 of the vessel 250 engages or mates with the housing of the receptacle 245 to form or provide a piston 265. The piston 265 can slide back and forth within a pumping chamber 261 formed by a cylinder 262 of a pump housing 264. As described above, the piston head 253 includes a one-way valve 256 that permits flow from the vessel 250 into the pumping chamber 261. At an opposite end or top end of the chamber 261 from the piston head 253, the second one-way valve 242 permits liquid additive to flow from the pumping chamber 261 into the beverage chamber 230 as the piston 265 moves forward, i.e. downward as shown in the inverted arrangement of FIG. 6, in the cylinder 262.

Figure 7C:
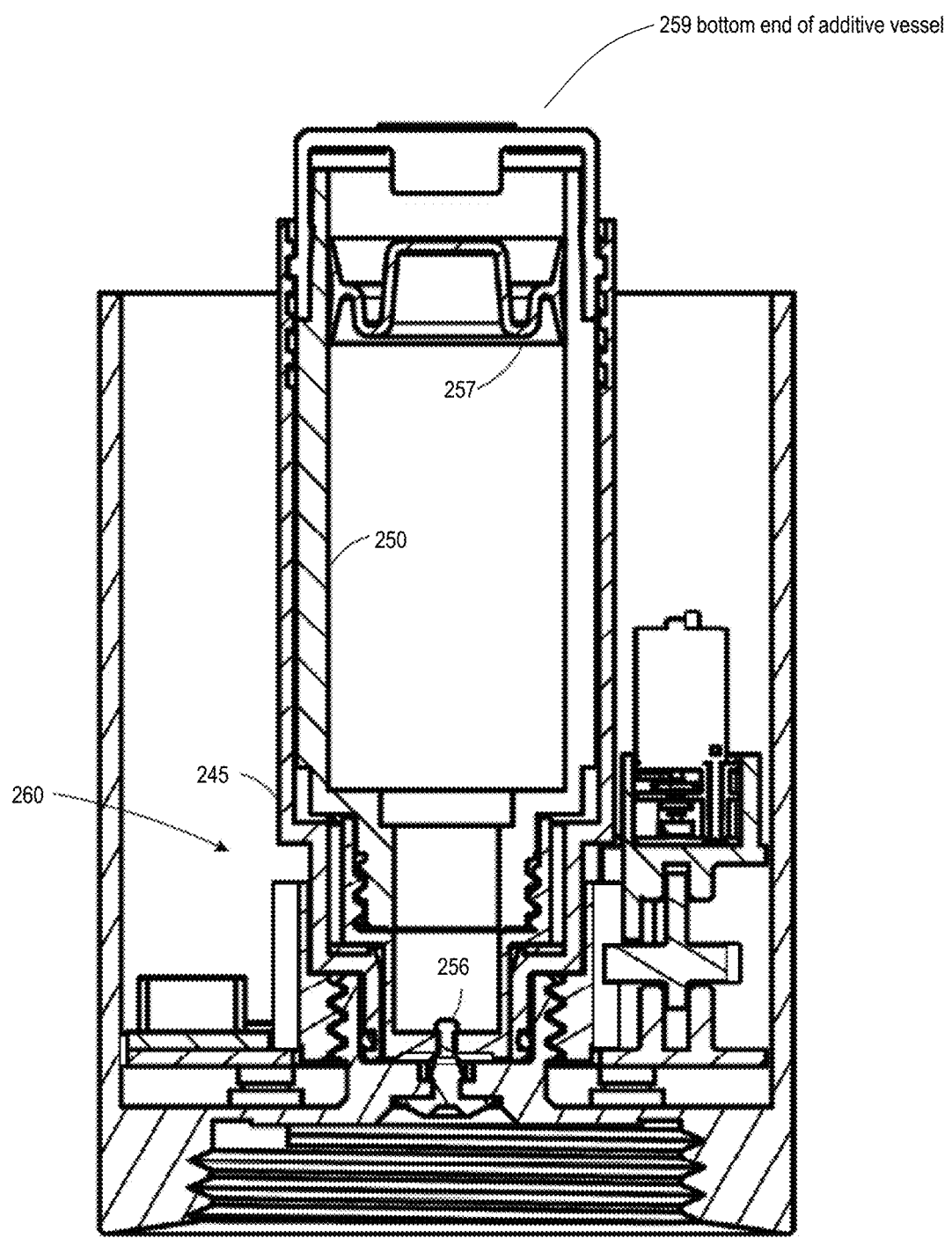

FIG. 7A shows the receptacle 245 and piston 265 in a starting position and the plunger 257 of the additive vessel 250 in an initial position prior to any additive being dispensed from a "full" additive vessel 250. As shown in FIG. 7B, the piston 265 is withdrawn, and the one-way valve 242 at the outlet port 241 blocks fluid flow in the reverse direction, creating a vacuum which draws fluid from the additive vessel 250 through the one-way valve 256 into the pumping chamber 261. It should be noted that in FIG. 7B, the plunger 257 has moved from its starting position illustrated in FIG. 7A to accommodate fluid flow from the vessel 250 into the pumping chamber 261. As shown in FIG. 7C, the piston 265 is driven back to its starting position, compressing the fluid within the chamber 261 and forcing the fluid through the one-way valve 242 at the outlet port 241 (see FIG. 3) and into the beverage chamber 230. The one-way valve 256 blocks the flow of fluid from returning into the vessel 250. Positive pressure, accordingly, is produced in this compression stroke, dispensing the contents of the pump chamber through the outlet port 241 into the beverage chamber 230.

The volume dispensed during a single piston stroke can be modulated linearly by modifying the piston stroke length.

Multiple piston strokes can be used to dispense larger quantities. By design, the volume of the pumping chamber can be configured to be as small as practically possible when the piston 265 is in the starting position to avoid wasting additive liquid when a depleted additive vessel is withdrawn from the receptacle.

Figure 8B:
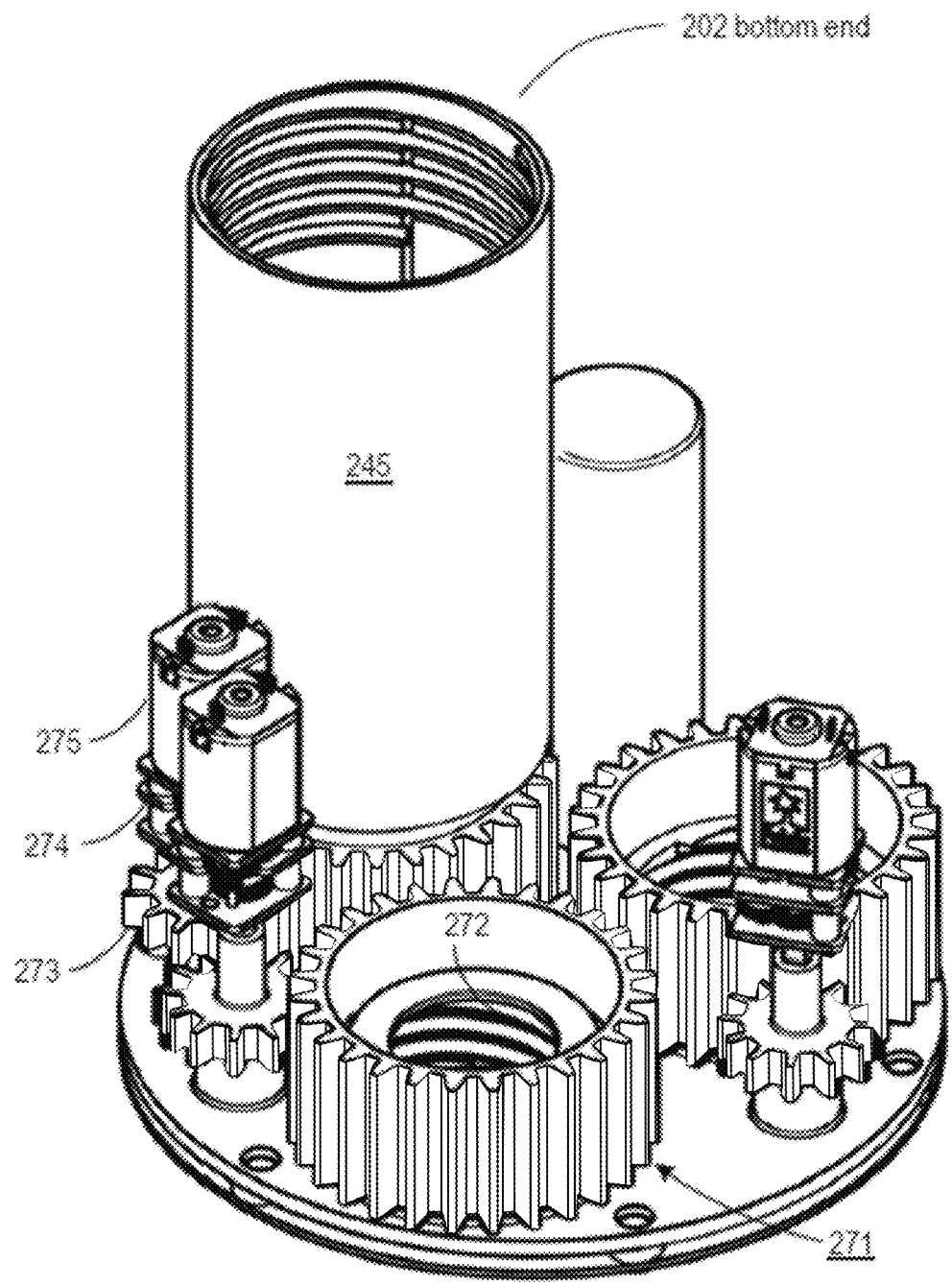

FIGS. 8A and 8B illustrate views of a drive mechanism 270 for actuating the receptacle 245 and associated piston 265 of the pumping mechanism 260. FIG. 8A illustrates an internal perspective view of the dispensing assembly 213 without an outer cover. FIG. 8B illustrates an additional internal perspective view of the dispensing assembly 213, with structure removed, to better illustrate certain aspects of the drive mechanism 270. As illustrated, each receptacle 245 and its associated piston 265 (not visible in FIGS. 8A-B) is moved down and up by an internally threaded toothed ring 271. A set of internal threads 272 on each internally threaded toothed ring 271 can engage with a threaded extension 276 (FIG. 9B) of the pump housing 264. Gears 271' on the outer diameter of each internally threaded toothed ring 271, can be driven by a gear 273, which in turn can be driven by an optional gearbox 274, which in turn is driven by an electric motor 275.

Figure 9A:
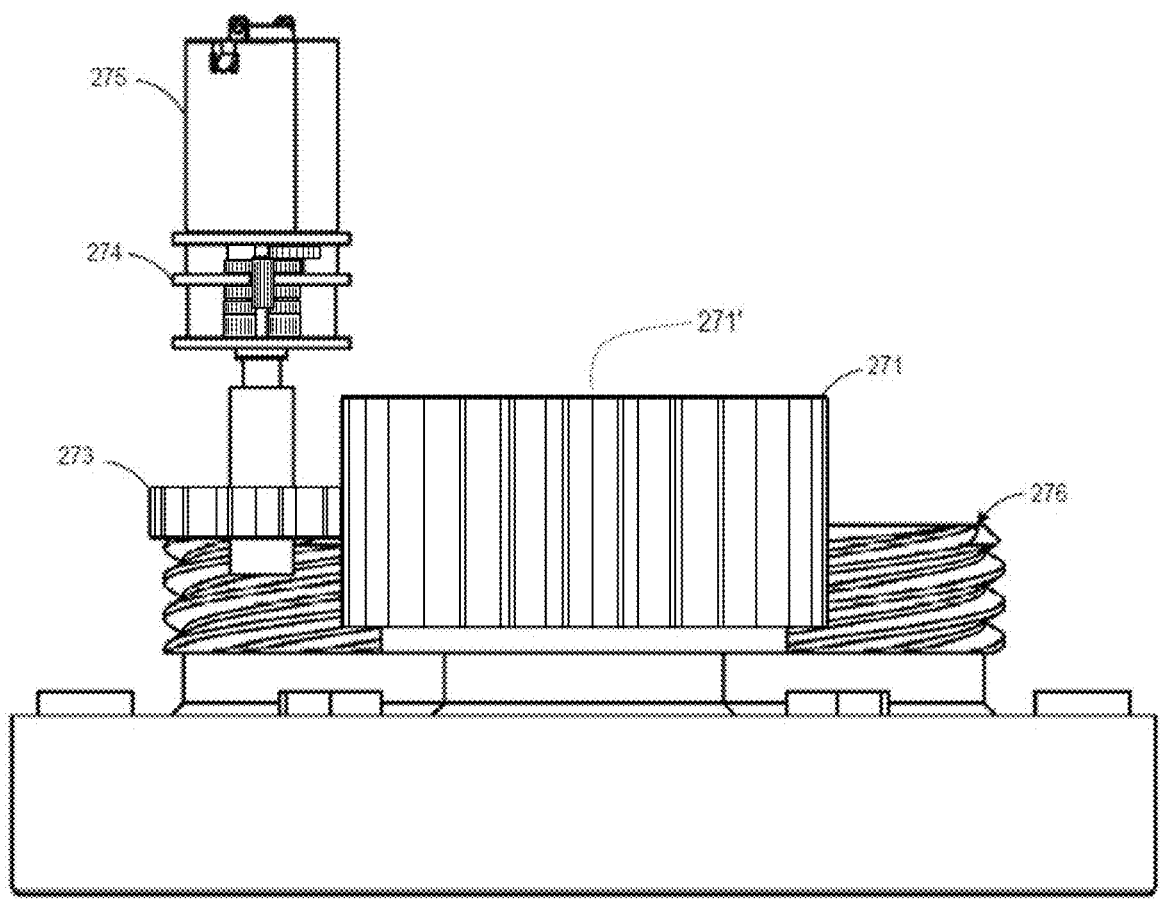
FIGS. 9A and 9B illustrate an elevation view of the drive mechanism with the receptacle in a starting position and in a withdrawn position, respectively, according to principles of the disclosure.
Figure 9B:
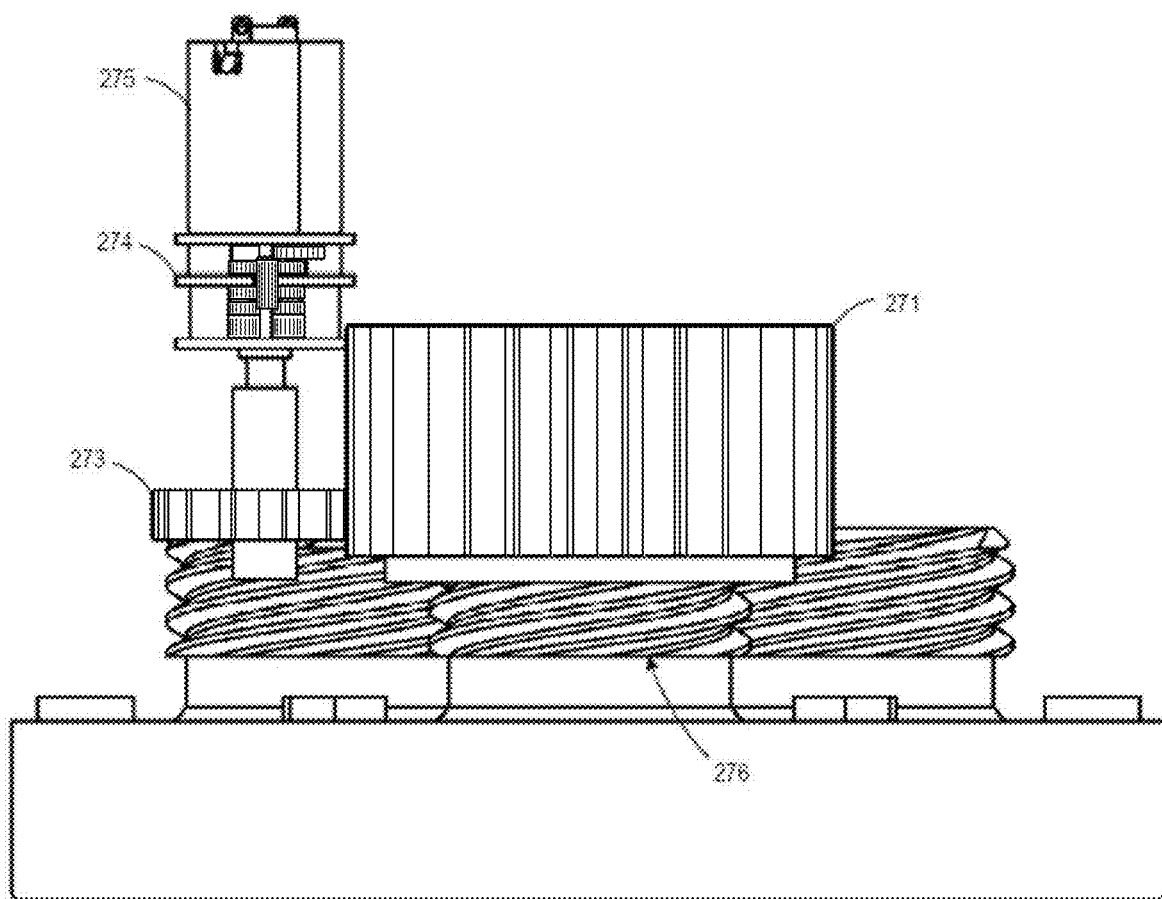

FIGS. 9A and 9B illustrate an elevation view of the drive mechanism with the receptacle in a starting position (9A) and in a withdrawn position (9B). As the toothed ring 271 rotates, the internal threads 272 cause the toothed ring to rise and fall on the threaded extension 276 of the pump housing 264. The receptacle 245, which can be snapped into or adhered to or integral with the toothed ring 271, also therefore rises and falls with the toothed ring, causing the piston 265 to move within the cylinder 262. In accordance with one embodiment, the threads on the toothed ring 271 and the threaded extension 276 can be a "fast" 4-start thread that cause the toothed ring 271 to travel to full linear extension with 180 degrees of rotation. The threads can be configured to have an ACME profile or similar.

Figure 10:
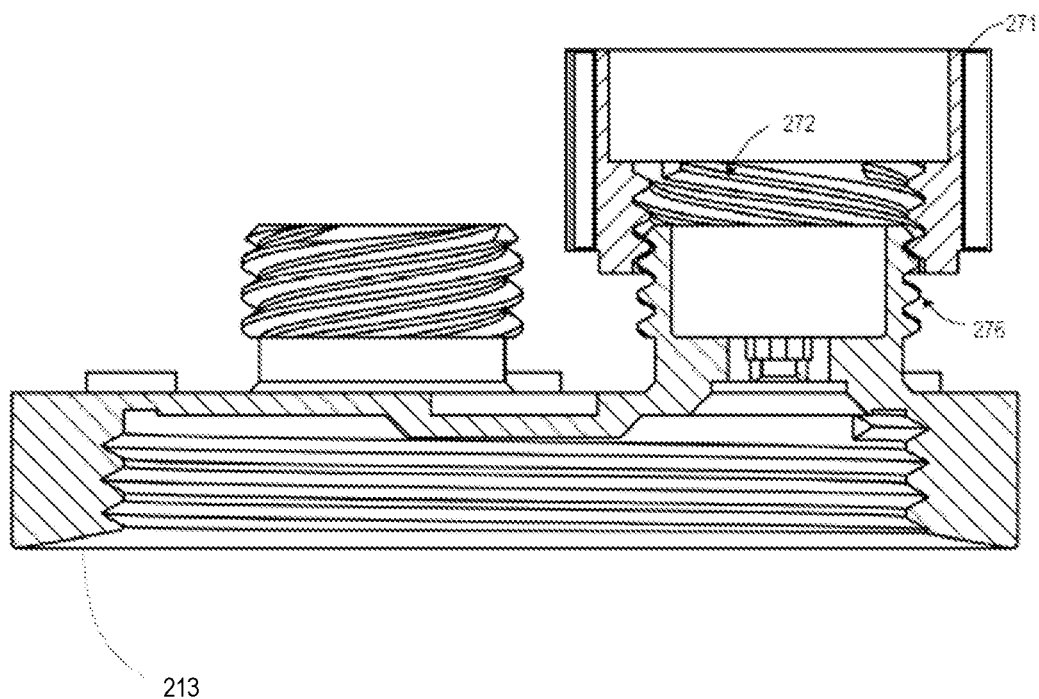
FIG. 10 illustrates a cross section of an internally threaded toothed ring engaged with a threaded extension of a pump housing, according to principles of the disclosure.

FIG. 10 illustrates a cross section of an internally threaded toothed ring 271 engaged with a threaded extension 276 (FIG. 9B) of the pump housing 264.

Figure 11A:
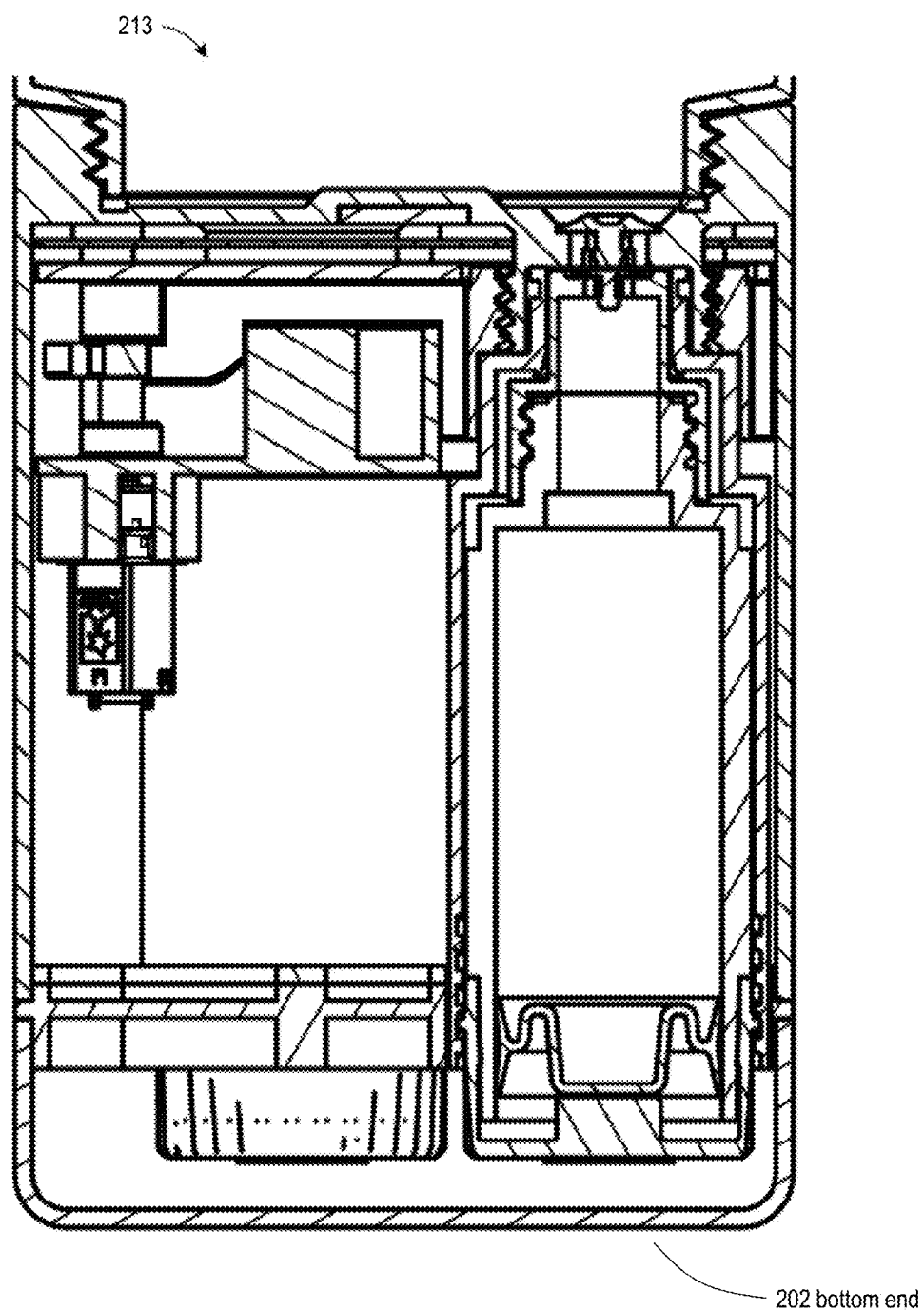
FIGS. 11A-11C illustrate three different cross-sectional cutaway views of the dispensing assembly 213, according to principles of the disclosure.
Figure 11B:
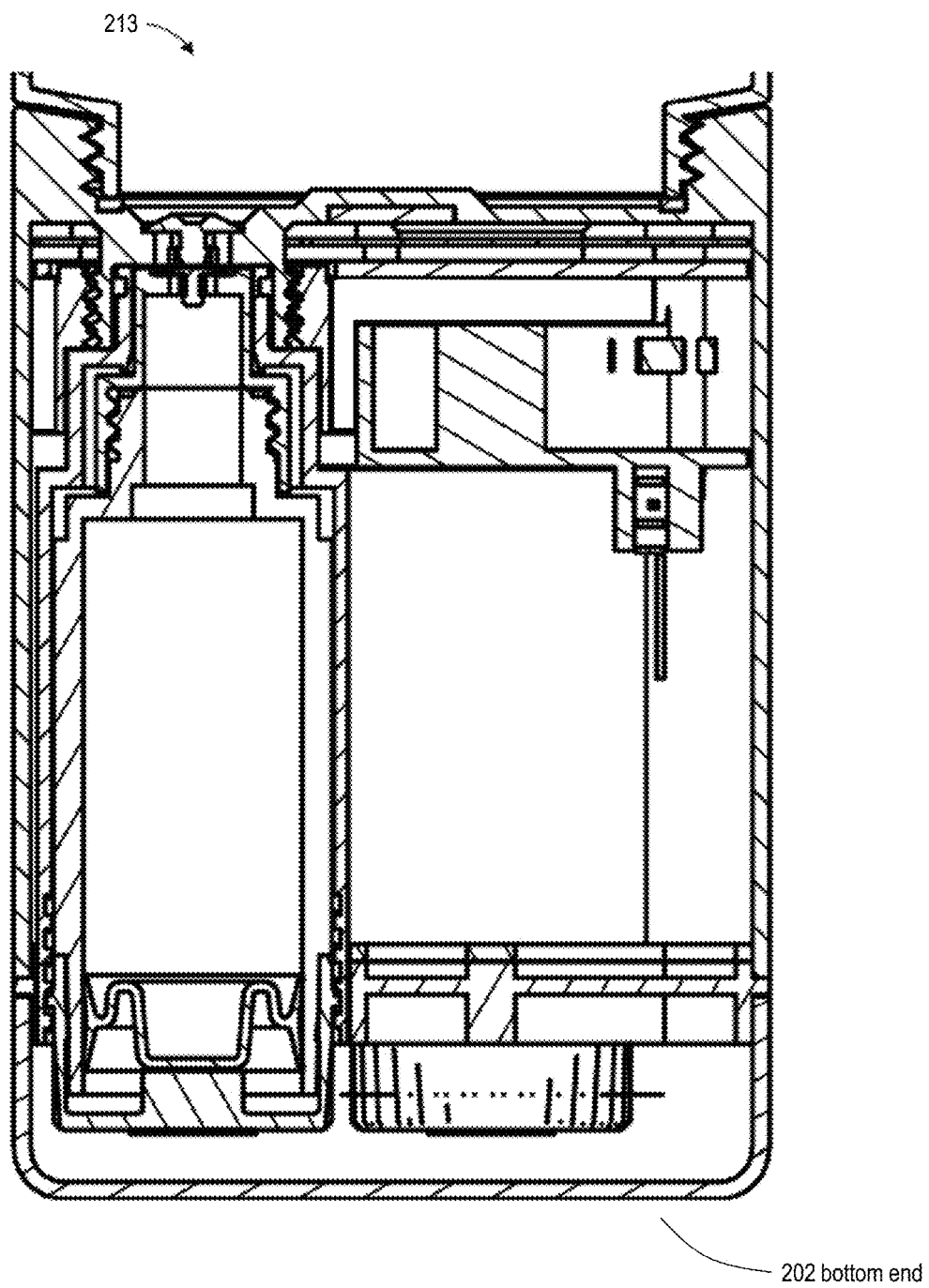
Figure 11C:
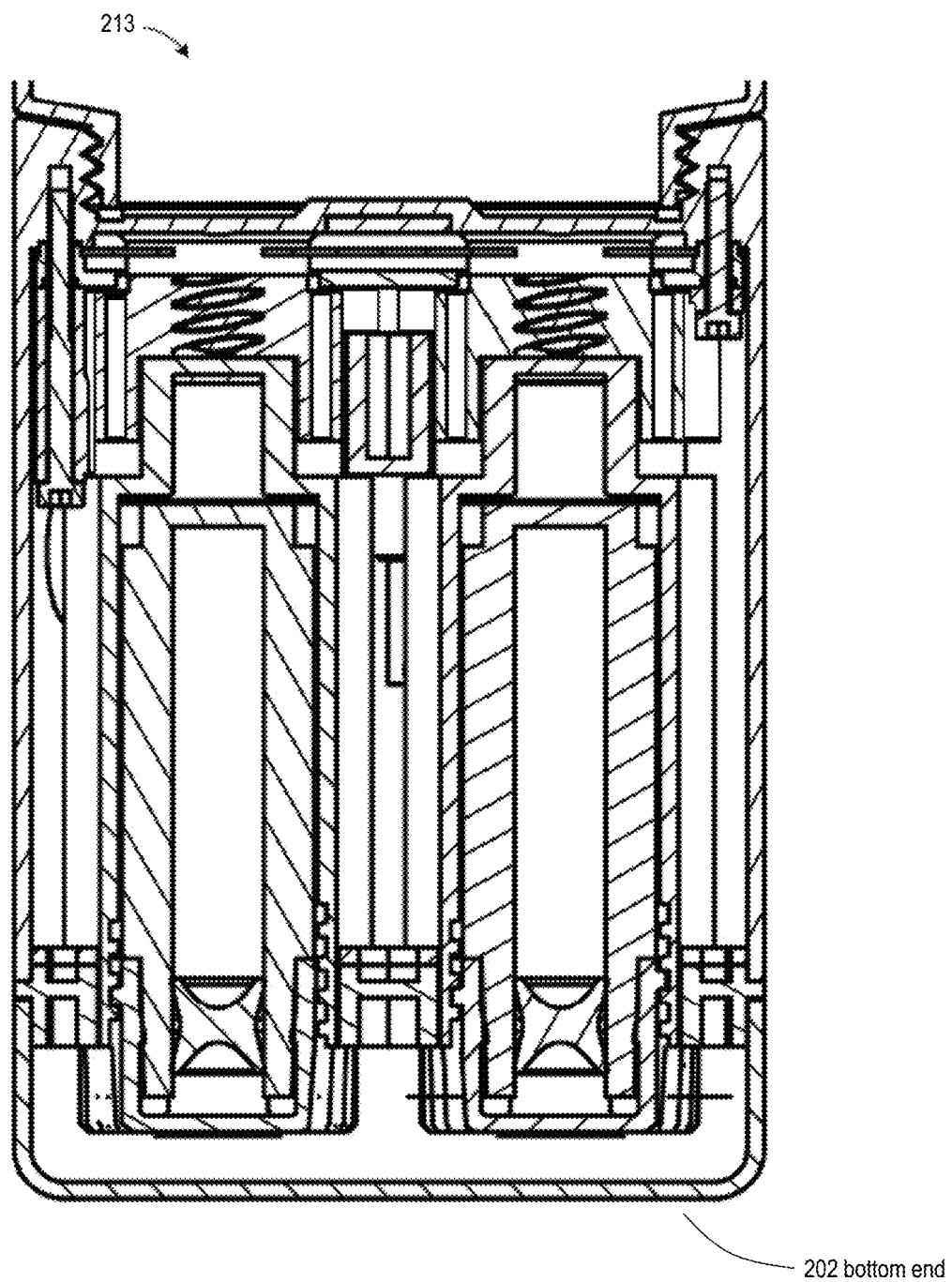

FIGS. 11A-11C illustrate three different cross sectional cutaway views of the dispensing assembly 213.

Figure 12A:
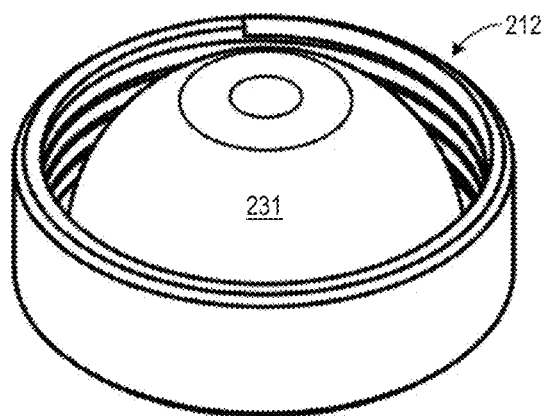
FIGS. 12A-12B illustrate isometric and cutaway views of a removable cap, according to principles of the disclosure.
Figure 12B:
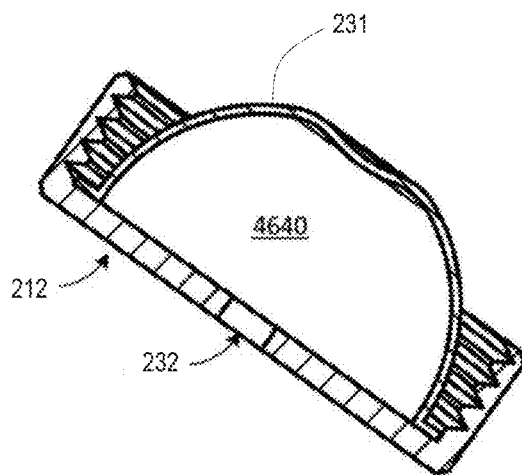

FIGS. 12A and 12B illustrate isometric and cutaway views of the removable cap 212. As discussed above with reference to FIG. 2, in the illustrated embodiment, the cap 212 seals a top opening of the beverage chamber housing 214 to complete the chamber 230. The cap 212 can be configured to thread or snap onto a top end of the beverage chamber housing 214. The cap 212 includes a compressible bladder 231 formed of silicone or other suitable rubber, that allows for deformation of the bladder 231 so as to accommodate the addition of liquid additives (from the vessel 250) into the chamber 230 by the dispensing assembly 213. The cap 212 also includes an air passageway 232 to allow air to escape from behind the bladder 231 so that the bladder can compress to accommodate the addition of the liquid additives. As shown in FIGS. 12A-B, the bladder 231 can be configured with a dimpled dome shape that yields an approximately linear resistance to deformation.

Figure 13:
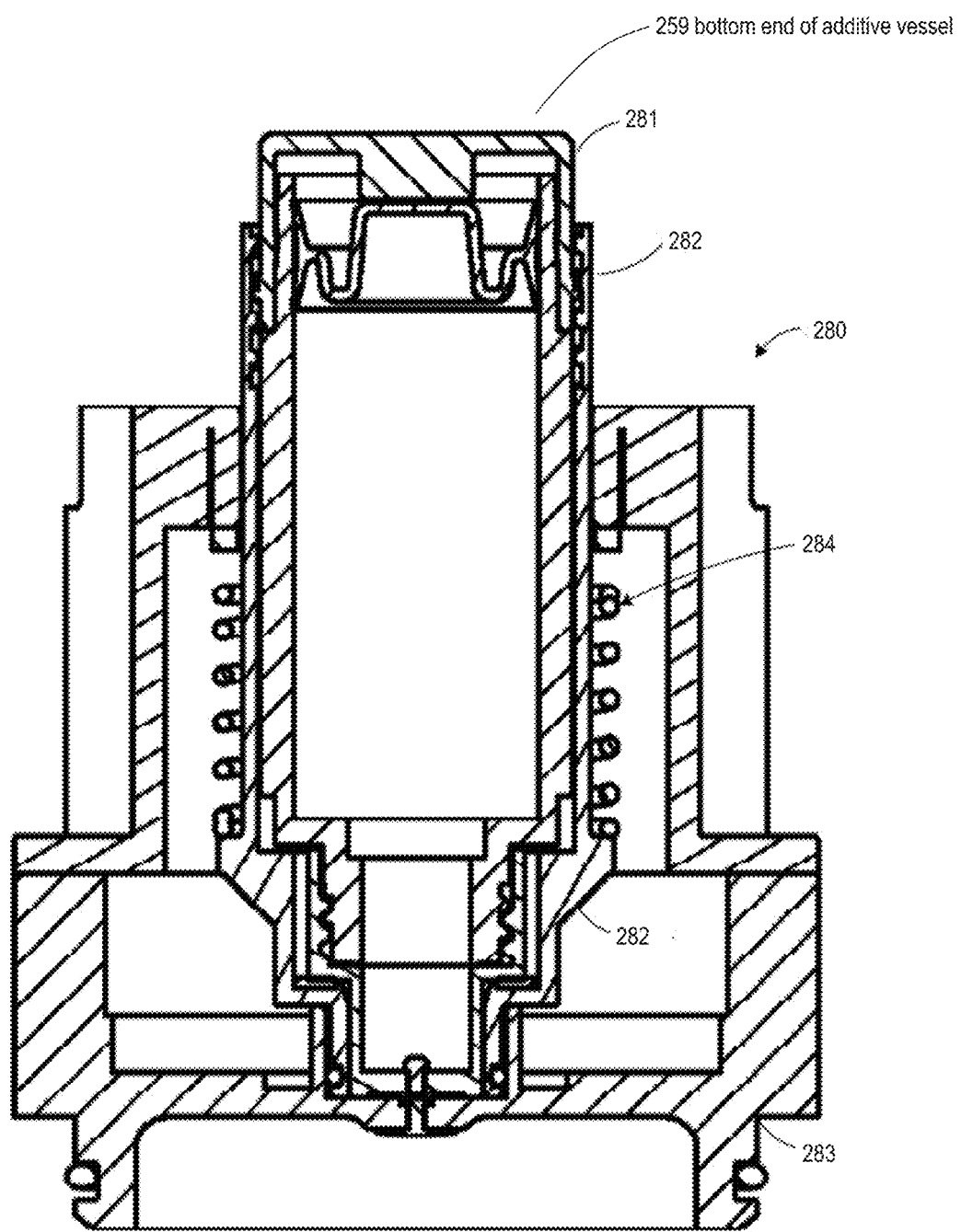
FIG. 13 illustrates a cutaway view of a pumping mechanism, according to principles of the disclosure.

FIG. 13 illustrates a cutaway view of a pumping mechanism 280 in accordance with one embodiment of the disclosure. Similar to the embodiments discussed above with reference to FIGS. 2-12, an additive vessel 281 is received into a receptacle 282, which engages within a pump housing 283. Two one-way valves similarly work together with a sliding piston and cylinder to pump additive liquid through a pumping chamber. In the embodiment illustrated in FIG. 13, however, the receptacle 282 can be actuated manually, by a user grasping and withdrawing the receptacle from the pump housing 283, or by another mechanical means. The receptacle 282 is withdrawn against pressure of a spring 284, which is biased to press the receptacle back to its start position, such that when the receptacle is released, any additive fluid drawn into the pumping chamber is then automatically ejected into the beverage chamber.

Figure 14A:
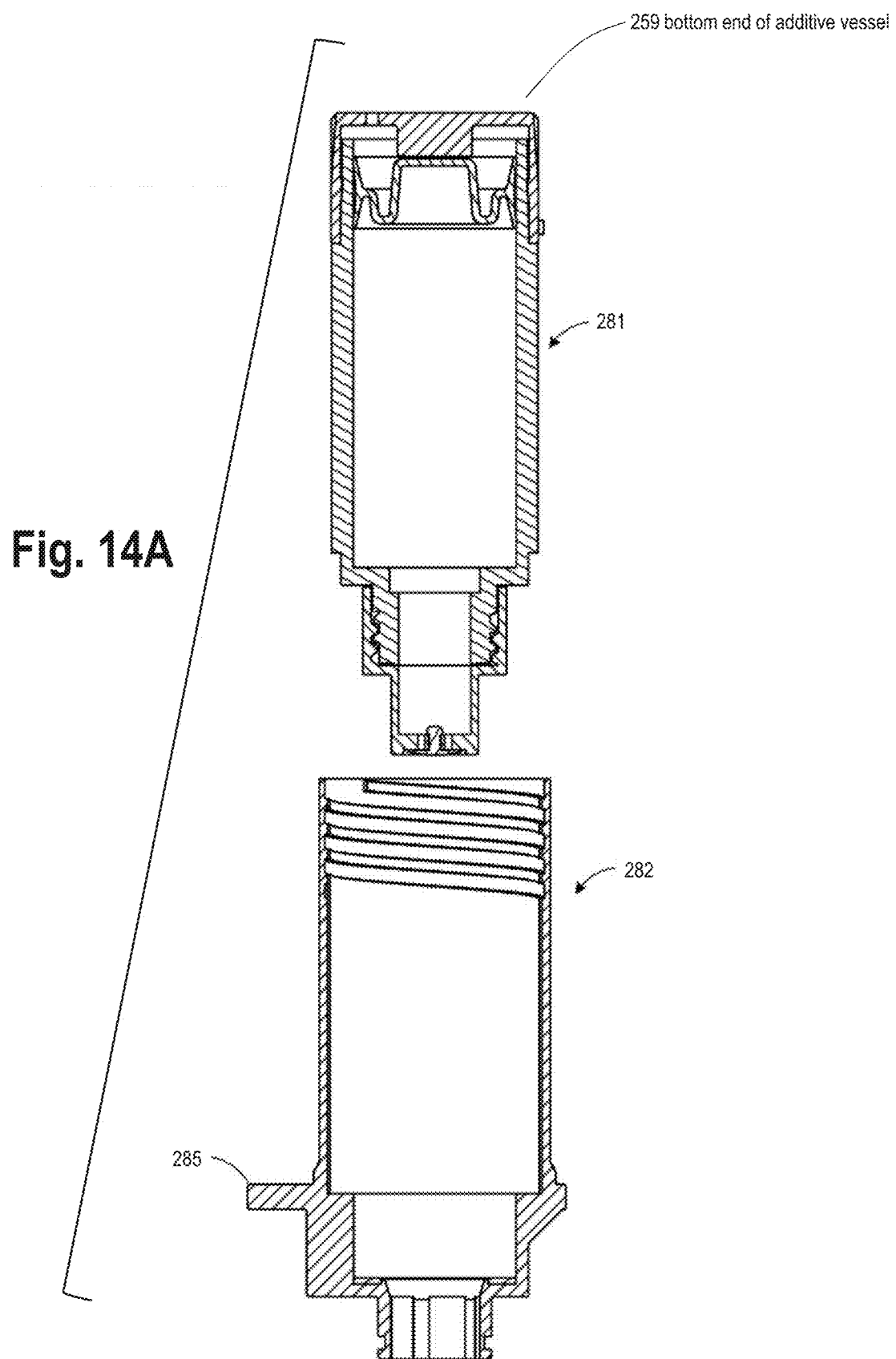
FIG. 14A illustrates a cutaway view of a receptacle of the embodiment of FIG. 13, but shown from a different perspective rotated 90 degrees around a vertical axis, according to principles of the disclosure.

FIG. 14A illustrates a cutaway view of the receptacle 282 of the embodiment of FIG. 13, but shown from a different perspective rotated 90 degrees around a vertical axis. The receptacle 282 includes a tab 285 that can be used either manually or actuated by a mechanism in order to withdraw the receptacle against the tension of the spring 284 from the pump housing 283. FIG. 14A also shows the additive vessel 281 removed from the receptacle 282.

Figure 14B:
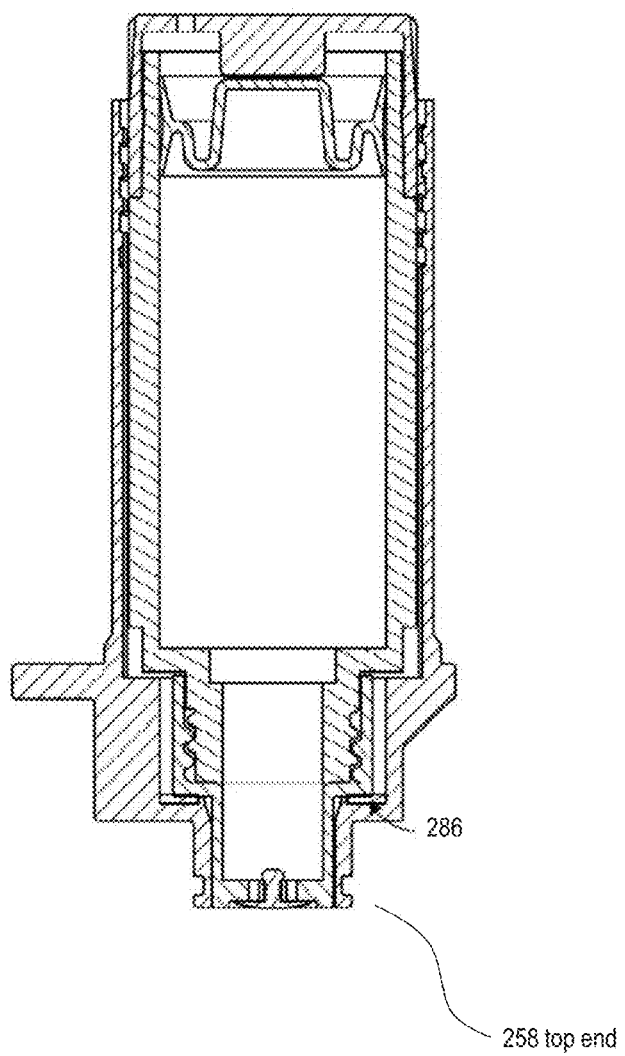
FIGS. 14B and 14C illustrate a seal placed in a shoulder portion of the receptacle that serves a vacuum breaker function as an additive container is withdrawn from the receptacle, according to principles of the disclosure.
Figure 14C:
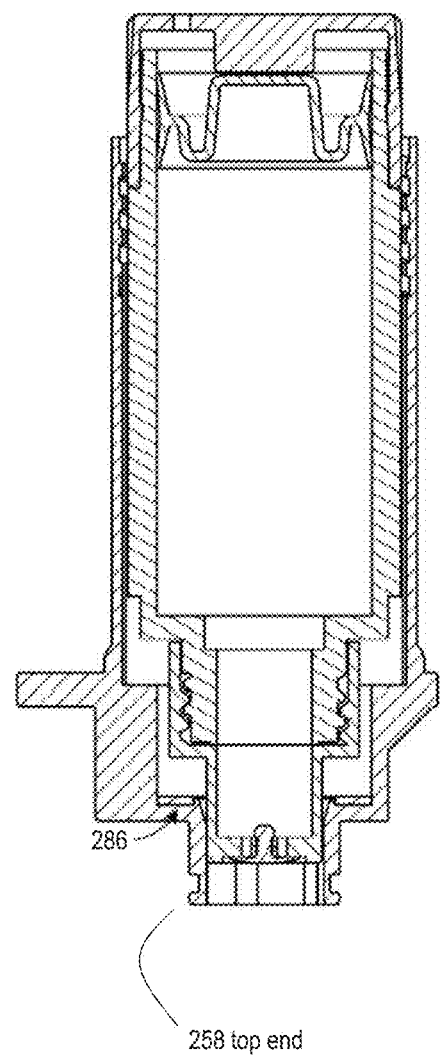

FIGS. 14B and 14C illustrate a seal 286 placed in a shoulder portion of the receptacle 282 that serves a vacuum breaker function as the additive vessel 281 is withdrawn from the receptacle, in an embodiment according to principles of the disclosure. Once the additive vessel 281 is withdrawn even a slightest amount, the vessel no longer contacts the seal 286 and therefore air is allowed to pass into the pumping chamber area as the vessel is withdrawn.

If no air were allowed to pass into the pumping chamber, the action of withdrawing the vessel or additive vessel would create a vacuum that would suck additive fluid out of the vessel and into the now open pumping chamber.

FIGS. 15A-D illustrate different configurations of additive vessels, containers or pods for liquid additives that can be used in accordance with various embodiments. FIG. 15A illustrates an airless or non-vented rear load vessel with a rigid tubular side wall. The additive vessel of FIG. 15A is similar in function to the vessel 250 illustrated in FIGS. 5A-B, with a plunger 257 that moves to prevent air from entering the vessel. FIG. 15B illustrates an airless front load vessel with a rigid tubular side wall. FIG. 15C illustrates a collapsible bag or sachet 1503' enclosed within an outer container 1503. The collapsible bag 1503' makes the plunger unnecessary, according to an embodiment of the disclosure. FIG. 15D illustrates a vented additive vessel, which allows air to pass back into the vessel to take the place of pumped additive fluid. A two-way valve 290 allows additive fluid to pass out of the vessel through a center portion of the valve, while air is allowed to enter the vessel through ports 291 around the periphery of the valve and under an umbrella portion of the valve.

Figure 16:
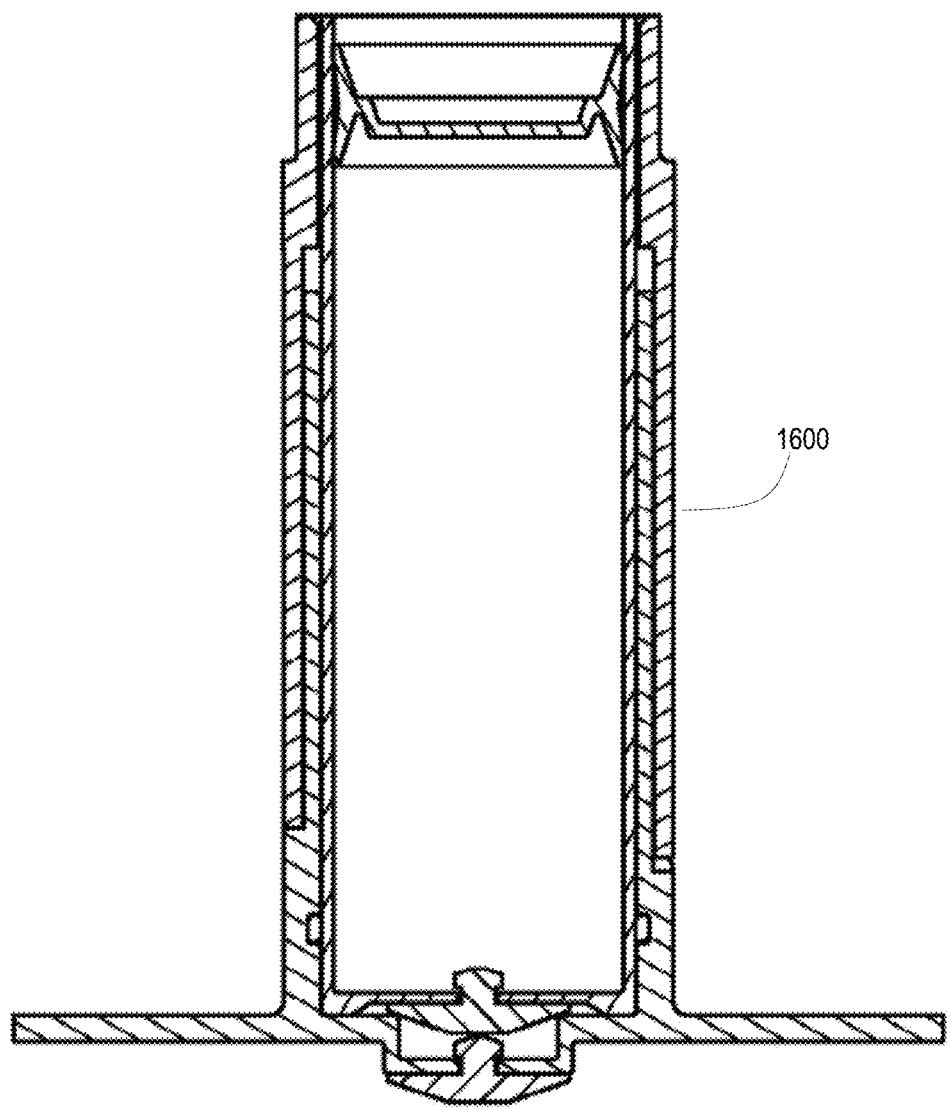
FIG. 16 illustrates a simplified positive displacement pumping mechanism that can be used with various actuation mechanisms, according to principles of the disclosure.

FIG. 16 illustrates a simplified positive displacement pumping mechanism 1600 that can be used with various actuation mechanisms in accordance with various embodiments.

One benefit of the foregoing described positive displacement pump configurations is that when the additive vessel is withdrawn and when the beverage chamber housing is removed from the dispensing assembly all parts of the pumping mechanism become visible and accessible for cleaning. The pumping chamber is accessible through the receptacle and only a one-way umbrella valve, for example, sits in the port between the pumping chamber and the platform which is otherwise also accessible for cleaning. A one-way umbrella valve can be easily removed and cleaned or replaced.

As noted above, the various features and functionality of the embodiments described above with reference to FIG. 1, FIGS. 2-12, and further with respect to FIGS. 13-16, can be combined as desired. In general, various features and functionality of the embodiments described herein can be combined and used in conjunction with various features and functionality of other embodiments.

For example, the dispensing assembly 213 illustrated in FIG. 3 can be further configured with an attachment sensor that monitors whether the beverage chamber housing 214 is threaded onto the dispensing assembly 213 before a dispensing event occurs. An attachment sensor can replace or supplement a lid sensor and checks can be performed before initiating a dispensing event. Each additive vessel can be configured with an RFID tag. The RFID tag of each additive vessel, once in the beverage apparatus 200, can be associated with a respective RFID reader or transceiver that is mounted on the dispensing assembly 213 or on another portion of the beverage apparatus 200. In the various embodiments of FIGS. 2-16, each vessel can be configured with its own separate pumping mechanism 260.

As shown in FIG. 8A, for example, the beverage apparatus 200, as well as the other container assemblies described herein, can include various structural platforms, connectors, fasteners, support posts, and other structure. The beverage apparatus 200 can include an upper support platform 207 and a lower support platform 208. The lower support platform 208 can be positioned below or lower than the upper support platform 207 when the bottle is in an upright orientation. Additionally, the beverage apparatus 200 can include a bottom support platform 209. Each of the support platforms 207, 208, 209 can provide structural support and integrity to the beverage apparatus 200. For example, the lower support platform 208 can support the controller 210. For example, the bottom support platform 209 can support the controller 210. For example, the lower support platform 208 can support the controller 210.

The support platforms 207, 208, 209 can be connected and/or adjoined by columns, flanges, or other support structure.

Figure 17:
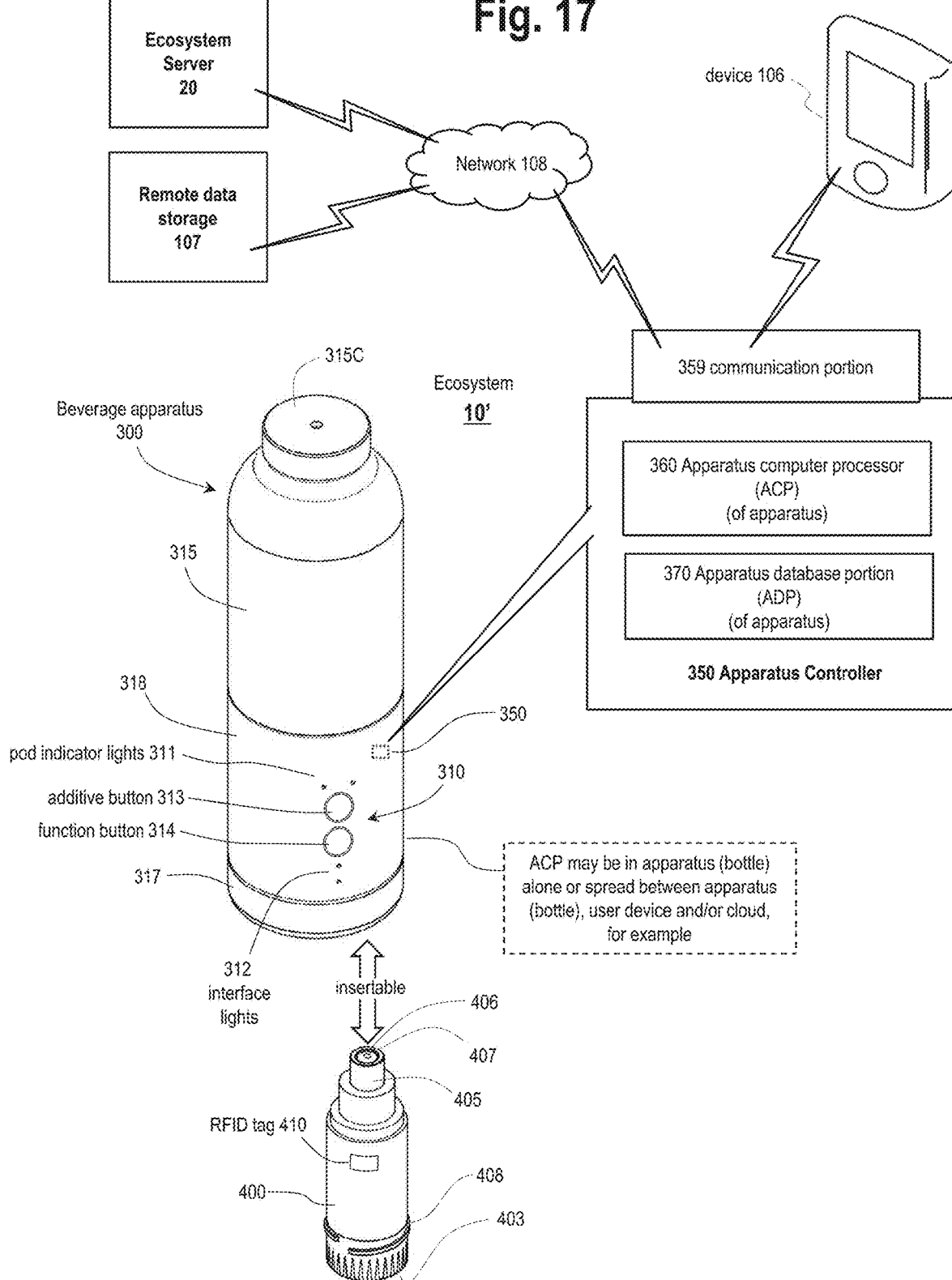
FIG. 17 is a schematic diagram showing details of a container apparatus or beverage apparatus 300 in an ecosystem 10, according to principles of the disclosure.

FIG. 17 shows a beverage apparatus 300, according to principles of the disclosure. The beverage apparatus 300 can be part of an ecosystem or system 10'. The beverage apparatus 300 can be similar in structure and functionality to the beverage apparatus 100 described herein. The beverage apparatus 300 can be similar in structure and functionality to the beverage apparatus 200 described herein. The beverage apparatus 300 can include any of the features of the beverage apparatus 100 and/or the beverage apparatus 200 as may be desired.

As shown in FIG. 17, the beverage apparatus 300 can include a beverage chamber housing 315, a base cover 317 and a dispensing assembly 318. The dispensing assembly 318 can be positioned between the beverage chamber housing 315 and base cover 317. The beverage chamber housing 315 can include an internal volume or chamber 316. The internal volume or chamber 316 can hold or contain the consumable liquid that is contained in the beverage apparatus 300.

The dispensing assembly 318 can be provided with a display or interface 310 that includes various user interface features, such as buttons or lights. The interface 310 and/or other user interface features can be provided anywhere on the beverage apparatus 300 as may be desired. Any number of user interface features can be provided so as to afford desired user control or functionality, so as to effectively control and monitor status of the beverage apparatus 300, and so as to provide interface between the beverage apparatus 300 and the user and/or user device 106. An additive button 313 can be provided on the beverage apparatus 300 and an illustrative function button 314 can be provided to afford functionality as described herein. In accordance with at least one embodiment of the disclosure, a user can press the additive button 313 so as to dispense additive, from a pod, additive vessel or vessel 400, into the consumable liquid contained in the beverage apparatus 300. The beverage apparatus 300 can include pod indicator lights 311. The pod indicator lights 311 can be provided to represent or show which pod is selected to dispense an additive and/or which pod is dispensing an additive. For example, each of the pod indicator lights 311 can be associated with a respective pod 400, i.e. additive vessel 400, in the beverage apparatus 300. When a user presses and/or holds the additive button 313, the selected pod 400 (as indicated by one of the pod indicator lights 311) can dispense the desired additive. The particular pod 400 (that the user wishes to select) can be selected, by the user, through a predetermined sequence of presses of the additive button 313, for example. It is appreciated that the disclosure is not limited to the buttons, lights, and/or other user interface devices shown in FIG. 17. Rather, other user interface arrangements, features or functionality may be utilized so as to control dispensing of additives from a pod and/or other operations of the beverage apparatus 300. The interface lights 312 can provide the user with various status information regarding the beverage apparatus 300. Functionality and/or operational control, for example, that is provided via the interface 310 can also be provided via a user device 106, such as a cell phone 106, for example. The user device 106 can communicate with the beverage apparatus 300 as otherwise described herein.

As shown in FIG. 17, the beverage apparatus 300 can include an apparatus controller or controller 350. The apparatus controller 350 can include an apparatus computer processor (ACP) 360 (the ACP 360 may also be described as an apparatus processing portion (APP) 360) and an apparatus database portion (ADP) 370, for example.

The ACP 360 can include one or more processors. The apparatus database portion 370 can include various computer memory that includes various databases, data records, memory portions and other memory architecture.

Accordingly, the apparatus database portion 370 can be provided with computer readable instructions that the ACP 360 can read according to principles of the disclosure. Based on such instructions and/or other data, the ACP 360 can perform various operations and/or provide functionality as described herein.

The apparatus controller 350, with the ACP 360 and the apparatus database portion 370, can control or provide for operations of the beverage apparatus 300 and can provide the various features and functionality described herein.

Various wires, communication paths and/or other conductive paths (not shown) can be utilized so as to provide connectivity between the apparatus controller 350, various motors or other drive mechanisms of the beverage apparatus 300 and/or other components of the beverage apparatus 300. Such wires, communication paths or other conductive paths can be in the form of insulated wires and/or structurally embedded wires or electrical conduits that are routed between components. Such wires or other conductive paths can be integrated into one or more components of the beverage apparatus 300. Such wires or other conductive paths can provide for both communication between components and/or electrical power to (or between) components, for example.

The ACP 360 can be in communication with the user device 106 that is associated with the particular user of the beverage apparatus 300, other user devices 106, a cloud network or resource 108, and/or other systems and/or other networks. For example, the beverage apparatus 300 can be in communication with a cell phone 106, of the user, that is associated with the beverage apparatus 300. The apparatus database portion 370 can contain any of a wide variety of data utilized by or generated by the apparatus controller 350 and/or the ACP 360, such as described below.

The beverage apparatus 300, as shown in FIG. 17, can also include an external communication portion or communication portion 359 that provides communication between the beverage apparatus 300 and various other components of the system 10'. For example, the communication portion 359 can provide communication with a user device such as a user cell phone 106. The apparatus controller 350 and/or the ACP 360 can perform a wide variety of processing related to the dispensing of additives and other processing as otherwise described herein.

The controller or apparatus controller 350 can be fully provided within the beverage apparatus 300. Accordingly, the beverage apparatus 300 can operate fully independently, with all processing and data storage/retrieval performed onboard the beverage apparatus 300, without external input/output. On the other hand, processing and data storage/retrieval can be shared between the onboard apparatus controller 350 and external computing resources.

Such external resources might include the ecosystem server or server 20. The server 20 can include processors and databases that can be utilized in conjunction with operation of the controller 350. The server 20 can interface with numerous other beverage apparatuses 300 and user devices 106 in the ecosystem 10'. Such numerous beverage apparatuses 300 and devices 106 may be in the thousands or millions. Additionally, the server 20 itself can be dispersed over a cloud architecture or dispersed over other architecture that includes numerous processing resources and numerous database resources.

As shown in FIG. 17, the beverage apparatus 300 can include the pod, additive vessel, or vessel 400. The vessel 400 can be removable, by the user in routine use, from the beverage apparatus 300 in accordance with one or more embodiments of the disclosure. The vessel 400 can be associated with or include a tag or RFID tag 410. The tag 410 can be mounted to or on a side of the vessel or mounted to some other location or position on the vessel 400.

The tag 410 can be mounted on a lower or bottom surface 403 of the vessel 400. The vessel 400 and tag 410 can include and/or be combined with any of the features described above with reference to the beverage apparatus 100 and/or the beverage apparatus 200, for example. In manner described above, the vessel 400 is insertable into the beverage apparatus 300. The vessel 400 can dispense additive, which is contained in the vessel 400, in manner as described above.

Figure 18:
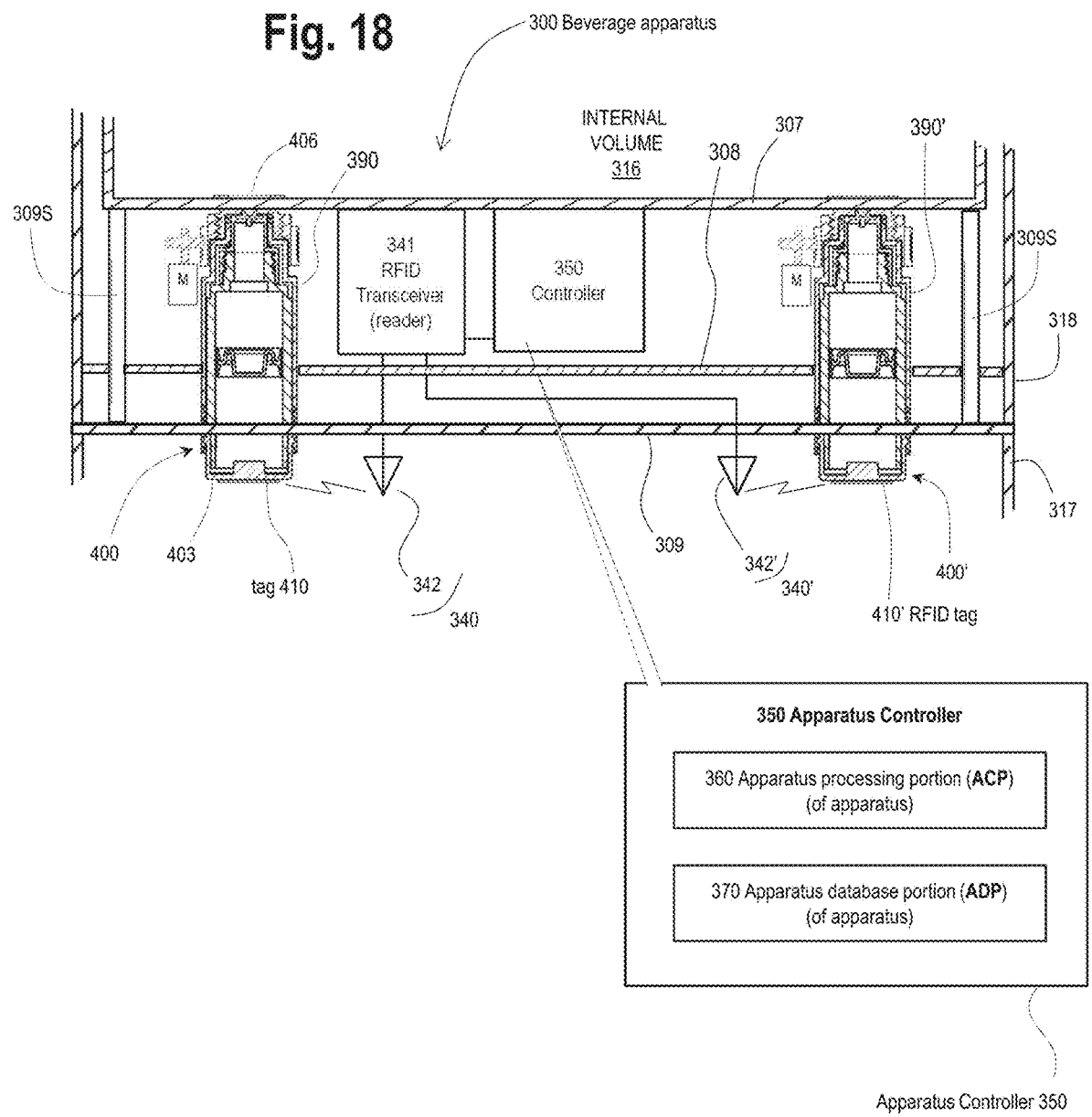
FIG. 18 is a schematic diagram showing further details of a beverage apparatus 300 in accordance with the principles of the disclosure.

FIG. 18 is a schematic diagram showing further details of a beverage apparatus 300 in accordance with the principles of the disclosure. The beverage apparatus 300 can include the dispensing assembly 318 and base cover 317 as described above. The dispensing assembly 318, in the beverage apparatus 300, can include an upper support platform 307. Beverage apparatus 300 can also include a lower support platform 308 and a bottom support platform 309. Supports 309S can extend between the lower support platform 308 and the upper support platform 307 and the bottom support platform 309. Accordingly, the upper support platform 307 can be structurally supported by the supports 309S. Various other structural supports, flanges, and/or connections between components can be provided.

As shown in FIG. 18, the beverage apparatus 300 can include a pod aperture or vessel aperture 389 that is provided in a receptacle 390. The receptacle 390 may be described as a "bay" or as a "vessel bay". The vessel 400 can be slid into and disposed in the pod aperture 389 in the receptacle 390 in manner as described herein. The vessel 400 can include a piston head 405 and a port 406, which can be provided with a one-way valve 407 to allow additive to exit the vessel 400. The piston head 405 can be of same or similar structure—and function in same or similar manner—as the piston head 253 with port 255, as described above. The piston head 405 can be positioned under the upper support platform 307 of the beverage apparatus 300. Mechanical components within or of the beverage apparatus 300 can be the same or similar to the mechanical components described above to provide dispensing of additive from the vessel 400 into the internal volume 316 of the beverage apparatus. In manner described above, the internal volume or chamber 316 can contain a consumable liquid. As shown in FIG. 18, the vessel 400 can include the tag or RFID tag 410 that is provided on a bottom surface 403 of the vessel 400. For example, the RFID tag 410 can be adhesively attached the bottom surface 403. Other types of electronic tags can be used instead of the RFID tag 410.

The tag or RFID tag 410 can include a processor portion and a memory portion. The processor portion can include a computer processor. The memory portion can include a memory that is readable by the processor, such as a database. The memory portion can retain various data regarding state of the vessel or pod 400 and/or attributes of the pod or vessel 400.

Figure 20:
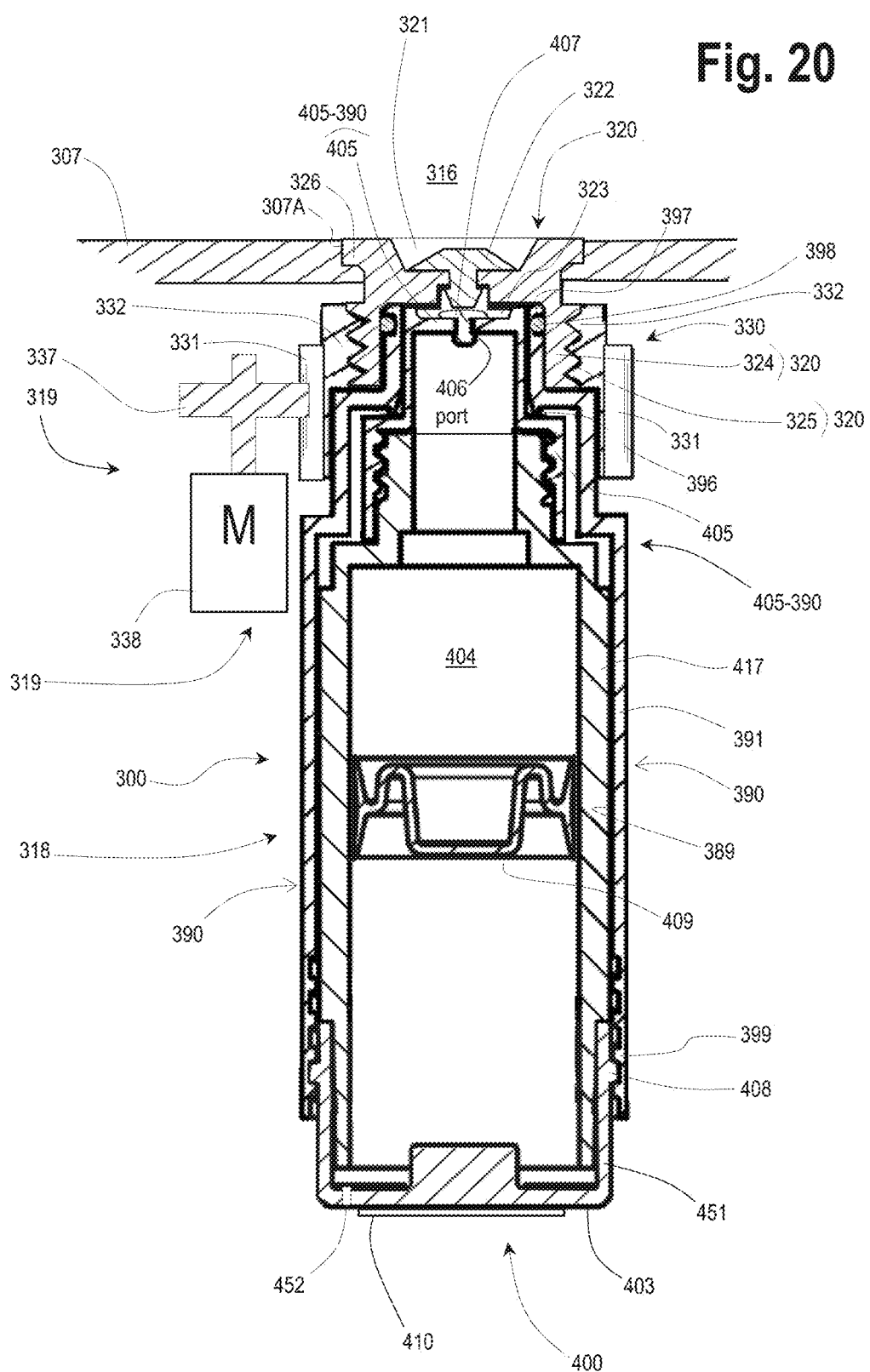
FIG. 20 is a cross-section schematic diagram showing a beverage apparatus, according to principles of the disclosure.
Figure 21:
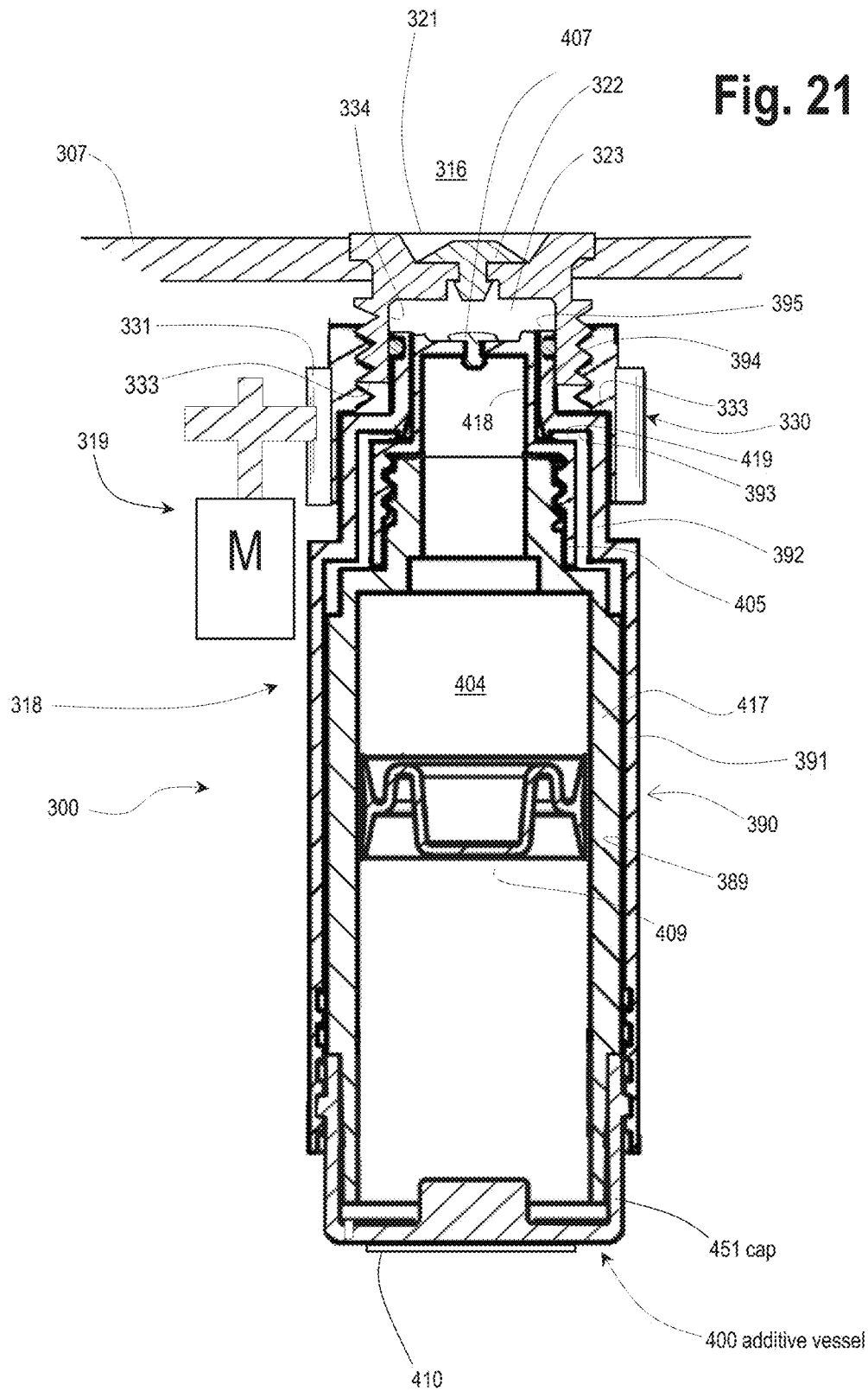
FIG. 21 is a cross-section schematic diagram showing a beverage apparatus the same as or similar to the beverage apparatus of FIG. 20, according to principles of the disclosure.

With reference to FIG. 20 and FIG. 21, the receptacle 390 can include a receptacle wall 391 that defines aperture 389.

The receptacle wall 391 can include a first reduced neck portion 392. The receptacle wall 391 can also include a second reduced neck portion 394. An annular abutment shoulder 393, of the receptacle 390, can connect the reduced neck portions 392, 394. The receptacle 390 can include a top edge 395. The top edge 395 can constitute a part of the piston 405-390. With such arrangement, the piston 405-390 can be described as being "radially bisected".

The receptacle 390 can include a seating engagement structure 396. The structure 396 can be in the form of an annular flange or shoulder that extends downwardly from the second reduced neck portion or portion 394, the annular abutment shoulder 393, and/or a junction of the elements 394, 393. The seating engagement structure 396 can engage with an annular abutment shoulder 419 of the vessel 400.

Relatedly, the vessel 400 can include a vessel body 417. The vessel 400 can include a neck 418. The neck 418 can be defined by the annular abutment shoulder 419. The neck 418 can be engaged with, i.e. slid into, the second reduced neck portion 394 of the receptacle 390. Such arrangement can provide securement of the vessel 400 within the receptacle 390.

As otherwise described herein, the receptacle 390/vessel 400 can reciprocate as a unit so as to provide a pumping arrangement or pumping mechanism. Relatedly, the second reduced neck portion 394 can be provided with an O-ring annular groove 397. An O-ring 398 can be disposed in the O-ring annular groove 397. The O-ring 398 can provide a seal between the receptacle 390 and the cylinder 324, i.e. while still providing or allowing reciprocating movement of the receptacle 390 within the cylinder 324. That is, the arrangement can provide a seal while still providing for pumping action.

As shown in FIG. 20, the vessel 400 can include a vessel cap or cap 451. As shown in FIG. 20, the vessel cap 451 can be provided with a hole 452. The hole 452 allows air to pass into the interior of the vessel 400 so as to allow advancement of a plunger 409, i.e. so as to not create an undesired vacuum within the interior of the vessel 400. The vessel cap 451 of the pod or vessel 400 can be a separate piece relative to the body 417 of the vessel 400. The vessel cap can be integrally formed with body 417.

It is appreciated that the beverage apparatus 300 can accommodate multiple pods or vessels 400. Accordingly, the arrangement of FIG. 18 can also include vessel 400' with tag 410', i.e. a second tag 410' that is on the second vessel 400', whereas a first tag 410 is on the first vessel 400. Beverage apparatus 300 can include functionality so as to engage with the second vessel 400' in similar or same manner as the beverage apparatus 300 engages with the vessel 400, i.e. the first vessel 400. A controller of the beverage apparatus can communicate with the second vessel 400' via second antenna 342'.

As shown in FIG. 18, the beverage apparatus 300 can include a controller or apparatus controller 350. The apparatus controller 350 can control operations of the beverage apparatus 300. The apparatus controller 350 can include the apparatus computer processor (ACP) 360. The apparatus controller 350 can also include the apparatus database portion (ADP) 370. The apparatus controller 350 can be in the form of physical machine or control unit that is physically attached to a suitable structural component of the beverage apparatus 300. For example, as shown in FIG. 18, the apparatus controller 350 can be attached to the upper support platform 307. The apparatus controller 350 can be in electronic communication with a reader, an RFID reader, RFID transceiver or transceiver, i.e. such as through wiring. The apparatus controller 350 can be in communication with an RFID transceiver 341, which can be or include an RFID reader. The RFID transceiver 341 can be in electronic communication with an antenna 342, i.e. such as through wiring. In some embodiments, such components can be integrated together. For example, the apparatus controller 350 can include the RFID reader 341 and the antenna 342. The antenna 342 can be disposed in the structure of the beverage apparatus 300 so as to be sufficiently proximate to the RFID tag 410, i.e. so as to effectively provide communications between the antenna 342 and the RFID tag 410. For example, the antenna 342 can be integrated into or provided upon or affixed to the lower support platform 308 and/or the bottom support platform 309, as schematically illustrated in FIG. 18. The RFID transceiver 341 or reader 341 and the antenna 342 can collectively constitute an RFID transceiver assembly 340.

To accommodate a second vessel 400', the beverage apparatus 300 can also include a second antenna 342'. The second vessel 400' can be removably positioned in a further or second vessel receptacle 390', i.e. the receptacle 390 can be described as a first receptacle 390. Accordingly, it is appreciated that the beverage apparatus 300 can include one or more vessels 400, including vessel 401', that are received into the beverage apparatus 300. Each of such vessels 400 can include a tag or RFID tag 410. Each of the tags 410, affixed to a respective vessel 400, can be associated with a respective antenna 342 that are each in communication with the RFID reader or transceiver 341. In turn, the RFID transceiver 341 can be in communication with the apparatus controller 350. In some embodiments, the beverage apparatus 300 can include multiple readers. In such embodiment, each of such transceivers 341 can provide support, be connected and/or communicate with a respective antenna 342, 342' (for each tag/vessel 400, 400). In some embodiments, a single RFID transceiver 341 can provide support, be connected and/or communicate with a single antenna 342, and such single antenna 342 can communicate with one or the plurality of tags 410 (on respective vessels 400). The single RFID transceiver 341 can be rotatable, such as being mounted on a pivoting mechanism, so as to be directed to a particular RFID tag/antenna of a vessel or pod.

Figure 19:
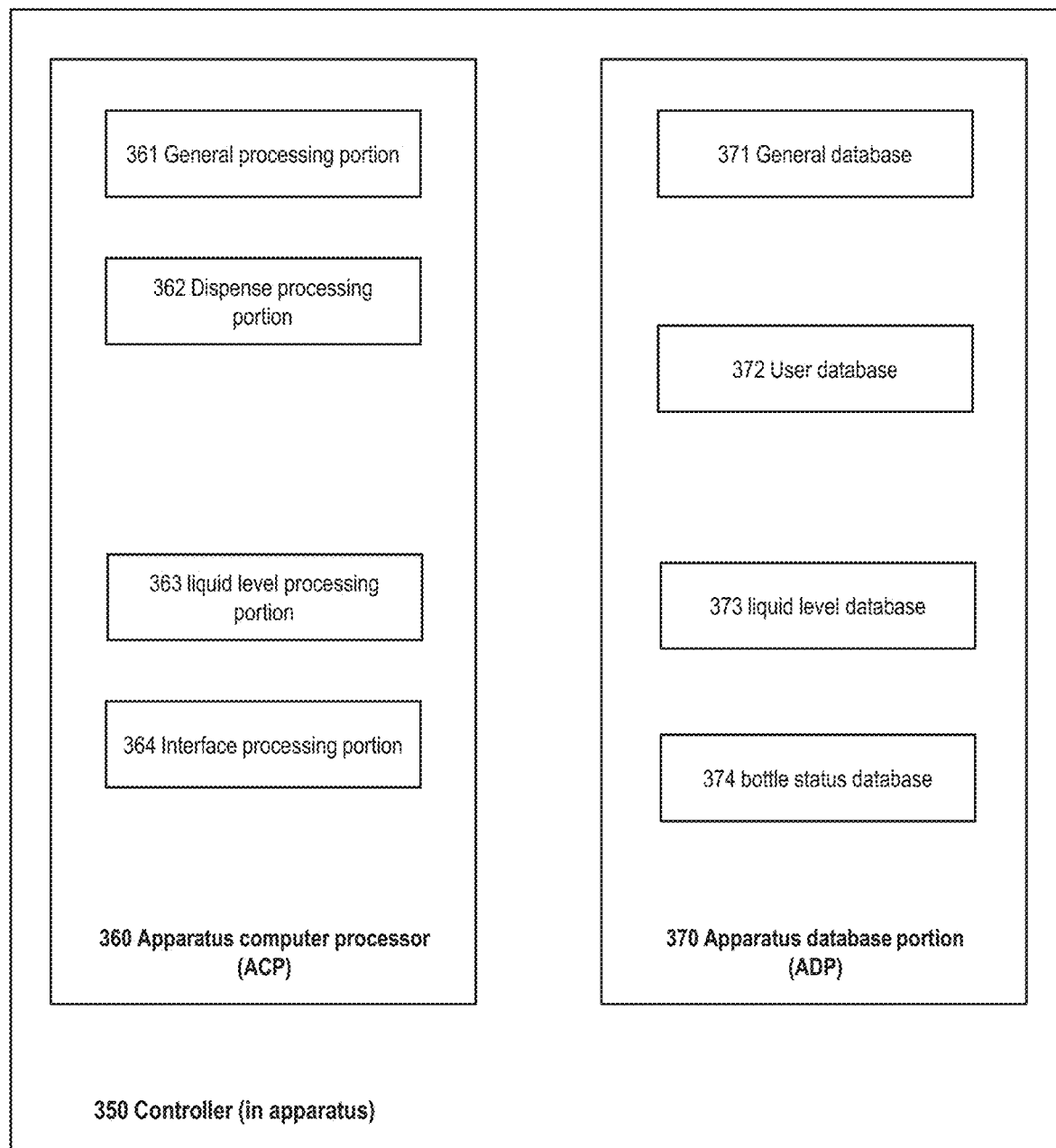
FIG. 19 is a block diagram showing in further detail the apparatus controller 350, including an apparatus computer processor (ACP) 360 and apparatus database portion (ADP) 370, according to principles of the disclosure.

FIG. 19 is a block diagram showing in further detail the apparatus controller 350, including the ACP 360 and apparatus database portion 370, that can be provided in the beverage apparatus 300, according to principles of the disclosure. The ACP 360 can include a general processing portion 361. The general processing portion 361 can handle a variety of processing performed by the beverage apparatus 300 that is not performed by other specialized processing portions as described herein. The general processing portion 361 can coordinate, orchestrate, and/or control more specialized processing that is performed by the specialized processing portions.

Various specialized processing portions can be provided in the ACP 360. The ACP 360 can include a dispense processing portion 362. The dispense processing portion 362 can perform a wide variety of operations associated with dispense of an additive from a vessel 400 that is disposed in the beverage apparatus 300. Such operations associated with dispense of an additive from a vessel 400 are described herein.

The ACP 360 can also include a liquid level processing portion 363. The liquid level processing portion 363 can perform a wide variety of operations associated with determining liquid level of the beverage apparatus. In general, it is appreciated that the various processing portions of the ACP 360 can perform with each other and/or complement each other so as to provide functionality of the beverage apparatus 300.

The ACP 360 can also include an interface processing portion 364. The interface processing portion 364 can perform various operations relating to interface functionality of the beverage apparatus 300. For example, the interface processing portion 364 can observe operations of the beverage apparatus 300 and output representative data to the user via the interface 310. In general, the interface processing portion 364 can input data from or via the display or interface 310, such as data generated from interface with a user, and control operations of the ACP 360 based on such input data. The interface processing portion 364 can observe operations of the beverage apparatus 300 and output data via the interface 310 so as to represent operations that are performed by the beverage apparatus 300.

The interface processing portion 364 can provide similar functionality between the beverage apparatus 300 and a user via a user device 106. Accordingly, the interface processing portion 364 can output data to the device 106 so as to represent operations of the beverage apparatus 300. The interface processing portion 364 can input data from the user device 106 that results from interface with the user. Such input data, from the user device 106, can dictate or control operations of the beverage apparatus 300. As otherwise described herein, the ACP 360 and the controller 350 in general can be disposed fully within the beverage apparatus 300. Portions of the ACP 360/controller 350 can be disposed external to the beverage apparatus 300. That is, it is appreciated that some processing performed might be performed by a server 20, the user device 106 and/or other processing resource, for example, in communication with the ACP 360 and/or controller 350.

As shown in FIG. 19 and FIG. 18, the controller 350 can also include the apparatus database portion 370. The apparatus database portion 370 can include a general database 371. The general database 371 can store a wide variety of data that is used by or generated by the ACP 360. The apparatus database portion 370 can also include a user database 372. The user database 372 can include a wide variety of data regarding the particular user of the beverage apparatus 300 and data regarding other users that are associated with the beverage apparatus 300 in some manner. The user database 372 can include user preference information, user history information, use pattern information, use trend information, as well as other data regarding use of the beverage apparatus 300 by a user (or users). The user database 372 can include data regarding the user device 106 and communication particulars of the user device 106 such as communication credentials, for example.

As described herein, information and data have been utilized herein interchangeably, unless otherwise provided by the particular context.

The apparatus data portion 370 can also include a liquid level database 373. The liquid level database 373 can store various data utilized by or generated by the liquid level processing portion 363. Operations of the liquid level processing portion 363 are further described below.

As described in detail above, FIG. 20 is a cross-section schematic diagram showing details of a beverage apparatus 300. The beverage apparatus 300 can include a dispensing assembly 318 that can include structure similar to the structure (of the dispensing assembly 213) described above with reference to FIGS. 6 and 7A-C, for example. The dispensing assembly 318 can be provided between the beverage chamber housing 315 and the base cover 317. In some embodiments of the disclosure, the dispensing assembly 318 can include the base cover 317. FIG. 21 is a cross-section schematic diagram showing details of a beverage apparatus or bottle 300 the same as or similar to the beverage apparatus of FIG. 20. In FIG. 21, the receptacle 390, with vessel 400 therein, has been lowered so as to be withdrawn from the outlet port 321. Accordingly, the volume of the pumping chamber 323 is increased.

In manner similar to that described above, the dispensing assembly 318 can include a dispense mechanism or pumping mechanism 319—to dispense additive from the additive vessel 400. The pumping mechanism 319 can include a pump housing 320, a toothed ring assembly or toothed ring 330, and a receptacle 390, in accordance with at least some embodiments of the disclosure.

The additive vessel 400 can include an internal volume or volume 404. FIG. 20 shows the receptacle or vessel 400 in what might be described as a "starting" position with no or little liquid in a pumping chamber or chamber 323. The vessel 400 can include the plunger 409. The plunger 409 as shown in FIG. 20 (in contrast to an initial position illustrated in FIG. 7A) is about half-way into the vessel 400, i.e. showing that about half of the additive has already been dispensed from the internal volume 404 (of the vessel 400) shown in FIG. 20. The arrangement, including the position of the plunger 409 shown in FIG. 20, could follow a dispense event, or in the example of FIG. 20, likely a series of dispense events.

As illustrated in FIG. 20, the receptacle 390 can include or define aperture 389. The vessel 400 can be threaded and positioned into the receptacle 390 such that piston head 405 of the vessel 400 is positioned in and/or forms a part of pumping chamber 323. The piston head 405 can provide, at least in part, a piston 405-390. Such "piston" 405-390, in accordance with at least one embodiment of the disclosure, can include the piston head 405 (of the vessel 400) and an upper end or top edge 395 of the receptacle 390. The receptacle 390 can support the vessel 400 via threads 399 (of the receptacle 390) engaging threads 408 (of vessel 400). As the receptacle 390 moves up and down (by operation as described herein), so does the vessel 400. Accordingly, the receptacle 390 movably supports the vessel 400. The "piston" 405-390 can slide back and forth (i.e. up and down as shown in FIG. 20) within the pumping chamber 323. The pumping chamber 323 can be formed in part by a cylinder 324 of pump housing 320. As described above, the piston head 405 (of the vessel) can include a one-way valve 407. The one-way valve 407 permits flow of liquid from the vessel 400 into the pumping chamber 323. At a top end of the chamber 323 (above the piston head 405) is the further or second one-way valve, i.e. the one-way valve 322 associated with the pump housing 320. The one-way valve 322 permits liquid additive to flow from the pumping chamber 323 into the chamber 316 as the piston 405-390 moves upward (from the position shown in FIG. 21 to the position shown in FIG. 20) in the cylinder 324.

The pump housing 320 can be supported within or on the upper support platform 307, as shown in FIG. 18. For example, the pump housing 320 can include or be a round or circular insert that includes an annular seating flange 326. Such annular seating flange 326, of the pump housing 320, can be adhesively bonded or heat bonded into a mating aperture 307A in the upper support platform 307.

As shown in FIG. 20 and FIG. 21, the piston 405-390 and vessel 400 can be drawn down—while the one-way valve 322 (at the outlet port 321) blocks fluid flow from coming into the pumping chamber 323 from the chamber 316. As a result, a vacuum is created that draws fluid from the additive vessel 400 through the one-way valve 407 into the pumping chamber 323. Accordingly, such manipulation provides for additive to be passed into the pumping chamber 323—and such additive "queued" to be dispensed into the beverage chamber 316. Such arrangement of the beverage apparatus 300 is similar to the arrangement shown in FIG. 7B.

Then, the piston 405-390 can be driven back to its starting position (FIG. 20) so as to compress or force the fluid, in the chamber 323, through the one-way valve 322 at the outlet port 321 and into the beverage chamber 316. The one-way valve 407 (of the vessel 400) blocks the flow of fluid/additive from returning into the vessel 400. Positive pressure, accordingly, is produced in what can be described as a "compression stroke". Such compression stroke results in dispensing the contents of the pump chamber or pumping chamber through the outlet port 321 into the beverage chamber 316. Such process can be described as a "single piston stroke."

The volume dispensed from the pumping chamber 323 during such a single piston stroke can be modulated linearly by modifying the piston stroke length, i.e. how much the piston moves up and down in the arrangement of FIG. 20 and FIG. 21. Multiple piston strokes can be used to dispense larger quantities. By design, the volume of the pumping chamber 323 can be configured to be as small as practically possible when the piston 405-390 is in the starting position, as shown in FIG. 20, to avoid wasting additive liquid when a depleted additive vessel 400 is withdrawn from the receptacle.

FIG. 20 also shows a dispense mechanism or pumping mechanism 319 for actuating the receptacle 390 with associated piston 405-390 of the pumping mechanism 319. As illustrated, the receptacle 390 and its associated piston 405-390 can be moved down and up by operation of the toothed ring assembly 330. Such arrangement is the same or similar to arrangements described above.

That is, the dispense mechanism 319 can include a pump housing 320. The pump housing 320 can include a cylinder 324 and a threaded extension 325. The toothed ring assembly 330 can include a set of internal threads 332.

The internal threads 332 can engage with the threaded extension 325 of the pump housing 320. The threaded extension 325 can be in the form of threads on an outer diameter of the cylinder 324 of the pump housing 320, in accordance with at least some embodiments of the disclosure. The toothed ring assembly can include an annular abutment shoulder 333. The annular abutment shoulder 333 can engage with the receptacle 390 as the receptacle 390 is moved upward as shown in FIG. 21 so as to limit upward movement, in an embodiment.

The toothed ring assembly 330 can include teeth 331 on an outer diameter (OD) of the toothed ring assembly 330.

As shown in FIG. 20, the teeth 331 can be vertically oriented or aligned. Each toothed ring assembly 330, can be driven by a gear 337 (shown in cross section in FIG. 20). That is, the teeth 331 can be driven by the gear 337. The gear 337 can be driven by a motor 338. Other gears and/or a gearbox can be interposed between the gear 337 and the motor 338 (and/or between the gear 337 and the toothed ring assembly 330) so as to provide a desired gear ratio.

The position of the vessel 400 shown in FIG. 20 can be described as a starting position. By operation of the dispense mechanism or pumping mechanism 319, the vessel 400 can be displaced downward, as shown in FIG. 21, into a withdrawn position.

The motor 338 and gear 337 can rotate the toothed ring assembly 330. As the toothed ring assembly 330 rotates, the internal threads 332 cause the toothed ring assembly 330 to rise and fall on the threaded extension 325 of the pump housing 320. The receptacle 390, which can be snapped into or adhered to or integral with the toothed ring assembly 330, also therefore rises and falls with the toothed ring assembly 330, causing the piston 405-390 to move within the cylinder 324. More specifically, the piston 405-390 can move within an inner diameter surface (i.e. a receptacle engagement sleeve portion) 334 of the cylinder 324. In accordance with one embodiment, the threads 332 on the toothed ring assembly 330 and the threaded extension 325 can be a "fast" 4-start thread that cause the toothed ring assembly 330 to travel to full linear extension with 180 degrees of rotation. The threads can be configured to have an ACME profile or similar profile.

In accordance with at least some embodiments of the disclosure, the receptacle 390 can be frictionally secured within the toothed ring assembly 330. Accordingly, as the toothed ring assembly 330 reciprocates, as a result of being driven by the teeth 331, the receptacle 390 reciprocates with the toothed ring assembly 330. The vessel 400 can be threaded onto or into the receptacle 390. Accordingly the vessel 400 can reciprocate with the receptacle 390.

In accordance with at least some embodiments of the disclosure, the toothed ring assembly 330, the receptacle 390, and the vessel 400 can reciprocate as a unit, i.e. reciprocate so as to move or oscillate between the start position and a withdrawn position as a unit. In at least some embodiments, the receptacle 390, or structure connected thereto, can be asymmetrical in shape. Such asymmetry in shape can be provided so as to preclude rotation of the receptacle or pod as the pod is being reciprocated, such as between the positions shown in FIG. 20 and FIG. 21. For example, the receptacle can be provided with ridges or fins that run along the length of the receptacle—and that engage with matching grooves or slots in a structure of the beverage apparatus that is static, i.e. that does not reciprocate.

Accordingly, the reciprocation between the positions of FIG. 20 and FIG. 21 can be provided for, while preventing rotation of the vessel or pod. In other embodiments, the pod 400 and receptacle 390 may be allowed to rotate in conjunction with reciprocation of the pod.

In manner similar to that described above, as shown in FIG. 20, the vessel 400 can be provided with threads 408. The receptacle 390 can be provided with threads 399. The threads 408 can be provided on any portion or outer surface of the vessel so as to secure the vessel 400 into the receptacle 390—so long as such threads 408 are provided to match or mate with threads on the receptacle 390. The threads 399 can be provided on any portion or inner surface of the receptacle 390 so as to secure the vessel 400 into the receptacle 390—so long as such threads 399 (of the receptacle) are provided to match with threads on the vessel 400.

The vessel 400 can be attached to the receptacle 390 in other manners as compared to the particulars shown in FIG. 20. For example, the vessel 400 can include threads around the top of the vessel 400, such as on neck 418, that engage with threads on an inner diameter of the second reduced neck portion 394 of the receptacle 390. For example, the vessel 400 can include threads around the top of the vessel 400 that engage with threads on an inner diameter of the first reduced neck portion 392 of the receptacle 390. Other threaded arrangements can be provided.

Hereinafter, various features relating to level sensing will be described according to principles of the disclosure.

As described above, a beverage apparatus can contain a consumable liquid that contains an additive. The consumable liquid can be contained in a chamber of the beverage apparatus. A controller of the beverage apparatus can control dispensing of the additive, by a dispensing assembly, so as to maintain a targeted concentration of the additive in the consumable liquid and/or so as to attain a desired concentration of the additive in the consumable liquid. The controller can utilize a variety of data in the dispensing of the additive. Such data can be input from a variety of sources. One type of data that may be input and utilized by the controller can include data that relates to a level or liquid level of the consumable liquid in the beverage apparatus or bottle.

For example, a fluid sensor or fluid level sensor may be in the form of an ultrasonic device or ultrasonic sensor. The fluid level sensor can emit a sound wave. A portion of the sound wave can be returned as a result of encountering a top surface of the consumable liquid in the chamber. Accordingly, the fluid level sensor can use "round trip time" for the reflected sound wave or waves to measure the height of a fluid or water column within the chamber. Based on the height of the fluid column within the chamber, the controller can be provided with known data so as to determine, i.e. calculate based on diameter or shape for example, the fill volume of the chamber. According to principles of the disclosure, a function or lookup table can be used to match or "map" the observed height of the liquid in the beverage apparatus, i.e. the bottle, the particular volume that corresponds to such liquid height. As described below, various arrangements and processes can be used to sense level of liquid in a beverage apparatus/bottle of the disclosure.

Hereinafter, various features relating to level sensing, i.e. liquid level sensing, will be further described. The liquid level sensing described herein can be performed in the environment of any of the beverage apparatuses as described herein, as may be desired. For example, liquid level sensing can be performed in the environment of the beverage apparatus 300 shown, for example, in FIGS. 20 and 21. For purposes of illustration of level sensing, FIG. 22 is a schematic diagram of a beverage apparatus 300 the same as or similar to the beverage apparatus 300 of FIGS. 20 and 21.

Figure 22:
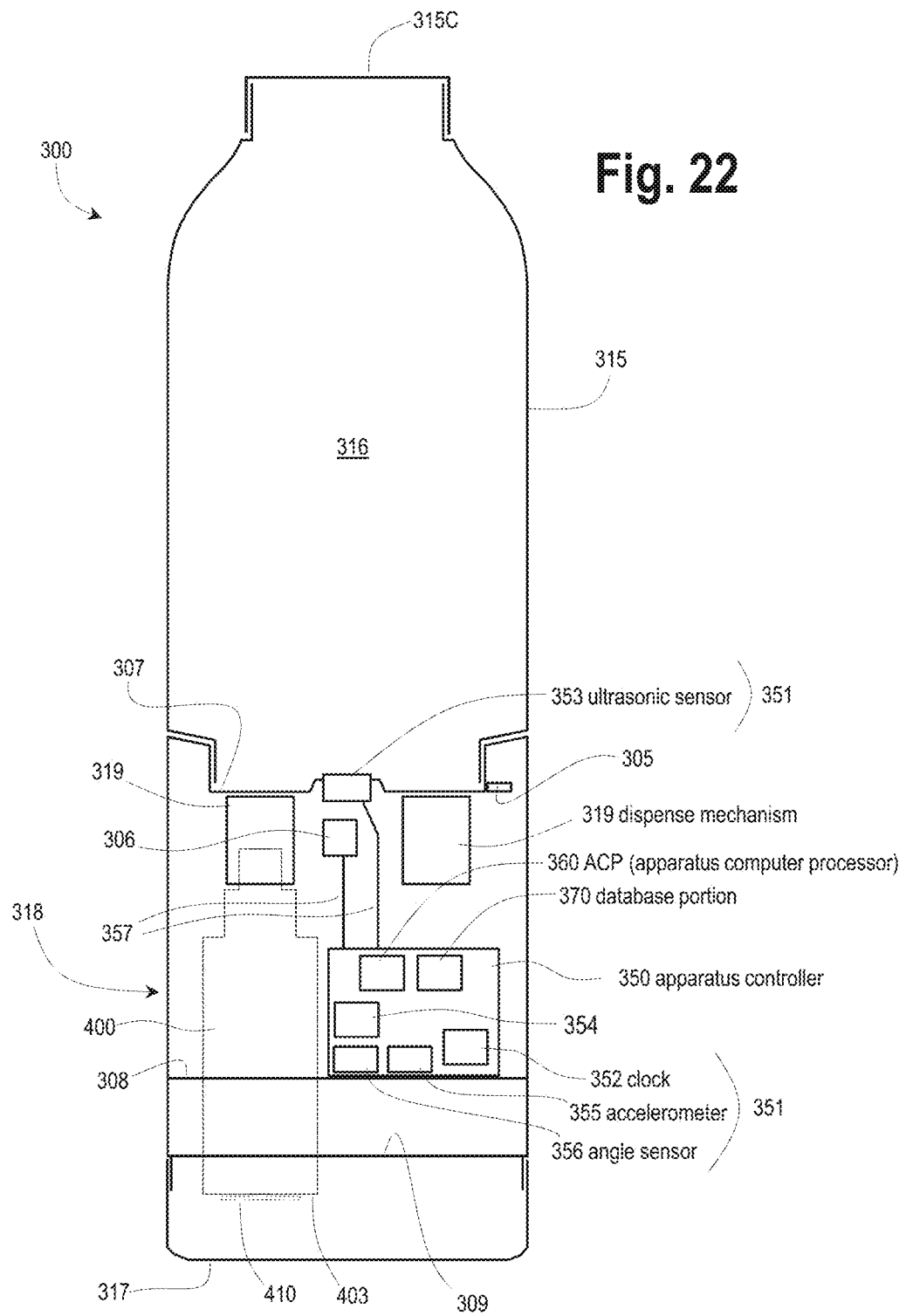
FIG. 22 is a schematic diagram of a beverage apparatus the same as or similar to the beverage apparatus of FIG. 21, according to principles of the disclosure.

As shown in FIG. 22, the beverage apparatus 300 can include a beverage chamber housing 315. The beverage chamber housing 315 can include an internal volume or chamber 316. A consumable liquid with additive can be contained in the chamber 316. The beverage apparatus 300 can include a removable cap 315C. A user can remove the removable cap 315C so as to fill the beverage apparatus 300 with liquid. The beverage apparatus 300 can also include a base cover or base cap 317. The base cover 317 can be removed by a user so as to switch out or insert a vessel or pod 400 into the dispense mechanism 319. In accordance with at least some embodiments, a dispensing assembly 318 can be described as including the dispense mechanism 319 and the vessel 400. As shown in FIG. 22, the vessel 400 can include a lower or bottom surface 403. A tag, RFID tag, or electronic tag 410 can be mounted on the bottom surface 403. The vessel 400 can be of same or similar structure, and can be manipulated in similar manner, to that described above with reference to FIGS. 20 and 21, for example.

The beverage apparatus 300 as shown in FIG. 22 can also include various structural features including those described above. The beverage apparatus 300 can include an upper support platform 307, a lower support platform 308, and a bottom support platform 309. The support platforms 307, 308, 309, as described herein, can serve to provide structural integrity to the beverage apparatus 300 and to support various components of the beverage apparatus. As described herein, the upper support platform 307 can support, at least in part, the dispense mechanism 319. As shown in FIG. 22, the lower support platform 308 can serve to support an apparatus controller 350.

However, it should be appreciated that the controller 350 can also be supported by the upper support platform 307 or by some other support structure within the beverage apparatus.

The controller 350 can include the apparatus computer processor (ACP) 360 of FIG. 19. The controller 350 can include an apparatus database portion (ADP) 370. The ACP 360 and the ADP 370 can include various features as described herein. The ADP 370 can control the various operations of the beverage apparatus 300. The ADP 370 can store data that is utilized by the ACP 360 and/or data that is generated by the ACP 360. Accordingly, the ADP 370 can store various instructions that are utilized by the ACP 360 in performing the various operations described herein.

With regard to level sensing, the apparatus controller 350 can also contain and/or be in communication with various sensors, mechanisms, devices, gadgets, systems, and/or apparatus, which can collectively be described as "elements" 351. One element 351 can be an ultrasonic sensor 353, i.e. an ultrasonic device 353, as shown in FIG. 22. The ultrasonic sensor 353 can be connected to the controller 350 utilizing a suitable communication pathway 357. The ultrasonic device or ultrasonic sensor can be provided with its own computer processing portion or processor. The communication pathway 357 can be in the form of a wire, cable, wireless link, embedded wire that is embedded in structure of the beverage apparatus 300, embedded cable, laminated cable, laminated wire, laminated conductive pathway, or other communication pathway. The communication pathway (s) 357 can be provided between any of the elements described herein and/or the controller 350 and can provide communications so as to provide control of a particular element and/or can provide power to a particular element.

The beverage apparatus or bottle can include one or more power sources, such as one or more batteries, that can power the various components of the beverage apparatus.

The beverage apparatus 300 can also include other elements 351. The other elements 351 can include a clock 352.

The clock 352 can perform various operations associated with the passage of time. The clock 352 can, in a routine manner, track time including days, hours, minutes, seconds, milliseconds, etc. The clock 352 can also perform various related functions including stopwatch operations, determining a duration of time, determining when a particular time has been attained, determining a differential between two observed times, and other operations. In at least some embodiments of the disclosure, the controller 350 can also perform such operations. That is, in some embodiments, the clock 352 can be limited to simply outputting time values to the controller 350—and the controller 350 performing various operations based on such output time values. For example, a time value that is output by the clock 352 might be 09102019day101521 hour to denote Sep. 10, 2019 at 10:15:21 AM. It should be appreciated that the content, nature, and format of such data can be varied as desired. The clock 352 can be in the controller 350 and/or be a part of the controller 352.

The elements 351 can include an accelerometer 355. The accelerometer 355 can monitor acceleration of the beverage apparatus 300 in the x-y-z space and output representative data to the controller 350. The elements 351 can also include an angle sensor 356. The angle sensor 356 can monitor an angle at which the beverage apparatus 300 is positioned. Each of the elements 351 can perform processing of data that is then output to the controller 350 and/or the elements 351 can output unprocessed or raw data to the controller 350. In the latter case, the controller 350 can process such raw data so as to generate requisite information. For example, the angle sensor 356 can, itself, perform processing to output an angle such as 51°. On the other hand, the angle sensor 356 can output raw data and the controller 350 determine the angle based on the raw data. According to at least one embodiment of the disclosure, the accelerometer can sense or determine angle of the beverage apparatus 300. In accordance with at least some embodiments, the angle sensor 356 can be or include the accelerometer 355. The accelerometer 355 can be or include the angle sensor 356.

Additionally, the elements 351 provided in the beverage apparatus 300 can include one or more temperature sensors.

The temperature sensors can include a liquid temperature sensor 305 and an apparatus temperature sensor 306. The liquid temperature sensor 305 can be provided in or adjacent to the chamber 316 so as to be exposed to the consumable liquid in the beverage apparatus 300. Accordingly, a temperature of the consumable liquid in the beverage apparatus 300 can be determined by the liquid temperature sensor 305. The apparatus temperature sensor 306 can be provided within structure of the beverage apparatus 300 so as to measure an operating temperature of the beverage apparatus. The apparatus temperature sensor 306 can be provided on or exposed to an exterior wall of the beverage apparatus 300 so as to input an ambient temperature in which the beverage apparatus 300 is disposed.

Multiple temperature sensors can be utilized so as to input both internal operating temperature of the beverage apparatus as well as ambient temperature of the beverage apparatus. Such various temperature sensing can be utilized in operation of the beverage apparatus as described herein.

Figure 23:
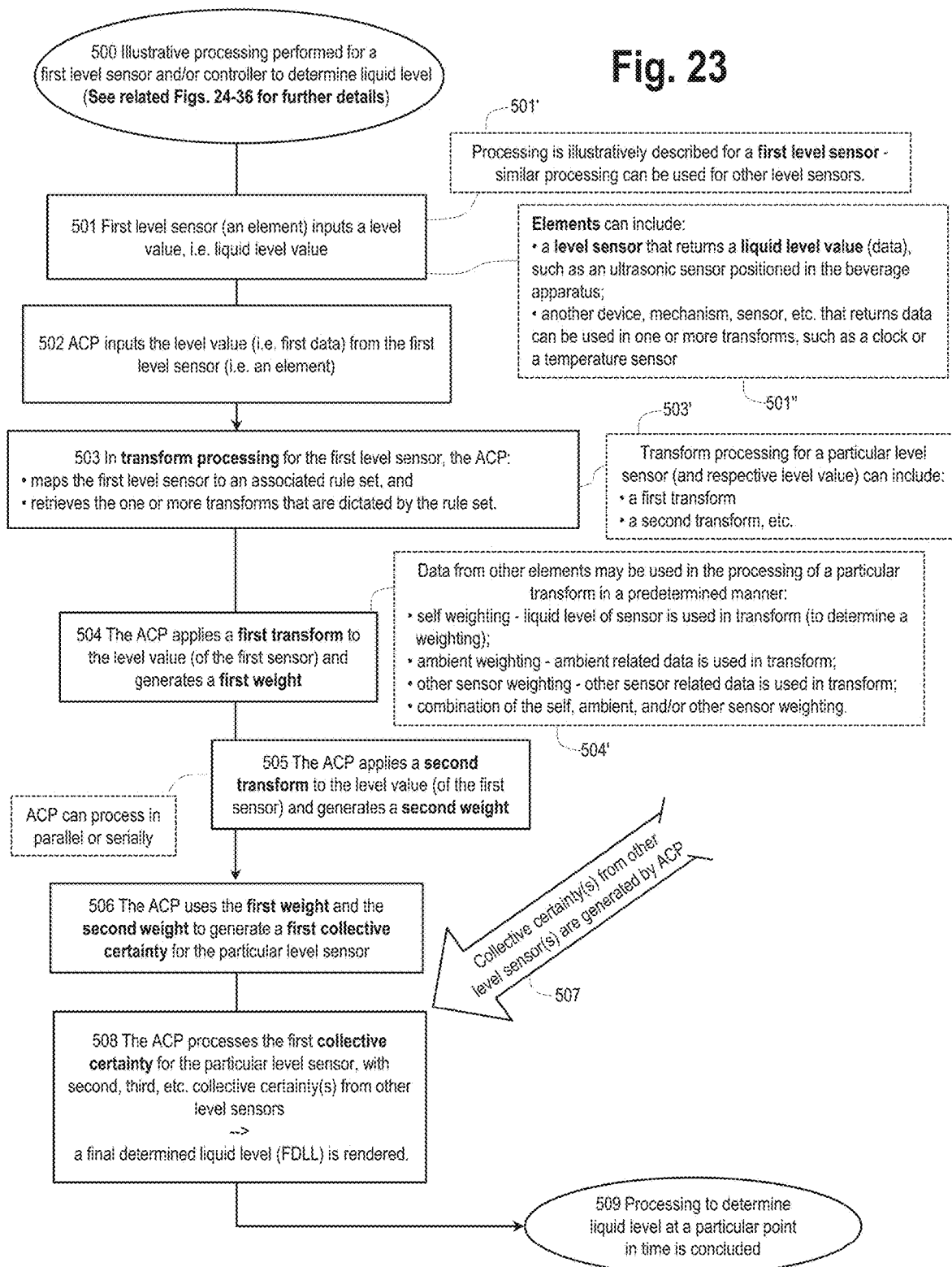
FIG. 23 is a flowchart showing processing that can be performed by a level sensor and/or controller to determine liquid level, according to principles of the disclosure.

For purposes of illustration herein and below, the ultrasonic sensor 353 can constitute or be described as a first level sensor 353. Various processing can be performed by the controller 350 and/or the first level sensor 353. FIG. 23 is a flowchart showing processing that can be performed by the first level sensor and/or controller 350 to determine liquid level. Illustratively, the process of FIG. 23 starts in step 500 and passes onto step 501. In step 501, the first level sensor, i.e. an element, inputs a liquid level value. For example, the ultrasonic sensor 353 may have used round trip time processing or time of flight processing, as described herein, so as to input liquid level of a consumable liquid in the beverage apparatus 300.

As described at 501', processing of FIG. 23 is illustratively described for a first level sensor, which in this example is the ultrasonic sensor 353. Similar processing can be used in conjunction with other level sensors. As described at 501" and discussed above, an "element" 351 can include a level sensor that returns a liquid level value, i.e. data.

Such an element 351 can be an ultrasonic sensor positioned in the beverage apparatus. An "element" 351 can also include a device, mechanism, sensor, etc. that provides data other than liquid level data. Such other data can be used in one or more "transforms" as described below. Accordingly, both elements that output a liquid level and elements that do not, in of themselves, output a liquid level value can be utilized in level sensing processing. For example, elements that do not, in of themselves output a liquid level value, can be used with a sensor that does output a liquid level.

With reference to FIG. 23, once a liquid level is input (by the first level sensor) in step 501, the processing passes onto step 502. In step 502, the controller 350, and specifically the ACP 360, inputs the liquid level value from the first level sensor 353. The level value can be described as first "level data" (from the first sensor) regarding level of the consumable liquid in the beverage apparatus 300. After step 502, the processing passes onto step 503.

As reflected at 503', the processing of FIG. 23 includes what can be described as "transform processing". In accordance with at least one embodiment of the disclosure, such transform processing can be performed for a particular level sensor that returns data representing a liquid level in the beverage apparatus 300. The data that is returned from the level sensor can be the liquid level itself. The data that is returned from the level sensor can be data used by controller 350 to determine liquid level. "Transform processing", for a particular level sensor, such as the ultrasonic sensor 353, can include multiple "transforms". Transforms can be used (by the controller 350) to process data from a respective element or elements. In at least one embodiment, as described herein, each "transform processing" can involve one or more input liquid level values. Each transform processing can involve determining the certainty of a liquid level that has been input (by the controller 350) from a level sensor. Each transform processing can involve determining the certainty of a liquid level that has been input (by the controller 350) based on known data, such as data from an angle sensor for example.

In some embodiments, the level value for which a certainty is determined can be described as the "subject level value" that can be input from a "subject element". The "subject element" can be a "subject sensor", for example. As described below with reference to FIG. 30, for example, other inputs from other elements/sensors can be used to determine certainty of the subject level value. Such other sensors can include other level sensors, which can be described as "supporting sensor(s)" that provide "supporting level value(s)". Accordingly, transform processing can include a first transform and a second transform. In the first transform, a level value (i.e. subject level value for which certainty is to be determined) can be input from a first sensor, which is the subject sensor—and a supporting level value can be input from a second sensor, which is thus the supporting sensor. In a second "transform", a level value (i.e. subject level value which certainty is to be determined) can be input from the second sensor, which is then the subject sensor—and a supporting level value can be input from the first sensor, which is thus the supporting sensor.

As described above, in step 502, the ACP inputs a level value from the first level sensor, which is (in this example) the ultrasonic sensor 553. In step 503, to perform transform processing for the first level sensor, the ACP determines the particular transforms that will be applied to the level value. The ACP can map or associate the first level sensor, and/or the input level value, to an associated rule set. Based on the associated rule set, the ACP can retrieve the one or more transforms that are dictated by the rule set, i.e. the transforms that will be used to assess certainty of the level value. Accordingly, the one or more transforms that will be applied to the level value, from the particular level sensor, is determined. After step 503, the processing passes onto step 504.

In step 504, the ACP can apply a first transform, which was identified in step 503, to the level value of the first sensor. Accordingly, in step 504, the ACP can generate a "first weight" that is associated with the level value of the first sensor. Then, the processing passes onto step 505. In step 505, the ACP can apply a second transform, which was identified in step 503, to the level value of the first sensor and, as a result, generate a second weight.

Accordingly, the processing of steps 504 and 505 apply first and second transforms respectively. Both transforms are applied to the same level value of the first sensor. The first transform provides a first weight. The second transform provides a second weight. The processing of step 504 and 505 can be performed in parallel or serial manner. It should be appreciated that any of the processing described herein, unless the particular context dictates otherwise, can be applied in parallel or serial manner.

As described at 504' and otherwise herein, data from other elements may be used in the processing of a particular transform in a predetermined manner. As described above, multiple transforms can be used in a transform processing. A transform can include self weighting, ambient weighting, and other sensor weighting, for example. In self weighting, the liquid level as determined by the subject sensor itself can be utilized to determine a certainty of such measured liquid level. Such self weighting can be beneficial in a situation where a particular sensor is known to be accurate in particular ranges. For example, a sensor might be particular accurate when the beverage apparatus is at least half full of liquid, but may operate with deteriorating accuracy as liquid level is further diminished.

A transform can include or use ambient weighting. In ambient weighting, ambient related data is used in the transform. For example, ambient weighting might be utilized when a sensor is known to be very accurate with liquid at room temperature, but with diminishing accuracy as the liquid falls below room temperature.

Additionally, a transform can include or use other sensor weighting. In other sensor weighting, sensor data from other sensors, including other level sensors, can be utilized in the transform. Such processing can provide for one level sensor to effectively cancel out another level sensor. For example, if a particular ultrasonic sensor 353 is known to diminish in accuracy at temperatures above 80°, then the data from the liquid temperature sensor 305 can be utilized so as to adjust certainty of the ultrasonic sensor accordingly. Additionally, as reflected at 504', processing can include a combination of self weighting, ambient weighting, and other sensor weighting.

With further reference to FIG. 23, after step 504 and/or step 505, the processing passes onto step 506. In step 506, the ACP uses the first weight, generated in step 504, and the second weight, generated in step 505, to generate a first collective certainty for the particular level sensor. Accordingly, in such processing, the first weight and the second weight are utilized to provide a collective certainty. It should be appreciated that the "first weight" could be described itself as a certainty. Additionally, the "second weight" could be described itself as a certainty.

In serial or in parallel to the processing performed in step 506, the ACP can perform the processing of step 507. In step 507, collective certainties from other level sensors, with respective other level values, can be generated by the ACP. The generation of such other collective certainties can include the ACP applying one or more transforms, in respective transform processing, to respective level values of the additional sensors. After the processing of step 506 and/or step 507, the processing passes onto step 508.

In step 508, the ACP processes the various collective certainties generated in step 506 and step 507. That is, in step 508, the ACP processes the first collective certainty for the particular level sensor, along with second, third, etc. collective certainty(s) from other level sensors. As a result, a final determined liquid level (FDLL) is rendered. It may be the case that only one level sensor contributed data in the processing of step 508, i.e. there were no other level sensors to support the processing of step 507. Accordingly, the value obtained from that one level sensor, in step 506, would be the value rendered in step 508, i.e. since there is no other level value to weigh against.

After step 508, the processing passes onto step 509. In step 509, the processing to determine liquid level at a particular point in time is concluded.

Accordingly, the ACP can perform processing that includes inputting first data from a first level sensor. The ACP can input second data from a second level sensor. The ACP can perform first transform processing, to the first data, to generate a first collective certainty. This first collective certainty can be associated with the first level sensor, i.e. so as to provide a certainty of the liquid level value obtained from the first sensor. The ACP can perform second transform processing, to the second data, to generate a second collective certainty. Further, the ACP can generate a final determined liquid level (FDLL) based on the first collective certainty, the first data, the second collective certainty, and the second data. Relatedly, it should be appreciated that in some embodiments of the disclosure and in some processing, an actual "liquid level value" may in fact not be determined. Rather, in some embodiments data that represents the liquid level value, but that has not been rendered as a liquid level value per se, can be utilized in the processing of FIG. 23 and/or in other processing as described herein.

Additionally, processing can, of course, include performing liquid level processing or other processing based on the FDLL or other liquid level that is generated. For example, such other processing might include adjusting a dispense amount based on the observed liquid level in the beverage apparatus 300, for example. The liquid level processing can include outputting the FDLL to the user through an available communication channel. For example, the FDLL can be output to a user via an interface or GUI of the beverage apparatus. For example, the FDLL can be output to the user via a user device, such as a cell phone, which is in communication with the beverage apparatus. For example, the first data (from a first sensor) can include a value that is a liquid level of the consumable liquid. The first data can include data that represents liquid level of the consumable liquid, and the particular transform processing can include converting the first data to a liquid level of the consumable liquid, for example.

As described above, FIG. 23 is a high-level flowchart showing various details of the processing of the disclosure.

Hereinafter, additional details will be provided with reference to FIG. 24 and related figures. That is, FIGS. 24-32 provide further details of the processing depicted at a high level in FIG. 23.

Figure 24:
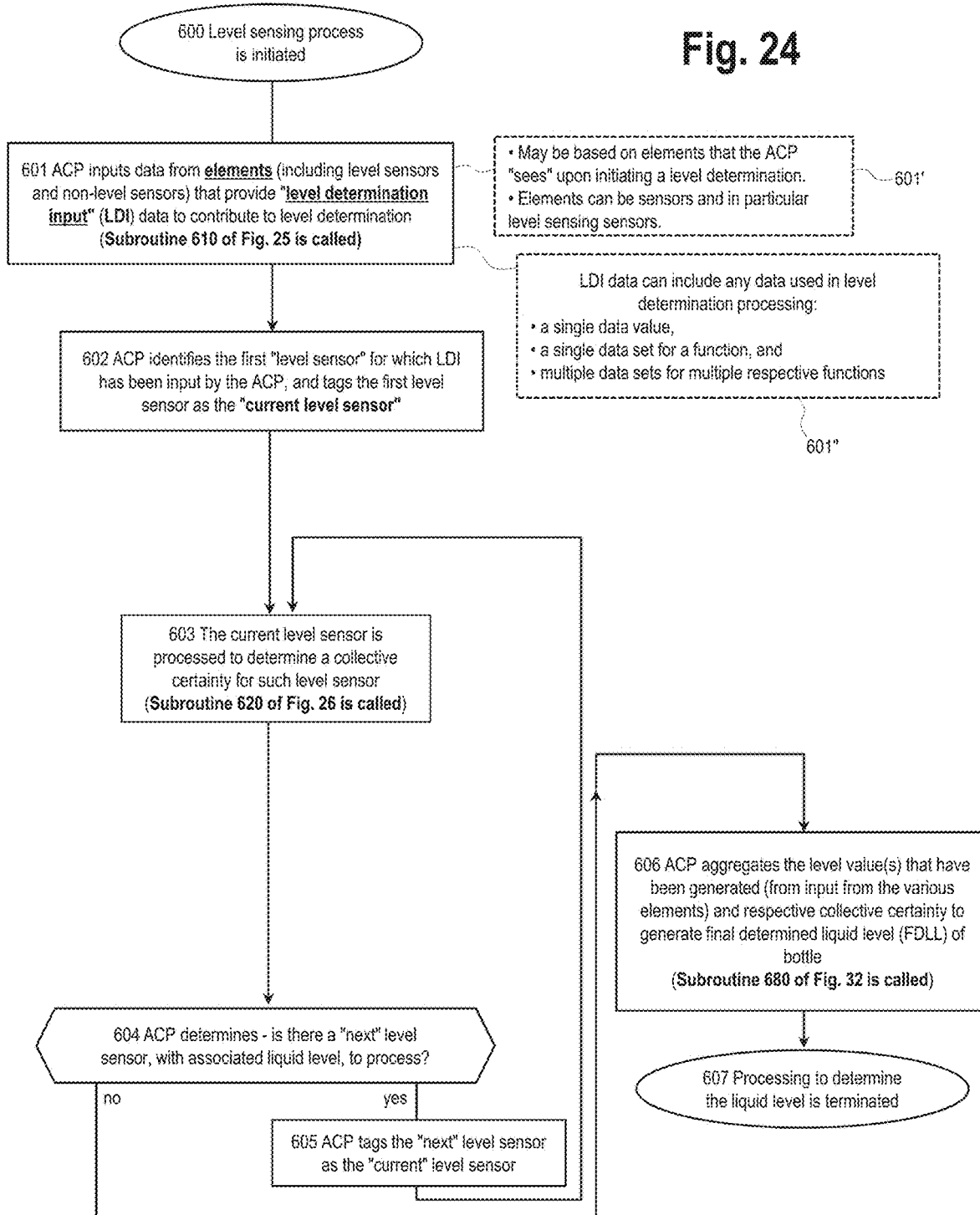
FIG. 24 is a flowchart showing level sensing processing, according to principles of the disclosure.

FIG. 24 is a flowchart showing level sensing processing. In the illustrative processing of FIG. 24, the processing starts or is initiated in step 600. After step 600, the processing passes onto step 601. In step 601, the ACP 360/processor 360 inputs data from "elements". The elements can be level sensors and non-level sensors, such as a thermometer.

Data from the elements can be described as level determination input "LDI". The level determination input can contribute to liquid level determination of the liquid in the beverage apparatus 300. As reflected at 601', the particular elements from which data is input may be based on elements that the processor "sees" upon initiating a level determination. For example, the processor can "see" a particular element if the element is turned "on" or in an "on" state and if the element is in electronic communication with the processor 360. As described above, elements can be sensors, level sensors, as well as non-level sensing sensors. The nature of data input in step 601 can vary. As reflected at 601", data sets that are input in step 601 can include a single data value, a single data set, a single data set for a function, multiple data sets, and multiple data sets for multiple respective functions, for example. In performing the processing of step 601, the ACP can "call" upon subroutine 610 of FIG. 25. Further details are described below.

After the processing of step 601, the process passes onto step 602. In step 602, the ACP identifies the first "level sensor" for which LDI has been input by the ACP. The ACP tags the first level sensor as the "current level sensor".

Then, the processing passes onto step 603.

In step 603, the current level sensor is processed to determine a collective certainty. In the processing of step 603, the ACP can call upon subroutine 620 of FIG. 26. Further details are described below with reference to FIG. 26. After step 603, the processing passes onto step 604.

In step 604, the ACP determines whether or not there is a "next" level sensor, with an associated liquid level, to process. If there are no other level sensors to process, then the processing passes from step 604 onto step 606.

In step 606, the ACP aggregates level values that have been generated from input from the various level sensors. As a result, the ACP generates a final determined liquid level (FDLL) of the bottle or beverage apparatus 300. It should be appreciated that, in step 606, if there is only one level sensor that has contributed a liquid level value, then the "aggregation" of step 606 can be taking that single liquid level value as the FDLL. In performing the processing of step 606, the ACP can call upon subroutine 680 of FIG. 32. Further details are described below.

After the processing of step 606, the processing passes onto step 607. Step 607 reflects that processing to determine the liquid level of the consumable liquid in the beverage apparatus 300 is completed. Accordingly, processing is terminated.

On the other hand with reference to FIG. 24, it may be the situation in step 604 that there is a "next" level sensor to process, i.e. another level sensor to process. Accordingly, in the situation of a yes determination in step 604, the processing passes from step 604 onto step 605. In step 605, the ACP tags the "next" level sensor as the "current" level sensor. Processing then passes from step 605 back to step 603. With a new level sensor now tagged as the "current" level sensor, processing continues as described above. That is, the current/additional level sensor can be processed in step 603 to determine a collective certainty of such level sensor.

Figure 25:
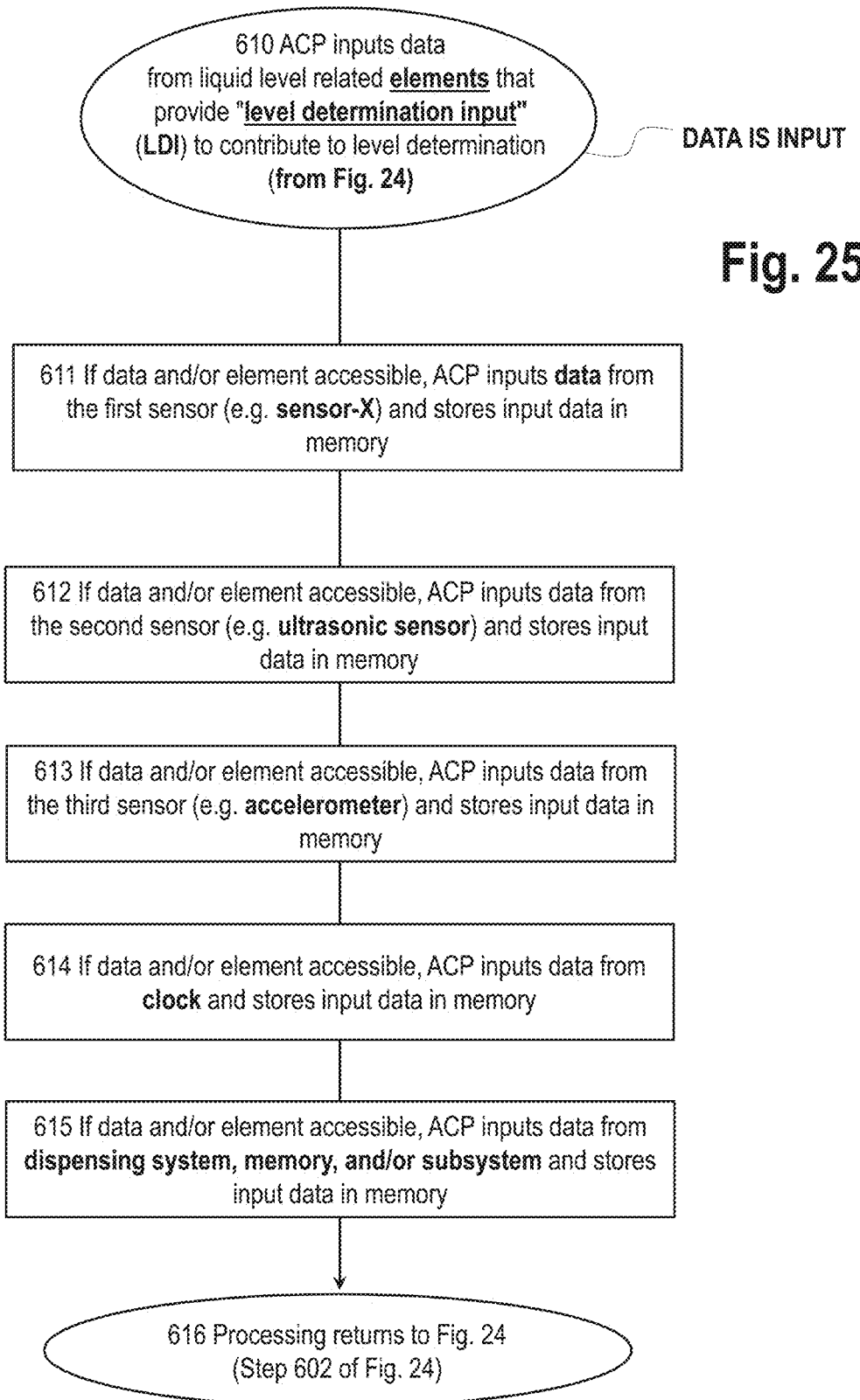
FIG. 25 is a flowchart showing in further detail the "ACP (apparatus computer processor) inputs data from elements that provide level determination input to contribute to level determination" subroutine 610, according to principles of the disclosure.

FIG. 25 is a flowchart showing in further detail the "ACP inputs data from elements that provide LDI to contribute to level determination" subroutine 610 from FIG. 24. FIG. 25 is illustrative and other processes and methodologies can be used to input data from sensors, including liquid level sensors. The processing starts in step 610 and passes onto step 611.

In step 611, the ACP 360 determines if a first element or data obtained from the first element is accessible. If accessible, the ACP can input data from the particular sensor and store the input data in a memory/database, which can be the liquid level database 373 of the database portion 370. For example, the first element can be referred to, illustratively, as sensor-X. After step 611, the processing passes onto step 612.

In step 612, the ACP determines if a second element or data obtained from the second element is accessible. If accessible, the ACP can input such data from the second element and store the input data into the database 373. For example, the second element can be an ultrasonic sensor 353 as illustrated in FIG. 22. After step 612, the processing passes onto step 613.

In step 613, the ACP determines if a third element or data obtained from the third element is accessible. If accessible, the ACP can input data from the particular element and store the input data in the database 373. For example, the third element can be an accelerometer 355, as shown in FIG. 22. After step 613, the processing passes onto step 614.

In step 614, the ACP determines if fourth data obtained from a fourth element is accessible. If such data is accessible, the ACP can input such data from the particular element. The ACP can store the input data in a memory/database, such as database 373. For example, the element of step 614 could be a clock 352 that tracks time and various time related parameters. After step 614, the processing passes onto step 615. As shown in FIG. 22, the controller 350 can also include one or more batteries or other power source 354, as illustrated in FIG. 22. For example, the battery 354 can be a rechargeable battery that can be recharged by attaching the battery 354 to an external power source. One or more batteries can power the various components of a beverage apparatus of the disclosure.

In step 615, the ACP determines if a fifth element or data obtained from such element is accessible. If such data is accessible, the ACP can input the data and store the data into memory. In particular, the processing of step 615 relates to inputting data regarding dispensing or dispensing events performed by the beverage apparatus 300. Such dispensing events can be tracked by the ACP 360 and provide an estimate of liquid level and/or data regarding liquid level that can be used in the level sensing processing of the disclosure. For example, there can be a correlation between dispensing of an additive and consumption of consumable liquid in the beverage apparatus 300. Step 615 reflects that data can be input from a dispensing system, other memory, and/or a subsystem of the beverage apparatus 300. After the processing of step 615, the process passes onto step 616. In step 616, the processing returns to FIG. 24, and specifically passes onto step 602 of FIG. 24.

Figure 26:
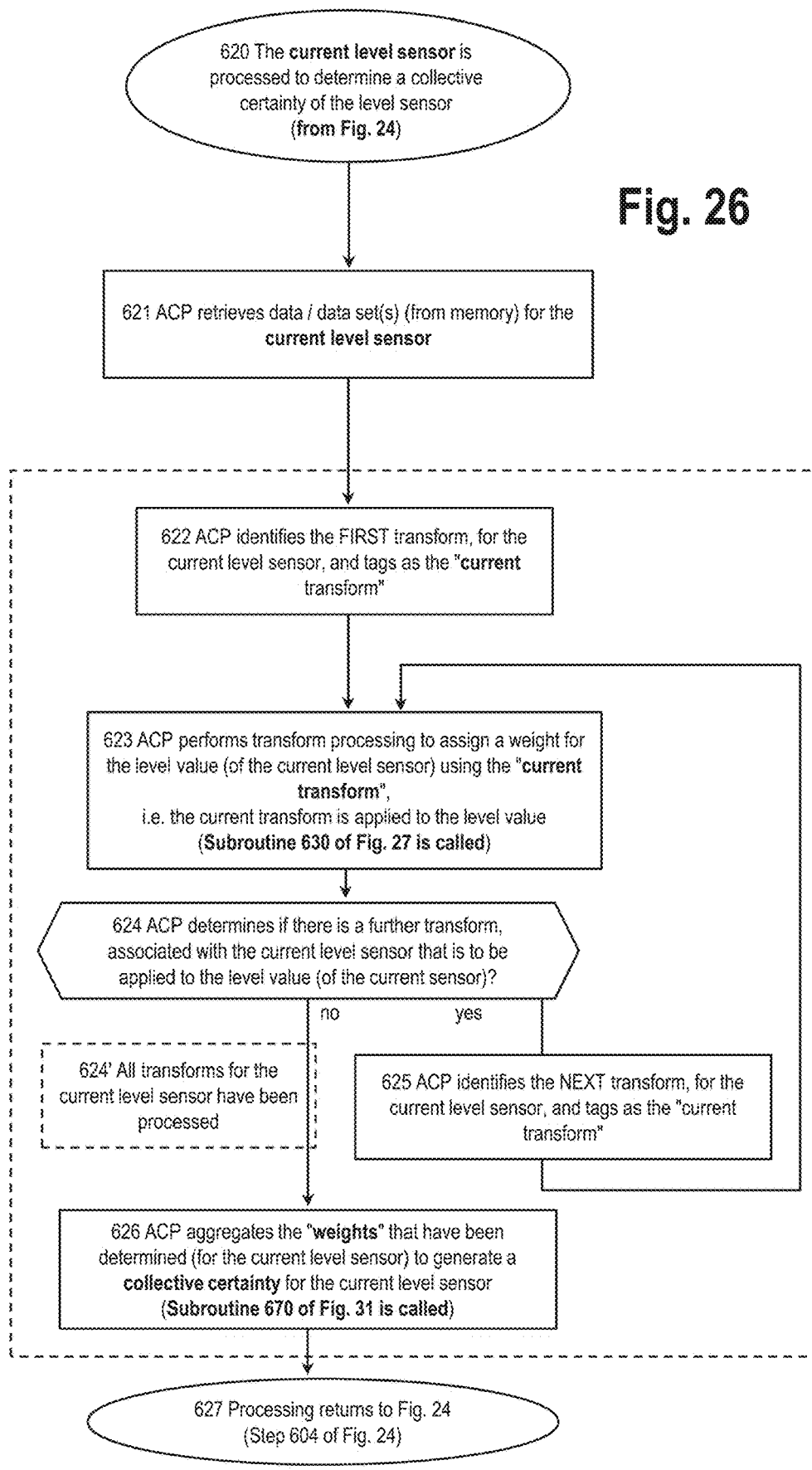
FIG. 26 is a flowchart showing in further detail the "current level sensor is processed to determine a collective certainty of the level sensor" subroutine 620, according to principles of the disclosure.

FIG. 26 is a flowchart showing in further detail the "current level sensor is processed to determine a collective certainty of the level sensor" subroutine 620 from FIG. 24. The processing starts in step 620 and passes onto step 621.

In step 621, the ACP 360 performs processing for a level sensor that can be tagged as the current level sensor. That is, as illustrated in FIG. 24 and FIG. 26, the processing can "roll" through the various level sensors in a serial manner.

Alternatively, it should be appreciated that the processing of FIG. 26 can be performed for each of the level sensors in parallel manner. Different processors and/or processing portions of the ACP 360 can be utilized. Once the data is retrieved in step 621, the process passes onto step 622.

In step 622, the ACP identifies the first transform, for the current level sensor, and tags such first transform as the "current transform". For example, the identification of the first transform that is associated with the current level sensor can be performed by associating the particular level sensor with an associated rule set, as described above with reference to step 503 of FIG. 23. After the processing of step 622, the process passes onto step 623.

In step 623, the processor 360 can perform transform processing for the liquid level value, of the current level sensor, using the current transform. That is, the ACP can apply the current transform to the liquid level value. In performing the processing of step 623, subroutine 630 of FIG. 27 can be called by the ACP 360. Further details are described below. After the processing of step 623, the process passes onto step 624.

In step 624, the ACP determines if there is a further transform (associated with the current level sensor) that is to be applied to the level value of the current sensor. For example, the processing of step 623 as described above, might include a liquid level value obtained from the ultrasonic sensor 353. A first transform might include "self weighting" of such liquid level. Then, in step 624, the ACP can determine that a further transform should additionally be applied to the liquid level value obtained from the ultrasonic sensor 353. For example, the further transform might relate to and utilize data from the liquid temperature sensor 305 or from the accelerometer 355. In such a situation with a further transform, a "yes" determination is determined in step 624. Accordingly, the processing passes from step 624 onto step 625. In step 625, the ACP identifies the next transform, for the current level sensor, and tags such next transform as the "current transform". The processing then loops back to step 623 with a new "current transform" provided in queue for processing in step 623.

At a point, all the transforms for "transform processing" associated with a particular level sensor will be processed (in the processing of FIG. 26), as referenced at 624' of FIG. 26. In other words, the transform processing for the particular level sensor will be concluded. Accordingly, the determination of the processing of step 624 will render a no determination. Accordingly, the processing will pass from step 624 onto step 626.

In step 626, the ACP aggregates the weight or weight values that have been determined for the current level sensor, according to at least one embodiment of the disclosure. The weight values can be aggregated so as to generate a collective certainty for the current level sensor. In performing such processing, subroutine 670 of FIG. 31 can be called or invoked by the ACP 360. After step 626 of FIG. 26, the processing passes onto step 627. In step 627, the processing can return to FIG. 24. Specifically, the processing passes to step 604 of FIG. 24. Processing then continues as described above.

Figure 27:
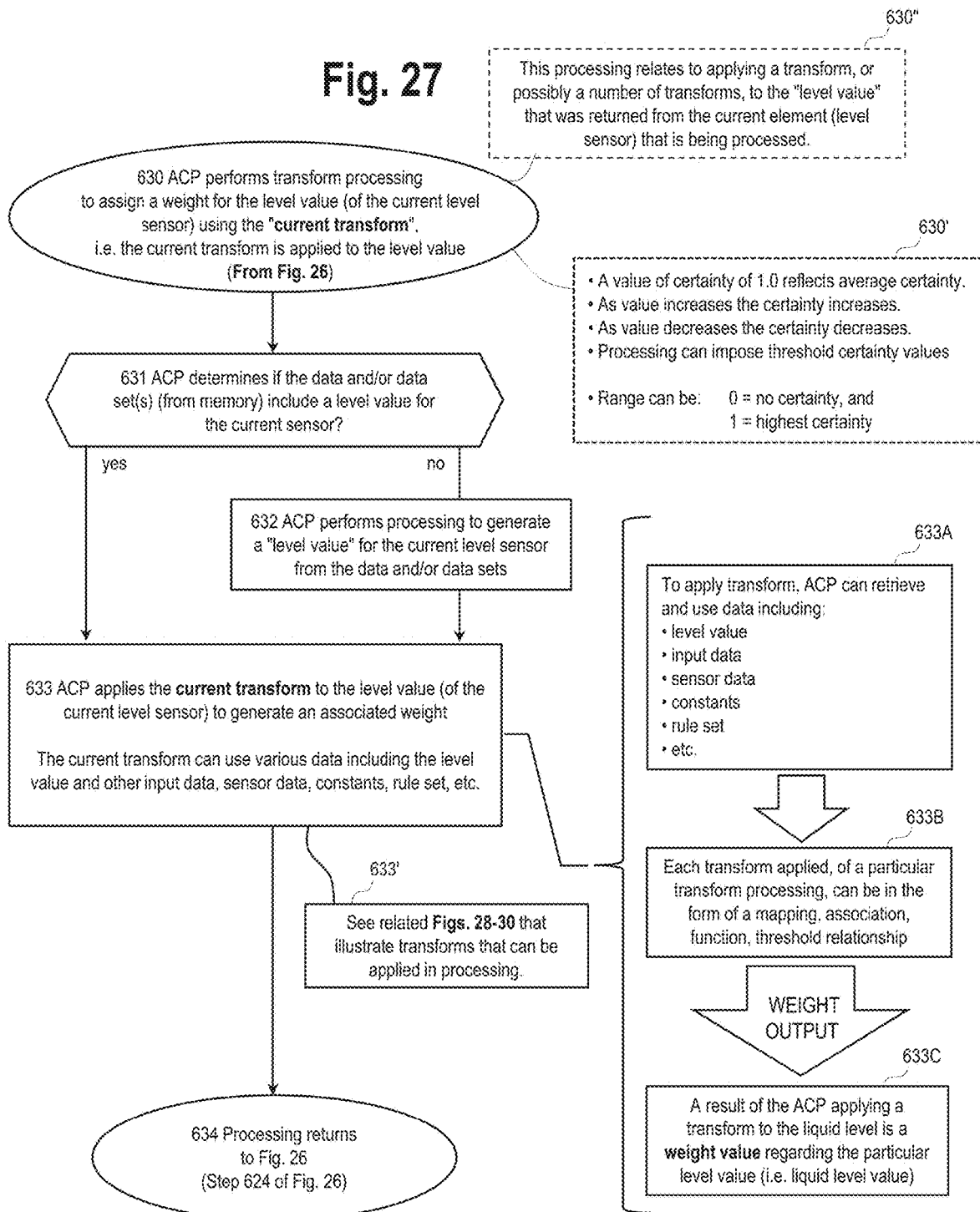
FIG. 27 is a flowchart showing transform processing of subroutine 630 as called from FIG. 26, according to principles of the disclosure.

FIG. 27 is a flowchart showing transform processing of subroutine 630 as called from FIG. 26, according to principles of the disclosure. In such processing, the ACP 360 performs transform processing for the level value, of the current level sensor, using the current transform. That is, the processing applies the current transform to the level value of the current level sensor. This processing provides applying a transform, or possibly a number of transforms, to the level value that was returned or input from the current element, as reflected at 630" of FIG. 27.

Tag 630' of FIG. 27 reflects further aspects of liquid level determination processing of the disclosure. In accord with one or more embodiments of the disclosure, the processing can include or utilize certain crossover values, thresholds, certainty architecture or schemes, as well as other mechanisms so as to advantageously utilize input data regarding level sensing. Such can further provide for accurately performing liquid level determination by the beverage apparatus 300. As illustratively shown at 630', a value of certainty of 1.0 can be utilized so as to reflect an average certainty, in accordance with at least some embodiments of the disclosure. To explain, using such threshold, the certainties between the various elements (that can include level sensors and other devices) can be orchestrated.

For example, the ultrasonic sensor 353 might be deemed to have an average certainty of level sensing at a liquid level of 50%. Accordingly, if the ultrasonic sensor 353 observes a liquid level value indicating 50% full, then that level value can be assigned a certainty of 1.0. It may be observed that as the fluid level increases beyond 50%, then certainty decreases for a particular range of values. Accordingly, if the ultrasonic sensor renders a level value indicating 60%, then such level value can be assigned a certainty of 0.9. Further, it may be observed that as the fluid level decreases under 50% full, then certainty increases for a particular range of values. Accordingly, for example, if the ultrasonic sensor renders or observes a level value indicating 40%, then such level value can be assigned a certainty of 1.1. Such rendering of certainties associated with a particular observed level value can be provided by a transform as described herein, including the "self weighting" described at tag 504' of FIG. 23.

The processing of FIG. 27 starts in step 630 and passes onto step 631. In step 631, the ACP determines if the data and/or data sets, retrieved from memory for the current sensor, include a level value. The processing of step 631 reflects two possible scenarios of (a) an actual liquid level value has been provided to the ACP 360 by the current sensor, or (b) data has been provided from the current sensor from which the ACP 360 can determine a liquid level value. If a determination of no is rendered in step 631, the processing then passes onto step 632. In step 632, the ACP performs processing to generate a "level value" for the current level sensor from the data or data sets. Then, the processing passes onto step 633.

On the other hand, the determination in step 631 may render a yes determination. In other words, a yes determination in step 631 reflects that the current sensor did indeed return a level value that can be utilized by the ACP 360 (and the processing of step 632 to determine a liquid value is not needed). Accordingly, if a yes determination is rendered in step 631, then the processing can pass directly to step 633. In step 633, the ACP 360 can apply the "current transform" to the level value (of the current level sensor) to generate a certainty value for such level value. The transform, i.e. the "current" transform, can use various data including the level value, as well as other input data, sensor data, constants, rule sets, variables, thresholds, ranges, etc. As reflected at 633' in FIG. 27, FIGS. 28-30 illustrate transforms that might be applied in the processing of step 633.

In accordance with at least some embodiments of the disclosure, FIG. 27 illustrates further aspects of step 633 in the form of processing steps 633A, 633B, 633C. Step 633A shows that an application of a particular transform to data (including a liquid level) from an element can utilize various types of data. Once data has been retrieved that is needed to apply a particular transform in step 633A, the processing passes onto step 633B.

In step 633B, the transform is applied. The transform can be in the form of a mapping, association, function, relationship, threshold, or other mechanism, for example. Further details are described below with reference to FIGS. 28-30. Then, as reflected at 633C, the weight generated from the transform is output. That is, a result of the processor applying a transform to the data (in step 633A) is a weight value that is associated with a particular liquid level value. Such liquid level value/certainty value pair can then be compared with other liquid level value/certainty pairs. From such processing, an accurate assessment of liquid level can be determined for the particular sensor. For example, liquid level determinations that possess a high certainty can be heavily weighed. Liquid level determinations that possess low certainty can be lightly weighed, or indeed discounted altogether.

With further reference to the processing of step 633 of FIG. 27, after step 633, the process passes to step 634. In step 634, the processing returns to FIG. 26, and specifically passes onto step 624 of FIG. 26.

Figure 28:
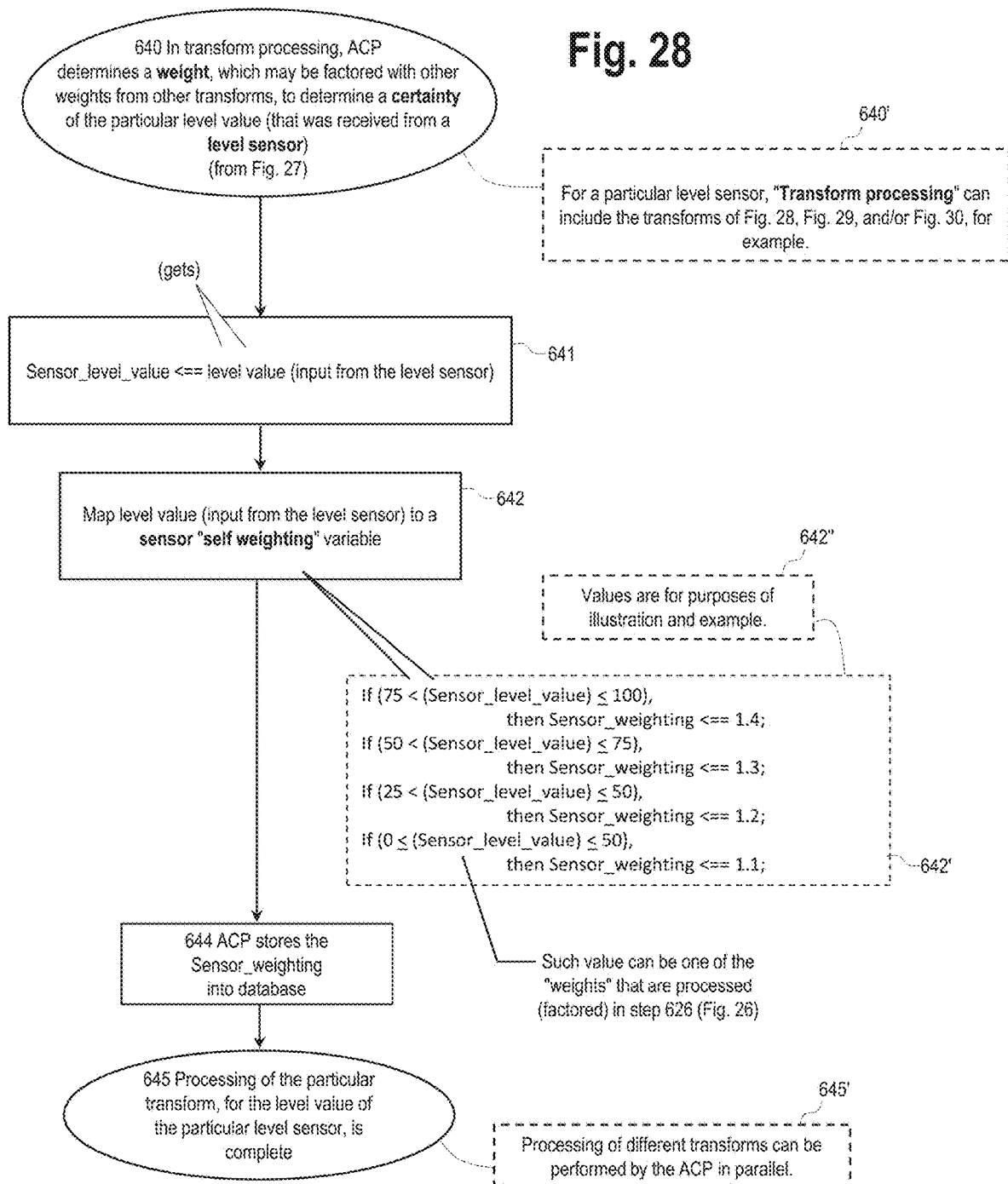
FIG. 28 is a flowchart showing transform processing of subroutine 640 that can be performed in the processing of step 633 of FIG. 27, according to principles of the disclosure.

FIG. 28 is a flowchart showing transform processing of a subroutine 640 that can be performed in the processing of step 633 of FIG. 27, according to principles of the disclosure. As reflected at subroutine 640, in the transform of FIG. 28, the ACP determines a weight, which may be factored with other weights from other transforms, to determine a certainty of the particular level value, which was received from a level sensor. As reflected at 640', for a particular level sensor, "transform processing" can include the transforms of FIG. 28, FIG. 29, and/or FIG. 30, for example.

The illustrative processing of FIG. 28 starts in step 640 and passes onto step 641. In step 641, a variable Sensor_level_value can be utilized. Such variable Sensor_level_value can be assigned or "gets" the level value that was input from the particular level sensor being processed. After the processing of step 641, the process passes onto step 642. In step 642 in this example transform, the ACP 360 "maps" the level value, input from the level sensor, to a Sensor_self_weighting variable. Specific details are provided at 642' in FIG. 28. As reflected at 642", values provided are for purposes of illustration example and may well be varied depending on attributes of the particular element/sensor, beverage apparatus and other variables.

In the example of step 642, if the Sensor_level_value is between the values of 75% and 100%, then the Sensor_self_weighting is assigned or gets a weighting of 1.4. For example, the liquid level in the beverage apparatus 300 might be 95% full—so as to result in a Sensor_self_weighting of 1.4. Such reflects a relatively high certainty that the level value is indeed accurate. On the other hand, the processing of step 642 reflects that if the Sensor_level_value is between the values of zero and 50%, then the Sensor_self_weighting is assigned or gets a weighting of 1.1. In a weighting scheme as reflected at 630' of FIG. 27, such liquid level still provides a better than average certainty. However, the relationships of 642' in FIG. 28 reflects that the particular sensor decreases in certainty of level sensing as liquid level diminishes from 100% to 0%. In accord with at least one embodiment, the ranges demarcated at 642' can be expressed as percentages that the beverage apparatus or bottle is full. However, it should of course be appreciated that the manner of expressing ranges, the particular units utilized in the processing, and the particular manner in which quantities are compared can be varied, as can be true with other processing described herein. Further, it should be appreciated that the example of 642' is simplistic in nature for purposes of illustration. Rather than four ranges as illustrated, many more ranges can be utilized so as to accurately track or map an observed liquid level value into or to an associated certainty. Additionally, the processing of the disclosure is not limited to the use of ranges as shown at 642'. Other relationships can be utilized such as functions—as described further below.

After the processing of step 642 of FIG. 28, the process passes onto step 644. In step 644, the ACP 360 stores the Sensor_self_weighting value, which has been determined, into a suitable database.

Then the process passes to step 645. In step 645, processing of the particular transform, for the level value of the particular level sensor, is complete. As described at 645', processing of different transforms can be performed by the ACP in parallel.

Figure 29:
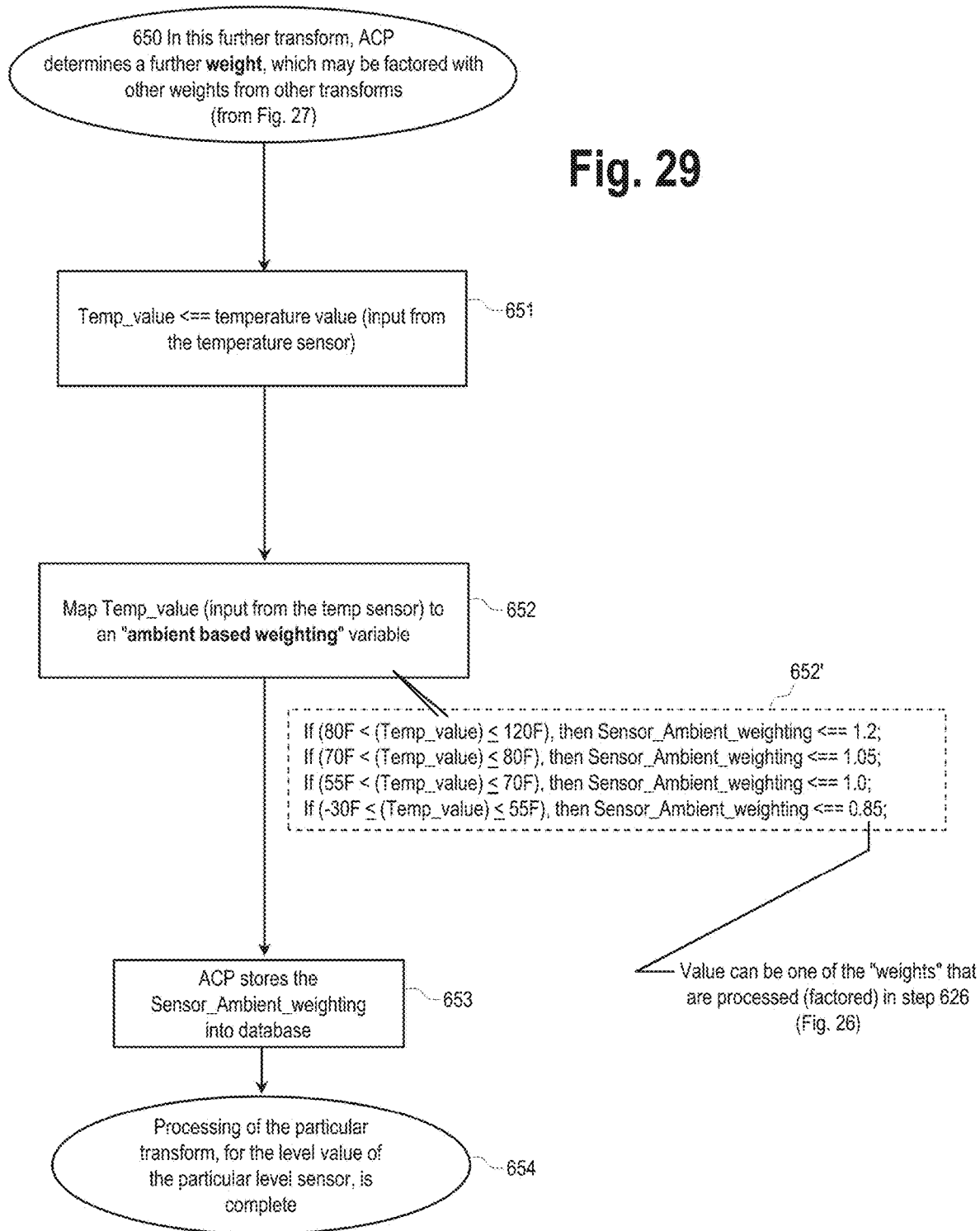
FIG. 29 is a flowchart showing further illustrative transform processing of a subroutine 650 that can be performed in the processing of step 633 of FIG. 27, according to principles of the disclosure.

FIG. 29 is a flowchart showing further illustrative transform processing of a subroutine 650 that can be performed in the processing of step 633 of FIG. 27. As reflected at step 650, in processing of the further transform of FIG. 29, the ACP can determine a further weight. The further weight may be factored with other weights from other transforms.

The transform illustrated in FIG. 29 relates to utilizing temperature (applying a relationship) to associate a certainty with an input liquid level value. As used herein, liquid level value and level value can be used interchangeably unless the particular context dictates differently.

The illustrative processing of FIG. 29 starts in step 650 and passes onto step 651. In step 651, a variable named Temp_value can be utilized. Such variable Temp_value can be assigned or "gets" a temperature value that was input from a temperature sensor, for example. The temperature sensor might be the liquid temperature sensor 305 illustrated in FIG. 22.

After the processing of step 651 of FIG. 29, the process passes onto step 652. In step 652, the ACP 360 "maps" the temperature value, which was input from the temperature sensor, to a Sensor_ambient_weighting variable. Specific details are provided at 652' in FIG. 29. In the example of step 652, if the temperature value is between 80° F. and 120° F. then the Sensor_ambient_weighting is assigned or gets a value of 1.2. On the other hand, if the Temp_value is between 55° F. and 70° F., then the Sensor_ambient_weighting gets or is assigned a value of 1.0. Such reflects a situation that—as the temperature is increased from 55° F. to 120° F., accuracy of the particular level sensor (for example the ultrasonic sensor 353) increases. On the other hand, as demonstrated by the relationships of step 652 (652'), as the temperature drops below 55°, the weighting is decreased. Such reflects that certainty of the input liquid level value is decreased as the temperature drops.

After the processing of step 652, the process passes onto step 653. In step 653, the ACP stores the determined weighting value into the database. Such stored weighting value can then be later used in the processing of subroutine 670 of FIG. 31. Step 654 of FIG. 29 reflects that processing of the particular transform, for the level value of the particular level sensor, is complete.

Figure 30:
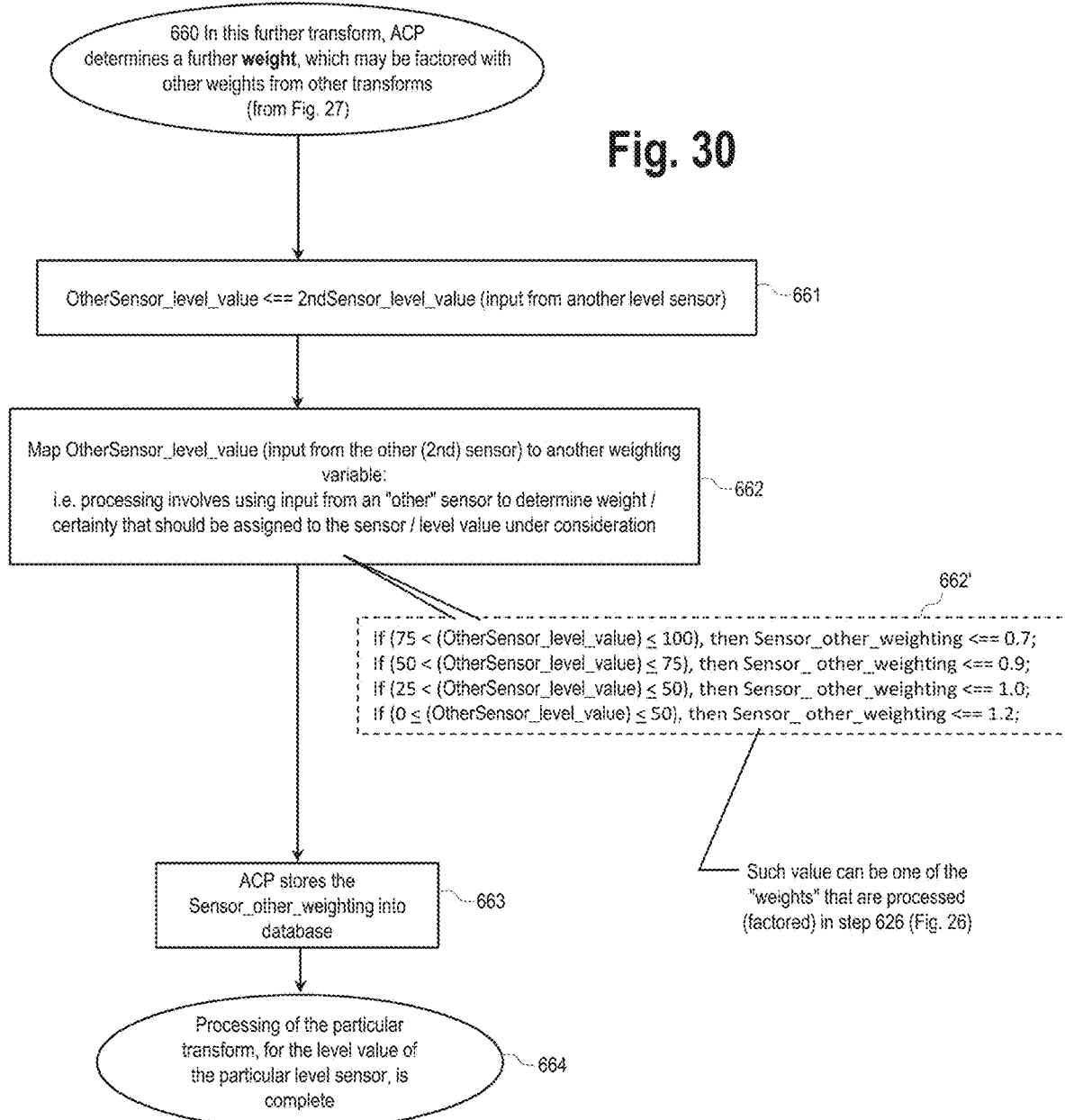
FIG. 30 is a flowchart showing processing of a further transform as performed in a subroutine 660, according to principles of the disclosure.

FIG. 30 is a flowchart showing processing of a further transform as performed in a subroutine 660. The illustrative processing of FIG. 30 starts in step 660 and passes onto step 661. In step 661, a variable named OtherSensor_level_value can be utilized. Such variable OtherSensor_level_value can be assigned or "gets" a data value (2ndSensor_level_value) that was input from another level sensor, i.e. a second level sensor. The second level sensor might be a pressure cell sensor that measures liquid level in the bottle, for example.

After the processing of step 661 of FIG. 29, the process passes onto step 662. In step 662, the ACP 360 "maps" the OtherSensor_level_value, which was input from the other sensor, to a Sensor_other_weighting variable. Specific details are provided at 662' in FIG. 30. In the example of step 662, if the OtherSensor_level_value is between 75% and 100% full, then the ACP assigns a weighting of 0.7. For example, if the OtherSensor_level_value is between zero and 50%, then the ACP 360 assigns a weighting of 1.2.

The processing of FIG. 30 reflects a dynamic that accuracy of a first level sensor can be ascertained based on a liquid level that is determined by a second level sensor. In the transform shown at 662', the liquid level value (obtained from the first level sensor) is assigned a weight or certainty based on the liquid level value that is obtained from the second sensor. For example, the transform 662' may be based on observation that—as the liquid level observed by the second sensor goes down, accuracy of liquid level observed by the first sensor goes up. Accordingly, the processing of the disclosure allows for a relationship between two liquid level sensors to be used, i.e. for such relationship to be leveraged to improve overall accuracy of liquid level determination. It should be appreciated that the processing of FIG. 30, in and of itself, thus may not address accuracy of the liquid level determination of the second sensor. Rather, the processing can use or leverage liquid level determined by the second sensor to determine accuracy of the first sensor. Accordingly, the processing of FIG. 30 can provide a dynamic where the second level sensor knows, or can provide data regarding, the accuracy of the first sensor. For example, the second level sensor might be highly accurate at a 90% liquid level, whereas the first level sensor may be known to be very inaccurate at the 10% liquid level. Accordingly, an appropriate weighting can be assigned. For example, rather than the weighting of 1.2 (when the second sensor detects 0 to 50 liquid level), in the transform 662', the weighting might be decreased to 0.3. Such decreased weighting will then result in the liquid level, which was observed by the first sensor, being substantially minimized or discounted. In an extreme situation, a reading of a second sensor can be used to fully disregard a liquid level value from a first sensor. Accordingly, the described processing bodes for better accuracy in the overall level determination processing.

With further reference to the processing of FIG. 30, after the processing of step 662, the process passes onto step 663. In step 663, the ACP stores the determined weighting value into the database. Then, Step 664 of FIG. 29 reflects that processing of the particular transform, for the level value of the particular level sensor, is complete.

It should be appreciated that the processing of FIGS. 28-30 can be applied to a single liquid level value that was input from a particular sensor, such as the ultrasonic sensor 353. As a result of the processing of step 604 in FIG. 24, the processing can advance to perform transform processing for additional liquid level sensors, which are each associated with a respective liquid level value.

It should be appreciated that greater weight can be provided to a liquid level value, input from a liquid level sensor, as certainty of the liquid level value increases. In other words, how sure is it that the liquid level sensor is providing an accurate liquid level value. The mapping of a liquid level value into a weighting can be performed by the various transforms as described above. It may be the situation that all of the input liquid level values are close to the same value. In such scenario, the weighting of the different liquid level values can be less critical, i.e. in that the final determined liquid level (FDLL) will also be close (in value) to the same value.

Figure 31:
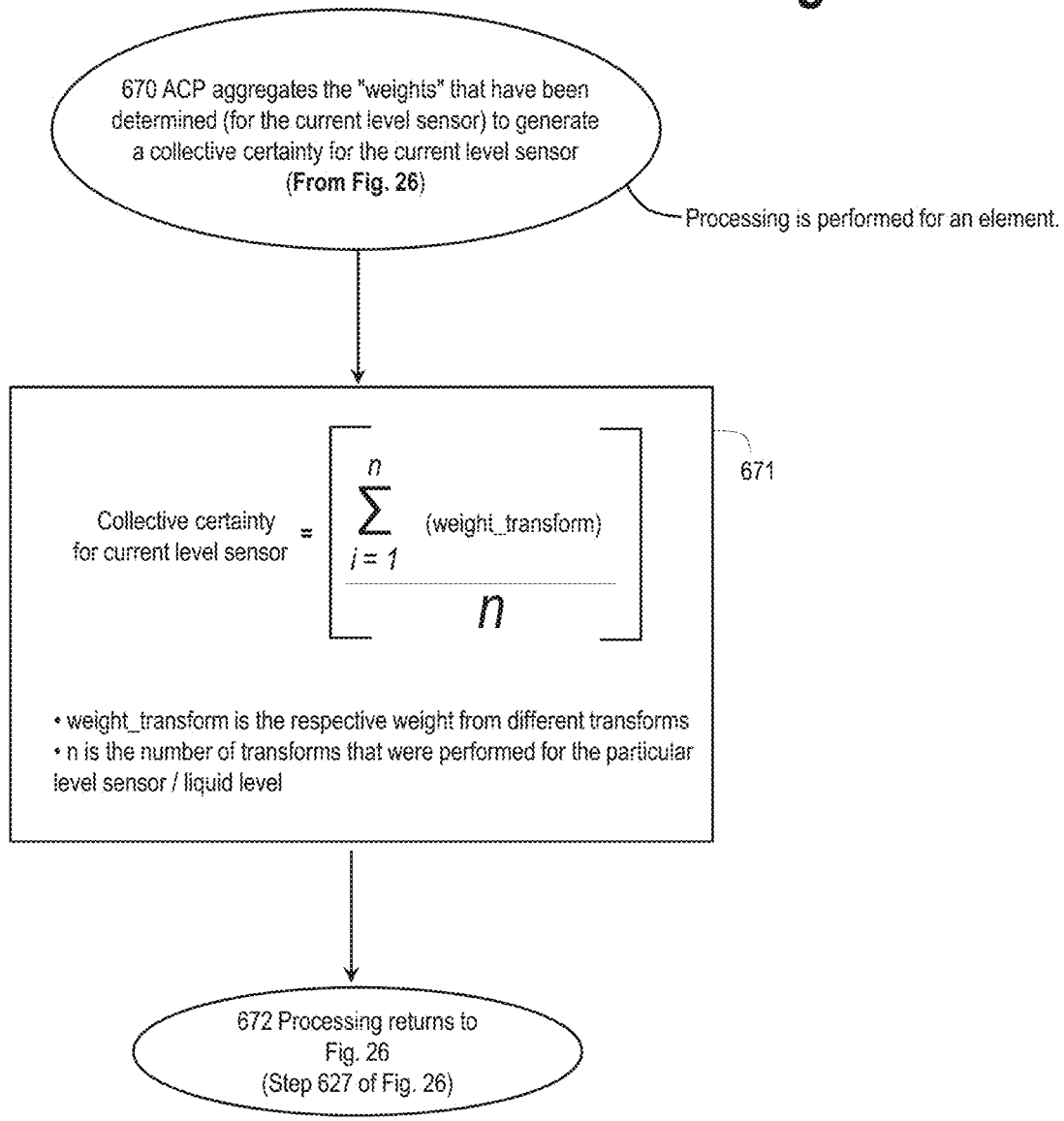
FIG. 31 is a flowchart showing in further detail the ACP aggregates weights that have been determined, for the current level sensor, to generate a collective certainty for the current level sensor, according to principles of the disclosure.

FIG. 31 is a flowchart showing in further detail the ACP aggregates weights that have been determined, for the current level sensor, to generate a collective certainty for the current level sensor. Such step 670 is a subroutine that can be called upon from the processing of step 626 of FIG. 26. In FIG. 31, processing starts in step 670 and passes onto step 671.

In step 671, a variable or parameter "weight_transform" is aggregated or summed. In this embodiment, such parameter is populated by the various weights (determined in steps 644, 653, 663 of FIGS. 28-30) from each of the transforms associated with the particular level sensor. Accordingly, the processing of FIG. 31 can include aggregating the various, respective weights that were generated from each of the transforms associated with a first level sensor, so as to assess a liquid level value that was received from such first level sensor.

In the processing of FIG. 31, the summation of the various weights, from each transform, is then divided by the total number of transforms for the particular liquid level sensor. Such total number of transforms is described in the relationship as "n". Accordingly, in this example, the processing can be described as generating an average of the weights associated with a particular liquid level sensor. It should be appreciated that other mechanisms could be utilized. For example, a median value of the weights associated with the liquid level sensor could be utilized. If three transforms are used for a level sensor, such as shown in FIGS. 28-30), then n can be 3.

After the processing of step 671, the processing passes onto step 672. In step 672, the processing returns to FIG. 26 (step 627). Processing can then continue as described above. The processing of FIG. 31 can be performed for each of the elements or level sensors under consideration—so as to determine a collective certainty of each of such level sensors.

Figure 32:
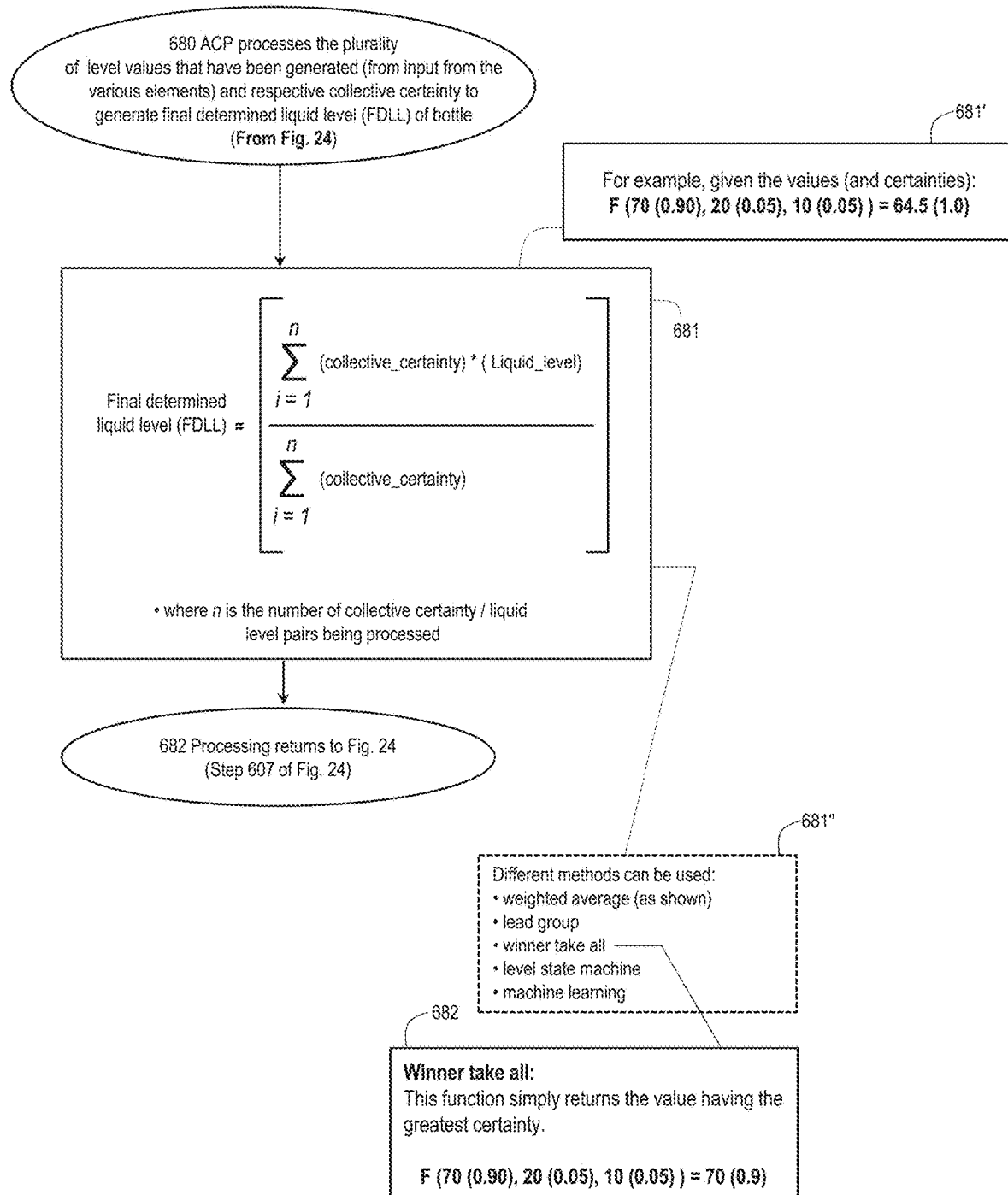
FIG. 32 is a flowchart showing in further detail the ACP 360 processes a plurality of level values that have been generated, from input from the various elements, and respective collective certainty of each element, according to principles of the disclosure.

FIG. 32 is a flowchart showing in further detail the ACP 360 processes the plurality of level values that have been generated, from input from the various elements, and respective collective certainty of each element. Such processing results in generation of a final determined liquid level for the beverage apparatus or bottle. Such step 680 is the subroutine that can be called upon from the processing of FIG. 24. The processing of FIG. 32 can use the values that were generated in the processing of FIG. 31. Processing of FIG. 32 starts in step 680 and passes onto step 681.

Step 681 can include a function or relationship. In step 681, as a numerator in the relationship, a collective certainty (from step 671 of FIG. 31) for each of the liquid levels can be multiplied by the corresponding liquid level value itself—and the resulting product summed over each of the certainty/liquid level pairs that are available. As a denominator in the relationship, the collective certainties for each of the certainty/liquid level pairs can be summed for each of the certainty/liquid level pairs that are available. Then, dividing the numerator by the denominator results in a final determined liquid level (FDLL). In the relationship of step 681, "n" is the number of collective certainty/liquid level pairs input from elements, in accordance with at least one embodiment of the disclosure.

Accordingly, the processing of step 681 reflects a weighted average of the collective certainties/liquid level pairs so as to determine final determined liquid level. The tag 681' reflects illustrative liquid level value/certainty pairs.

The processing of the disclosure is not limited to the particulars of step 681 of FIG. 32. Other techniques or approaches to determining a weighted average of the collective certainties/liquid level pairs can be used. Other techniques or approaches to weighting or favoring one certainty/liquid level pair over another can be used.

That is, as reflected at tag 681", different methods can be utilized in the ACP in determining a final liquid level from the certainties and liquid level pairs. A weighted average methodology can be utilized as shown in FIG. 32.

Additionally, a lead group methodology can be utilized.

With regard to a lead group methodology, it should be appreciated that in any given moment, there are some inputs with high certainty values and others with lower certainty values. Additionally, some of these inputs may indeed be overstating their certainty. A certainty threshold can be introduced by the processing performed by the ACP. The introduction of a certainty threshold can allow segregation of values into two groups. Such two groups might be described as a good group and a bad group. The good group can include liquid level values whose certainty value, i.e. whose collective certainty value, did indeed satisfy the threshold. The good group can be segregated from the bad group. Then, the processing can include calculating a weighted average on the good group, for example.

Another methodology that can be utilized in the processing of step 681 (in lieu of the weighted average approach shown) can be a "winner take all" approach, as reflected at 681'" of FIG. 32. In this methodology, a function can be utilized that simply returns the liquid level value having the greatest certainty. For example, as shown at 682, such approach can be illustrated as:

F (70 (0.90), 20 (0.05), 10 (0.05))=70 (0.90)

With further reference to FIG. 32, after the processing of step 681, the process passes onto step 682. In step 682, processing returns to FIG. 24 (step 607). Accordingly, the processing is terminated as the final determined liquid level (FDLL) has indeed been generated. It should be appreciated that various other processing can be continued, such as dispensing processing.

Figure 33:
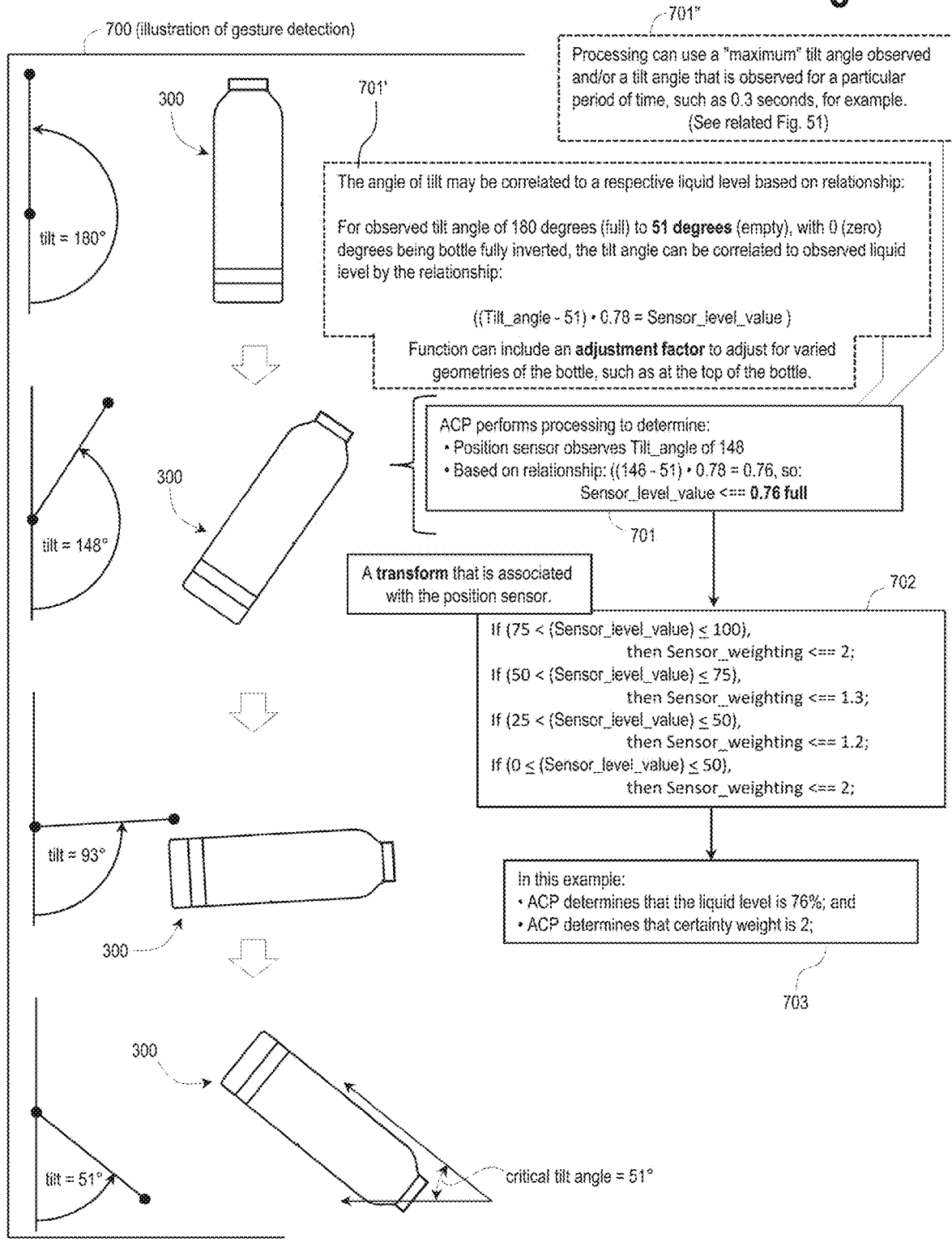
FIG. 33 is a diagram showing additional methodology and additional features to determine a liquid level in a beverage apparatus, according to principles of the disclosure.

FIG. 33 is a diagram showing additional methodology and additional features to determine a liquid level in a bottle/beverage apparatus. The methodology of FIG. 33 might be described as level determination based on angle or "gesture detection". With regard to such processing, drinking a beverage can involve fairly well defined gestures.

Accordingly, a progression from full to empty can be defined in terms of a series of gestures. In particular, such gestures can be "tilts" of the beverage apparatus, i.e. bottle,

300. In a situation that the bottle is full, an initial tilt of the bottle (for a first drink by a user) can be relatively well defined. As the user consumes more and more of the beverage, the tilt angle can be observed to increase over time. At the conclusion of a user consuming a beverage in the beverage apparatus or bottle 300, the tilt angle can be observed to be at its highest. What might be described as a "vessel tilt theorem" can be utilized. Such theorem provides for—given a radially symmetric water vessel—the angle of tilt required to empty all of the water is equal to angle of the steepest wall relative to a central axis of the bottle or beverage apparatus 300. Such angle can be described as the "critical tilt angle". In other words, at the "critical tilt angle", the bottle will be angled such that the last remaining liquid will flow out of the bottle, i.e. since the steepest angle in the interior of the bottle will then be oriented substantially horizontally.

FIG. 33 shows an implementation of such gesture detection or tilt methodology. In the processing of FIG. 33, the angle of tilt is correlated with a respective liquid level. Based on such correlation, a liquid level can be estimated based on the angle of tilt. It can be the case that the certainty of such processing is highest at the low end due to the relative certainty imposed by the vessel tilt theorem. Certainty can also be high at the top, i.e. full, end of the range.

Figure 49:
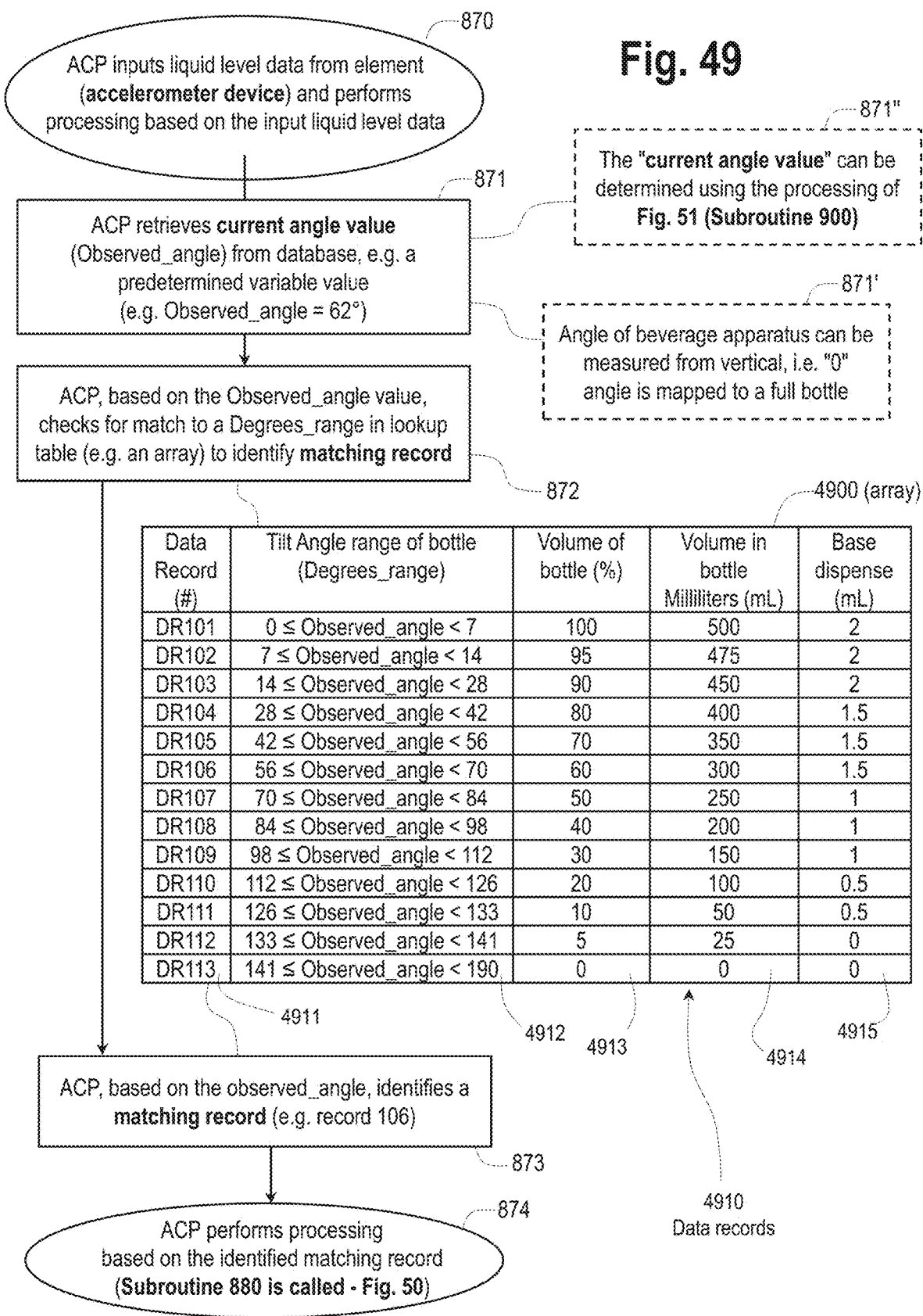
FIG. 49 is a flow chart showing processing details of "ACP inputs liquid level data from element and performs processing based on the input liquid level data" according to principles of the disclosure.

Such can be due to the fact that a user might be relatively consistent with tilting her bottle when taking the first initial sips from a fully "full" bottle. Relatedly, a tally of tilt events can be maintained for a particular user and bottle. In some situations, with some users, it can be the case that a number of sips per bottle/beverage apparatus is a fairly precise value. Additionally, it can be the case that the number of sips per bottle/beverage apparatus can be a fairly precise value amongst users with similar attributes. Further, the progression of tilt angle and depletion of the bottle may advance in a relatively consistent manner—or at least consistent enough to yield useful information in the processing performed by the bottle. FIG. 49 described below describes related processing.

With further reference to FIG. 33, such figure thus illustrates processing that can be performed for an additional sensor, i.e. an angle sensor or accelerometer. As shown at 702 of FIG. 33, the processing can including a transform that assesses certainty of a liquid level value of such additional sensor. Accordingly, the processing of step 702 of FIG. 33 is akin, in some ways, to aspects of the respective processing of each of FIGS. 28-30 described above. The processing of such figures can also include and use respective transforms as described.

Relatedly, it should be appreciated that upon a liquid level being determined as illustrated in FIG. 33—such determined liquid level can then be processed using the methodology of FIG. 24, FIG. 26 and FIG. 27. Such can include the angle sensor being associated with a transform, i.e. step 702 of FIG. 33.

FIG. 33 shows example tilt angles of bottle 300. The example tilt angles shown include 180°, 148°, 93°, 51°. For the particular bottle illustrated in FIG. 33, the 51° value corresponds to the physical "critical tilt angle" of the particular bottle. As shown in step 701, the processing to determine a liquid level of the bottle 300 can include determining the particular tilt angle by a suitable position or angle sensor 356, such as an accelerometer. In one example, the position sensor 356 can observe a tilt angle of 148°.

In the arrangement of FIG. 33, an observed tilt angle of 180° corresponds to a full bottle. In other words, at 180°, the bottle is fully upright, as it would be in a fully full state. On the other hand, position at the critical tilt angle of 51° can reflect a fully empty or depleted bottle. Accordingly, an operational range of depleting a bottle from "full to empty" includes the bottle being progressively positioned between 180° and 51°. Thus, in accordance with one methodology, a travel or tilt angle range of the bottle can be determined by subtracting off the critical tilt angle from 180°, i.e. subtracting 51° from the 180° value. Such results in a total tilt angle range of 129° when the bottle is drunk down from full to empty.

As reflected at 701' of FIG. 33, an observed tilt angle can be correlated to liquid level of liquid in the bottle. Such correlation can include multiplying the observed tilt angle by an "adjustment ratio".

Such adjustment ratio can be provided, in this example, based on a total tilt angle range (from full to empty) of the bottle, i.e. (180−51=129). Such range of tilt can be correlated to a percentage range of liquid in the bottle, i.e. (100% to 0%, or 100) percentage points to traverse full to empty (in conjunction with the bottle traversing the 129°).

Thus, factor analysis can be applied to render that each one (1) degree tilt of the bottle will, in theory, provide a 0.78% depletion of liquid from the bottle, i.e. (100/129=0.78).

Thus, illustratively, at a middle point in the tilt of the bottle (drunk from full to empty) the angle of position of the bottle is 115.5°. Such angle can then be correlated into a liquid level, of the bottle, by the relationship ((115.5−51)·adjustment_factor)→(64.5·0.78)=50, or in other words 50% full.

Accordingly, such relationship can be applied in the processing of step 701 of FIG. 33. In step 701, as shown, an observed angle of 148° can be correlated to a liquid level of 76% full. Thus, such 76% or 0.76 full liquid level can be rendered in the processing of step 701.

After the processing of step 701, the process passes onto the transform of step 702. In step 702, the determined liquid level can be mapped or tracked into a weighting or weight value. Thus, the value of 76% full can be tracked into a weighting of "two". Thus, as reflected at 703, the ACP determines that the liquid level is 76%—and that the weight to be accorded to such liquid level is a weight of 2, i.e. thus reflecting a relatively high certainty.

The transform of step 702 (FIG. 33) includes four ranges that are utilized to map or associate a particular level value (from a sensor) to a particular weight. Other transforms can be utilized that provide more complex relationships between liquid level value and weight, i.e. certainty, values. For example, many more ranges can be utilized as compared to those set forth in the illustrative step 702. Further, for example, any of a wide variety of functional relationships can be utilized so as to associate a particular level value with a corresponding weight. Relationships can be utilized, as may be desired or required, based on the particular sensor and the various related data. Such various related data can be used to assess the weight/certainty of such liquid level value.

It should be appreciated that the methodology described above can be adjusted based on the particular internal geometry of the bottle. For example, if the bottle is narrow at the top and/or bulbous in the middle, then appropriate adjustment factors or relationships can be utilized so as to adjust for such geometry over the extent of the tilt range from full to empty. The adjustment factors or relationships can be represented in the form of a lookup table, or in the form of a function, that maps a particular angle of tilt to a corresponding liquid level or liquid volume.

According to principles of the disclosure as reflected at tag 701" of FIG. 33, processing as performed by the ACP can use a "maximum" tilt angle observed and/or a tilt angle that is observed for a particular period of time, such as 0.3 seconds, for example. Further details are described below.

Figure 34:
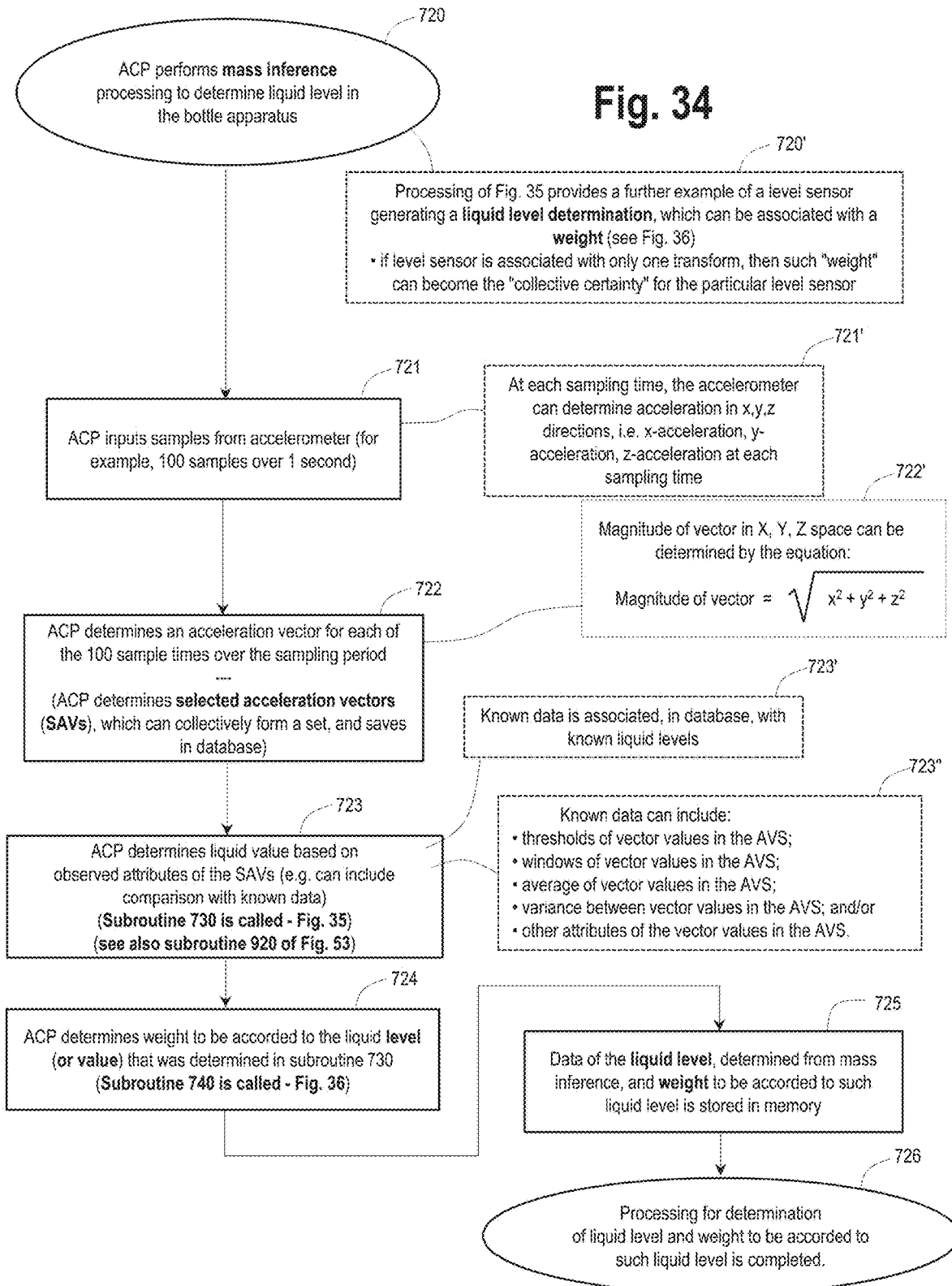
FIG. 34 is a flowchart illustrating features of mass inference (MI) processing, according to principles of the disclosure.
Figure 35:
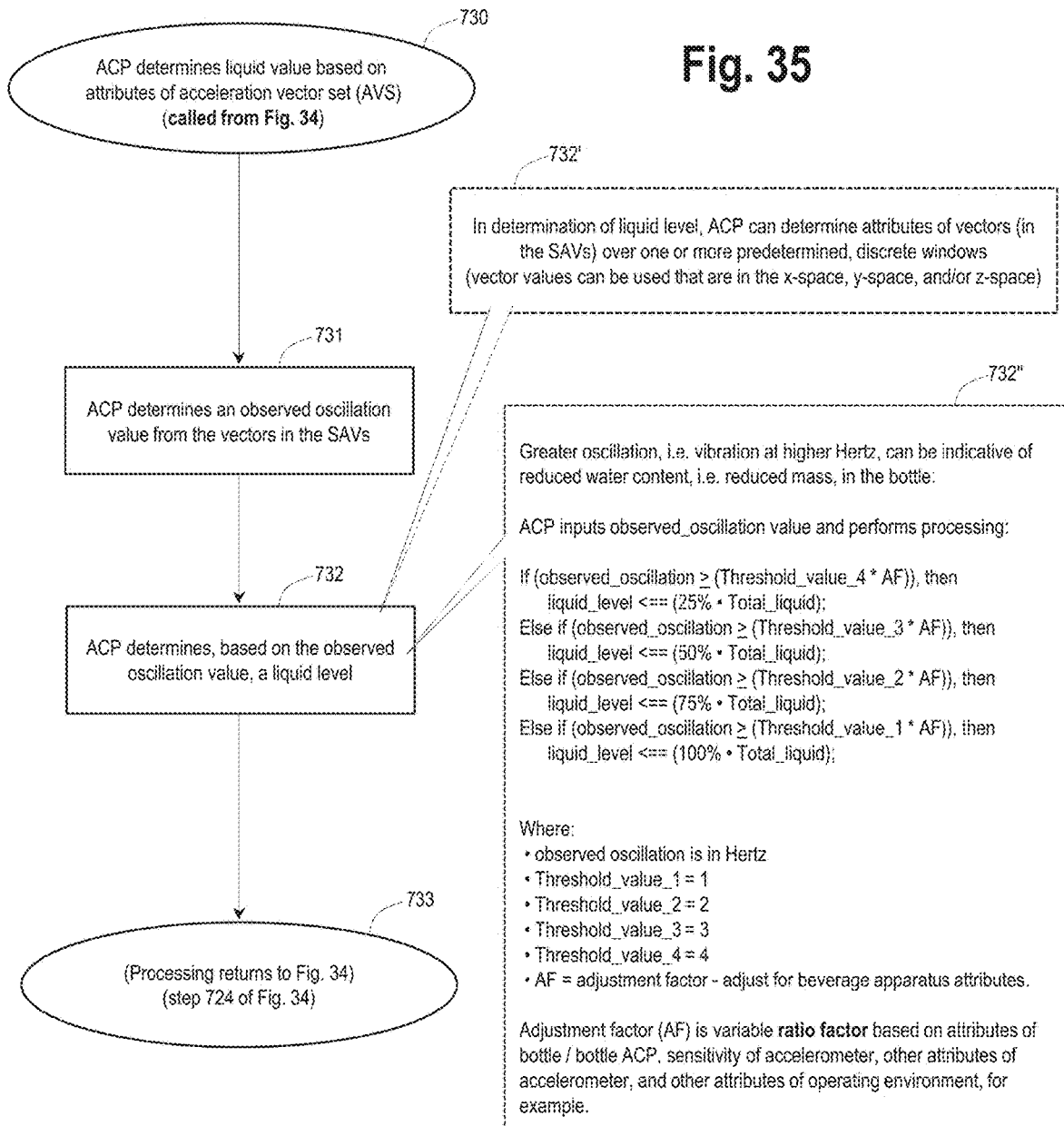
FIG. 35 is a flowchart showing in further detail the "ACP determines liquid value based on attributes of acceleration vector set (AVS)" subroutine 730, as called from FIG. 34

FIGS. 34-35 relate to "mass inference" processing or "MI" processing that can be performed in accordance with at least some embodiments of the disclosure. As described herein, mass inference processing relates to determining mass of the beverage apparatus or bottle 300 based on attributes associated with movement of the bottle 300. For example, mass inference can relate to the use of data from an accelerometer or other motion sensor or device to determine mass of the bottle. The data from an accelerometer can include frequency data from an accelerometer.

The data can be processed by the accelerometer and/or by the ACP 360 so as to determine mass of the bottle and/or mass of liquid in the bottle. Upon mass of liquid in the bottle being determined, liquid level and/or liquid volume can be determined from the mass of the liquid in the bottle. For example, once liquid volume is determined, various related processing can be performed based on such liquid volume. For example, a dispense from an additive vessel can be performed into the liquid. Since the volume of the liquid is known, the dispense can be calibrated so as to attain a certain desired concentration of additive in the liquid in the bottle.

FIG. 34 is a flowchart illustrating features of mass inference (MI) processing. As reflected in step 720 of FIG. 34, the ACP performs mass inference processing to determine liquid level in the bottle apparatus. As reflected at 720', the processing of FIG. 35 provides a further example of a level sensor generating a liquid level determination, which can be associated with a weight (see related FIG. 36). If a particular level sensor is associated with only one transform, then such "weight" can become the "collective certainty" for the particular level sensor. The process of FIG. 34 starts in step 720 and passes onto step 721. In step 721, the ACP inputs samples from an accelerometer. The samples can be over a predetermined time period. The predetermined time period can be initiated by the ACP observing some event. For example, the event might be a user requesting a dispense of an additive from an additive vessel, i.e. a pod, of the beverage apparatus 300. For example, the samples from an accelerometer might be 100 samples of acceleration data over one second. The 100 samples might include inputting acceleration values representing acceleration in each of the three coordinate axes. That is, as reflected at 721', at each sampling time, the accelerometer can determine acceleration in x,y,z directions, i.e. x-acceleration, y-acceleration, z-acceleration at each sampling time. The 100 samples might be taken at every 100th of a second. The number of samples and the time duration can of course be varied as may be desired. After step 721, the process passes to step 722.

At step 722, the ACP determines an acceleration vector for each of the 100 sample times over the sampling period. More specifically, the ACP can determine "selected acceleration vectors" (SAVs). The SAVs can collectively form an SAV set. The SAV set can be saved in a suitable database of the bottle 300 or on a server that is in communication with the bottle. As reflected at 722', the magnitude of the vector in X, Y, Z space can be determined by taking the square root of the sum of each of the component vectors squared. After step 722, the process passes onto step 723.

In step 723, the ACP determines liquid value based on observed attributes of the SAVs. The determination of liquid value based on observed attributes of the SAVs can include comparison of the SAVs with known data. Such comparison can result in a match, which can include a sufficiently close correlation, between and SAV set and a known set. Further, the known set can be associated, such as via a lookup table, with a corresponding liquid volume or liquid level. That is, as reflected at 723', the known data can be associated, in the database of the bottle, with known liquid levels. As reflected at 723", known data can include thresholds of vector values in the AVS; windows of vector values in the AVS; average of vector values in the AVS; variance between vector values in the AVS; and/or other attributes of the vector values in the AVS, for example.

Then, in step 724, the ACP determines weight to be accorded to the liquid level (or value) that was determined in subroutine 730. To perform such processing, subroutine 740 can be called, in FIG. 36.

For example, in the processing of step 723, the subroutine 730 of FIG. 35 can be called or invoked by the ACP. In further embodiments of the disclosure, a subroutine 920 of FIG. 53 can be called upon or invoked by the ACP. Then, data of the liquid level, determined from mass inference, and weight to be accorded to such liquid level can be stored in memory in step 725. Then, in step 726, processing for determination of liquid level and weight to be accorded to such liquid level is completed.

FIG. 35 is a flowchart showing in further detail the "ACP determines liquid value based on attributes of acceleration vector set (AVS)" subroutine 730, as called from FIG. 34, in accordance with at least some embodiments of the disclosure. FIG. 35 sets forth one embodiment or approach to determining liquid level of the bottle based on data from an accelerometer. Other approaches can be used as described below. The subroutine of FIG. 35 starts in step 730 and passes to step 731. In step 731, the ACP determines an observed oscillation value(s) from the vectors, e.g. from acceleration vectors, in the SAVs. Then, the process passes to step 732.

In step 732, the ACP determines, based on the observed oscillation value(s), a liquid level of the bottle. As reflected at 732', in determination of liquid level, ACP can determine attributes of vectors (in the SAVs) over one or more predetermined, discrete windows. Vector values, including acceleration vectors, can be used that are in the x-space, y-space, and/or z-space. After step 732, the process passes onto step 733. In step 733, the processing returns to step 724 of FIG. 34.

As described at 732' in FIG. 35, greater oscillation, i.e. vibration at higher Hertz, can be indicative of reduced water content, i.e. reduced mass, in the bottle. Further details are described below with reference to FIG. 62. In the processing of FIG. 35, the ACP inputs observed_oscillation values and performs processing that can include determining if the observed oscillation is within predetermined thresholds or ranges. For example, as shown, if (observed_oscillation> (Threshold_value_4·AF)), then liquid_level<==(25%·Total_liquid), for example. In the processing, an adjustment factor (AF) can be used. The adjustment factor can be a variable "ratio factor" based on attributes of bottle/beverage apparatus, sensitivity of accelerometer, other attributes of the particular accelerometer, and other attributes of operating environment, for example. The adjustment factor can be used to tune processing to a particular bottle.

Figure 36:
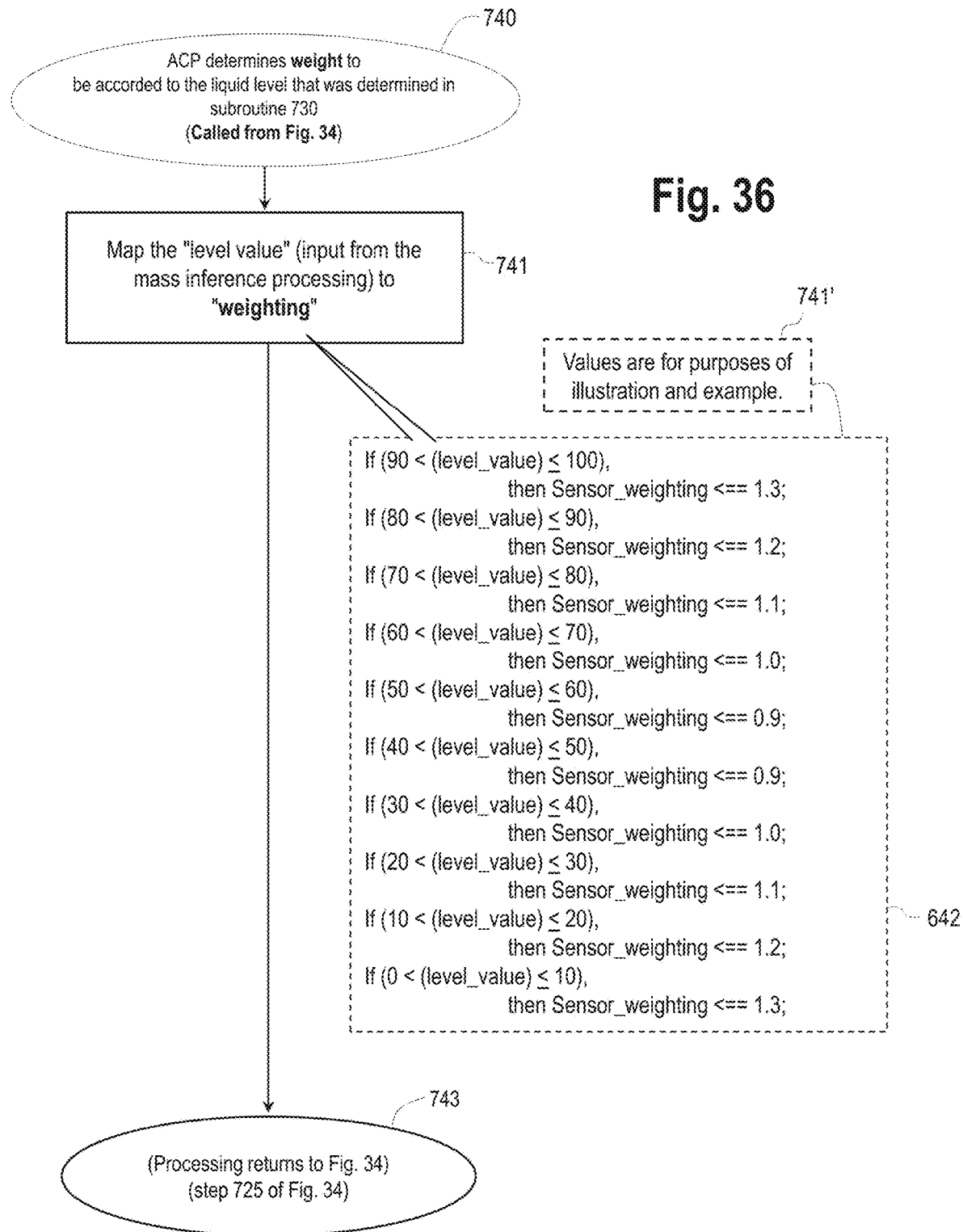
FIG. 36 is a flowchart showing in further detail subroutine 740 that includes "ACP determines weight to be accorded to the liquid level" processing, according to principles of the disclosure.

FIG. 36 is a flowchart showing in further detail subroutine 740 that includes "ACP determines weight to be accorded to the liquid level that was determined in subroutine 730" according to principles of the disclosure. The subroutine of FIG. 36 can be called from FIG. 34. The subroutine starts in step 740 and passes onto step 741. In step 741, the ACP maps the "level value" (input from the mass inference processing) to a "weighting" value. The processing of step 741 can use thresholds, windows, or ranges as set out at 742. As reflected at 741', the described values are for purposes of illustration and example. The weighting value can be based on a certainty that is to attributed to the level value at various levels. In the example of FIG. 36, certainty is highest when the bottle is approaching full or approaching empty. Certainty is lower around the middle ranges of liquid level, such as for example around 50% of liquid level.

Various features relating to liquid level sensing are described herein. Effective and efficient liquid level sensing can enhance both the performance and maintainability of a beverage apparatus/bottle of the disclosure. A particular sensor, such as an ultrasonic sensor, can be very effective in some implementations. However, even effective liquid level sensors can fall short of operational expectations under some operating conditions. Such sensors can suffer from a lack of context in real-world use cases. The various liquid level sensing features and methodologies described herein address such potential shortcomings.

As described herein, a wide variety of elements and inputs can be utilized in liquid level determination. For example, inputs that can be utilized in liquid level determination include mass inference, gesture detection, tilt tally, chronometer, and dispensing, for example. Such inputs are described above and/or in the disclosure that follows.

Each of these resources or inputs can be capable of independently quantifying water level, at a given moment in time, with some certainty.

"Certainty" can be an important component or element of an effective solution to liquid level sensing. Input need not be perfect in order to be useful. Any input that contains some useful information can improve overall system accuracy, so long as such input can quantify its own certainty or so long as the certainty of input can be quantified in some manner.

For example, an input to determine liquid level might have excellent certainty upon fill, but degrade to zero certainty as the vessel is emptied or depleted. In such situation, the value that represents the liquid level can be weighted accordingly. Such level value can be provided with substantial weight upon fill of the beverage apparatus. However, the weight accorded to input level value can be degraded as the bottle is depleted to empty, i.e. so as to reflect degraded certainty.

Figure 37:
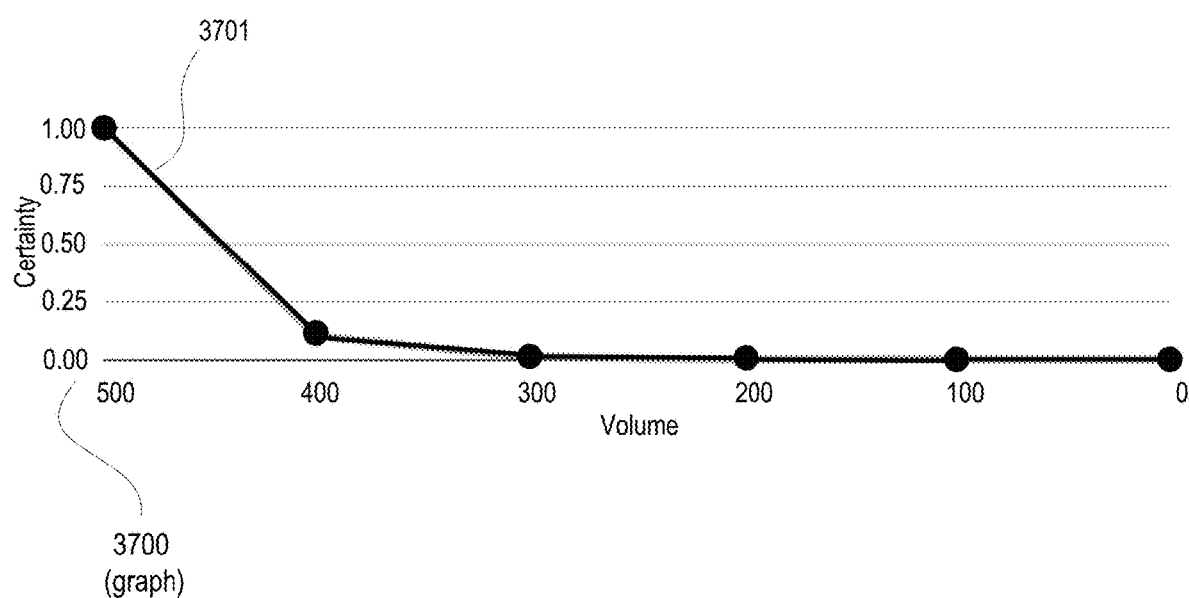
FIG. 37 is a graph showing a relationship or plot line between certainty and volume, of a level sensing input, of a beverage apparatus, according to principles of the disclosure.

FIG. 37 is a graph 3700 showing a relationship or plot line 3701 between certainty and volume, of a level sensing input, of a beverage apparatus or bottle 300. For example, FIG. 37 could depict the level sensing input of an ultrasonic device or sensor 351. As illustrated by the graph 3700, certainty can decrease as volume decreases.

Accordingly, the level value can be weighted accordingly. This approach allows the system (of the bottle 300) to reject false empty values from the sensor 351, i.e. the element 351, at low levels when the bottle is nearing depletion—but is not yet depleted. The bottle 300 can include a further or second level sensor that is more accurate, i.e. certain, at low liquid levels. Such second sensor can be weighted accordingly. Thus, for example, at 0-33% volume the ultrasonic device 353 can be weighted at 0.15 and the second sensor weighted can be weighted at 0.8. Thus, at low liquid level, the second sensor can control and the ultrasonic device 353 can be discounted or not considered at all.

In accordance with at least one embodiment of the disclosure, a tally of tilt events can be utilized as an input to determine liquid level. Accordingly, as a derivative product, a tally of tilt events can be maintained by the controller of a beverage apparatus, such as the ACP 360. As a user takes a sip or drink of beverage in a bottle, the volume of that bottle is depleted. In one scenario, the controller can monitor the number of sips a user takes to consume a full bottle. For example, a bottle might hold 17 fluid ounces. The controller of the bottle might observe that a user consumes a full bottle in 17 sips. As a result, the controller can calculate that each sip results in a depletion of about 1 fluid ounce.

Accordingly, if the bottle is full—and the user takes five sips—the controller can calculate that liquid level of the bottle is depleted about 5 ounces. As otherwise described herein, it is appreciated that the particular geometry of the bottle can be taken into account as desired or needed. Relatedly, the action of a user taking a "sip" or "drink" for example can be identified through one or more mechanisms or approaches. For example, a position sensor or angle sensor can be utilized to determine that the bottle has been tilted in a manner characteristic of sipping. Additionally, a sensor, such as a magnetic sensor, can be utilized so as to determine when a top of the bottle has been removed, which can be indicative of a user taking a drink from the bottle. Accordingly, a tally of tilt events can be utilized alone or in conjunction with other inputs so as to provide determination of liquid level and/or volume of liquid in the bottle. Further details are described below with reference to FIG. 51.

In accordance with at least one embodiment of the disclosure, a chronometer or time measuring device can be utilized as an input to determine liquid level. Over the duration of a time span, the volume of a user's bottle can be depleted. In one scenario, the controller can monitor the time it takes for a user to consume a full bottle. For example, the bottle might hold 17 fluid ounces. The controller of the bottle, such as the ACP 360, can observe that it takes approximately 34 minutes for the user to consume contents of the bottle. As a result, the controller can calculate that every two minutes the user consumes about 1 fluid ounce. The controller of the bottle might observe that six minutes have passed since the user filled up the bottle. Accordingly, the controller can calculate that 3 fluid ounces of the beverage has been consumed. Accordingly, a chronometer or other time measuring device can be utilized so as to provide an input to determine liquid level and/or volume of liquid in the bottle.

FIG. 38 is a graph illustrating aspects of utilizing the passage of time to estimate or determine liquid level in a beverage apparatus. FIG. 38 shows a standard distribution curve or distribution curve 3801. For example, it might be determined that the standard distribution of the curve (of FIG. 38) has a mean with value on the order of 20 minutes.

Accordingly, such data can indicate that, on average, a user consumes the content of his or her bottle in 20 minutes.

Related to FIG. 38, FIG. 39 is a diagram showing graphs 3900. The graphs 3900 include graph 3901 and graph 3902.

The graph 3901 illustrates that at any point on the distribution curve (of FIG. 38), the rate of consumption may be linear. Additionally and relatedly, a certainty function from a full disposition (of the bottle) to an empty disposition (of the bottle) can be linear as illustrated by graph 3902 of FIG. 39.

The relationships of FIGS. 38 and 39 can be applied by the beverage apparatus 300 in operation of the beverage apparatus 300. For example, the beverage apparatus 300 may be coded to identify particular observed attribute(s) of a particular user and compare those observed attributes against known attributes of known users, wherein such known users contributed to the known distribution of FIG. 38. Based on such comparing, the beverage apparatus 300 can adjust processing for the observed user along the distribution curve 3801 of FIG. 38. For example, if the observed user shares attributes with known users who are about the 1σ point on the distribution curve 3801, then processing (performed by the beverage apparatus 300) can be adjusted to reflect a likely longer consumption time than is the norm. In addition or alternatively, the beverage apparatus 300 can adjust processing along the distribution curve 3801 based on historical data of the observed user herself. Other processing can be performed based on the distribution curve 3801 and the manner in which a particular user relates to such distribution curve 3801.

In accordance with principles of the disclosure and the processing described herein, each element can be responsible for evaluating certainty, or the system can provide mechanisms for evaluating certainty, when a level value is emitted or output from such element. Some elements, i.e. sensors or other resources, may provide ancillary data to contribute to the liquid level determination. Such resources might include the ultrasonic level sensor and may include the accelerometer. Other elements may have a predefined certainty function with an adjustable coefficient.

Such other elements might include or use the chronometer and dispensing related processing as described above, for example.

Figure 40:
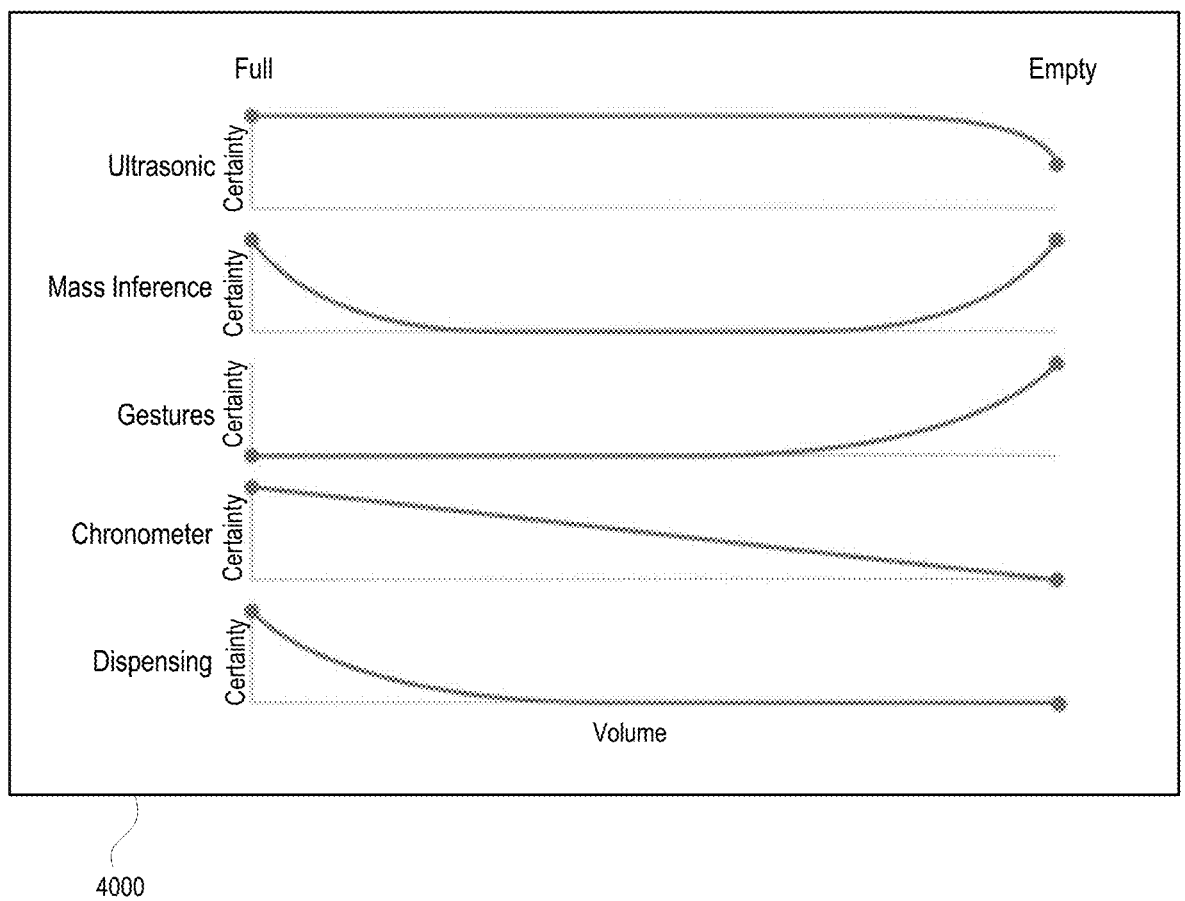
FIG. 40 is a graph illustrating different inputs that can be used to determine liquid level or volume in a bottle, according to principles of the disclosure.

FIG. 40 is a graph 4000 illustrating five different inputs that can be used to determine liquid level or volume in a bottle. As shown, the Y-axis of each of the graphs represents certainty. The X-axis of each of the graphs represents volume.

As illustrated by the respective graphs, each of the five inputs demonstrate illustrative different behavior in the relationship of "certainty" and "depletion" of liquid in the bottle. With regard to the ultrasonic sensor, high certainty is maintained until the latter stages of depletion. With regard to mass inference, certainty is high at the beginning of the depletion process, high at the end of the depletion process, but low over most the course of depletion. With regard to gestures that can include angle detection, certainty can be very low in the situation of a full bottle but very high at the end of the depletion process, when the bottle is empty or almost empty. With regard to the chronometer approach, certainty can decrease in a linear manner through the course of depletion of the bottle. With regard to the dispensing approach, certainty can decrease in a decreasing exponential manner—with high certainty at the beginning of the depletion process and low certainty upon attaining about half contents of the bottle.

In the "lineup" of FIG. 40, good corroborative certainty can be provided at the high end and the low-end. Poorer corroborative certainty can be provided in the middle range. However, it may be the case that the corroboration illustratively provided by the inputs of FIG. 40 may be sufficient to provide effective data for operation of the bottle.

For example, it may be the case that liquid level determination is most critical when the bottle is full or almost full, as well as most critical when the bottle is empty or almost empty. Such criticality can arise due to the importance of reliably detecting fill and empty events of a bottle.

Relatedly, it is appreciated that inaccurate values with non-zero certainty can tend to negatively affect accuracy. As result, it can be desirable to place the onus, through suitable programming or coding, on each input to produce an accurate certainty value. In accordance with at least one implementation of the disclosure, it may be desirable for certainty to tend toward zero unless the input is truly "certain". For example, if a particular certainty of an input fails to satisfy a predetermined threshold, it may be preferable for the input to indeed emit no value—and rely on the other inputs to provide usable data to perform the liquid level determination. With further reference to the lineup of FIG. 40, the provided relationships of certainty vis-à-vis volume depletion might be determined using observation over one or many users. Provided with the relationships of FIG. 40, a weighting that is associated with each of the inputs can be provided and used in the system 10' and/or the controller 350.

For example, weighting associated with the particular input can be determined based on a relationship of the input's certainty vis-à-vis other input's certainty. In other words, an "allocation" of weighting can be determined based on an "allocation" of certainties demonstrated by data, such as that shown in FIG. 40. To explain further, a weighting of the inputs at a depleted scenario might be afforded primarily to mass inference and gestures with some weight accorded to ultrasonic. Little or no weight could be allocated to chronometer and dispensing, i.e. since such inputs, in this example, have poor certainty when the bottle is in a depleted state. Accordingly, distribution of the allocation might be along the lines of 40% allocated to gestures, 40% allocated to mass inference, 20% allocated to ultrasonic, for example.

On the other hand, allocation of weighting could be different amongst the inputs if a full state of the bottle is determined. In a full state scenario, with the illustrative data of FIG. 40, no or little weight could be accorded to gestures since gestures are illustrated to have poor certainty in a full scenario. Rather, weighting could be distributed equally amongst the other four inputs. Such equal distribution could be warranted since the other four inputs may be observed to have similar certainty values in a full scenario.

According to principles of the disclosure, various different relationships can be used to represent a relationship between certainty and volume. As otherwise described herein, volume can be proportionally related to liquid level.

Figure 41:
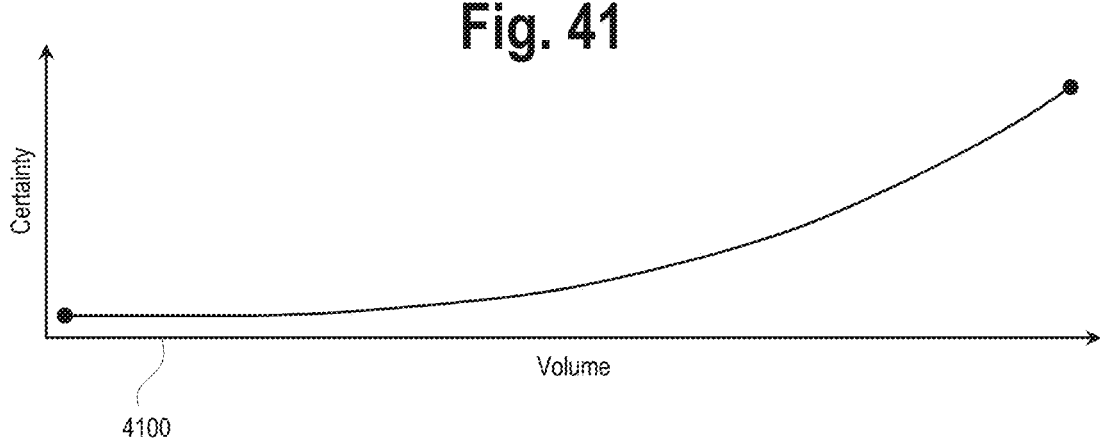
FIG. 41 is a graph showing the plot of an exponential function that can be used to represent a relationship between certainty and volume/liquid level, according to principles of the disclosure.

FIG. 41 is a graph showing the plot of an exponential function that can be used to represent a relationship between certainty and volume/liquid level. For example, such exponential function can be in the form of or include a mathematical relationship of $f(x)=X^2$ or $f(x)=X^3$ or other exponential function, for example. According to principles of the disclosure, the ACP 360 may use quantification modules that use such relationship in assessing certainty of in input (from an element) based on liquid level or volume sensed by such element.

Figure 42:
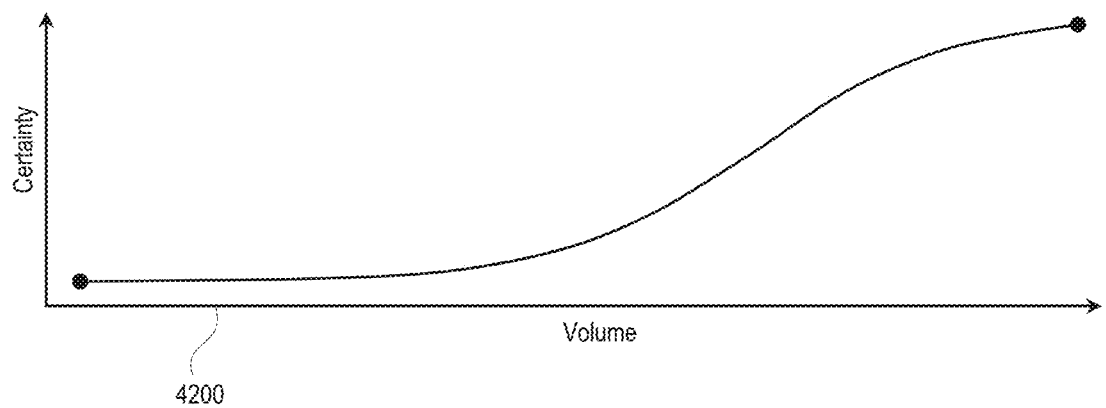
FIG. 42 is a graph showing the plot of a sigmoid function that can be used to represent a relationship between certainty and volume/liquid level, according to principles of the disclosure.

Further, FIG. 42 is a graph showing the plot of a sigmoid function that can be used to represent a relationship between certainty and volume/liquid level. For example, such exponential function can be in the form of or include a mathematical relationship of $f(x)=(1/(1+e^{-x})$ or other sigmoid function, for example. According to principles of the disclosure, the ACP 360 may use quantification modules that use such relationship in assessing certainty of in input (from an element) based on liquid level or volume sensed by such element.

Figure 43:
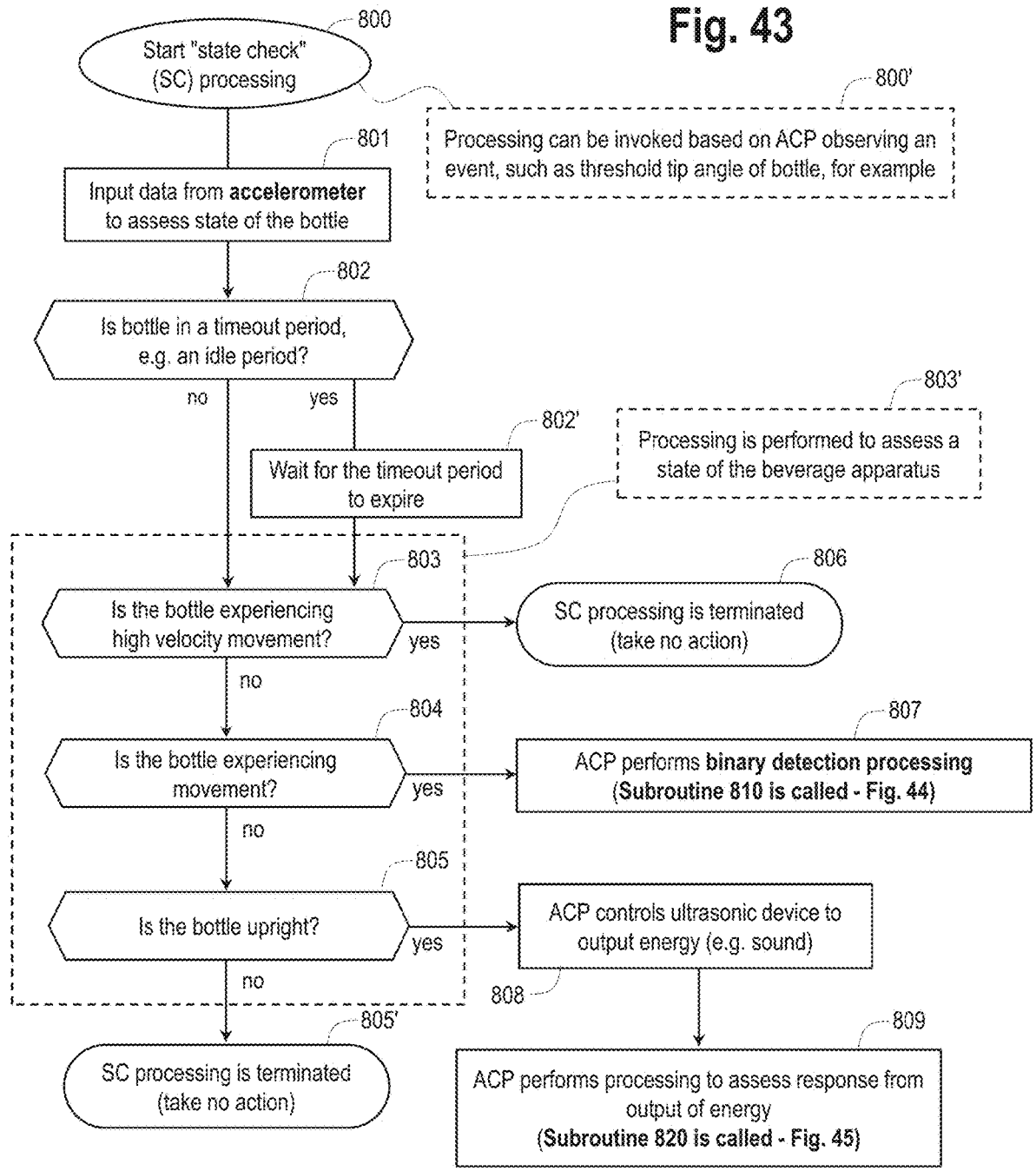
FIG. 43 is a flowchart showing aspects of "state check" processing and level determination processing performed by a beverage apparatus, according to principles of the disclosure.

Hereinafter, further features of the beverage apparatus 300 and related processing as performed by the ACP will be described. FIG. 43 is a flowchart showing aspects of "state check" processing and level determination processing performed by the beverage apparatus 300, in accordance with at least some embodiments of the disclosure. The process of FIG. 43 starts in step 800. As reflected at 800', the processing of FIG. 43 can be invoked based on the ACP observing an event. For example, the event could be identifying that the bottle has been tipped beyond a predetermined threshold tip angle. Such predetermined threshold tip angle can vary as a bottle is drunk down and diminished in liquid content, i.e. what constitutes an observed event can vary as the bottle is drunk down. After initiating in step 800, the process passes onto step 801. In step 801, the ACP inputs data from the accelerometer so as to assess state of the bottle. In particular, the accelerometer data may indicate whether or not the bottle is in motion. Such status and data are described further below.

After step 801, the process passes onto step 802. In step 802, the ACP determines whether or not the bottle is in a timeout period. Such timeout period can also be referred to as an idle or idle period. Step 802 reflects an aspect of the processing that the beverage apparatus or bottle 300 can be put into a timeout period in some use scenarios of the bottle. For example, a timeout period can occur when the processor is resetting, when a dispense event is occurring, when a pod is being removed or inserted into the beverage apparatus, or in other situations where a state check is not desired or would not be appropriate. If the ACP determines in step 802 that the bottle is in a timeout period, then the process will pass to step 802'. In step 802', the ACP will wait for the timeout period to expire. In some embodiments, once the timeout period has expired, the ACP can input new data from the accelerometer so as to assess state of the bottle. After step 802', the process passes onto step 803. On the other hand, it may be determined in step 802, that the bottle is not in a timeout period. In such situation, the process passes directly from step 802 onto step 803.

The processing of steps 803, 804, 805 relate to a determination of whether the bottle is experiencing movement and/or a determination of orientation of the bottle. Accordingly, as reflected at 803', processing can be performed to assess a "state" of the beverage apparatus. This processing can be performed based on the data from the accelerometer. Depending on the state of the bottle, different or varied processing can be performed by the ACP. For example, some level functionality can be problematic to perform when the bottle is in motion.

After either of step 802 or step 802', the process passes onto step 803. In step 803, the ACP determines whether the bottle is experiencing high velocity movement. Such high velocity movement can be problematic in determining state of the bottle and/or liquid level in the bottle. Accordingly, in this embodiment, if step 803 renders a yes, then the processing passes onto step 806. In step 806, the state check processing is terminated and the ACP takes no further action in terms of the state check processing. If a no is rendered in step 803, the process passes onto step 804.

In step 804, the ACP makes a determination of whether the bottle is experiencing movement based on data from the accelerometer. If the bottle is experiencing movement based on the ACP's assessment of data from the accelerometer, then the processing passes onto step 807. In step 807, the ACP performs binary detection processing.

Figure 44:
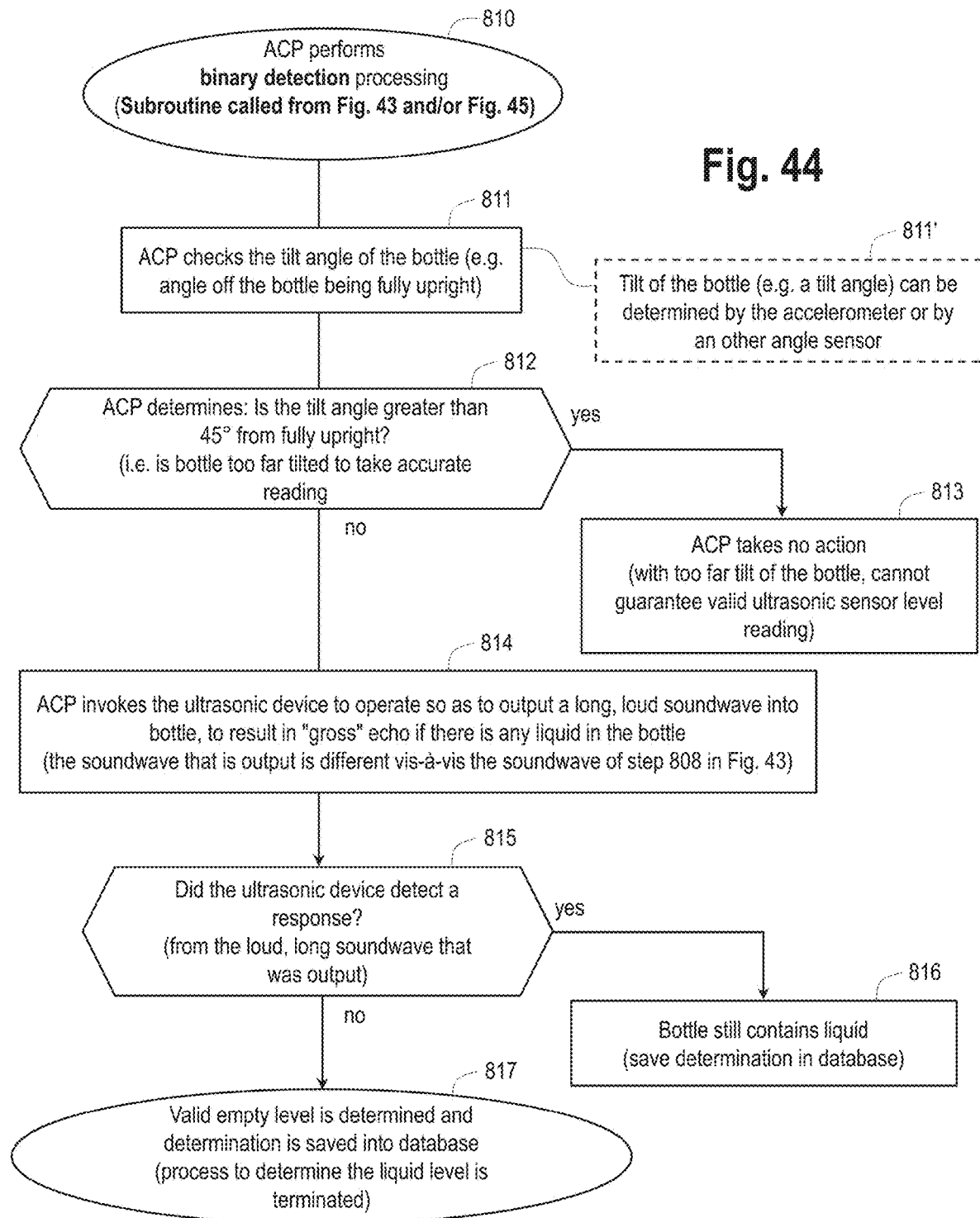
FIG. 44 is a flowchart showing subroutine 810 in which the "ACP performs binary detection processing" according to principles of the disclosure.

Such binary detection processing can be performed by subroutine 810 as illustrated in FIG. 44. Further details are described below.

On the other hand, a no may be rendered in step 804. That is, the determination that the bottle is not experiencing movement can dictate processing performed by, and/or functionality provided by, the ACP. In the situation of a no being rendered in step 804, the process can pass onto step 805. In step 805, the ACP performs a determination to determine whether the bottle is upright. Such determination can be performed based on data from the accelerometer.

The determination of step 805 can also be based on some other type of angle sensor, a gyroscope, and/or other device. If the ACP determines that the bottle is not upright, then the process passes onto step 805'. In step 805', the state check processing (SC) is terminated. In other words, the "state check" (as performed by the ACP) has determined that certain functionality can not be performed or can not be offered at the present time. In this example, that functionality might be the determination of a liquid value or liquid level.

Figure 45:
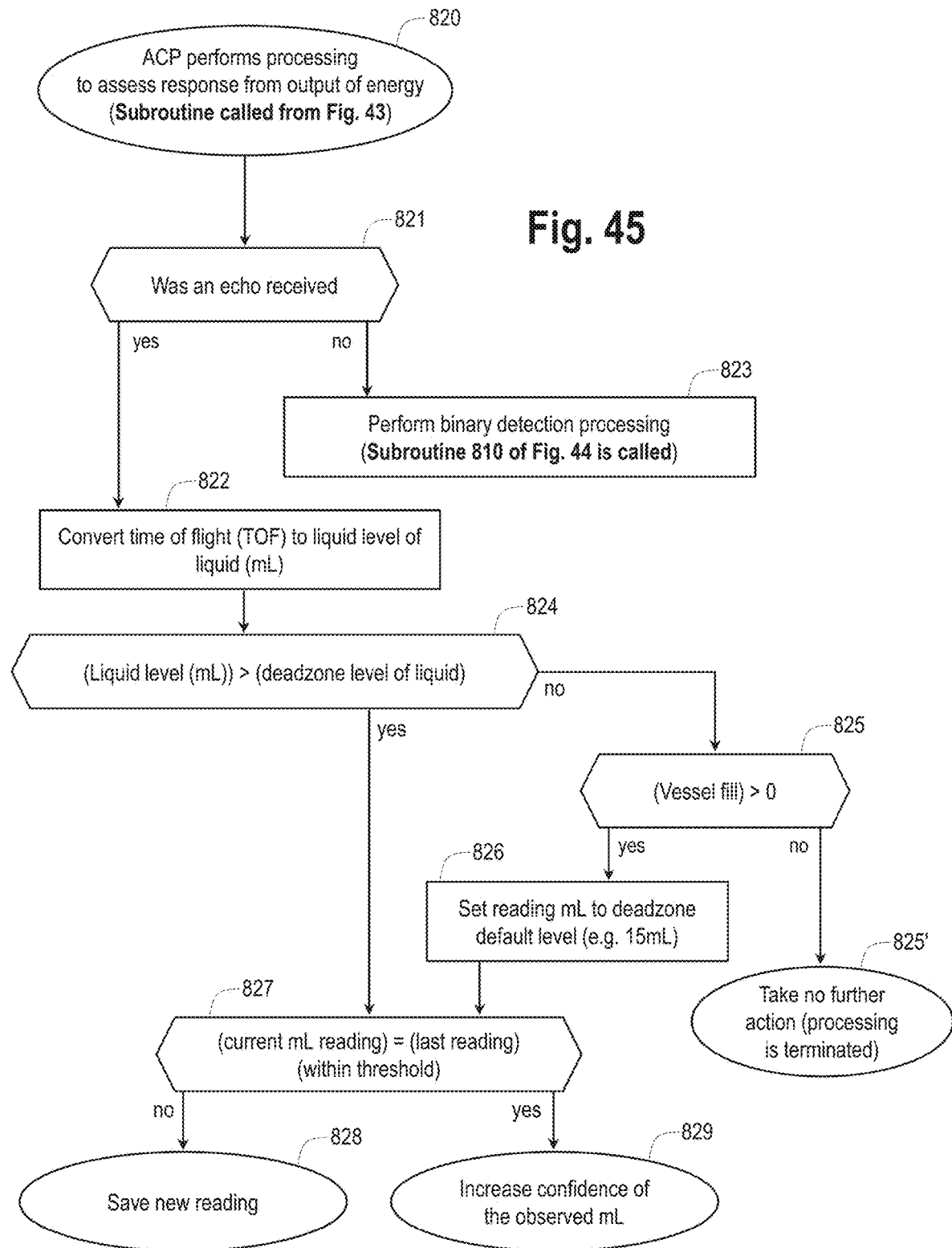
FIG. 45 is a flowchart showing in further detail "CP performs processing to assess response from output of energy" subroutine 820 as called upon from FIG. 43, according to principles of the disclosure.

On the other hand, it may be determined in step 805, that the bottle is indeed upright. As result, the process passes from step 805 to step 808. In step 805, the ACP controls the ultrasonic sensor, i.e. an ultrasonic device, to output energy so as to perform a liquid level determination. In other words, the state processing 803, 804, 805 has determined that the situation or disposition of the bottle is appropriate for the ultrasonic sensor to perform a determination of liquid level. After step 808 of FIG. 43, the process passes onto step 809. In step 809, the ACP performs processing to assess a response from the output of energy from the ultrasonic sensor. In performing the processing of step 809, the ACP can call upon the subroutine 820 as illustrated in FIG. 45.

It should be appreciated that the processing of steps 803, 804, 805 can use thresholds or ranges of values. For example, in determining high velocity movement, the ACP can determine whether the bottle is traveling faster than 4 mph (miles per hour). The ACP can input data from the accelerometer over some discrete amount of time so as to assess the velocity of the bottle.

In similar manner, step 804 can use thresholds or ranges of values. For example, step 804 can include the ACP determining if the bottle is experiencing movement over 1 mph. Additionally, the processing of step 805 can use thresholds or ranges of values. For example, the ACP may use thresholds such that if the bottle is within 10° of being upright, then the bottle is considered to be upright. In at least some embodiments, the processing of step 805 can be binary in nature in that the bottle is determined to be upright or not to be upright. On the other hand, the processing of step 811, described below, can use the particular angle of the bottle determined. Step 811 can also be binary in nature so as to determine if the bottle is tipped too far, or not tipped too far.

As described above, FIG. 44 is a flowchart showing a subroutine 810 in which the "ACP performs binary detection processing". The subroutine 810 can be called from the processing of FIG. 43. The subroutine 810 can also be called from the processing of FIG. 45 (step 823).

As shown in FIG. 44, the process starts in step 810 and passes onto step 811. In step 811, the ACP checks the tilt angle the bottle. In other words, the ACP determines the angle "off" of the bottle being fully upright. For example, an angle of 5° would indicate that the bottle is very close to being upright. On the other hand, an angle of 80° would indicate that the bottle is close to being on its side. As noted at 811', the tilt of the bottle, i.e. the tilt angle, can be determined by the accelerometer or by an angle sensor. After step 811, in step 812, the ACP determines: is the tilt angle greater than 45° from fully upright. In other words, is the bottle too far tilted to take an accurate reading. The disclosure is not limited in particular to the 45° angle, which is provided for purposes of illustration. The particular angle of step 812 can be determined based on an observation that accuracy decreases or decreases substantially beyond a certain angle. If yes in step 812, the process passes onto step 813. In step 813, the ACP takes no action.

That is, with a too far tilt of the bottle, the ACP cannot guarantee valid ultrasonic sensor level reading—even with a modified ultrasonic device output as utilized in the processing of step 814.

On the other hand, a no determination may be rendered in step 812 indicating that the tilt angle is not "too much" so as to perform the processing of step 814. To explain further, in a particular situation, it may be determined that the bottle is experiencing movement such that normal ultrasonic liquid level detection can not be performed. However, even though that the bottle is tilted to some extent, modified ultrasonic liquid level detection can be performed as illustrated in step 814.

That is, in step 814, the ACP invokes the ultrasonic device to operate so as to output a long, loud sound wave into the bottle. The objective of such "modified" sound wave—as compared to the "normal" sound wave of step 808 is to determine if any liquid is present in the bottle. Thus, in processing, a "normal" sound wave emitted by the ultrasonic device can indeed detect a liquid level based on a returned sound wave. The returned sound wave may be described as a returned sound wave or an echoed sound wave, for example. On the other hand, a "modified" sound wave may not determine a particular value or liquid level, but rather can be directed to a binary determination of whether there is or is not liquid in the bottle. The processing of step 814 can be referred to as a determination of a "gross" echo in that no particular value is desired in response to the output sound wave, but rather simply if any echo or returned pulse is observed by the ultrasonic device.

After step 814, the processing passes onto step 815. In step 815, the ACP determines: did the ultrasonic device detect a response, i.e. a returned sound wave. If yes, then the processing passes onto step 816. Step 816 reflects that the bottle does indeed contain liquid. Such determination can be saved, by the ACP, in a suitable database.

If a no is rendered in step 815, then the process passes onto step 817. In step 817, the processing of the ACP can conclude that a valid empty level has been determined. In other words, the ACP has validated the determination of an empty bottle using the processing of step 814. In step 817, the ACP can save the determination into a suitable database. The process to determine the liquid level may then be terminated.

According to principles of the disclosure, the apparatus computer processor (ACP) 360 and the accelerometer, or other sensing element can detect a state transition of the bottle—such as the bottle experiencing movement and then being still. Such might occur when the user is drinking from the bottle and then sets the bottle down on a table, for example. Processing can be based on such state change, such as the ACP determining a liquid level (using the liquid level devices and processing as described herein) upon the ACP detecting a state change from: (a) movement detected to (b) no movement detected. Processing to determine liquid level can be based on some observed event (such as a state change) and/or performed in some periodic manner. For example.

FIG. 45 is a flowchart showing in further detail "CP performs processing to assess response from output of energy" of subroutine 820 as called upon from FIG. 43, according to principles of the disclosure. The processing of FIG. 45 starts in step 820 and passes onto step 821. In step 821, the ACP determines whether an echo was received from the output of energy of step 808. If no, then such indicates that further processing should be performed to determine if the bottle is indeed empty—and whether or not such empty condition is the reason that no echo was received.

Accordingly, the processing can pass to step 823. In step 823, the ACP and ultrasonic device can perform binary detection processing. That is, the processing of subroutine 810 of FIG. 44 can be called upon or invoked by the ACP. On the other hand, the decision processing of step 821 can render a yes. As result, the process passes to step 822. In step 822, the ACP can convert the time-of-flight (TOF) data to a liquid level of the liquid in the bottle. In this example, such liquid level is then utilized by the ACP to determine a volume (mL) of liquid in the bottle. For example, the liquid level can be used to determine the volume via a lookup table as otherwise described herein.

Then, the process passes onto step 824.

In step 824, the ACP determines if the liquid level and/or volume is greater than a dead zone level of the liquid. For example, a dead zone volume might be 30 mL in a 500 mL bottle. The processing of step 824 can be performed in light that there may be limitations to the ultrasonic device accurately determining liquid level at a low volume level.

Accordingly, if a liquid level is rendered that falls within the dead zone level, then such liquid level may be suspect.

Accordingly, if a no is rendered in step 824, then the processing passes onto step 825. In step 825, the ACP determines if the liquid level returned in step 822 is greater than zero. If no, then the process passes to step 825'. In step 825', the ACP takes no further action and processing is terminated. Such step 825' reflects a processing disposition that if the time-of-flight in step 822 reflects an empty state, then no further processing is to be determined.

On the other hand, a yes may be rendered in step 825. Accordingly, the process will pass to step 826. In step 826, the ACP sets the reading mL to the dead zone level. Thus, the processing of step 826 reflects that once the ACP determines that the liquid level is in the dead zone, the specifics of the liquid level returned in step 822 is replaced by a default dead zone level. For example, if the dead zone level is anything below 30 mL, then the default dead zone level might be 15 mL. Then, the process passes onto step 827.

In step 827, the ACP determines if the current milliliter (mL) reading is equivalent to the last reading, within a particular threshold. If no, then the ACP can simply save the new reading in step 828. If a yes is rendered in step 827, then the process passes onto step 829. In step 829, the ACP increases the confidence of the observed milliliter level—since correspondence and/or expected progression has been correlated between two inputs.

It should be appreciated that various processing described herein can be performed using either liquid levels and/or volume or milliliter (mL) levels. Such can be the case since such parameters are interrelated. In other words, a particular liquid level can correspond to a particular volume level. A particular volume level can correspond to a particular liquid level. Accordingly, in comparisons, processing of thresholds, and various related processing, the ACP can work off of a volume level, liquid level, or some other corresponding, representative value, in accordance with at least one embodiment of the disclosure.

Figure 46:
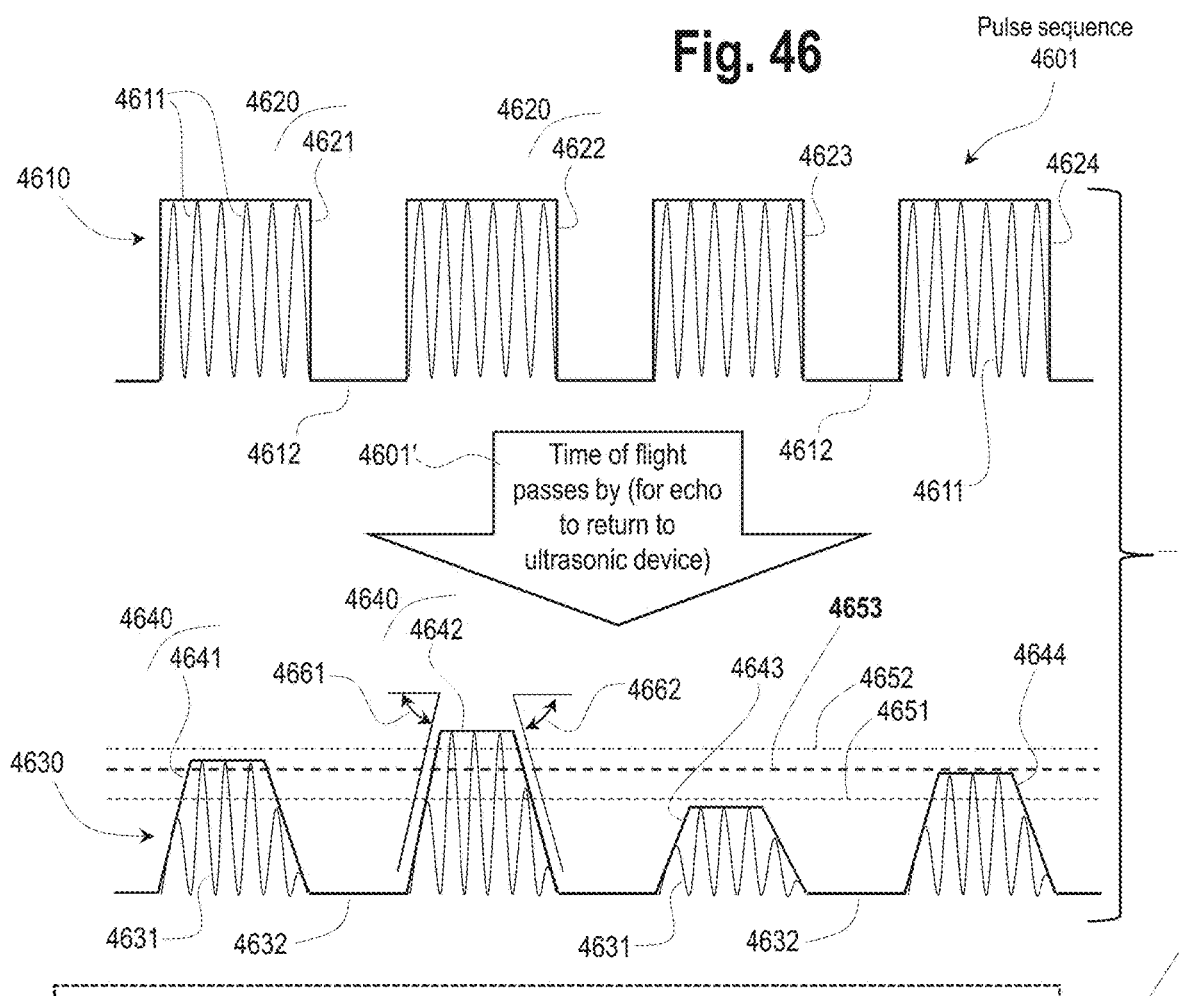
FIG. 46 is a schematic diagram illustrating a pulse sequence and aspects of validity processing, according to principles of the disclosure.

The ACP can perform various processing so as to perform a variety of functionality to the bottle 300. In determining a liquid level present in the bottle, that can allow the determination of a volume level or volume of liquid in the bottle, one or more devices can be utilized. Such devices can be sensors. The device can output a signal(s) and/or input signals so as to determine the liquid level. It should be appreciated that in some situations, validity of the signal or data may be suspect. Accordingly, it may be desired to perform processing so as to assess the validity of data that will be used in level determination. FIG. 46 is a schematic diagram illustrating a pulse sequence 4601 and aspects of validity processing according to principles of the disclosure.

As shown in FIG. 46, the pulse sequence 4601 includes a pulse train 4610 generated by ultrasonic device, as illustrated in box 4699. The pulse train 4610 can include sound pulses 4611. The sound pulses 4611 can be generated by the ultrasonic device in pulse blocks 4620. The pulse blocks 4620 can include a first pulse block 4621, a second pulse block 4622, a third pulse block 4623, a fourth pulse block 4624, and so forth. The pulse blocks 4620 are generated in sequence in the pulse train 4610 over any desired amount of time. For example, the amount of time might be 0.1 seconds. As shown in FIG. 46, there can be rest periods 4612 between the pulse blocks 4620. The sound pulses 4611 within each of the pulse blocks 4620 can be uniform in frequency and magnitude.

As noted at 4601', once the pulse train 4610 is generated by the ultrasonic device, time of flight passes by, i.e., for an echo or returned pulse to return to the ultrasonic device. The returned pulse can then be sensed by the ultrasonic device. In an optimum situation, the returned pulse would match or correspond with the generated pulse in various respects. However, it should be appreciated that various parameters can impact quality of returned pulses. Such various parameters can include tilt of the bottle, ice in the liquid, variations in density throughout the liquid, fluctuation in surface of the liquid, and other parameters. Accordingly, processing can be provided by the ACP such that assessment can be performed regarding validity of input data.

To explain further with reference to FIG. 46, the pulse sequence 4601 includes a returned (or echoed) pulse train 4630. The pulse train 4630 can include returned or echoed sound pulses 4631 within the pulse train. The pulses 4631 can be in pulse blocks 4640. The pulse blocks 4640 can include pulse block 4641, pulse block 4642, pulse block 4643, and pulse block 4644. The extent that the returned pulse blocks 4640 correspond to the generated pulse blocks 4620 can depend on various parameters. In optimum situation, the shape of the returned sound pulses 4631 may correspond very closely with the shape of the generated pulses 4611, excepting for some diminish in magnitude as a result of energy being absorbed into the liquid. As shown in FIG. 46, there may well be rest periods 4632 between the pulse blocks 4620. The rest periods 4632 in the returned pulses may correspond to the rest periods 4612 in the generated pulses, such variance also dependent on various parameters.

The ACP can perform various processing to assess validity of the returned sound pulses 4631 in the returned pulse train 4630. Such processing to assess validity can include the assessment of various attributes of the returned sound pulses 4631 and/or the returned pulse train 4630. For example, a particular ultrasonic device operating in the environment of a particular bottle can be expected to result in returned pulses with a particular magnitude. That is, based on performance information, it may be determined that returned pulses of magnitude below a particular level (assuming a predetermined magnitude of the generated pulses) is suspect. In other words, in a given bottle/system, a predetermined floor threshold value 4651 can be utilized. A returned pulse that is of magnitude below the predetermined floor threshold value can be deemed suspect and not considered by the ACP. Alternatively, the ACP can consider such data but with diminished confidence. Based on performance information, it may be determined that returned pulses of magnitude above a particular level (assuming a predetermined magnitude of the generated pulses) is suspect. In other words, in a given bottle/system, a predetermined ceiling threshold value can be utilized.

A returned pulse that is of magnitude above the predetermined ceiling threshold value 4652 can be deemed suspect and not considered by the ACP. Alternatively, the ACP can consider such data but with diminished confidence.

Accordingly, data resulting from the returned or echoed pulses can be referred to as "validated" or "invalidated".

Validated data can be given a strong confidence factor. Invalidated data can be given a weak confidence factor.

The predetermined floor threshold value 4651 can include or be in the form of a level. The predetermined ceiling threshold value 4652 can include or be in the form of a level. Both of the values 4651, 4652 can be in the form of a set value or can be in the form of a percentage (value or magnitude) of the generated pulses. For example, the predetermined floor threshold value 4651 can be 80% of the generated pulse. For example, the predetermined ceiling threshold value 4652 can be 120% of the generated pulses. Validation of data, such as by the threshold values 4651, 4652 can operate on different components of the returned sound pulses 4631. Validation can be based on an average of sound pulses over predetermined time. Validation can be based on average of pulses within a given returned pulse block 4640. Validation can be based on each pulse individually. Validation can be based on pulses that occur within a pulse block that correspond to the generated pulse blocks 4620.

As shown in FIG. 46, processing performed by the ACP can utilize an optimum returned signal value or level 4653.

Such optimum returned signal value 4653 can be the magnitude that is to be expected from the generated pulses.

Accordingly, as a returned pulse varies from the optimum returned signal value 4653, such returned pulse can become more suspect. In other words, as a returned pulse varies in magnitude from the optimum returned signal value 4653, then the weight or certainty of such value can be downgraded. Thus, the variance or delta away from the optimum can correspond and be associated, by the processing, to decreased certainty. The predetermined ceiling threshold value 4652 and the predetermined floor threshold value 4651 can be based on or can be a window/range about the optimum returned signal value 4653.

The processing to determine validity is not limited to assessing attributes associated with magnitude of the returned pulses. For example, the diagram of FIG. 46 also illustrates a ramp-up slew rate 4661 and a ramp down slew rate 4662. In a returned pulse block 4640, the ramp-up slew rate 4661 reflects an increasing change in signal strength over time. In a returned pulse block 4640, the ramp down slew rate 4642 reflects a decreasing change in single strength over time. Relatedly, the sound pulses 4611 that are generated by the ultrasonic device can be in block shape reflecting the on/off of the ultrasonic device. Under optimum conditions, such block shape of the generated pulses would result in corresponding block shape of the returned or echoed pulses. However, it may well be the case that the return pulses are deteriorated in shape, as compared to the generated pulses. Such deterioration provides an attribute that the ACP can assess so as to assess validity of the return pulses/data. If deterioration is substantial, then the return pulses and/or pulse blocks can be deemed to constitute invalid data or can be deemed inappropriate degradation in certainty. Deterioration can be based on both the ramp-up slew rate 4661 and ramp down slew rate 4662. The ramp-up slew rate 4661 can be or include a rate of change of the returned pulses over time and/or an angle defined by the rate of change of the returned pulses over time. The ramp down slew rate 4662 can be or include a rate of change of the returned pulses over time and/or an angle defined by the rate of change of the returned pulses over time.

Figure 47:
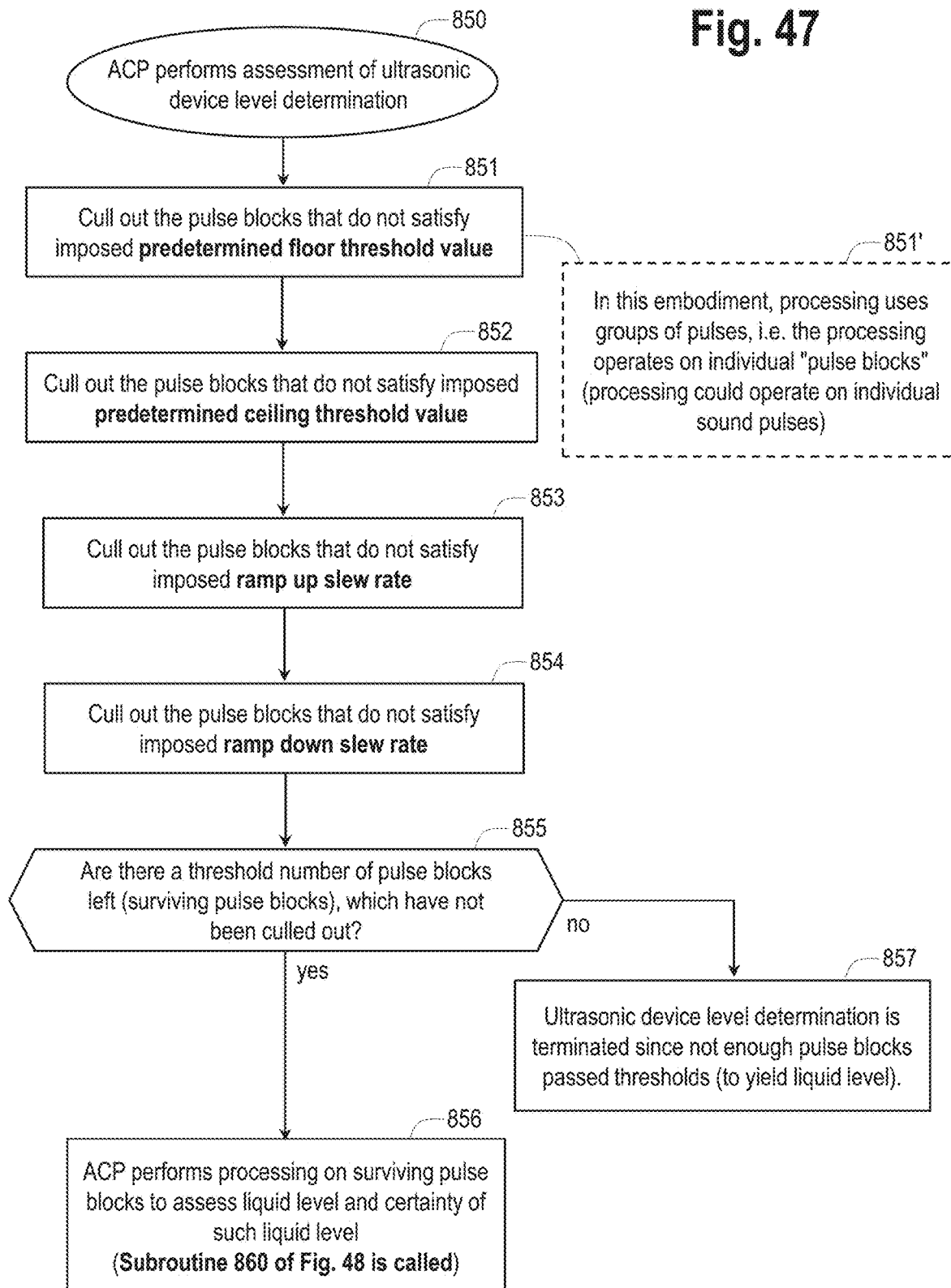
FIG. 47 is a flowchart showing details of ACP performs "assessment of ultrasonic device level determination" according to principles of the disclosure.

FIG. 47 is a flowchart showing details of ACP performs "assessment of ultrasonic device level determination" step 850, in accordance with at least one embodiment of the disclosure. The processing of FIG. 47 can employ various processing and use of pulse attributes as described above with reference to FIG. 46. As shown, the processing of step 47 starts in step 850. The process then passes onto step 851. In step 851, the ACP can "cull out", i.e. discard, the pulse blocks that do not satisfy the imposed predetermined floor threshold value. Accordingly, in this example, the processing is based on a pulse block, i.e. a collection of pulses in a pulse block. For example, the processing might be based on an average over the particular pulse block. Thus, in this example, a pulse block will stand or fall along with each of the pulses in such pulse block. In other words, as reflected at 851', in this embodiment, the processing uses groups of pulses. In other words, the processing operates on individual "pulse blocks". Alternatively, or in addition to, the processing described in FIG. 47 could be applied to pulses on an individual basis. The processing described in FIG. 47 could be applied to pulses over some discrete time window or range independent of the generated pulse blocks.

With further reference to FIG. 47 and step 851, pulse blocks that are culled out and disregarded can be tagged, i.e. associated with first metadata—whereas pulse blocks that do satisfy the criteria of step 851 can be tagged with second metadata so as to reflect disposition of the pulse blocks. Then, the process passes to FIG. 852.

In step 852, the process culls out, i.e. separates out and disregards, pulse blocks that do not satisfy an imposed predetermined ceiling threshold value. Such pulse blocks that do not satisfy the criteria of step 852 can be tagged with third metadata and pulse blocks that do satisfy the criteria of step 852 can be tagged with fourth metadata.

Then, in step 853, the process culls out, i.e. separates out and disregards, pulse blocks that do not satisfy an imposed ramp up slew rate. Such pulse blocks that do not satisfy the criteria of step 853 can be tagged with 5th metadata and pulse blocks that do satisfy the criteria of step 852 can be tagged with 6th metadata.

Then, in step 854, the process culls out, i.e. separates out and disregards, pulse blocks that do not satisfy an imposed ramp up slew rate. Such pulse blocks that do not satisfy the criteria of step 853 can be tagged with 7th metadata and pulse blocks that do satisfy the criteria of step 852 can be tagged with 8th metadata. Then, the process passes to step 855.

In step 855, the ACP determines if there are a threshold number of blocks left, i.e. surviving blocks that have been not been culled out. The threshold number of blocks can be determined based on a number deemed to provide reasonably reliable results. For example, according to principles of the disclosure, if 50% of the pulse blocks are found to be surviving in the determination of step 855, then a yes is rendered in step 855. In the case that a yes is rendered in step 855, then the process passes onto step 856. In step 856, the ACP performs processing on the surviving pulse blocks to assess liquid level in the bottle. The processing can also include a determination of a certainty of a rendered liquid level. The processing of step 856 can be performed in subroutine 860 of FIG. 48, in accordance with at least some embodiments of the disclosure.

Alternatively, a no may be rendered in the processing of step 855 in FIG. 47. As a result, the process passes to step 857. In step 857, the ultrasonic device level determination is terminated and the processing is terminated—since an insufficient number of pulse blocks passed the thresholds or other criteria of steps 851, 852, 853, 854.

Figure 48:
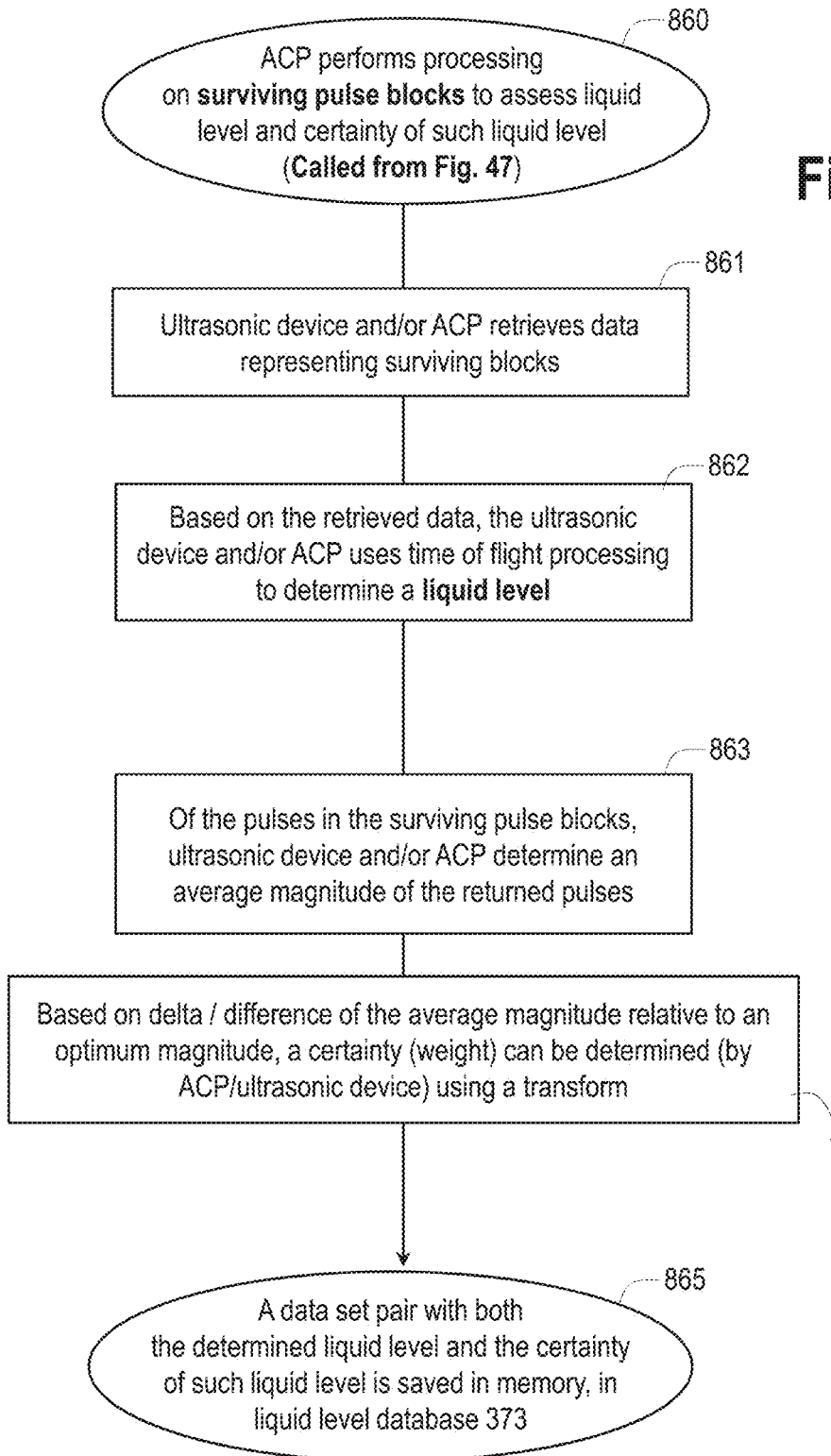
FIG. 48 is a flowchart showing details of the ACP "performs processing on surviving pulse blocks to assess liquid level and certainty of such liquid level" subroutine 860 as called from FIG. 47, according to principles of the disclosure.

FIG. 48 is a flowchart showing details of the ACP "performs processing on surviving pulse blocks to assess liquid level and certainty of such liquid level" subroutine 860 as called from FIG. 47. As shown, the process starts in step 860 and passes onto step 861. In step 861, the ultrasonic device and/or the ACP retrieves data representing the surviving blocks, which were determined in the processing of FIG. 47. That is, the processing of FIG. 48 can be performed by the ultrasonic device and/or the ACP. After step 861, the process passes onto step 862.

In step 862, based on the retrieved data, the ultrasonic device and/or ACP uses time of flight processing to determine a liquid level. For example, the ultrasonic device and/or the ACP determines an average time, for the pulses in the surviving pulse blocks, for the pulses to be returned to echoed back to the ultrasonic device. Then, the process passes to step 864.

In step 864, the ACP determines a certainty of the liquid level that was determined in step 863. In accordance with at least some embodiments of the disclosure, the ACP determines a delta, i.e. a difference, of the average magnitude relative to an optimum magnitude, i.e. a predetermined magnitude. Such predetermined magnitude is the magnitude that the returned or echoed pulses are expected to possesses. As described above with reference to FIG. 46, as the difference (of the average magnitude of the observed pulses (in the surviving pulse blocks) vis-à-vis an expected magnitude) increases—such corresponds to decreased certainty. That is, as the difference or magnitude increases such can be deemed to correspond or correlate to a decreased certainty associated with a liquid level (obtained from the pulses in the surviving pulse blocks). For example, an observed average magnitude that corresponds very closely with the expected magnitude can be correlated with high certainty. For example, an observed average magnitude that corresponds very poorly with the expected magnitude can be correlated with low certainty. In accordance with at least some embodiments of the disclosure, a delta value (for example, the difference between the observed average value vis-à-vis the expected magnitude in the returned pulses) can be processed by the ACP using a transform so as to render a certainty or weight value.

After step 864, the process passes to step 865. In step 865, a data set pair with both the determined liquid level and the certainty of such liquid level is saved in memory. For example, such data can be saved in liquid level database 373.

FIG. 49 is a flow chart showing processing details of "ACP inputs liquid level data from element and performs processing based on the input liquid level data" in accordance with at least some embodiments of the disclosure. In the illustrative example of FIG. 49, the liquid level data, which is input, is data relating to a current angle or angle value of the bottle. The element from which the liquid level data is input, in this example, is an accelerometer device.

As shown, the process starts in step 870 and passes onto step 871. In step 871, the ACP retrieves a current angle value from a database of the system. For example, the current angle value may have been saved as a predetermined variable value Observed_angle. For example, such variable can have the value of 62°. The value can reflect that an observed angle of the bottle has been identified as 62° off vertical. Such determination may be based on an observation that during an observed tilt of the bottle, 62° was the greatest tilt during a particular observed time window, e.g. 4 seconds. The current angle value can be determined using the processing of subroutine 900 as described with reference to FIG. 51 (as reflected at tag 871" of FIG. 49). As reflected at 871', the angle of the bottle or beverage apparatus can be measured from vertical. Accordingly, with such measuring arrangement, a 0° angle can be correlated to a full bottle, i.e. 0° angle can be "mapped" to a full bottle.

After step 871, the process passes onto step 872. In step 872, the ACP, based on an Observed_angle value, checks for a match to a Degrees_range data field 4912 in a lookup table or array 4900. The checking for a match can be performed so as to identify a matching record 4910 in the lookup table 4900. More specifically, the ACP can determine if the particular Observed_angle value "falls within" one of a plurality of ranges or windows of values that are defined in the lookup table 4900. The lookup table 4900 can be in the form of an array. After step 872, the process passes onto step 873.

In step 873, the ACP, based on the observed_angle, identifies a matching record in the lookup table 4900. In this example, the record 4910 that was "mapped to" or "matched to" is data record number DR106. Then, the processing passes onto step 874. In step 874, the ACP performs processing based on the identified matching record. This further processing can be performed by subroutine 880 of FIG. 50. Further details are described below.

With further reference to FIG. 49, the lookup table or array 4900 can include a plurality of data records 4910. Each of the data records 4910 can include a data record field 4911, a tilt angle range of bottle (degrees_range) field 4912, a volume of bottle (%) field 4913, a volume in bottle milliliters (mL) field 4914; and a base dispense (mL) field 4915.

The data record field 4911 can provide a respective reference anchor of the data record. Such reference anchor can be used for various processing by the ACP and by other processing components. For example, a liquid level that is observed (i.e. current liquid level) can be mapped to a particular data record, e.g. the data record DR106. The particular data record can then be referenced in processing. For example, the data record number, e.g. DR106, can be output to a user device. The user device 106 can also have access to the lookup table 4900. Thus, the user device 106, based on the data record number received from the ACP of the beverage apparatus, can identify the current liquid level that has been determined by the ACP. Such current level can then be used in processing performed by the user device 106—such as the user device displaying a GUI that depicts liquid level.

In the lookup table or array 4900, the tilt angle range of bottle (degrees range) field 4912 can define a range or window of values of the particular data record. Thus, for example, an observed tilt angle that is greater or equal to 56° and less than 70° will be mapped to the data record DR106.

The volume of bottle (%) field 4913 can be a liquid percentage value. In other words, the field 4913 is a percentage of a full bottle that corresponds to a particular tilt angle in field 4912. Thus, if the bottle is tilted 128° and mapped to data record 111, the ACP can determine that the volume of liquid in the bottle, of a maximum volume of the bottle, is 10% volume.

The volume in bottle milliliters (mL) field 4914 is a value in mL that corresponds to a particular tilt angle in field 4912. It should be appreciated that any suitable units can be used and the disclosure is not limited to the particular units described herein. Thus, if the bottle is tilted 128° and mapped to data record 111, the ACP can determine that the volume of liquid in the bottle, of a maximum volume of the bottle, is 50 mL.

Each of the data records 4910 can be assigned a data record number. In the illustrative example, the data record numbers can run from DR101 to DR113. More or less data records can be provided, as may be desired, in coding the lookup table or array 4900. It may be desired to provide finer or courser gradations as compared with the predations illustrated in FIG. 49. For example, instead of 13 data records the array 4900 could include 26 data records. Such arrangement could provide finer "resolution" as compared to the resolution illustrated in FIG. 49.

Figure 50:
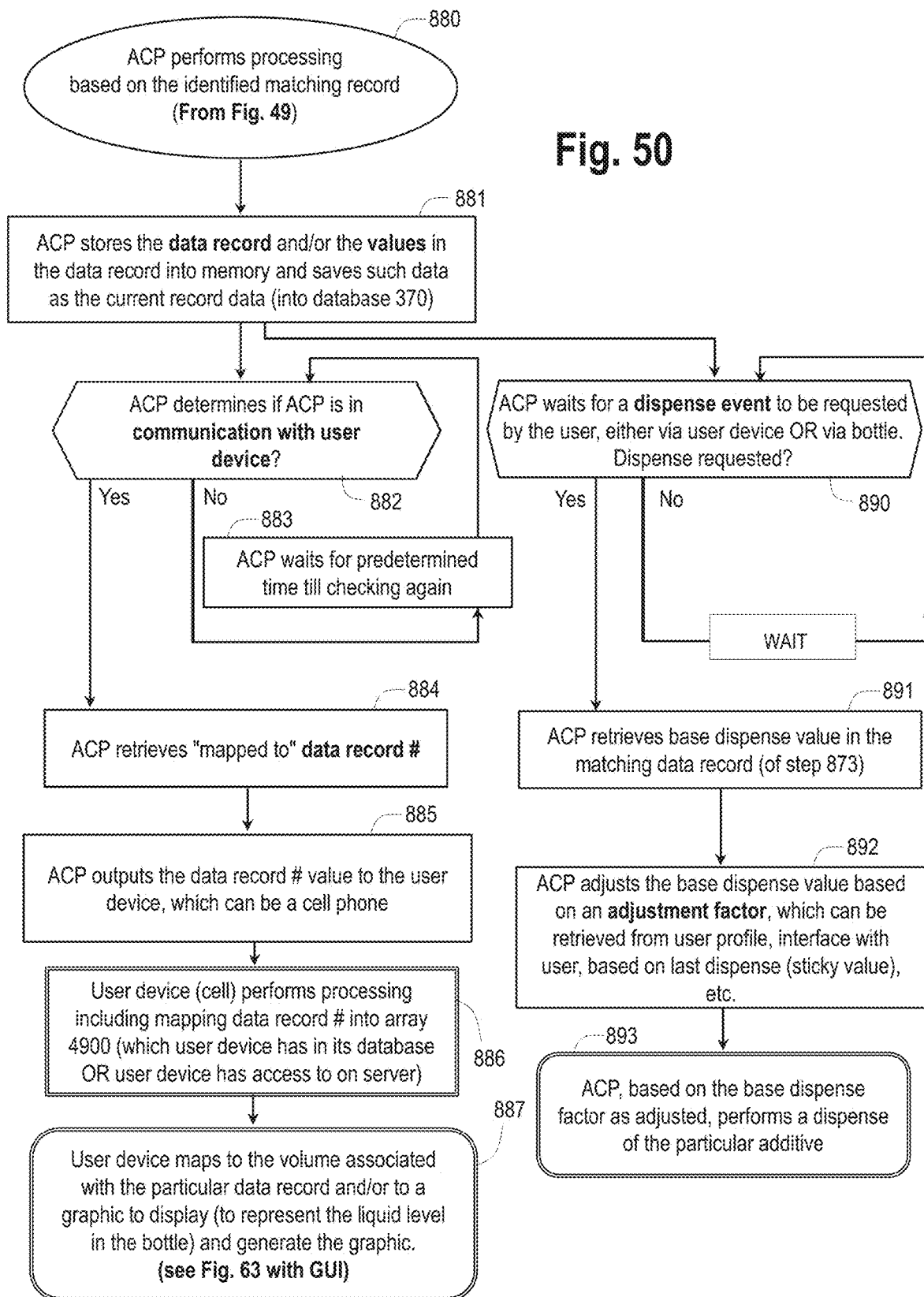
FIG. 50 is a flowchart showing details of "ACP performs processing based on identified matching record" subroutine 880, according to principles of the disclosure.

FIG. 50 is a flowchart showing details of "ACP performs processing based on the identified matching record" subroutine 880 of FIG. 49. As shown, the process starts in step 880 and passes onto step 881. In step 881, the ACP stores the data record and/or the values in the data record into memory and saves such data as the current record data (into database 370). For example, the data can be stored into the apparatus database portion or database 370. After step 800, process can pass onto step 882 and step 890. The processing of such steps 882 and 890 can be performed in parallel to each other. The processing performed in step 882 relates to the bottle interfacing with a user device.

The processing performed in step 890 relates to a dispense event.

In step 882 of FIG. 50, the ACP determines if the ACP is in communication with the user device. For example, the user device might be cell phone or smart phone. If no, then the process passes onto step 883. In step 883, ACP waits for a predetermined time until checking again if the ACP is in communication with the user device. The predetermined time can be a set time, such as 4 PM. The predetermined time can be some periodicity or magnitude of time, such as every five minutes. After waiting a predetermined time, the processing passes again to step 882.

Processing then continues as described above.

If a yes is rendered in step 882, then the process passes to step 884 in step 884, the ACP retrieves the "mapped to" data record number. That is, as described above, a particular angle of the bottle can be identified. The observed angle can then be mapped into the array 4900. A data record number can be identified as corresponding or matching to the particular angle of the bottle. In the example above, the data record number is DR106. Accordingly, the DR106 value can be retrieved from memory. Then, in step 885, the ACP outputs the data record number value, in this example DR106, to the user device. For example, the user device can be a cell phone. Then, the process passes onto step 886.

In step 886, the user device performs processing that includes mapping the data record number into the array 4900 of FIG. 49, i.e. the user device identifies a data record in the array 4900 based on the data record number 4911. The user device can also have the array 4900 stored in memory. The user device can have access to the array 4900 in a situation that the array 4900 is stored on a server and/or stored in a database of the bottle. After step 886, the process passes to step 887.

Figure 63:
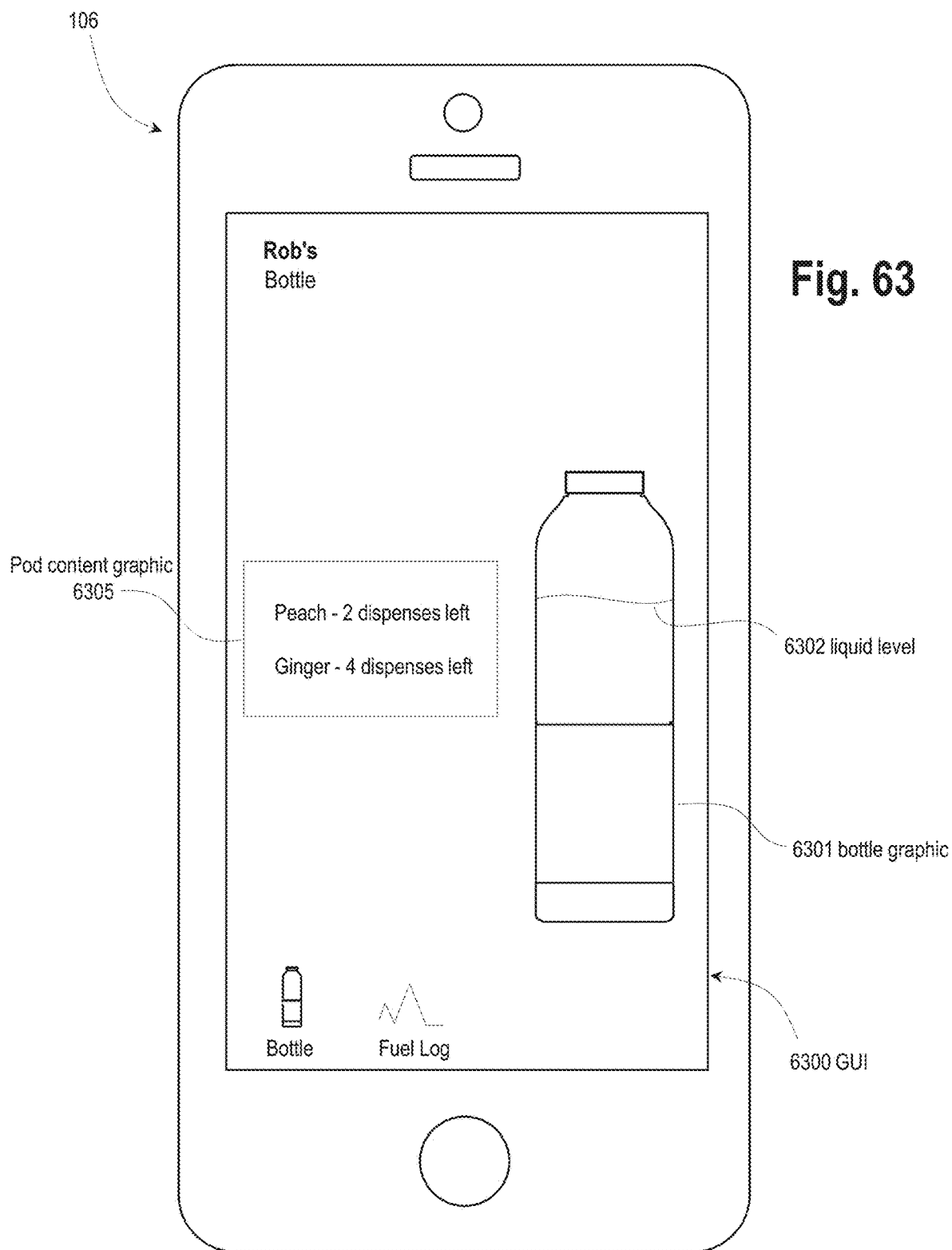
FIG. 63 is a schematic diagram of a user device with graphical user interface (GUI) according to principles of the disclosure.

In step 887, the user device maps to the liquid volume associated with the particular data record. Based on the liquid volume, the user device can display a graphic, such as shown in FIG. 63. The particular graphic that the user device displays can be a component of the array 4900. For example, each data record of the array 4900 can include a graphic number which tells the user device which graphic to display. Accordingly, the processing can include the user device identifying the particular data record based on the data record number—and the user device then identifying the graphic number from the identified data record. In such processing, the bottle volume (of liquid) never need be rendered, either in the ACP or in the user device. Rather, the observed angle can be mapped directly to a data record number, the data record number be communicated to the user device, and the user device then displays a particular graphic based on the data record number.

In parallel to the processing performed by steps 882-887, the processing of steps 890-893 can be performed by the ACP 360 of the bottle 300.

In step 890, the ACP waits for a dispense event to be requested by the user. The dispense event can be requested either by the user directly interfacing with the interface 310 of the bottle 300 or by the user interfacing with a user device GUI (in the situation that the user device is in communication with the bottle 300). Such communication can be provided by the user device being paired with the bottle 300 such as via a Bluetooth communication, for example.

If a dispense has not been requested (such that a no is rendered in step 890), then the ACP continues to wait as reflected in FIG. 50.

If a dispense has been requested, i.e. yes in step 890, the process passes onto step 891. In step 891, the ACP retrieves the base dispense value 4915 of the matching data record, which was identified in step 873 of FIG. 49. Then, the process passes onto step 892.

In step 892, the ACP adjusts the base dispense value based on an adjustment factor. The adjustment factor can be retrieved from the user profile. The adjustment factor can be retrieved or determined from interface with the user.

The adjustment factor can be based on a prior or last adjustment factor applied by the ACP 360. Such use of the last adjustment factor applied to a dispense event can be referred to as "sticky" processing in that the ACP "sticks" to the last adjustment factor utilized. Then, the process passes onto step 893.

In step 893, the ACP performs a dispense of the particular additive that was selected by the user. The dispense amount can be based on the base dispense value 4915, which was identified from the observed angle of the bottle being mapped into the array 4900, and the adjustment factor that was input in step 892. It should be appreciated that in the dispense related processing of steps 890-893, the actual liquid volume in the bottle 300 also need not be identified. Rather, the processing can input the observed angle of the bottle, map the observed angle into a particular data record in the array 4900, and determine a base dispense 4915 that is associated with the particular data record.

Figure 51:
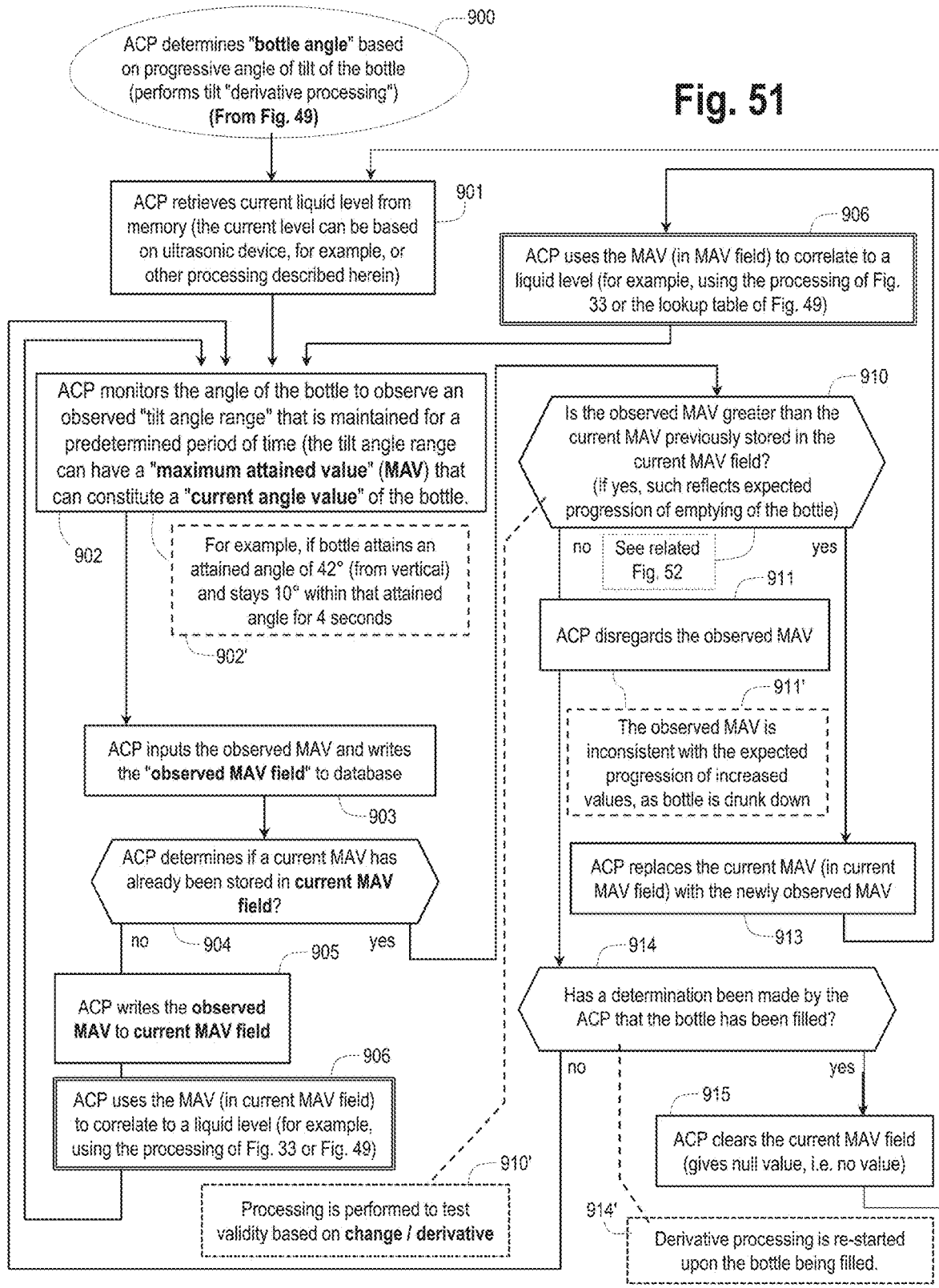
FIG. 51 is a flowchart showing the ACP determines "bottle angle" based on progressive angle of tilt of the bottle subroutine 900, according to principles of the disclosure.

FIG. 51 is a flowchart showing the ACP determines "bottle angle" based on progressive angle of tilt of the bottle subroutine 900, according to principles of the disclosure. Such processing can include tilt "derivative processing" as described below. The subroutine 900 can be called or invoked from the processing of FIG. 49 is described above.

The process of FIG. 51 starts in step 900 and passes to step 901. In step 901, the ACP retrieves a current liquid level from memory. The current liquid level can be based on input from an ultrasonic device, for example, or other processing described herein. After step 901, the process passes onto step 902. In step 902, the ACP monitors the angle of the bottle to observe an observed "tilt angle range" that is maintained for a predetermined period of time.

The tilt angle range can have a "maximum attained value" (MAV) that can constitute a "current angle value" of the bottle. For example, as reflected at 902', the bottle may be observed to attain (i.e. be tilted) an attained angle of 42° (from vertical) and stay 10° within that attained angle for 4 seconds. Based on such observation, the 42° can be deemed the MAV. Other criteria or constraints can be imposed on such processing performed by the ACP. For example, a constraint may be imposed that such observation must be accompanied with a tilt of the bottle that is indicative of the user taking a drink from the bottle.

After step 902, the processes passes onto step 903. In step 903, ACP inputs the observed MAV and writes such value to the "observed MAV field" in a data record. The data record can be in a database associated with the ACP, such as into the bottle status database portion 374 (in apparatus database portion 370). Then, in step 904, the ACP determines if a current MAV has already been stored in a current MAV field in the database. If a no is rendered in step 904, then there is no prior MAV that can be used to compare the newly input MAV against, i.e. so as to assess the validity of the newly input MAV. Accordingly, the process passes to step 905. In step 905, the ACP writes the observed MAV to a "current MAV field", which can be in the database portion 374. Then, the process passes to step 906.

In step 906, the ACP uses the MAV (in the current MAV field) to correlate to, or determine, a liquid level of the bottle. For example, the ACP can determine the liquid level of the bottle using the processing of FIG. 33 and/or FIG. 49. The liquid level can then be available, in the database so as to be used in various processing as described herein.

After step 906, the processing passes back to step 902 in FIG. 51. Processing then continues with the processing of step 902 as described above, i.e. with further monitoring so as to determine a further MAV.

On the other hand, it may be the case in step 904 (of FIG. 51) that a current MAV has already been stored in current MAV field, i.e. yes in step 904. If a yes is determined in step 904, the process passes from step 904 onto step 910—so as to assess validity of the newly input MAV. More specifically, as reflected at 910" processing can be performed so as to test validity of the newly input MAV based on (a) variance of the newly input MAV vis-à-vis one or more previously input MAVs and/or (b) a derivative of the MAVs previously input. The derivative of the MAVs previously input can include a determination of whether a newly input MAV is consistent with previously input MAVs, i.e. whether the newly input MAV is consistent with a trajectory, or rate of change, of previously input MAVs. Further details are described below.

Figure 52:
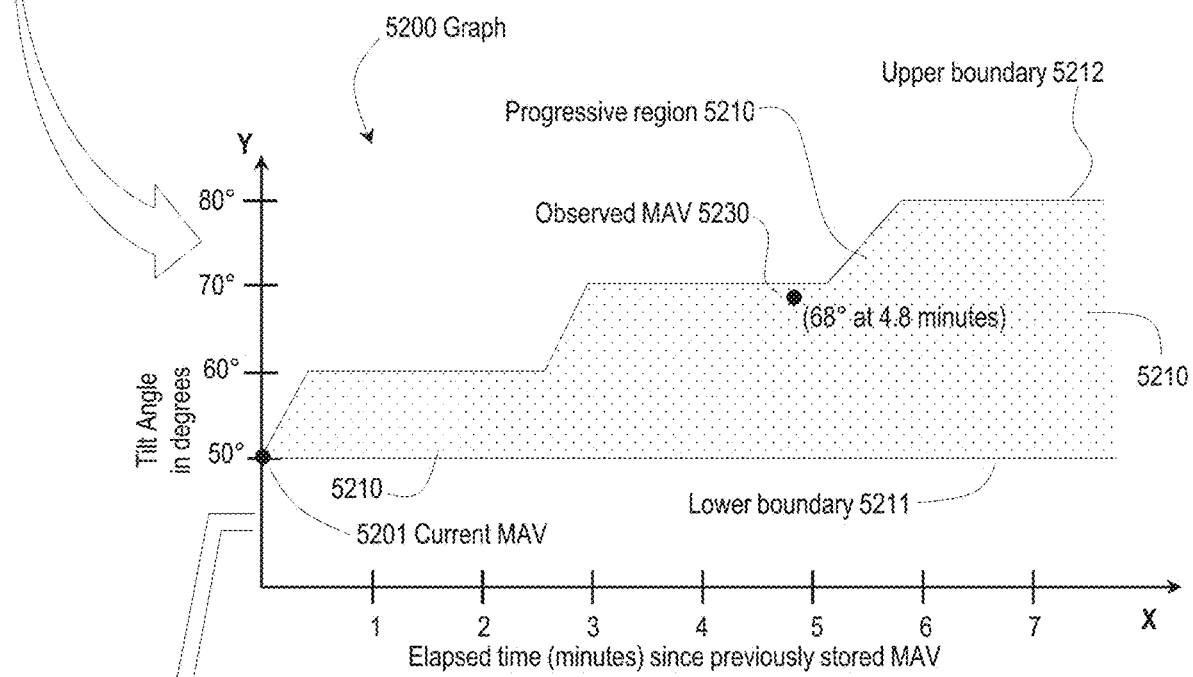
FIG. 52 is a diagram showing aspects of derivative processing, according to principles of the disclosure.

In step 910, the ACP determines: is the observed MAV greater than the current MAV previously stored in the current MAV field. If yes in step 910, such reflects expected progression of emptying of the bottle. Accordingly, if yes in step 910, in this embodiment, the process passes onto step 913. That is, in this embodiment, for the ACP to validate the MAV, all that is required can be for the MAV to be less than prior determined MAVs. In other embodiments, further requirements can be imposed for validation. FIG. 52, described below, is illustrative of a different embodiment in which further requirements can be imposed for validation of an observed MAV.

If no in step 910, then the process passes onto step 911. In step 911, the ACP disregards the observed MAV since the observed MAV is inconsistent with the expected progression of the increased values of the angle of tilt, as the bottle is drunk down. Such increased values of the angle of tilt can correspond to the volume of liquid in the bottle decreasing. After step 911, the process passes to step 914.

In step 914, the ACP determines whether the ACP has observed or sensed that the bottle has been filled. For example, such observation can be performed by the ultrasonic device, as otherwise described herein. If a no is rendered in step 914, then the processes passes to step 902. In step 902, processing is then performed as described above.

On the other hand, if a yes is rendered in step 914, then the process passes to step 915. In step 915, the ACP clears the current MAV field, i.e. the ACP gives the current MAV field a null value or no value. Accordingly, as reflected at 914', such clearing of the current MAV field effectively "restarts" what can be referred to as "derivative processing" of FIG. 51. Such restart can be reflected by virtue that—in the determination of step 904—a MAV will not be found to be stored in the current MAV field. To explain further, "derivative processing" aspects of FIG. 51 can relate to the expected change of values as a bottle is drunk down. Thus, in the case that the bottle is refilled, the rate of change of the bottle is obsolete, and thus the derivative processing can be restarted.

On the other hand, the ACP may determine in step 910 that the observed MAV is greater than the current MAV previously stored in the current MAV field. Such observation reflects expected progression of emptying of the bottle—and a yes is rendered in the determination of step 910. Thus, such yes determination reflects that the newly input MAV has been validated. Accordingly, the process passes onto step 913.

In step 913, the ACP replaces the current MAV (in the current MAV field) with the newly observed MAV. Then, the processes passes from step 913, as shown in FIG. 51, to step 906. In step 906, the ACP uses the MAV (in the current MAV field) to correlate or map to a liquid level. For example, such correlation or mapping can be performed using the processing of FIG. 33 or the lookup table of FIG. 49). The processing of step 906 can be the same as or similar to the processing of step 906 as shown in FIG. 51.

After step 906, the process passes to step 902. In step 902, processing continues as described above.

FIG. 52 is a diagram showing aspects of derivative processing, in accordance with at least some embodiments of the disclosure. The processing of FIG. 52 includes step 910'. Step 910' can be invoked or used in the processing of FIG. 51 instead of step 910 in FIG. 51. Thus, as shown in FIG. 52, processing that is performed by the ACP can pass from step 904 of FIG. 51 to step 910'. Similar to step 910, if a no is rendered in step 910', the processing can pass onto step 911. Similar to step 910, if a yes is rendered in step 910', the processing can pass onto step 913 of FIG. 51.

As described above, in step 910 of FIG. 51, the ACP determines whether an observed MAV is greater than the current MAV. If the observed MAV is greater, such reflects expected progression of values, i.e., since the user is tilting her bottle a greater degree—as she drinks down the liquid in her bottle. Thus, in such embodiment, if the MAV is greater, then the ACP validates the observed MAV.

In contrast to the processing of step 910 in FIG. 51, in step 910' in FIG. 52, the ACP determines whether an observed MAV is within a predetermined progressive region relative to the current MAV and/or prior MAVs. The current MAV can be stored in the current MAV field. As illustrated in FIG. 52, a graph 5200 can be used to depict a progressive region 5210. The graph 5200 can include X and Y axes. The X-axis can be elapsed time since a previously stored MAV, i.e. the elapsed time since a MAV was last stored in the database. The elapsed time can be in minutes, seconds, or other suitable time period. The Y-axis can be an angle value of tilt of the bottle. The angle value can be in degrees. As shown in FIG. 52, the illustrated angle value is 50° to 80°, and the illustrated elapsed time is 0 minutes to 8 minutes. It should be appreciated that at different stages or phases of drinking the bottle down, the angle values and the elapsed time may vary.

As shown in FIG. 52, a current MAV value 5201 can be plotted on the graph 5200. As illustrated, the current MAV value 5201 can represent a tilt angle value of 50° and a zero elapsed time. The zero elapsed time can be by design, i.e., since by definition the elapsed time can be the amount of time since the current MAV 5201. As shown, an observed MAV 5230 can also be plotted on a graph 5200. The observed MAV 5230 illustratively possesses the value of 68° tilt angle value as observed at 4.8 minutes. Such observed MAV is illustratively shown to indeed be in the progressive region 5210. As a result, a yes will be rendered in step 910'. Illustratively, if the tilt angle value was slightly greater, such as 75°, at the 4.8 minutes mark—then the observed MAV 5230 would not have been within the progressive region 5210—and accordingly, the processing of step 910' would have rendered a no.

The progressive region 5210 can be a variety of shapes so as to capture acceptable variance in the progression of tilt angle of the bottle. In other words, the progressive region 5210 depicts what the ACP will validate as an acceptable tilt angle. That is, if an observed MAV 5230 falls within the progressive region 5210, then such input MAV will be validated. On the other hand, if the observed MAV 5230 falls outside of the progressive region 5210, then the ACP will not validate such observed MAV. The reason for such non-validation is that the observed MAV varies too much from what is to be expected. Relatedly, the progressive region 5210 includes a lower boundary 5211. The lower boundary 5211 defines a lower limit of the progressive region 5210. The basis for such lower boundary 5211 is that a decrease in tilt angle is not expected and will not be validated. In other words, as a user drinks down a bottle in the normal course, the tilt angle that is required to take a sip from the bottle will increase. A decrease in tilt angle is suggestive of invalid data. For example, perhaps the user tilted the bottle for some other reason other than to take a sip from the bottle. Accordingly, the lower boundary 5211 reflects a constraint imposed by the ACP that an observed MAV that is less than the current MAV will not be validated. In other embodiments, the lower boundary 5211 might be slightly lower in value than tilt angle of the MAV.

The progressive region 5210 also includes an upper boundary 5212. As shown, the upper boundary 5212 is in the form of a step function or quasi step function. The particular shape of the upper boundary 5212 can be varied based on historical data of the user, preferences of the user, and other data. The upper boundary 5212 shows a step at approximately the 2.7 minute mark. Such can reflect an expected drink time of the user. Accordingly, the progressive region 5210 is expanded or stepped so as to reflect such expected drink time. Similarly, an expected drink time can be at the approximately 5.1 minute mark—and thus the upper boundary 5212 is stepped again so as to yet further expand the progressive region 5210.

As reflected at 5201, in this example of FIG. 52, tilt angle is based off of a vertical axis. In such arrangement, 0° corresponds to the bottle being upright and full. Thus, in the situation that a user takes a sip from a fully full bottle, the tilt angle will be small. For example, the tilt angle might be 5° off vertical. Such small tilt angle can correspond to an almost full bottle. Further, the processing of FIG. 52 can also utilize a critical tilt angle that is associated with the physicality of the bottle. Such critical tilt angle is described above. For example, the critical tilt angle might be 129°. In the processing, the critical tilt angle can correspond and be mapped to liquid in the bottle being fully depleted or empty, i.e., since all liquid will have flowed out of the bottle when positioned at the critical tilt angle. It should of course be appreciated that critical tilt angle may well vary between bottles. Thus, the ACP can be programmed or coded based on a drinking angle range of 0° to 129°, for a particular bottle.

As reflected at 5202, the processing relating to FIG. 52 and graph 5200 could use other related variables instead of the MAV. For example, instead of utilizing the MAV, the processing could utilize a volume level and/or a liquid level (such values affording correlation or correspondence to the MAV). In such processing, the ACP can convert the MAV into a liquid level. Such converting can be performed by a lookup table, for example. Such liquid level, based on an observed MAV, can thus constitute an observed liquid level. Such observed liquid level can then be compared with a current liquid level. Thus, the progressive region 5210 can be based on liquid level, rather than tilt angle/MAV of the bottle. It should of course be appreciated that other variables can be utilized that can be correlated to the MAV.

Figure 53:
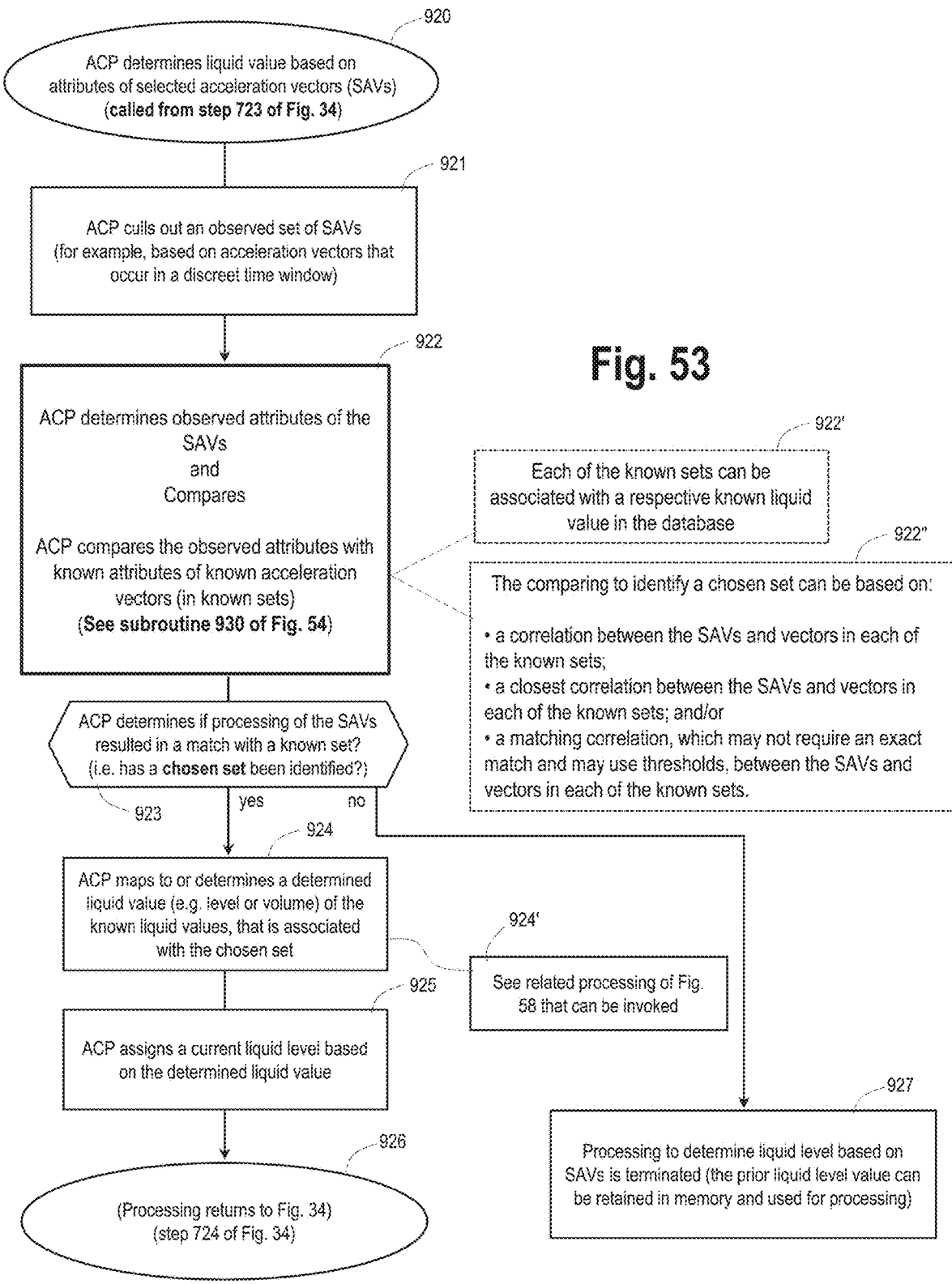
FIG. 53 illustrates processing, performed by the ACP, directed to the determination of a liquid value based on attributes of acceleration vectors, according to principles of the disclosure.

FIG. 53 illustrates processing, performed by the ACP, directed to the determination of a liquid value based on attributes of acceleration vectors. Such liquid value can be or correspond to a liquid level or a liquid volume, for example. More specifically, as illustrated in step 920, in the processing of FIG. 53 the ACP determines liquid value based on attributes of "selected acceleration vectors" (SAVs). The process of FIG. 53 can be called or invoked in a predetermined manner. For example, if the ACP detects that the user has requested a dispense, through interaction with the ACP, then the processing of FIG. 53 can be invoked. For example, the processing of FIG. 53 can be invoked from step 723 illustrated in FIG. 34. Other level sensing determinations can also be invoked in parallel to the processing of FIG. 53.

In accordance with at least one embodiment of the disclosure, the processing of FIG. 53 can use data output from an accelerometer. Such accelerometer can output acceleration data that can be in the form of acceleration vectors. As described in detail below, the ACP can process such acceleration data, including acceleration vectors, so as to assess mass of the bottle with liquid contained therein. As described herein, mass of the additive vessels or pods can be taken into account in such processing.

As shown, the process of FIG. 53 starts in or is initiated in step 920 and passes onto step 921. In step 921, the ACP selects out or culls out an observed set of SAVs. For example, the SAVs that are selected out can include acceleration vectors that occur in a discrete time window. A trigger can be used so as to initiate the time window.

For example, the trigger might be a tilt of the bottle that indicates movement of the bottle. For example, the trigger might be in the form of a predetermined level of acceleration being detected by the accelerometer. Other triggers can be utilized. For example, the discrete time window can be one or two seconds.

After step 921, the process passes onto step 922. In step 922, the ACP determines observed attributes of the SAVs.

Step 922 can also include the comparison of observed attributes of the SAVs vis-à-vis known attributes of known acceleration vectors (in known sets). In other words, the newly observed acceleration vectors that are under consideration can collectively be referred to as SAVs. The ACP can determine attributes of the SAVs. Such attributes can then be determined with known attributes of known acceleration vectors. The known acceleration vectors can be mapped to or associated with respective liquid values, liquid levels, or liquid volumes—as reflected at 922' of FIG. 53. The ACP can call upon or invoke subroutine 930 of FIG. 54 so as to perform the processing of step 922.

After step 922, the process passes onto step 923. In step 923, the ACP determines if processing of the SAVs, in step 922, resulted in a match with known acceleration vectors in known sets of acceleration vectors. If indeed a match is determined (with a known set), the known set that matched can be referred to as a "chosen set".

If a no is rendered in step 923, then the process passes onto step 927. In step 927, since no match of the SAVs vis-à-vis known attributes of known acceleration vectors was attained, processing to determine a liquid level based on the SAVs is terminated. In other words, no "chosen set" can be determined. In such situation, a prior liquid level value can be retained in memory in use for processing. Additionally, it may be the case that liquid level in the bottle can be determined from other processing or inputs, such as utilizing an ultrasonic device.

On the other hand, a yes can be determined in the processing of step 923. Such yes determination indicates that processing of the SAVs did indeed result in a match to known acceleration vectors in known sets. In other words, a "chosen set" was indeed determined. Upon a yes being rendered in step 923, the process passes onto step 924.

In step 924, the ACP maps to or determines a determined liquid value (which can be a liquid level or liquid volume), of the known liquid values, that is associated with the chosen set. Related processing is described below in further detail with reference to FIG. 58, as reflected at 924' in FIG. 53. The determined liquid level can also be described as a selected liquid level. After step 924, the process passes to step 925. In step 925, the ACP assigns a current liquid level based on the liquid value, in this embodiment. In other words, step 925 reflects that a liquid value can be associated with or correspond to a liquid level. Then, processing passes to step 926. In step 926, the processing returns to FIG. 34. Specifically, the processing passes to step 724 of FIG. 34.

In the processing described above, selected acceleration vectors (SAVs) can be compared with known attributes of known acceleration vectors in known sets. In the processing, one of the known sets can be identified as matching with the SAVs. Such one of the known sets can thus be referred to as a "chosen set". Such processing has been referred to above as a "match". However, it should be appreciated that such comparing of SAVs to identify a chosen set is not limited to determining an exact "match". The comparing to identify a chosen set can be based on (a) a correlation between the SAVs and vectors in each of the known sets; (b) a closest correlation between the SAVs and vectors in each of the known sets; and/or (c) a matching correlation between the SAVs and vectors in each of the known sets. Other comparison mechanisms can be utilized. Accordingly, in this disclosure where a match or other comparison mechanism is specifically described, it should be appreciated that a "match" need not be an exact match and other comparison mechanisms can be used in lieu of such determination of a match.

In the case of processing utilizing a "closest correlation" (in the processing of step 923 of FIG. 53) it should be appreciated that a chosen set may always be determined. That is, whatever known set is closest, in its attributes, to the SAVs will be deemed the "chosen set". In such processing scenario, a no determination will never be rendered in the processing of step 923, in accord with at least some embodiments of the disclosure. Alternatively, in determination of a closest correlation, one or more thresholds can be used such that the correlation has to be sufficiently close.

Figure 54:
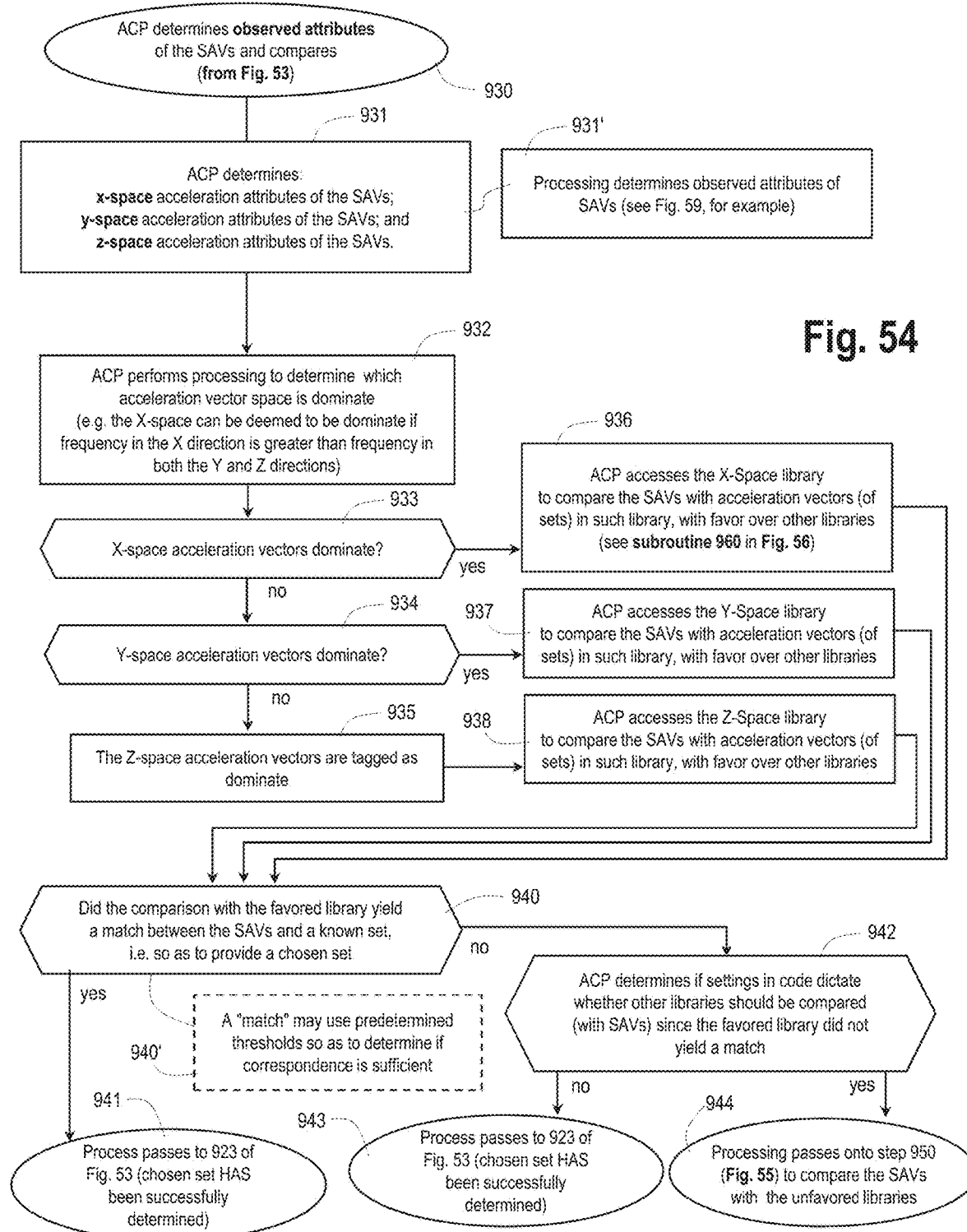
FIG. 54 is a flowchart showing processing details of the ACP determines observed attributes of the SAVs (selected acceleration vectors) and performs comparison processing, according to principles of the disclosure.

FIG. 54 is a flowchart showing in further detail the ACP determines observed attributes of the SAVs and compares, i.e. compares attributes of the SAVs vis-à-vis attributes of known sets of acceleration vectors. Such comparison is performed in an attempt to determine a chosen set of known vectors. In particular, the processing of FIG. 54 relates to determining acceleration attributes of the SAVs in XYZ space. Once attributes of the SAVs in XYZ space are determined, then various processing can be performed based on such attributes.

Figure 59:
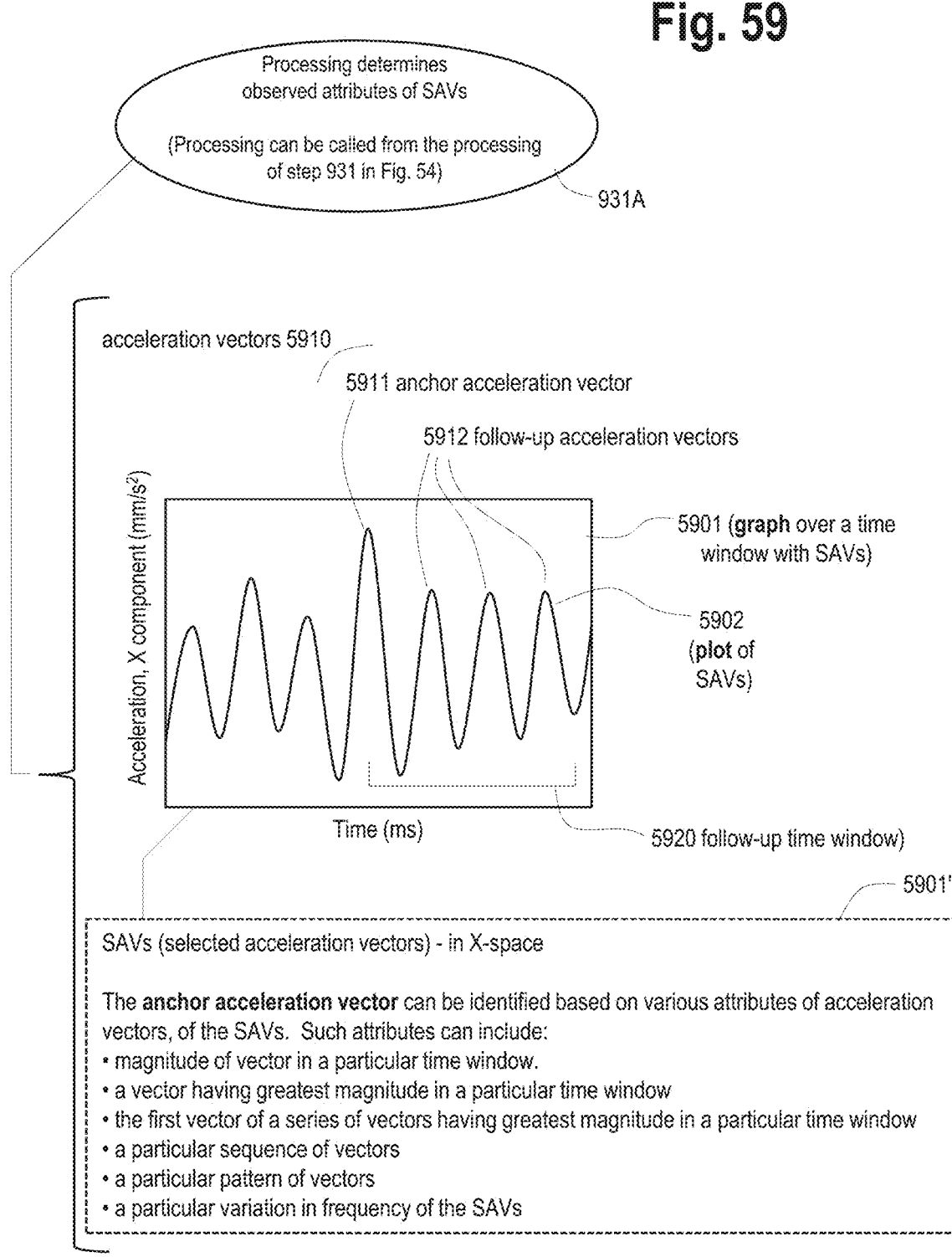
FIG. 59 is a diagram showing details of a "processing determines observed attributes of SAVs" step, according to principles of the disclosure.

As shown, the process starts in step 930 and passes onto step 931. In step 931, the ACP determines x-space acceleration attributes of the SAVs; y-space acceleration attributes of the SAVs; and z-space acceleration attributes of the SAVs. Accordingly, as reflected at 931', the processing of step 931 determines observed attributes of the SAVs. Such observed attributes can include one or more of a variety of attributes of the SAVs. Such observed attributes can include frequency, amplitude or magnitude, patterns, variance in magnitudes, variance in magnitudes in a particular pattern, change in pattern, and/or other attributes. For example, FIG. 59 illustrates that determination of an observed attribute can include the determination of an anchor acceleration vector. Additionally, such described attributes can be separated out or broken down into XYZ space or coordinate components. For example, it may be observed that frequency in the X direction is minimal, whereas frequency in the Z direction is substantial.

After step 931 of FIG. 54, the process passes onto step 932. In step 932, in the illustrative processing of FIG. 54, the ACP performs processing to determine which acceleration vector space is dominant. For example, the X-space can be deemed to be dominant if frequency in the X direction is greater than frequency in both the Y and Z directions.

Frequency in the X direction being greater than frequency in both the Y and Z directions can be determined based on: more acceleration vectors being dominate in the X-coordinate direction—than in any other coordinate direction.

Frequency in the Y direction being greater than frequency in both the X and Z directions can be determined based on: more acceleration vectors being dominate in the Y-coordinate direction—than in any other coordinate direction.

Frequency in the Z direction being greater than frequency in both the X and Y directions can be determined based on: more acceleration vectors being dominate in the Z-coordinate direction—than in any other coordinate direction.

After step 932, the process passes onto step 933. In step 933, the ACP determines if the X-space acceleration vectors were determined (in step 932) to be dominant. If yes, then the process passes onto step 936.

In step 936, the ACP accesses an X-Space library to compare the SAVs with acceleration vectors (of sets) in such X-Space library, with favor over other libraries. That is, the "with favor over other libraries" can include that the other libraries are simply not accessed for comparison. In such processing scenario, if the X-Space library does not render a match or correlation, then the processing may be terminated with no chosen set being determined. In other arrangements, the "with favor over other libraries" can include the SAVs being compared with the dominant library first, and then if no match is found in the dominant library, then the ACP proceeds to the other libraries so as to attempt to find a match to the SAVs.

Figure 56:
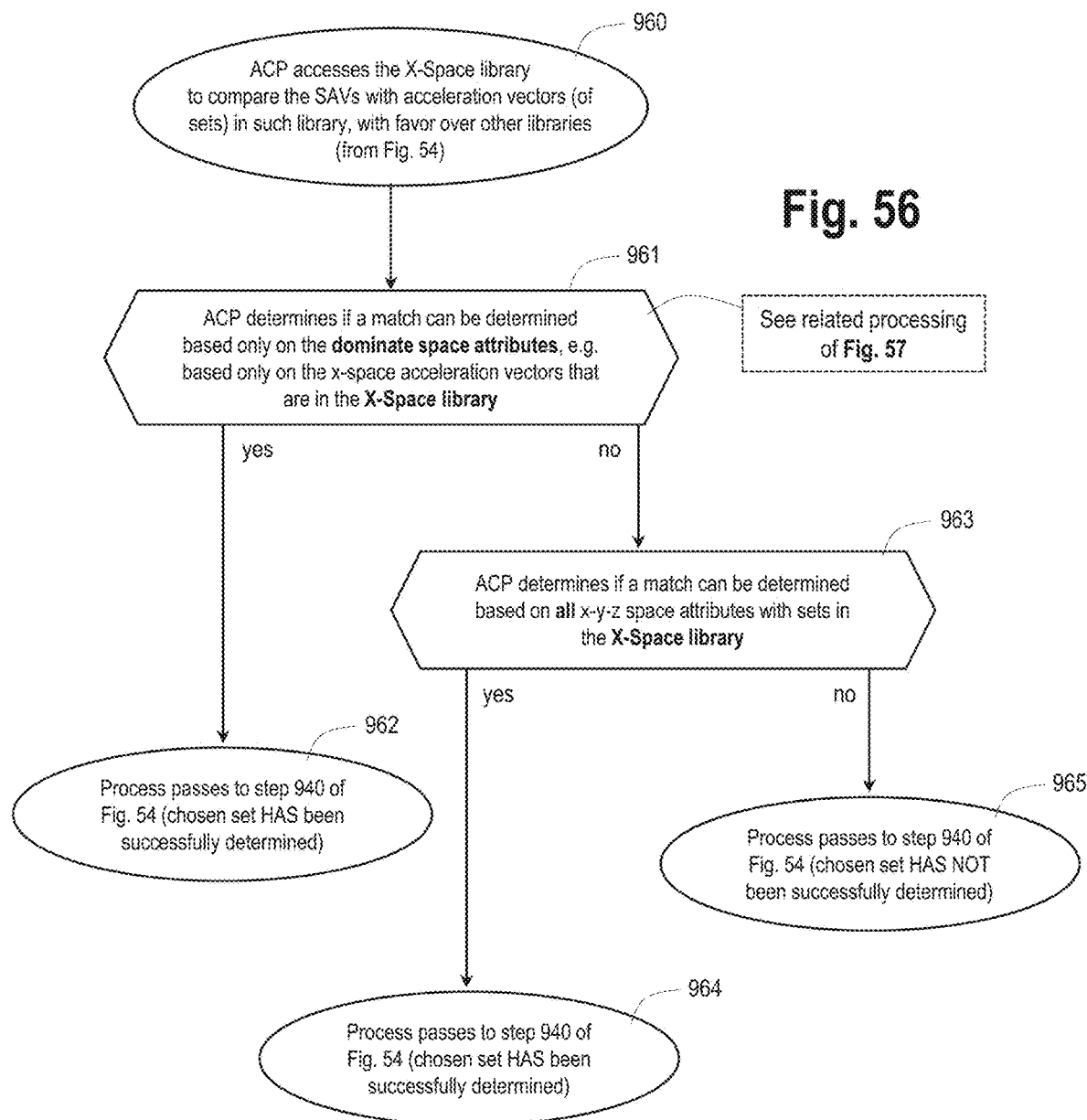
FIG. 56 is a flowchart showing in further detail the "ACP accesses the X-Space library to compare the SAVs with acceleration vectors (of sets) in such library, with favor over other libraries" subroutine 960 of FIG. 54, according to principles of the disclosure.

In the processing of step 936 of FIG. 54, the ACP can call upon or invoke subroutine 960 as illustrated in FIG. 56.

After step 936 of FIG. 54, the process passes onto step 940. Further details of the processing of step 940 are described below.

On the other hand, it may be determined in step 933 that the X-space acceleration vectors are not dominant. Accordingly, a no will be rendered in step 933—and the process will pass to step 934. In step 934, the ACP determines if Y-space acceleration vectors are dominant. If yes, then the process passes onto step 937. In step 937, the ACP accesses the Y-Space library to compare the SAVs with acceleration vectors (of sets) in such library, with favor over other libraries. After step 937, the process passes onto step 940.

On the other hand, it may be determined in step 934 that the Y-space acceleration vectors are not dominant. Accordingly, a no will be rendered in step 934—and the process will pass to step 935. In step 935, the ACP tags the Z-space acceleration vectors as dominant. Then in step 938, the ACP accesses the Z-Space library to compare the SAVs with acceleration vectors (of sets) in such Z-Space library, with favor over other libraries. After step 938, the process passes onto step 940.

The decisioning of step 940 can follow step 936, in which the SAVs are compared with acceleration vectors of known sets in the X-space library. The decisioning of step 940 can follow step 937, in which the SAVs are compared with acceleration vectors of known sets in the Y-space library. The decisioning of step 940 can follow step 938, in which the SAVs are compared with acceleration vectors of known sets in the Z-space library. In step 940, the ACP determines whether the comparison (and steps 936, 937, or 938) with the respective favored library indeed yielded a match or correlation, for example, between the SAVs and a known set, i.e. so as to provide a chosen set. A yes may be rendered in step 940 indicating that a match was indeed identified in the comparison of steps 936, 937, or 938. Thus, the processing passes from step 940 onto step 941. In step 941, the process passes to step 923 of FIG. 53. In step 923 (FIG. 53) the ACP determines if the processing of the SAVs resulted in a match. That is, the decision processing or logic gate of step 923 (FIG. 53) can be similar to or related to step 940 (FIG. 54). In at least some embodiments, the processing of step 940 can tag or otherwise identify whether a match was yielded.

Such tag can then be utilized in the processing of step 923. In step 940, as reflected at 940', a "match" or match processing may use predetermined thresholds so as to determine if correspondence is sufficient. Other mechanisms to determine closeness, correlation, correspondence, or other comparison mechanisms can also be used—as are also described otherwise herein.

On the other hand, a no may be rendered in the decisioning of step 940. As result, the process passes from step 940 onto step 942. In step 942, the ACP determines if settings in the code dictate whether other libraries should be compared (with the SAVs) since the favored library did not yield a match. To explain such processing further, in the processing of FIG. 54, a determination is made of which XYZ space acceleration vector is dominant. Relatedly, the X-space library (that includes known acceleration vectors of known sets, which are mapped to respective liquid level values) can be composed of acceleration vector sets in which the X-space acceleration vectors are dominant. Thus, in such processing, an unknown vector set (SAVs) having a particular dominance can be compared with acceleration vectors in a library that has that same dominance. As a result, the processing provides a mechanism by which similarities (i.e. which XYZ space is dominant) can be identified and leveraged.

With further reference to FIG. 54, it may be determined in step 942 that settings or code (under which the ACP operates) dictates that no other libraries should be compared with the SAVs. Thus, illustratively, observed SAVs that are dominant in the X-space will be compared with an X-space library (that contains acceleration vectors that are also dominant in the X-space)—and if no match is determined—the process will be terminated. That is, a no will be rendered in step 942 and the process passes onto step 943. In step 943, the process passes onto step 923 of FIG. 53.

In such step 923, the decisioning will yield a result that a chosen set has not been successfully determined. Thus, the process will pass from step 923 onto step 927, as described above.

On the other hand, it may be determined in the decisioning of step 942 that the setting(s) in the code do dictate that other libraries, i.e. acceleration vectors in the other libraries or unfavored libraries, should be compared with the SAVs. Thus, a yes will be rendered in step 942. Accordingly, the process passes onto step 950 of FIG. 55. In such step 950, the SAVs will be compared with the unfavored libraries. More specifically, the SAVs will be compared with known acceleration vectors in such unfavored libraries.

Figure 55:
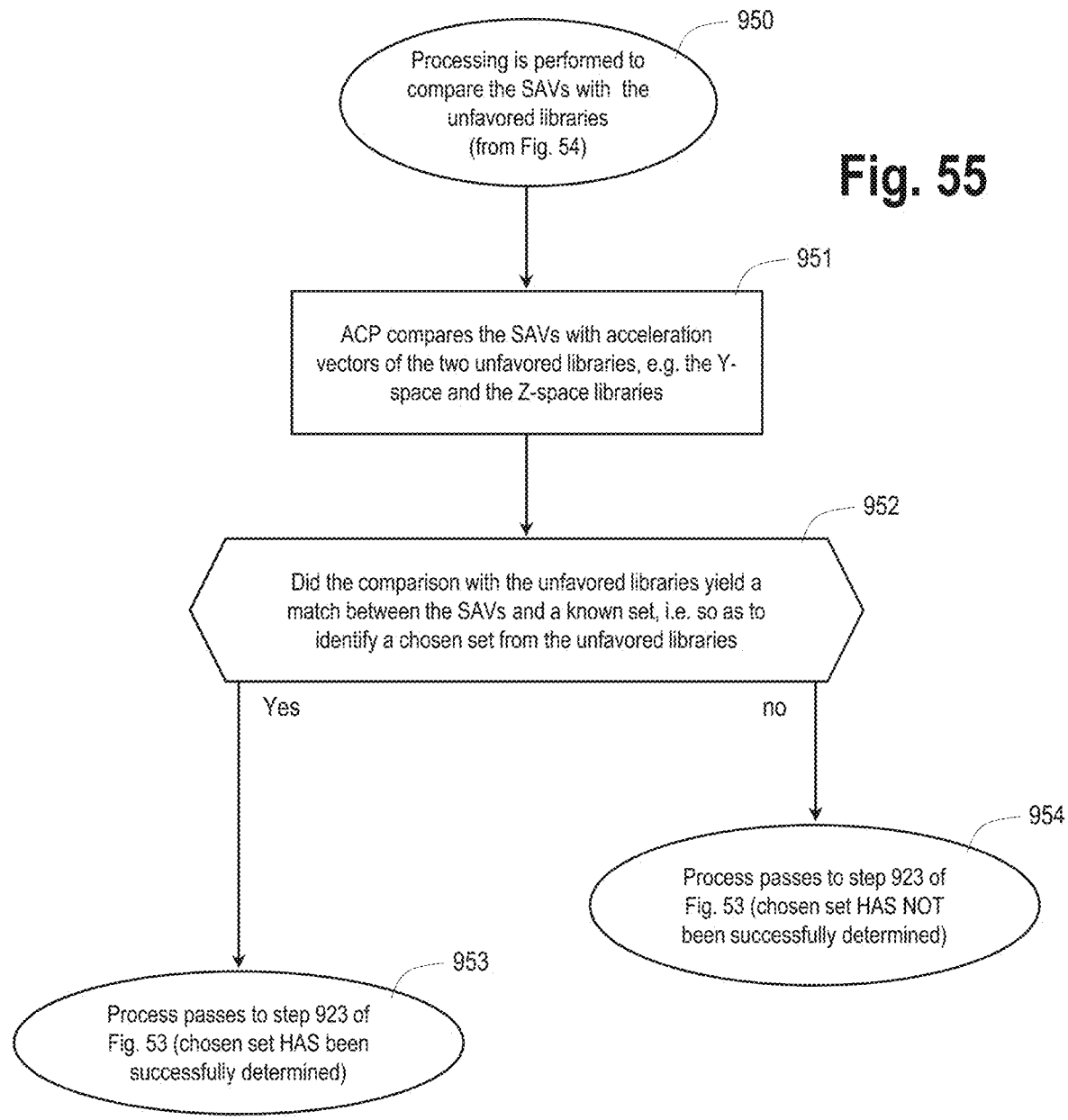
FIG. 55 is a flowchart showing "processing is performed to compare the SAVs with the unfavored libraries" of step 950 of FIG. 54, according to principles of the disclosure.

Accordingly, FIG. 55 is a flowchart showing "processing is performed to compare the SAVs with the unfavored libraries" of step 950 of FIG. 54 in further detail, in accordance with at least some embodiments of the disclosure.

As shown, the processing of FIG. 55 starts in step 950 and passes to step 951. In step 951, the ACP compares the SAVs vis-à-vis acceleration vectors in known sets, such known sets being in one of the two unfavored libraries. The two unfavored libraries can include the Y-space library and the Z-space library, in this example. Then, the process passes onto step 952.

In step 952, the ACP determines: did the comparison with the unfavored libraries yield a match between the SAVs and acceleration vectors in a known set, i.e. so as to identify a "chosen set" from the known sets in the unfavored libraries. If no, then the processes passes onto step 954. In step 954, the process passes to step 923 of FIG. 53 (with a chosen set not having been determined). On the other hand, a yes may be determined in step 952, and the process passes to step 953. In step 953, the process passes to step 923 of FIG. 53 (with a chosen having been successfully determined). That is, a chosen set of acceleration vectors has been identified in one of the two unfavored libraries.

The ACP can thus identify a liquid level that is associated with the particular chosen set. The association between a known set of acceleration vectors, which can be identified as a "chosen set" if a match is found with SAVs, is further illustrated in FIG. 57.

FIG. 56 is a flowchart showing in further detail the "ACP accesses the X-Space library to compare the SAVs with acceleration vectors (of sets) in such library, with favor over other libraries" subroutine 960 of FIG. 54 in accordance with principles of the disclosure. The process of FIG. 56 can be called upon from step 936 of FIG. 54. As shown in FIG. 56, the process starts in step 960 and passes to step 961.

In step 961, the ACP determines if a match can be determined based only on X-dominate acceleration vectors that are in the X-Space library. That is, in the described processing, the SAVs can be referred to as forming an SAV set.

A portion of the SAVs, of the SAV set in the XC-space library, can be determined in step 932 (FIG. 54) to be X-dominate. In accordance with at least one embodiment, to be X-dominate can mean that more acceleration vectors in the SAV are dominate in the X-direction than in any other direction. However, the X-Space library can include acceleration vectors and/or sets of acceleration vectors that are Y-dominate. The X-Space library can include acceleration vectors and/or sets of acceleration vectors that are Z-dominate.

Figure 64:
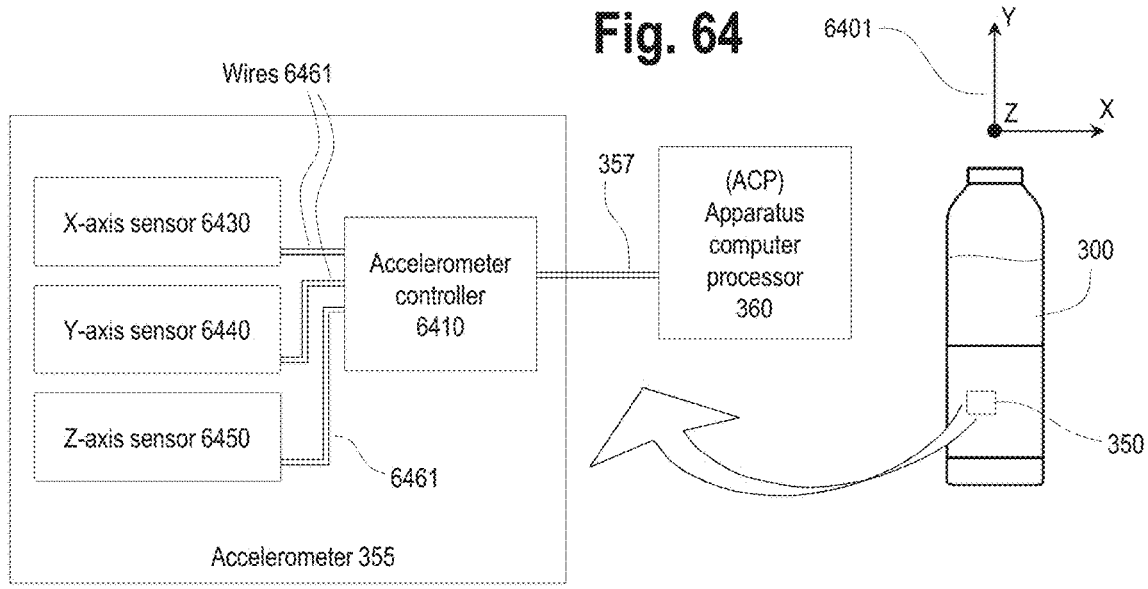
FIG. 64 is a schematic diagram showing an accelerometer, according to principles of the disclosure.

As described above, selected acceleration vectors (SAVs) can be determined in a discreet time window. Such time window can begin based on the ACP observing some event, such as a dispense request. Data showing movement of the bottle, including acceleration of the bottle, can be input from an accelerometer. An accelerometer is shown in FIG. 64. As should be appreciated, data from the accelerometer (input into the ACP) can be used for a wide variety of processing. At any point in time, the ACP can input accelerometer data so as to assess acceleration of the bottle.

In accordance with principles of the disclosure, processing can be varied as to when acceleration vectors, to be used for purposes of comparison, can be determined. For example and illustratively, in a 1.0 second time interval or window, the ACP might determine an acceleration vector every 0.01 seconds, based on data from the accelerometer.

Thus, 100 acceleration vectors can be rendered using such "sampling time" of every 0.01 seconds. With such approach, each of the 100 acceleration vectors will have a dominate coordinate—X-coordinate, Y-coordinate, or Z-coordinate—that can be determined by the ACP based on the accelerometer data. In the 100 acceleration vectors, if more acceleration vectors are dominate in the X-coordinate direction—then the set of vectors, to which the 100 acceleration vectors belongs, can be deemed (by the ACP) to be X-dominate. In the 100 acceleration vectors, if more are dominate in the Y-coordinate direction—then the set of vectors, to which the 100 acceleration vectors belongs, can be deemed (by the ACP) to be Y-dominate. In the 100 acceleration vectors, if more are dominate in the Z-coordinate direction—then the set of vectors, to which the 100 acceleration vectors belongs, can be deemed (by the ACP) to be Z-dominate. Such sets can be either an observed set (of acceleration vectors) or a known set (of acceleration vectors).

Other sampling times and time windows can of course be used as may be desired. Additionally, other sampling schemes or arrangements can be used instead of taking the samples over a set time interval, e.g. 0.01 seconds in the example above. For example, the ACP can look for particular attributes in the acceleration data and base sample times on observation of such attributes. For example, the ACP can look for inflections (e.g. when data graphically goes from concave to convex) in the accelerometer data over time, and take samples (i.e. generate acceleration vectors) at the point in time that an inflection is observed. Also, different schemes can be combined, such as taking a sample every so many seconds and upon observing a particular attribute. In at least some embodiments, the same scheme is applied to acceleration data (from an accelerometer, for example) to determine both "known" sets of acceleration vectors and "observed" sets of acceleration vectors. That is, it is appreciated that applying the same scheme to generate both "known" sets of acceleration vectors and "observed" sets of acceleration vectors (based on accelerometer data) may well be desired so as to measure (or assess) one or more attribute(s) of both data sets similarly and/or so as to be able to compare similarly input data.

With further reference to FIG. 56, the processing of step 961, in this embodiment, compares the SAVs vis-à-vis acceleration vectors in the X-Space library. More specifically, in step 961, the ACP compares (1) acceleration vectors, of the SAVs, that are dominate in the X-direction (i.e. X-dominate), vis-à-vis (2) acceleration vectors, of the known acceleration vectors in the known sets, that are dominate in the X-direction (i.e. X-dominate). If a yes is rendered in step 961, the process passes to step 962. If a no is rendered in step 961, the process passes to step 963.

In step 963, given the failure in step 961 to determine a match, the ACP determines if a match can be determined based on ALL acceleration vectors that are in the X-Space library, i.e. including Y-space acceleration vectors and Z-space acceleration vectors. If a match is determined in step 963, i.e. a yes is rendered, then the process passes onto step 964. If a match is not determined in step 963, i.e. a no is rendered, then the process passes onto step 965.

In step 962, the process passes to step 940 of FIG. 54 (chosen set HAS been successfully determined). In step 964, the process passes to step 940 of FIG. 54 (chosen set HAS been successfully determined). In step 965, the process passes to step 940 of FIG. 54 (chosen set HAS NOT been successfully determined.) Accordingly, the ACP can generate and compare data in a manner envisioned to provide the greatest chance of success (e.g. step 961). If such processing does not result in a match, i.e. does not result in success, than other processing can be performed (e.g. step 963) in a further attempt to determine a match. As otherwise described herein, a "match" as described herein can include a sufficiently close correlation or correspondence in one or more attributes of acceleration vectors being compared, e.g. in sets of acceleration vectors. Such sufficiently close correlation can use thresholds, for example.

The described processing can provide for efficient and effective processing, from a computer processing perspective. For example, only X-dominate acceleration vectors can be compared with the SAVs in step 961.

Fewer comparisons thus bode for reduced processing requirements. Also, for example, if a chosen set is not identified in step 936 and related steps, then acceleration vectors in the Y-Space library and/or the Z-Space library can be compared with the SAVs in step 951—in an attempt to identify a match. Other of the described processing can provide for efficient and effective processing.

Figure 57:
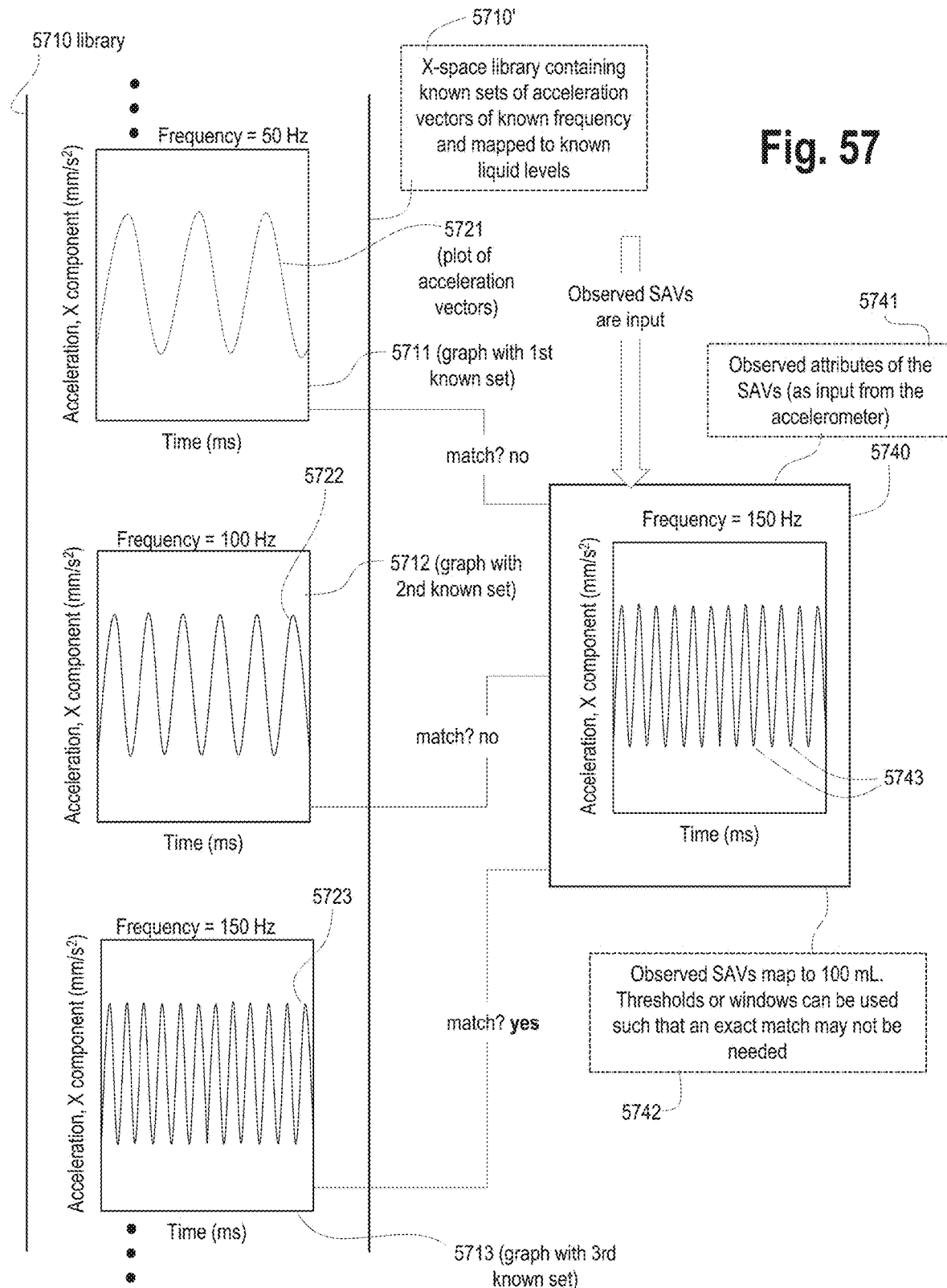
FIG. 57 is a diagram showing an X-space library containing plots of known sets of acceleration vectors, according to principles of the disclosure.

FIG. 57 is a diagram showing an X-space library 5710 containing plots 5721, 5722, 5723 of known sets of acceleration vectors. The X-space library 5710 can be used in the processing of step 936 (FIG. 54), for example.

Figure 58:
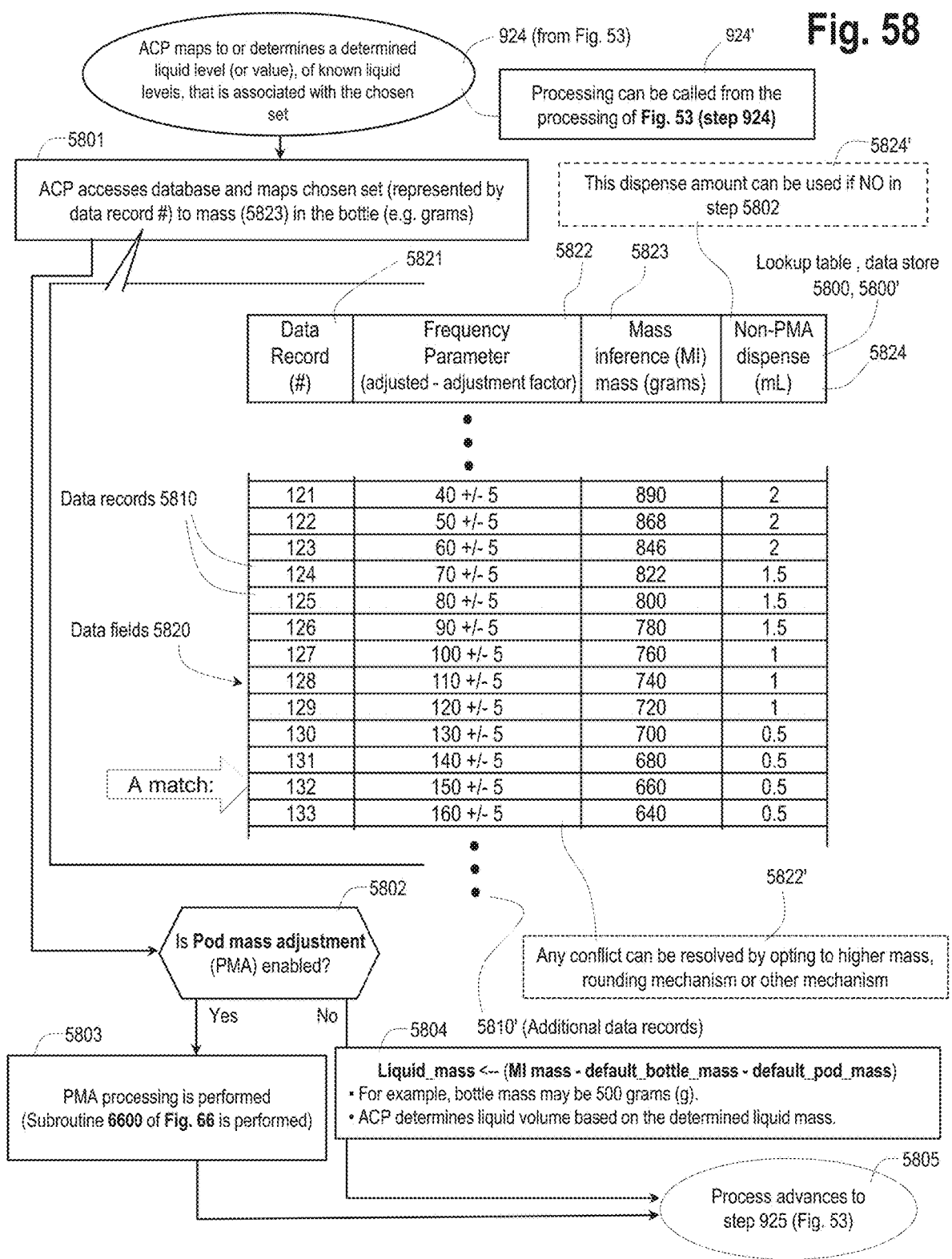
FIG. 58 is a diagram that shows a flow chart depicting mapping processing that uses a lookup table, according to principles of the disclosure.

Relatedly, FIG. 58 is a diagram that shows a flow chart depicting mapping processing that uses a lookup table. The lookup table can be used to map a detected frequency in X-space to a mass value and to dispense value.

As reflected at 5710', the X-space library can contain known sets of acceleration vectors of known frequency. More specifically, the X-space library 5710 can include a plurality of graphs (i.e. known graphs) 5711, 5712, 5713 with respective plots 5721, 5722, 5723. Each of the known graphs 5711, 5712, 5713 can be associated with a known liquid volume. FIG. 57 depicts three graphs 5711, 5712, 5713 of known frequency in the X-space library 5710. It should be appreciated that the X-space library can contain many more graphs, i.e. hundreds or thousands, for example.

FIG. 57 also shows graph 5740. The graph 5740 includes a selected acceleration vector (SAV) set that includes a plurality of SAVs. As reflected at 5741, the graph 5740 depicts observed attributes of the SAVs in a plot 5743. The SAVs can be input from an accelerometer of the bottle. In this example, an observed attribute is frequency. The frequency of the SAV of plot 5743 can be compared with frequency of known sets of acceleration vectors, i.e. the plots 5721, 5722, 5723. More complex attributes of data, input from an accelerometer of the bottle, can also be used for comparison of SAVs with known sets.

Accordingly, graph 5711 includes a plot 5721 of a first known set of acceleration vectors. An X component of acceleration is represented on the Y axis. Time is represented on the X axis. The depicted frequency of the plot 5721 is 50 Hz. The graphs 5712 and 5713, as well as graph 5740, can be similarly constructed. The depicted frequency of the plot 5722 is 100 Hz. The depicted frequency of the plot 5723 is 150 Hz.

The ACP can compare the plot 5743 and/or any attribute of the plot 5743 vis-à-vis the plots 5721, 5722, 5723. In the example of FIG. 57, the frequency of the plot 5743 is determined to match, i.e. sufficiently correlate, with the plot 5723. Thus, a match is determined of the plot 5743 vis-à-vis the plot 5723. The plot 5723 can be linked or mapped to a liquid level. The known frequency of the plot 5723 can be retrieved—and such retrieved frequency can be linked or mapped to a liquid level. Accordingly, a liquid level of the bottle can be determined from the SAV of the plot 5743 (FIG. 57). As reflected at 5742, the observed SAV can be mapped to a liquid level of 100 mL.

Thresholds or windows can be used such that an exact match may not be needed. Various attributes of the SAV vis-à-vis the known plots can be used in the comparing including frequency, magnitude, variations in magnitude, patterns of the plot, variations in the plot, for example.

As described herein, FIG. 58 includes a mapping diagram that includes a lookup table 5800 to map a detected frequency in X-space to volume and dispense values. The lookup table 5800 can be maintained in a data store 5800'.

FIG. 58 illustrates processing that can be utilized to map an observed frequency input from accelerometer 355 to a mass of the beverage apparatus and to determine a volume of liquid in the bottle. Illustratively, as shown in FIG. 58 at 924', such mapping can be called upon or invoked from the processing of step 924 of FIG. 53. As described above, in step 924, the ACP can determine a "matching" chosen set of acceleration vectors. The matching set need not be an exact match and can utilize thresholds to determine if a match is sufficiently close. The ACP can map to a selected mass value 5823, of known mass values 5823, that is associated with the chosen set. Accordingly, the processing of FIG. 58 describes processing that can be invoked by the ACP to perform the processing of step 924.

The process of FIG. 58 starts in step 924 of FIG. 58 and passes to step 5801. In step 5801, the ACP accesses the database or datastore 5800' and maps a chosen set (represented by a data record number in field 5821) to mass (5823) of the bottle (e.g. grams). The processing of step 5801 can use the lookup table 5800 of FIG. 58.

The lookup table 5800 can include a plurality of data records 5810. Each of the data records 5810 can include a plurality of fields 5820. The fields 5820 can include a data record number field 5821, a frequency parameter field 5822, a mass field 5823, and a dispense field 5824. The data record field 5821 can contain a unique data record number. For example, the unique data record number can be used to communicate the identification of a selected record number between devices, for various mapping processing, and for various other processing. The frequency parameter field 5822 can contain a range in frequency values, which can be mapped to an observed frequency (observed by the accelerometer 355). The mass field 5823 can contain a mass value that corresponds with the particular data record, e.g. that corresponds to a particular frequency parameter. The mass field 5823 can be the mass of the beverage apparatus including the structure of the bottle, the vessel(s) or pod(s) with additive contained therein, and the consumable liquid contained in the chamber 316. The mass field 5823 can be described as mass inference (MI) mass since such value can be mapped to via mass inference processing. The dispense field 5824 can contain a dispense value that corresponds with the particular data record, e.g. that corresponds to a particular frequency parameter.

The frequency parameter field 5822 can contain a value of frequency in X-space, e.g. For example, the frequency value can be expressed in Hertz. The frequency parameter can be a base frequency value that can be multiplied by an adjustment factor. The adjustment factor can be varied based on unique attributes of the particular bottle 300.

That is, the adjustment factor can be used to "tune" the values of lookup table 5800 to a particular bottle. In some operating situations with some bottles, it may be the case that no tuning is needed. Tuning can be performed by a training process, for example. A user can empty her bottle and initiate a "tuning session" with her bottle. An SAV set (of SAVs) can be input from the accelerometer 355—and the data processed by the ACP. The ACP can compare the SAVs with known acceleration vectors that are known to represent an empty condition of the bottle. The SAVs may match with the known acceleration vectors. If there is a match, then the adjustment factor will be set to a value of "1". If there is not a match, then the adjustment factor can be adjusted. For example, if a value of the SAVs (e.g. frequency) is slightly low for what is expected for an empty condition, then the adjustment factor can be increased, e.g. to 1.05.

Then, the user can fully fill her bottle—so that additional tuning can be performed for a full bottle. With a full bottle, a different training SAV set (of SAVs) can be input from the accelerometer 355—and the data processed by the ACP. The ACP can compare the SAVs with known acceleration vectors that are known to represent a full condition of the bottle. If there is not a match, then additional tuning can be performed. In some embodiments, a single adjustment factor can be used. The single adjustment factor can be an average of all the tuning factors determined, e.g. empty, full, half-full, etc. In other embodiments, different adjustment factors can be used for different fill levels. Such use of multiple tuning values may provide for more precise operation. Accordingly, the frequency parameter(s) in the field 5822 can be determined and can be unique to the particular bottle. In general, illustratively, it should be appreciated that the "frequency parameter" in the data field 5822 and the frequency parameter of the SAVs can be expressed in any suitable manner, using any suitable units, and using any suitable multiplier(s) such that the values can be compared. As otherwise described herein, attributes of the SAVs are not limited to frequency, and other attributes can be used in addition to frequency or instead of frequency.

The data records 5810 shown in FIG. 58 are illustrative and represent only a portion of data records that can be used in the processing, as reflected at 5810'. Data records can of course be included in the lookup table 5800 that address the full spectrum of fill levels of the bottle, i.e. from empty to full. The frequency parameter ranges set forth in the respective data records 5810 can result in a conflict with some values that are input. For example, if a frequency of 85.00 is input, the ACP can be presented with a conflict of whether to map to data record 125 or data record 126.

Such conflict can be resolve in suitable manner by the ACP, such as opting for a higher data record by default, as reflected at 5822'.

With further reference to FIG. 57, SAVs (in an SAV set) can be compared with a library of known sets of acceleration vectors. Particular attributes can be compared—such as frequency. In the example above, the input SAVs were found to match, or sufficiently correlate, to known graph 5713—that is known to be associated with a frequency of 150 Hz. Assuming for this example that the frequency parameter in field 5822 (FIG. 58) is in Hertz (Hz), such frequency value (as determined by matching to graph 5713) can then be mapped into the lookup table 5800 of FIG. 58. Such frequency of 150 can be mapped to the data record 132, which can then be deemed by the ACP to be the chosen or selected data record. The ACP can then retrieve other values from the selected data record.

In particular, the ACP can retrieve the mass of the bottle and/or a base dispense amount from fields 5823 and 5824, for example. The ACP can determine the amount of liquid in the bottle based on the mass field 5823—and as described below with reference to FIGS. 66-68.

Accordingly, the ACP can use the lookup table 5800 to perform processing of step 5801 as described above. After step 5801, the process can pass to step 5802. In step 5802, the ACP determines if pod mass adjustment (PMA) is enabled. Such PMA processing can include assessing state of the one or more pods in the beverage apparatus—including whether one or more pods are present and amount of liquid, respectively, contained therein. Details are described below with reference to FIG. 66-68.

Figure 66:
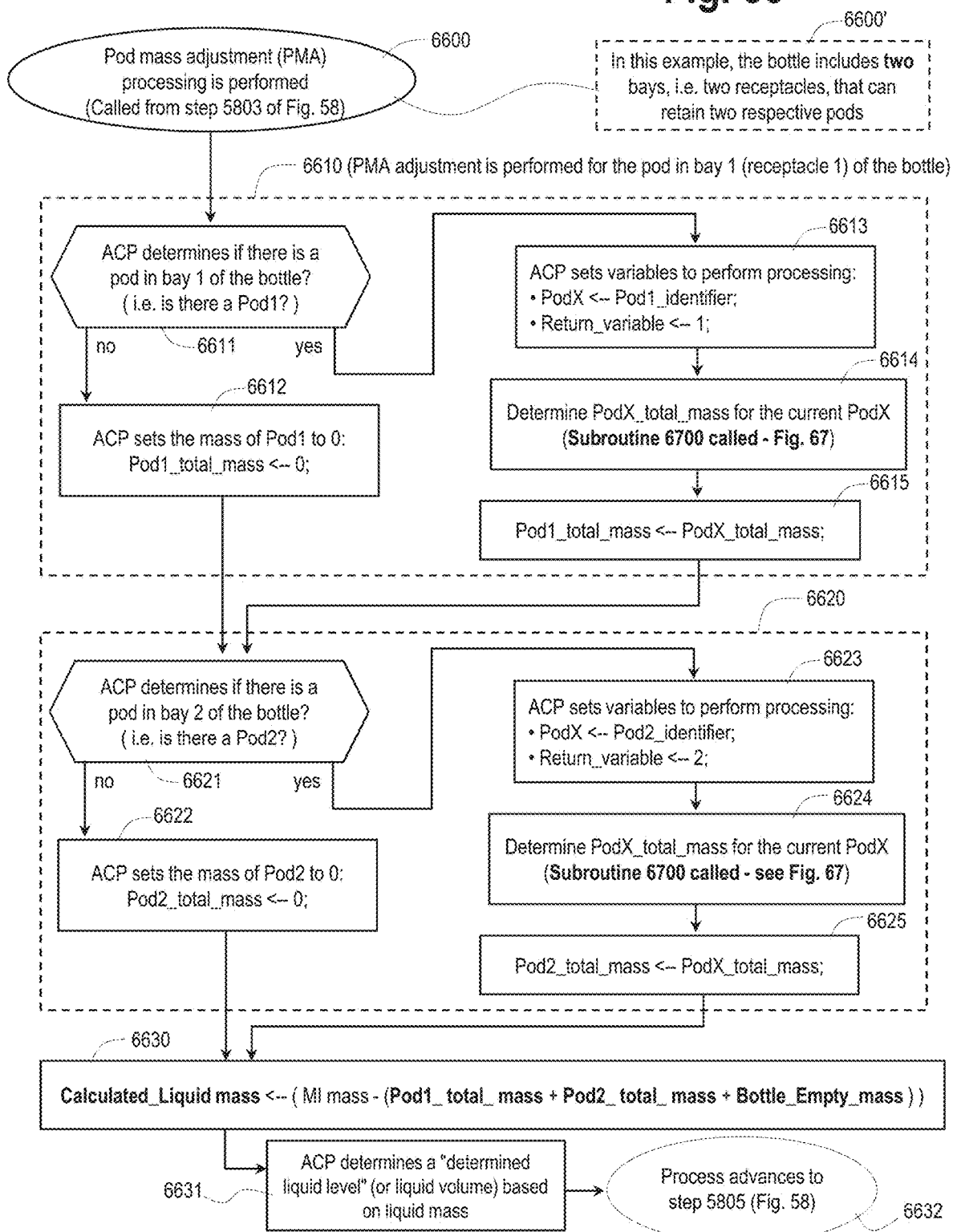
FIG. 66 is a flowchart showing details of "pod mass adjustment (PMA)" is performed, according to principles of the disclosure.

If yes in step 5802, then the process passes to step 5803. In step 5803, PMA processing is performed. That is, subroutine 6600 of FIG. 66 is performed so as to perform the processing of step 5803. Subroutine 6600 is described below with reference to FIG. 66. After step 5803, the process can pass to step 5805. In step 5805, the process advances to step 925 of FIG. 53. In step 925, the ACP assigns a current liquid level based on the determined liquid value. Subsequent processing can then be performed as desired.

On the other hand, a no may be rendered in step 5802. Such no in step 5802 means that pod mass adjustment will not be performed. That is, state of the one or more pods/vessels in the beverage apparatus will not be taken into account or will be taken into account in some default manner. For example, the ACP might determine that a respective pod is (or is not) in each of the receptacles 245 or "bays" of the beverage apparatus by detecting an RFID tag of the pods (that are present) using an RFID sensor or reader. For each pod that is determined to be present, the ACP may use a known empty pod mass (e.g. 12 g) and an average or half full additive content (e.g. 15 g). Thus, each pod present can be assumed to have a mass of 27 g, for example. Alternatively, in an embodiment, the presence/non-presence of the pod(s) may not be considered or may be considered in some default manner as factored into the mass of the empty beverage apparatus/bottle. In an embodiment, the dispense value in field 5824 may be used if pod mass adjustment is not to be performed. If pod mass adjustment is to be performed, the dispense value in field 5824 may be used, and may be adjusted up or down based on determined pod mass.

With further reference to FIG. 58, if a no is rendered in step 5802, the process passes to step 5804. In step 5804, a value is assigned to a variable "liquid mass" that represents an amount of liquid that is determined to be in the beverage apparatus. That is, the variable "Liquid_mass" is assigned or "gets" a determined value. The determined value can be the mass inference (MI) mass (as determined from mass inference processing) adjusted to account for a default mass of the bottle (default_bottle_mass) and a default mass of the pods (default_pod_mass). The default mass of the bottle can be the bottle/beverage apparatus without any pods and without any consumable liquid in the chamber, i.e. a static value that can be retrieved from the database of the bottle. Default mass of the pods can be some set mass, such as the 27 g described above. Once liquid mass of the consumable liquid is determined, the liquid level, liquid volume, or other value can be determined as needed. After step 5804, the process passes to step 5805. Processing then continues as described above.

FIG. 59 is a diagram showing details of "processing determines observed attributes of SAVs" step 931A. The processing of FIG. 59 can be a subroutine that is called from the processing of step 931 (FIG. 54). FIG. 59 shows a graph 5901 over a time window SAVs. The graph 5901 includes plot 5902 of SAVs. An X component of acceleration is represented on the Y axis, and time (in milliseconds (ms)) is represented on the X axis of the graph 5901. In other processing different space vectors can be used, e.g. vectors in the Y and Z space.

The plot 5902 (of SAVs) plots a plurality of acceleration vectors 5910 over the time window of the graph 5901. The SAVs can be input by the ACP from the accelerometer 355. In the processing of FIG. 59, the ACP is coded, i.e. is provided instructions in the database portion 370, to detect an "anchor acceleration vector" 5911. One or more attribute(s) of the SAVs can be used to identify the anchor acceleration vector 5911. Such one or more attributes can be an attribute that distinguishes one acceleration vector, of the SAVs, over other acceleration vectors of the SAVs. For example, as shown at 5901', the anchor acceleration vector can be identified based on various attributes of acceleration vectors, of the SAVs. Such attributes can include: magnitude of vector in a particular time window; a vector having greatest magnitude in a particular time window; the first vector of a series of vectors having greatest magnitude in a particular time window; a particular sequence of vectors; a particular pattern of vector; and/or a particular variation in frequency of the SAVs.

Accordingly, the ACP can detect an anchor acceleration vector 5911 out of the SAVs. In the comparison processing described herein, the anchor acceleration vector 5911, in and of itself, can be used as an attribute to compare the SAVs vis-à-vis known acceleration vectors, i.e. so as to determine a chosen set of acceleration vectors (such chosen set can be associated with a liquid value/liquid level). Additionally, "follow-up acceleration vectors" 5912 can be identified. Such follow-up acceleration vectors 5912 can be, for example, the vectors that follow, in some time period or based on some other marker, the anchor acceleration vector 5911. For example, the follow-up acceleration vectors 5912 can be vectors in a follow-up time window 5920 (e.g. 0.3 seconds) that come after the anchor acceleration vector 5911. Also, a lead-in time window can be used that comes before the anchor acceleration vector 5911. Acceleration vectors in such lead-in time window can be used as an attribute(s) to compare the SAVs vis-à-vis known acceleration vectors—so as to determine a matching or chosen "known set", and in turn, a liquid level that is associated with such chosen set. Attributes of the SAVs can be used alone and/or together with other attributes so as to compare the SAVs (in a SAV set) with known acceleration vectors, and so as to identify a chosen set, of known acceleration vector sets. As depicted in FIGS. 57 and 58 and otherwise described herein, such chosen set can be associated or mapped to values that are known to correspond to such chosen set. Such values can include liquid value, liquid level, liquid volume, dispense amount, piston (265) operation time, or piston travel distance, for example. Once the ACP has determined such mapped to values, the ACP can perform other processing based on such values. Such other processing can include performing a dispense operation.

Figure 60:
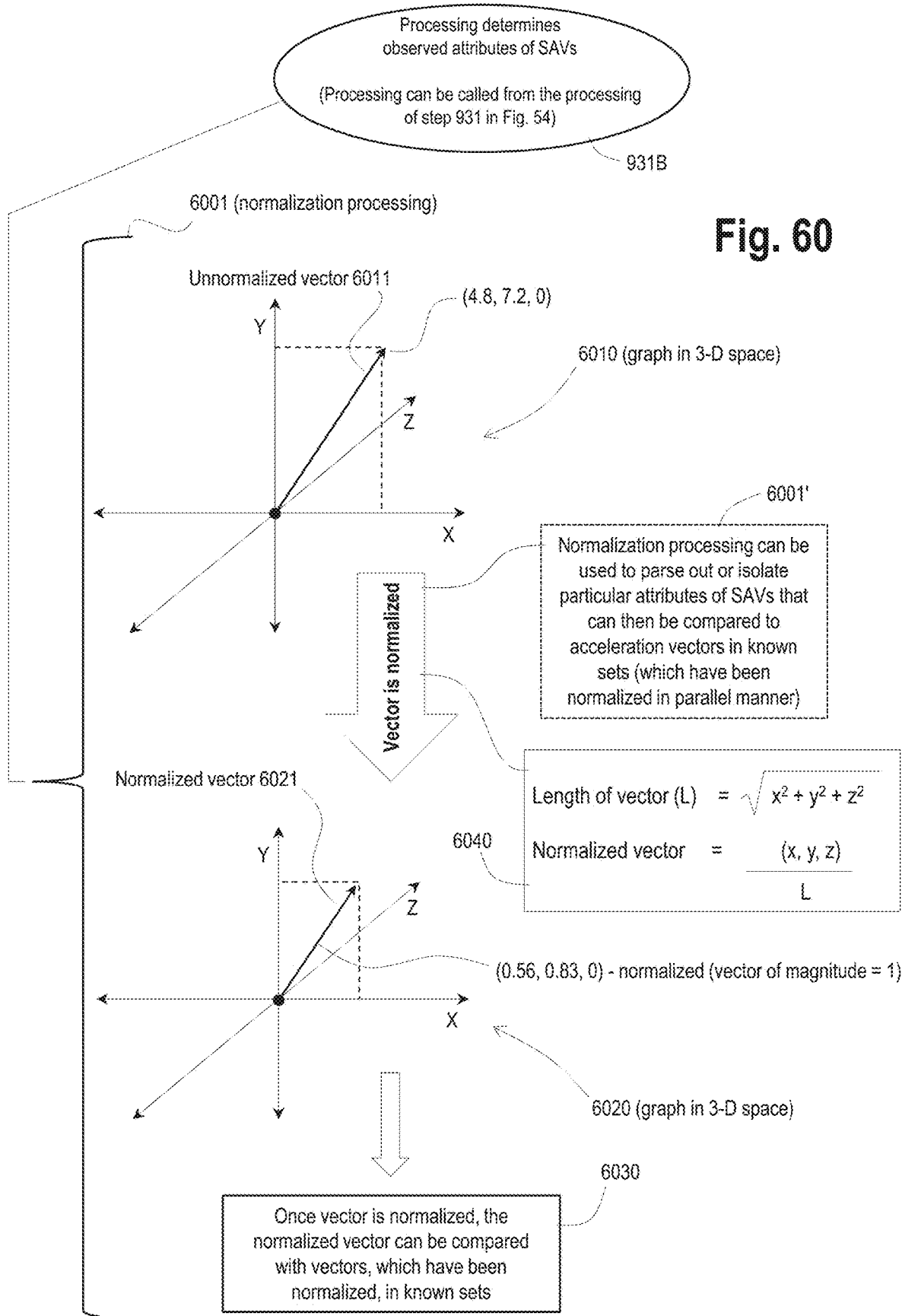
FIG. 60 is a diagram showing details of a "processing determines observed attributes of SAVs" step, according to principles of the disclosure.

Attributes of the SAVs can be used alone and/or together with other attributes to determine a matching "chosen set" that matches or correlates with SAVs. For example, frequency of SAVs, attributes of FIG. 59, attributes of FIG. 60 and/or attributes of FIG. 61 can be used to compare SAVs vis-à-vis known acceleration vectors. That is, FIG. 60 is a diagram showing details of "processing determines observed attributes of SAVs" step 931B. The processing depicted in FIG. 60 can also be a subroutine or a component of a subroutine that is called from the processing of step 931 (FIG. 54). A "match" as described herein can include a sufficiently close correlation and need not be an exact match, in accordance with at least some embodiments of the disclosure.

The processing of FIG. 60 can be performed by the ACP to normalize acceleration vectors using normalization processing 6001, according to at least one embodiment of the disclosure. The ACP can normalize acceleration vectors in known acceleration vector sets. In similar manner, the ACP can normalize SAVs, i.e. observed acceleration vectors.

As reflected at 6001', normalization processing can be used to parse out or isolate particular attributes of SAVs, or to transform vectors to be more standard or regular, for purposes of comparison. For example, such isolated or parsed out attributes of SAVs can then be compared to acceleration vectors in known sets (which have been normalized or standardized in a parallel or similar manner), as reflected at 6030. For example, processing of the disclosure can include comparing direction of two vectors (e.g. X-component of an SAV vis-à-vis X-component of an acceleration vector in a known vector set). Processing performed by the ACP can include isolating a vector's direction in each of X-space, Y-space and Z-space. Such isolation can be performed and/or used in the processing of steps 936, 937, 928, for example. Once isolated in respective XYZ space, different vectors can then be compared using methodologies that were not viable before normalization.

For example, FIG. 60 shows an acceleration vector 6011 in a graph 6010 in 3D space. Magnitude and direction can uniquely define a vector. The acceleration vector 6011 is unnormalized. The acceleration vector 6011 has components of (4.8, 7.2, 0) and a magnitude of 8.6 in XYZ space. It may be desired in processing to compare the X-direction of the SAV with known acceleration vectors. For purposes of performing such comparison, the vector 6011 can be normalized so as to be of unit length, i.e. of length 1. In other words, to make the vector normal or standard can include making the vector of magnitude 1 or a "unit" length. Such can be performed, by the ACP, by the relationship 6040, as shown in FIG. 60. For example, the illustrative vector (4.8, 7.2, 0) can be calculated to have a length (L) of 8.6. Each XYZ component (4.8, 7.2, 0) can be divided by the length (8.6) so as to render a normalized vector 6021 possessing normalized XYZ components, i.e. (0.55, 0.83, 0). The normalized vector 6021 is shown in graph 6020. Such normalized vector 6021, by definition, possesses a length of 1. Such normalized vector, and XYZ components thereof, can be compared with other vectors that have been normalized. For example, the acceleration vector 6011 might be identified, by the ACP, as the anchor acceleration vector 5911 of FIG. 59. Such SAV can then be compared with known acceleration vectors (in known sets) and—if such known acceleration vector(s) also have an X-component of around 0.55— then a match/correlation can be rendered. Accordingly, normalization, as illustrated by the processing of FIG. 60, can provide a processing feature that can be used to provide efficient and effective comparison of vectors to assess similarities and/or differences in such compared vectors. Normalization can also be used for other processing according to principles of the disclosure, such as for the purpose of comparing a vector to a threshold, for example.

According to principles of the disclosure, various aspects of processing as applied to "acceleration vectors" are described herein. It is appreciated that such processing, as applied to acceleration vectors, can also be applied to other vectors. Such other vectors can including velocity vectors, for example.

Figure 61:
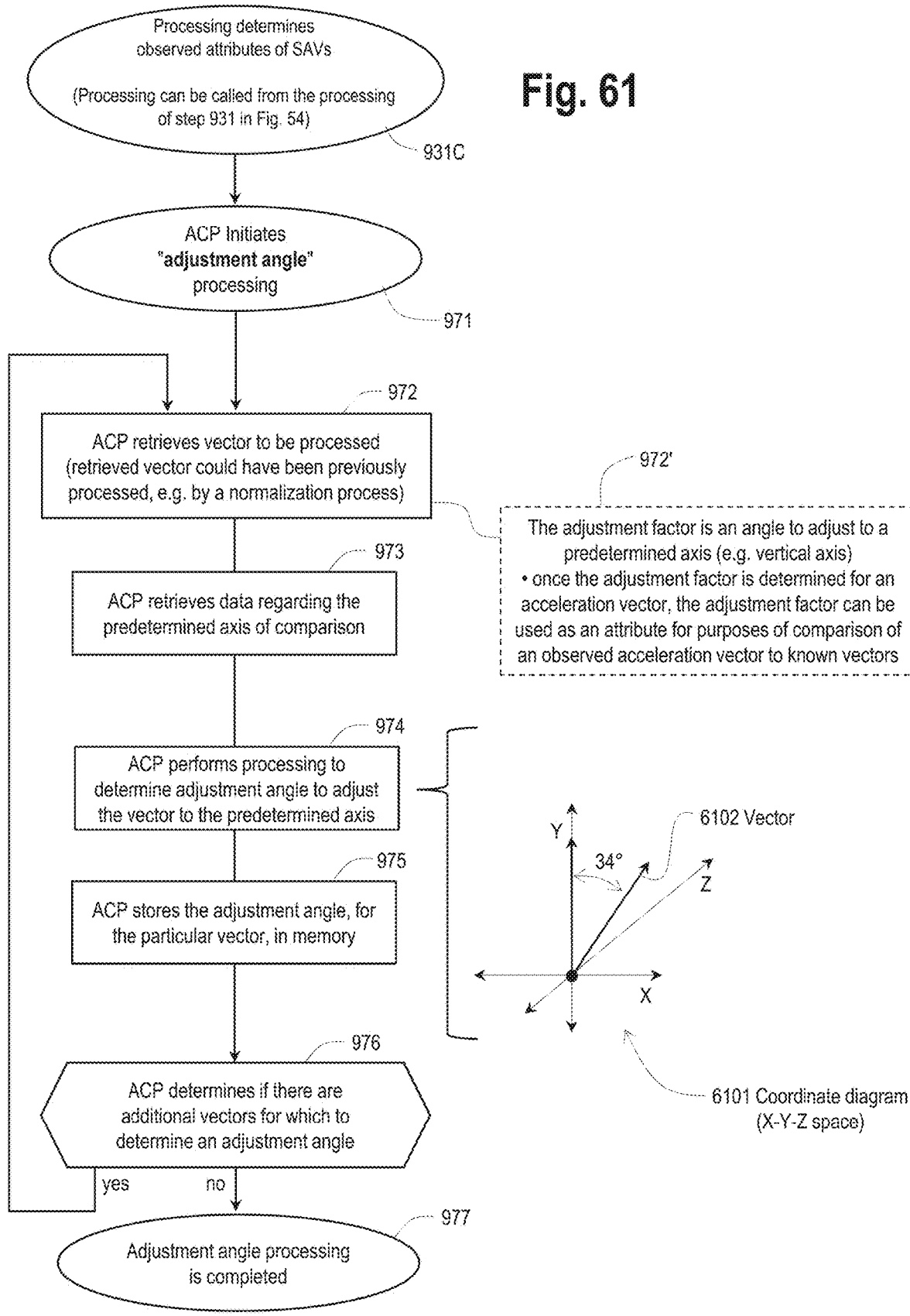
FIG. 61 is a diagram showing details of "processing determines observed attributes of SAVs" step, according to principles of the disclosure.

FIG. 61 is a diagram showing details of "processing determines observed attributes of SAVs" step 931C in accordance with at least some embodiments of the disclosure. The processing depicted in FIG. 61 can also be a subroutine or a component of a subroutine that is called from the processing of step 931 (FIG. 54). The processing of FIG. 61 includes performing processing on an acceleration vector so as to determine an angle of adjustment. That is, as described at tag 972', an adjustment factor can be an angle that is needed to adjust an acceleration vector, i.e. align an acceleration vector, to a predetermined axis of comparison. For example, the predetermined axis can be a vertical axis or Y axis. In processing as performed by the ACP, once the adjustment factor is determined for an acceleration vector, the adjustment factor can be used as an attribute, of the acceleration vector, for purposes of comparison. For example, an adjustment factor that is determined from a SAV can be compared to adjustment factors that have been determined for known acceleration vectors. Thus, a match (or sufficiently close correlation) can be determined between the adjustment factor for the SAV and the adjustment factor for one of the known acceleration vector. An adjustment factor can be provided for additional axes. For example, processing can be provided to determine, for an acceleration vector, an adjustment factor so as to orient the acceleration vector with each XYZ axis. Thus, attributes for a particular acceleration vector can include an X adjustment factor, a Y adjustment factor, and a Z adjustment factor.

The diagram of FIG. 61 includes a coordinate diagram 6101. The coordinate diagram 6101 is in XYZ space. The coordinate diagram 6101 includes acceleration vector 6102. In such example, the acceleration vector 6102 is disposed in the XY plane. The vector 6102 is 34° off vertical. In other words, the vector 6102 requires an adjustment of 34° so as to orient the vector 6102 along the Y axis—the Y axis being the predetermined axis in this example.

Accordingly, in the processing of FIG. 61, the "adjustment angle" is 34°. The vector 6102 can then be compared with other vectors. If such other vectors also have an adjustment angle of 34°, then associations can be made as otherwise described herein. For example, if a known acceleration vector also possesses an adjustment angle of 34° or close thereto, then such known acceleration vector can be deemed a match. Accordingly, the processing of FIG. 61 can be used to compare attributes of SAVs to be compared with known acceleration vectors or known sets of acceleration vectors.

Illustratively, the process of FIG. 61 starts in step 931C and passes to step 971. In step 971, the ACP initiates "adjustment angle" processing. Then, the process passes onto step 972. In step 972, the ACP retrieves a vector to be processed. The vector can be an acceleration vector. The vector can be SAVs or a known acceleration vector. The retrieved vector could have been previously processed, such as by a normalization process. Thus, adjustment angle processing and normalization of vectors can be used together. Then, the process passes onto step 973.

In step 973, the ACP retrieves data regarding the predetermined axis of comparison. For example, in the example of the coordinate diagram 6101, the predetermined axis of comparison is the Y axis. Then, in step 974, the ACP performs processing to determine the adjustment angle to adjust the vector to the predetermined axis. In the example of coordinate diagram 6101, the adjustment angle is 34°. Then, the process passes onto step 975.

In step 975, the ACP stores the adjustment angle, for the particular vector, in a suitable database. Then, the process passes onto step 976. In step 976, the ACP determines if there are additional vectors for which to determine an adjustment angle. For example, such additional vectors might be additional acceleration vectors in an SAV set. If a yes is rendered in step 976, then the process passes back to step 972. In step 972, processing proceeds as described above. On the other hand, a no may be rendered in step 976. Accordingly, the process passes from step 976 onto step 977. In step 977, adjustment angle processing is completed. Accordingly, additional attributes can be generated by the ACP so as to compare a first acceleration vector(s) vis-à-vis a second acceleration vector(s). In particular, the processing can be used to compare SAVs vis-à-vis known acceleration vectors in known sets—so as to identify a chosen set, of the known sets—and map to a liquid value that is associated with the chosen set.

FIG. 62 is a diagram illustrating processing features relating to forces exerted on a bottle 300, according to principles of the disclosure. Various details of use of a bottle 300, by a human user, are described herein. In use, the bottle 300 can experience a wide variety of forces exerted on the bottle and constraints provided to the bottle. For example, a user can pick up the bottle and tilt the bottle so as to take a sip or drink of liquid in the bottle. A user can take the cap or top off the bottle and perform a filling operation. A user can hold the bottle while jogging. The bottle can be positioned in a vehicle while the vehicle is moved over a road or terrain. A user can reposition the bottle on a supporting surface or by placement within a backpack or bag. In these operations, various forces are imposed on the bottle 300. For example, in the situation of a user holding the bottle while jogging, the user's legs can provide a motive force to propel the user's body with bottle over terrain; the user's skeletal system can provide constraints or supports imposed on the bottle; and the user's muscles can provide force and motion and can act as springs. Such dynamics are also at work with action of a user to take a sip from the bottle 300. FIG. 62 provides a cart or cart device 6210 that represents components of force, constraints and/or support.

As shown in FIG. 62, the cart 6210 can include a base 6211 with wheels 6211'. While only two wheels are shown, the cart 6210 can be supported by four wheels. The illustrative cart 6210 can include walls 6212. The walls 6212 act as constraints in which a support 6213 is movably positioned. The support 6213 is movably supported by a spring 6214 so as to allow vertical movement up and down within the walls 6212. The spring 6214 can be provided with a spring constant k. The support 6213 can support a bottle 300. The bottle 300 can include liquid 301. The cart 6210 can be, in the illustration, pulled across terrain 6220 by a force (F). The terrain 6220 is depicted as being rough with bumps so as to exert a variety of forces upon the bottle with liquid.

FIG. 62 includes example A (6201) and example B (6202). Both examples include the cart 6210 with a bottle 300 that is filled, to some extent, with liquid 301. In the example 6201, the bottle 300 is substantially full with liquid 301A. In the example 6202, the bottle 300 is substantially empty with a small amount of liquid 301B. Accordingly, the mass of the two bottles, with liquid 301, are different. As described at box 6205, the illustrative cart 6210 can be moved across the terrain 6220. As the cart is moved across the terrain 6220, the cart is exposed to the same horizontal force (F) in both example 6201 and example 6202. Such force F is provided to represent human movement that provides a force on the bottle. In both examples, the bottle is supported or constrained by the same support 6213, as well as the same spring 6214 and the same walls (constraint) 6212, which either alone or collectively are provided to represent human support of the bottle.

As the cart 6210 is pulled across the terrain 6220, the cart 6210 will be variably jostled up and down. Accordingly, the cart 6210 will experience both velocity and acceleration forces up and down. As a result of the acceleration forces, the spring 6214 will be displaced, i.e. as a result of force of the bottle being applied to the spring 6214.

Various forces and movement will be experienced by the bottle in both examples 6201, 6202. For example, the cart might experience a drop, with one of the wheels 6211'. Such drop can result in the cart with bottle initially dropping.

Then, the cart will be abruptly decelerated as a result of impact with terrain 6220. However, the deceleration of the bottle will be slower as a result of compression of the spring 6214. Thus, the spring 6214 can experience a displacement D1 in example 6201. The spring 6214 can experience a displacement D2 in example 6202. Since the mass of liquid 301A (in example 6201) is much greater than the mass of liquid 301B (in example 6202), the displacement D1 will be greater than the displacement D2. Indeed, it might be the case that if the mass of the liquid 301B with bottle 300 is relatively small, then the displacement D2, may be relatively small. Such relationship is provided at box 6208 of FIG. 62, i.e. if a Mass1 is greater than a Mass2, then a distance D1 will be greater than a distance D2. In other words, in the example, it is appreciated that a greater force is required to stop or decelerate the almost full bottle than the force required to stop or decelerate the almost empty bottle. Such differential in force translates into a differential (D1 versus D2) of compression of the spring 6214. In the example, for purposes of illustration, Mass1=Mass of support+mass of bottle without liquid+mass of liquid 301A=600 grams; and Mass2=mass of support+mass of bottle without liquid+mass of liquid 301B=60 grams.

In both examples 6201, 6202, the force (F) might be paused after the cart experiences the above described drop of one of the wheels. In such a situation, with example 6201, a displacement D1 will then be followed by oscillation or bobbing of the spring (with support 6213 and bottle 300) up and down, with harmonic motion. Such oscillation of the spring up and down will eventually "die down" depending on the damping attributes of the spring. Accordingly, the illustrative drop of one of the wheels of the cart can result in two features that include (1) the displacement D1 as the bottle 300 with liquid 301A is decelerated, and (2) the subsequent oscillation or bobbing, which can occur at a particular frequency or frequencies.

As depicted in box 6205 of FIG. 62, a time period (T) of oscillation can be determined based on a relationship to mass and spring constant. Such relationship can be expressed by equation 6206 of FIG. 62, where: T=time period of oscillation in seconds; M=mass of object in kilograms (kg); and k=spring constant of spring (N/m). As reflected by such relationship, as M increases T increases. Relatedly, as the period of oscillation in seconds (T) increases, the frequency of the oscillation decreases, i.e. since the arrangement takes more time to go up and down. Thus, as shown in equation 6207 of FIG. 62, the frequency of the Mass1 movement will be less than the frequency of the Mass2 movement. In other words, with the same spring 6214 of constant k in both examples 6201, 6202, the oscillation (i.e. the frequency) of the smaller Mass2 will be quicker than the variations of the relatively larger Mass1, and more generally—the frequencies will indeed be different.

Accordingly, the diagram 6200 (of FIG. 62) illustrates that a bottle 300 experiencing one or more forces or constraints, can exhibit different frequency in motion as dependent on an amount of liquid in the bottle. In application, the bottle 300 can be provided with an accelerometer 355 and ACP 360 as described in detail herein.

The accelerometer can detect a wide variety of attributes of movement including observed frequency of movement.

The observed frequency can be represented as acceleration vectors. The acceleration vectors can be processed by the ACP of the bottle. Accordingly, the ACP of the bottle can determine mass of the bottle, i.e. liquid in the bottle, based on acceleration vectors from the accelerometer. Such can be performed using the mass inference (MI) processing as described herein. In general, a wide variety of data from the accelerometer 355 can be input and processed by the ACP 360. This wide variety of data can be used in various ways to represent attributes of movement of the bottle. From such attributes of movement of the bottle, which can include frequency attributes, the mass of liquid in the bottle can be determined. Thus, the volume of liquid in the bottle can be determined. Thus, an amount of dispense of additive can be controlled so as to provide a desired concentration of additive in the liquid of the bottle.

FIG. 62 and the bottle 300 shown in FIG. 62 are for purposes of illustration. The features and processing described with reference to FIG. 62 can be used with other processing described herein as may be desired. Any of the features of the bottle 300 described herein can be used in conjunction with the features and processing described with reference to FIG. 62. In particular, the bottle 300 of FIG. 62 can be provided with a chamber to hold liquid, one or more additive vessels or pods, a dispensing assembly, accelerometer, an apparatus controller, and various other features. Such other features are described with reference to FIG. 22, for example.

In accordance with one aspect of the disclosure, processing as described herein can be based on a determined mass of the bottle 300 plus liquid within the bottle. In particular, the mass of liquid in the bottle can be determined. From such mass of the liquid in the bottle, a volume of liquid in the bottle can be determined. Such volume can then be used to perform various processing—including to control dispense of additives to attain a particular concentration of additives in the liquid. It is appreciated that the ACP of the bottle can determine a total mass of the bottle plus liquid, as described in FIG. 62. From this total mass, the mass of the bottle can then be subtracted out so as to provide mass of liquid in the bottle. The mass of the bottle can include the additive vessels or pods (with additive contained therein). As described herein, content of additives in the one or more additive vessels will vary over time. The ACP of the bottle can keep track of the dispense events of additive from each of the additive vessels, as described below.

Accordingly, the ACP can be provided data so as to know the mass of the additive vessels plus remaining additive contained therein. Accordingly, the ACP can take such data into account when calculating mass of liquid in the bottle.

FIG. 63 is a diagram showing a user device 106 and display of a GUI 6300 on the user device, according to principles of the disclosure. The GUI 6300 can include a bottle graphic 6301. The bottle graphic can include a liquid level 6302. As described herein, data can be input from an associated beverage apparatus so as to display liquid level 6302, on the user device 106, to correspond with the actual liquid level of the bottle. Accordingly, the generation of the bottle graphic 6301 can utilize input from the beverage apparatus 300 that is processed by the controller 350 and/or a processor of the user device 106. Relatedly, data can be input from the beverage apparatus 300 to provide various other information that can be displayed on the GUI 6300. For example, attributes of the one or more pods that are currently disposed in the beverage apparatus can be displayed on the user device 106. Such content can be displayed using a pod content graphic 6305. In the illustrative situation of FIG. 63, a peach pod is currently in the beverage apparatus. The peach pod has 2 dispenses left or remaining. Additionally, a ginger pod is currently in the bottle, with 4 dispenses left.

Hereinafter, features of an accelerometer that can be used in the beverage apparatus of the disclosure will be described. An accelerometer can include multiple accelerometer sensors. An accelerometer sensor can measure acceleration in or along a single axis by detecting positional variations between a substrate and a proof mass, both of which can constitute inertial masses. The proof mass can be coupled to the substrate by an elastic cantilever.

According to Newton's first law of motion, the proof mass will tend to stay at rest as the substrate is accelerated, and will therefore appear to move relative to the substrate. This resulting variation in distance may be measured using a variety of techniques, for example capacitive, piezoelectric, or optical. Three accelerometer sensors can be packaged into an accelerometer so as to provide a 3-axis assembly, yielding an accelerometer with 3 degrees of freedom (X, Y, and Z).

Figure 65:
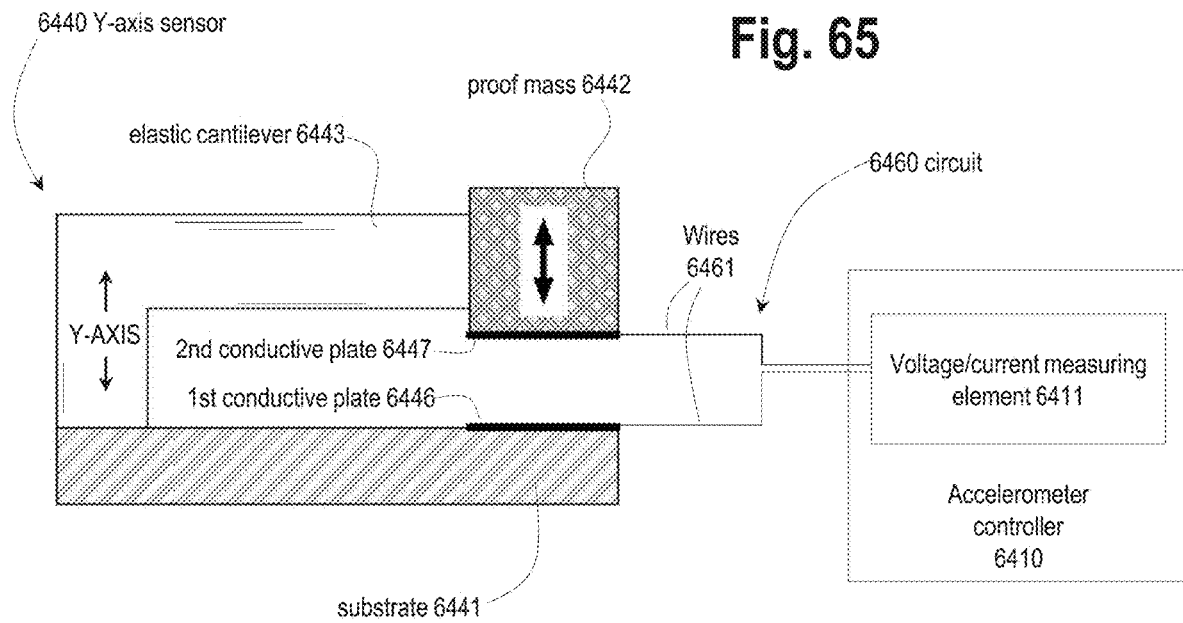
FIG. 65 is a schematic diagram showing details of the accelerometer of FIG. 64, according to principles of the disclosure.

FIG. 64 and FIG. 65 are diagrams showing an accelerometer 355 in accordance with at least some embodiments of the disclosure. As shown in FIG. 22, the accelerometer 355 can be provided in a beverage apparatus or bottle 300.

As shown in FIG. 64, the accelerometer 355 can include an accelerometer controller 6410. The accelerometer controller 6410 can control various operations of the accelerometer 355. The accelerometer 355 can also include a plurality of accelerometer sensors that can include an X-axis sensor 6430, a Y-axis sensor 6440, and a Z-axis sensor 6450. Note, the accelerometer 355 itself can be described as a sensor or as a device. Each of the sensors 6430, 6440, 6450 can be connected to the accelerometer controller 6410 by communication pathways 6461, which can be in the form of wires, for example, that provide power and data communication, for example. The accelerometer controller 6410 can be connected to the ACP (apparatus computer processor) 360 by communication pathway 357, which can be in the form of additional wires. The communication pathway 357 can include the communication pathway 6461.

The assembly of the ACP 360 and the accelerometer 355 can be disposed in the beverage apparatus, i.e. bottle, 300 as illustrated in FIG. 22. The ACP 360, the accelerometer 355 and the sensors 6430, 6440, 6450 can be powered by a power source provided in the beverage apparatus 300. The power source can include one or more batteries. In some embodiments, the accelerometer controller 6410 can be integrated with the ACP 360 and/or the accelerometer controller 6410 can be one and the same as the ACP 360.

FIG. 65 is a diagram showing further details of the Y-axis sensor 6440. The Y-axis sensor 6440 can include a substrate 6441. The substrate 6441 can be connected to a frame or structure of the apparatus controller 350. The substrate 6441 can be connected to the lower support platform 308 in embodiments of the disclosure.

The Y-axis sensor 6440 can include a "proof mass" 6442. The proof mass 6442 can be supported by and connected to the substrate 6441 by an elastic cantilever 6443. Operation of the accelerometer is described herein. According to Newton's first law of motion, the proof mass 6442 will tend to resist movement, due to inertia, as the substrate 6441 is accelerated, and will therefore move relative to the substrate as the substrate 6441 is accelerated. The substrate 6441 can be affixed to structure of the beverage apparatus 300 so as move with, represent, and reflect movement of the beverage apparatus 300. Thus movement, i.e. acceleration, of the beverage apparatus 300 can be represented by movement, i.e. acceleration, of the substrate 6441.

The Y-axis sensor 6440 can include a first conductive plate 6446 and a second conductive plate 6447. The first conductive plate 6446 can be a part of, attached to, or affixed to the substrate 6441. The second conductive plate 6447 can be a part of, attached to, or affixed to the proof mass 6442. The first conductive plate 6446 can be electrically connected to a voltage/current measuring element 6411, i.e. a measuring element 6411. The measuring element 6411 can measure voltage and/or current in a circuit 6460. The second conductive plate 6447 can be electrically connected, by wires 6461, to the measuring element 6411. The wires 6461 can be part of or included in the communication pathway 357. The first conductive plate 6446, the second conductive plate 6447, the wires 6461, and the measuring element 6411 can form the circuit 6460. The measuring element 6411 can be a component in the accelerometer controller 6410 and/or in the ACP 360. The accelerometer controller 6410 can be in communication with the ACP 360. Accordingly, processing components of the bottle 300 can determine voltage or current being passed through the measuring element 6411 and secure data therefrom.

In operation, the substrate 6441 will experience acceleration. As the substrate 6441, affixed to the structure of the beverage apparatus 300, is accelerated, such acceleration will result in relative movement between the first conductive plate 6446 and the second conductive plate 6447. Such relative movement will result in a capacitive change or differential between the plate 6446 and the plate 6447. This capacitive change or differential can be detected by the measuring element 6411, i.e. as current flows through the circuit 6460. Accordingly, acceleration in the Y-axis can be measured by the Y-axis sensor 6440. The arrangement of FIG. 65 utilizes a capacitive change or differential. Other mechanisms can be utilized so as to determine relative movement between the proof mass 6442 and the substrate 6441. Such other mechanisms might include piezoelectric mechanisms or light/optical mechanisms or spring mechanisms.

The X-axis sensor 6420 and the Z-axis sensor 6430 can be of similar construct to the Y-axis sensor 6440. The X-axis sensor 6420 can be positioned about the X-axis—so as to measure acceleration along the X-axis. The Z-axis sensor 6430 can be positioned about the Z-axis—so as to measure acceleration along the Z-axis. As illustrated in FIG. 65, the Y-axis sensor 6440 can be positioned about the Y-axis—so as to measure acceleration along the Y-axis.

In at least one embodiment of the disclosure, the Y-axis can be a vertical axis of the beverage apparatus or bottle 300. The bottle 300 can be in a static rest condition—supported by a table or other support surface. In such static condition, the bottle will experience an ongoing acceleration due to the force of gravity, i.e. 1G or 9.8 m/s². The force of gravity can vary in different parts of the world. Accordingly, while the "weight" of the beverage apparatus 300 and liquid contained therein can be described as varying based on varied gravitational force, the "mass" of the beverage apparatus 300 and liquid contained therein can be described as non-varying.

Various description set forth in this disclosure relates to detecting position, movement and acceleration of the bottle 300 and performing processing based on such position, movement and acceleration. For example, various description set forth herein relates to or includes detecting movement of the bottle 300, detecting acceleration of the bottle 300, detecting angle of the bottle 300, and/or related position or movement detection. Such detection of position, movement, and/or acceleration can be provided by the accelerometer 355 operating in conjunction with the ACP 360. For example, acceleration vectors in the X-space, the Y-space, and the Z-space can be provided by the accelerometer 355 operating with the ACP 360—and processing performed using such acceleration vectors. The bottle 300 can also include one or more gyroscopes that can be used with or without the accelerometer of the bottle.

A gyroscope can be provided that measures rotation about an X-axis. A gyroscope can be provided that measures rotation about a Y-axis. A gyroscope can be provided that measures rotation about a Z-axis.

Additionally, angle of the bottle 300 can be provided by the accelerometer 355 operating with the ACP 360. To explain further, an accelerometer can measure acceleration or more specifically acceleration forces. The acceleration can be described as static acceleration and/or dynamic acceleration. By determining the dynamic acceleration, the accelerometer can determine attributes of movement of the bottle 300. By determining static acceleration, the accelerometer can determine attributes of position of the bottle 300. However, it should be appreciated that processing may be required, by the ACP 360, to assess static acceleration versus dynamic acceleration. That is, the accelerometer may simply determine acceleration along each of the three axes respectively by each of the three sensors 6430, 6440, 6450—and processing be required so as to determine static acceleration components and dynamic acceleration components.

Accordingly, the accelerometer can measure an amount of acceleration that is experienced by the bottle, which the accelerometer can view as static acceleration. As shown by the coordinate system 6401 of FIG. 64, the accelerometer 355 can be oriented with the Y-axis of the accelerometer aligned with a vertical axis of the bottle 300. The X-axis of the accelerometer can be the horizontal axis side-to-side of the bottle, and the Z-axis can be the horizontal axis front-to-back of the bottle.

An angle at which the bottle 300 is disposed can be determined from the accelerometer. For example, it may be the case that the bottle 300 is sitting level on a level tabletop. In such disposition, the Y-sensor will observe an acceleration as a result of gravity, i.e. a 1G acceleration or 9.8 m/s² acceleration. In processing performed by the accelerometer controller 6410 or the ACP 360, this G-force acceleration can be subtracted out (or in other words compensated for) so as to provide a real-world acceleration. That is, ((observed_acceleration−1G-force)=real_world_acceleration). In other words, the real-world acceleration can be understood to be acceleration observed by a person sitting next to the bottle.

Accordingly, if the bottle is positioned perfectly vertical, only the Y-axis sensor 6440 will observe acceleration, such acceleration being due to gravity. However, upon a tilt of the bottle, the gravitational force will no longer be isolated exclusively to the Y-axis. For example, the bottle 300, as shown in FIG. 64, might be rotated clockwise such that the bottle is positioned at an angle. In this example, it is assumed that the bottle is not rotated back-to-front, i.e. such that no acceleration will be observed along the z-axis, in and out of the paper as shown in FIG. 64.

Accordingly, as the bottle is rotated clockwise, the gravitational force will no longer be isolated exclusively to the Y-axis of the accelerometer, i.e. the Y-axis of the bottle. Rather, as the bottle is rotated clockwise, the Y-axis component of the acceleration will decrease. In a proportional manner to the decrease in the Y-axis component, the X-axis component of the acceleration will increase. A slight tilt off-center will result in only a small proportion of the gravitational force being transferred onto the X-axis of the bottle. Upon the bottle being tilted so as to be horizontally disposed, the gravitational force will exclusively exist along the X-axis, i.e., with such orientation of the bottle there will be no Y-axis component. Further illustratively, when the bottle is tilted at a 45° angle, then 50% of the gravitational force will be along the Y-axis and 50% of the gravitational force will be along the X-axis.

Accordingly, the accelerometer controller 6410 and/or the ACP 360 can determine a distribution of gravitational forces between the three axes X-Y-Z of the accelerometer. Based on such distribution of gravitational forces, the angle of the bottle 300 can be determined using trigonometric relationships, such as via the use of Sine or Cosine related processing and relationships, for example. Other processing can be used so as to assess allocation of gravitational forces, i.e. static acceleration forces experienced by the accelerometer 355, and to track such allocation of forces into an orientation or tilt of the bottle. For example, a lookup table can be used so as to track or map an allocation of gravitational forces into a corresponding tilt angle of the bottle.

In such processing to determine angle of the bottle from data from the accelerometer 355, it should be appreciated that there can be other acceleration forces present that are not attributable to tilt. For example, in the above example in which the bottle was rotated clockwise about the z-axis, the user could be accelerating the bottle in a rightward direction. In other words, the bottle can be experiencing dynamic acceleration as well as static acceleration. In order to address such scenario, assumptions can be made and/or processing can be performed. For example, processing can be performed so as to isolate dynamic acceleration versus static acceleration. In the situation of a user taking a drink from a bottle, there can be dynamic acceleration forces resulting from the user moving the bottle up to her mouth. However, it may be the case that such dynamic acceleration is volatile and tends to greatly vary over a particular time period. On the other hand, static acceleration—due to a tilt of the bottle—may tend not to vary in a sufficiently small window of time, e.g. 0.01 seconds. Thus, a variable component of the acceleration can be subtracted out of a total acceleration observed. The result is the static acceleration—which can then be processed by the accelerometer controller 6410 and/or the ACP 360 so as to determine tilt of the bottle.

On the other hand, in other embodiments of the disclosure, it may be assumed that dynamic acceleration forces are negligible when compared to acceleration forces resulting from gravitational forces. Thus, for example, when the ACP 360 retrieves data from the accelerometer 355, so as to determine angle or tilt angle of the bottle 300, the ACP 360 may simply assume (by virtue of the code or instructions upon which the ACP 360 operates) that all acceleration forces are a result of static acceleration forces. Such assumption would be highly valid in the situation where a user slowly moves the bottle up to her lips in conjunction with tilt of the bottle, i.e., in that dynamic acceleration would be minimal. On the other hand, such assumption may not hold true in a dynamic situation in which the user is taking a sip from her bottle in an accelerating vehicle. However, even in such situation with an accelerating vehicle, the dynamic acceleration may still be sufficiently small, compared to the static acceleration resulting from tilt of the bottle, so that angle processing or tilt angle processing can still be performed with sufficient accuracy. Accordingly, in the processing of data from the accelerometer 355, in at least some embodiments of the disclosure, it may be assumed in the coding/instructions that all acceleration observed by the accelerometer 355 is due to static acceleration—with any dynamic acceleration being ignored for purposes of determination of bottle tilt angle.

The accelerometer 355 can include components of one or more known accelerometers as may be desired.

Additionally, known processing techniques can be utilized to determine tilt angle of the bottle from the accelerometer. Additionally, known processing techniques can be utilized to determine movement and/or acceleration of the bottle from the accelerometer.

As described herein, an accelerometer can be used to determine mass of the beverage apparatus or bottle 300. The beverage apparatus 300 may include various physical components including the removable cap 315C, the dispensing assembly 318, the various internal components (in the dispensing assembly 318) including the dispense mechanism 319, and the beverage chamber housing 315. The beverage apparatus 300 may also be understood to include the liquid 301, i.e. the consumable liquid, in the chamber and one or additive vessels or pods 400 that may be disposed in the dispensing assembly 318. The beverage apparatus 300 can contain, and more specifically each pod 400 can contain, additive. The pod 400 may be described as including the additive.

In the various processing described herein, the mass of the beverage apparatus 300 can be determined—with the objective of determining the amount of liquid that is contained within the beverage apparatus 300. Once the amount of liquid is determined, various beneficial processing can be performed such as controlling dispense so as to attain a desired concentration of additive(s); recording consumed amount of liquid; and reporting out/outputting the amount of liquid (in the form of a liquid level) to a user device. The liquid level can then be graphically displayed, as shown in FIG. 63 with bottle graphic 6300.

Relatedly, it should be appreciated that some parts of the beverage apparatus 300 are static in mass and some parts of the beverage apparatus 300 are dynamic in mass. The various physical components can be static in mass, e.g., the mass of the dispensing assembly 318 can be unchanging. On the other hand, the mass of the one or more pods can vary, i.e. mass of the pods is dynamic.

For example, a beverage apparatus 300 can have mass of about 500 grams (g) when empty and with no pods. The beverage apparatus 300 can contain 3 pods. Thus, the number of pods can vary in that the beverage apparatus 300 can contain 0, 1, 2 or 3 pods. Each of the pods empty can have mass of approximately 12 grams (g). In application, each pod can contain about 30.5 ml, in a slightly overfilled state. Density of the additive might be 1.02 g/mL.

Accordingly, mass of the liquid in the pod may be 31.1 g—or about 31 g. Thus, mass of the pod can be about 43 g, which includes mass of the pod empty (12 g)+mass of the additive (31 g). The beverage apparatus 300 can contain about 500 mL (having mass of 500 g, assuming a density of 1.0 g/mL).

Figure 67:
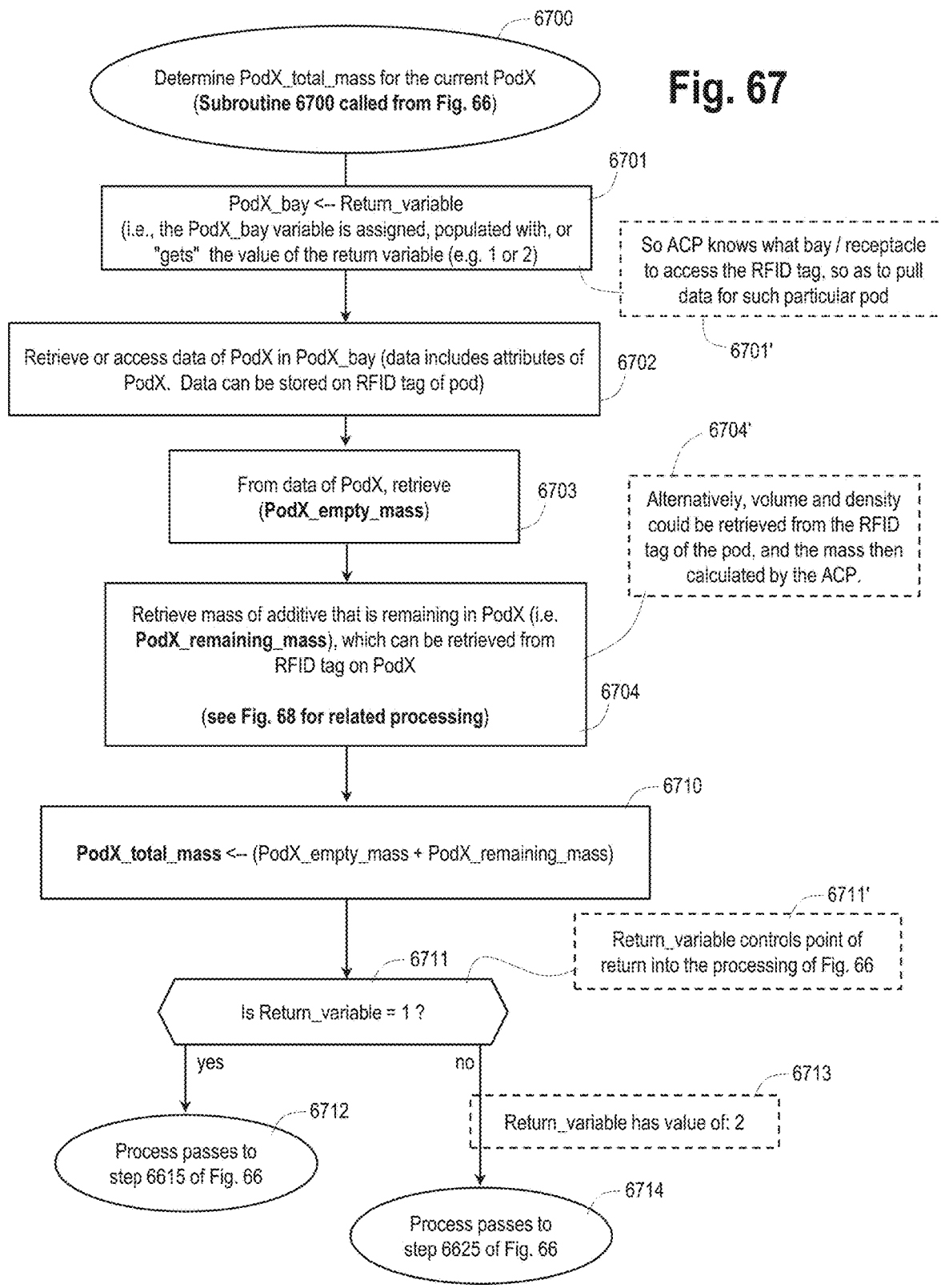
FIG. 67 is a flowchart showing a subroutine relating to determination of pod mass, according to principles of the disclosure.
Figure 68:
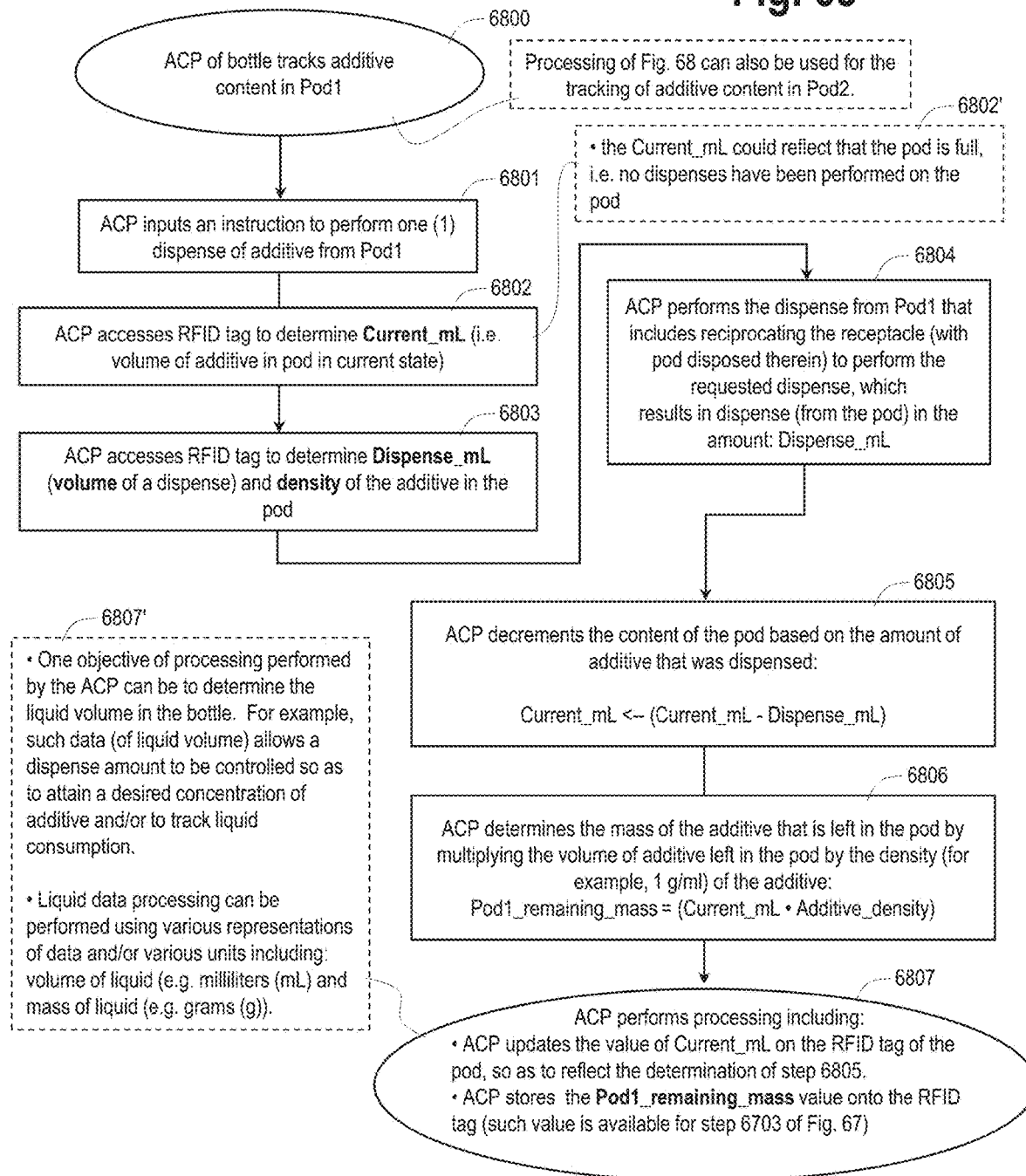
FIG. 68 is a flowchart showing details of the "ACP tracks additive content in a pod" processing, according to principles of the disclosure.

Accordingly, mass of 3 full pods can be in total 3×43 g=129 g. Accordingly, in processing in which liquid volume or level is determined from mass of the beverage apparatus 300, it can become important to "factor in" or consider the state of the pods. Such state of the pods can include whether the pods are indeed present and how full the pods are. Illustratively, volume of liquid in the chamber might be 160 ml, i.e. about one third full. In a first situation, one pod (with 5 ml of additive) might be in the beverage apparatus—providing total pod mass of 17 g. In a second situation, three pods (all full at 31 g of additive) might be in the beverage apparatus—providing total pod mass of the 129 g, as described above. Thus, total pod mass might be either 11 percent (17/160) or 81 percent (129/160). Accordingly, such example illustrates that it may be beneficial for the ACP to have data regarding pod state. FIGS. 66-68 are flowcharts that describe processing to determine pod state, as well as describe various other processing.

Accordingly, FIG. 66 is a flowchart showing details of "pod mass adjustment (PMA)" is performed, in accordance with at least some embodiments of the disclosure. Such PMA processing can include assessing state of the pods—including whether one or more pods are present and amount of liquid, respectively, contained therein. As reflected at 6600', in this example, the bottle (i.e. beverage apparatus 300) includes two bays, i.e. two receptacles, that can retain two respective pods. The illustrative processing of FIG. 66 might be implemented by the beverage apparatus 300 of FIG. 22, for example.

The process of FIG. 66 starts in step 6600 and passes to step 6611. In step 6611, the ACP determines if there is a pod in bay 1 of the bottle? In other words, the ACP determines if there is a Pod1. To determine whether a particular pod is present in a particular receptacle or "bay", a transceiver (e.g. RFID transceiver) assembly 340 can detect (or not detect) the presence of a respective RFID tag on the pod. The transceiver assembly 340 can then communicate this data/information to the apparatus computer processor (ACP) 360 of the controller 350. Accordingly, the ACP can possess data, i.e. know, whether a pod 400 is in each of the receptacles or bays 390. A no may be rendered in the processing of step 6611, thus reflecting that a pod is not present. Accordingly, based on the no determination, the process passes to step 6612.

In step 6612, the ACP sets or assigns the mass of Pod1 to 0, i.e. Pod1_total_mass←0. Accordingly, data can be saved (in a suitable database) that represents that no pod was detected in bay 1 of the beverage apparatus 300. Such data can be saved in the apparatus database portion 370, as shown in FIG. 19. After step 6612, the process passes to step 6621. On the other hand, a yes may be rendered in step 611— indicating that there is indeed a pod in bay 1 of the beverage apparatus 300.

Accordingly, the process passes to step 6613. In step 6613, the ACP sets variables to perform processing of the subroutine 6700. To explain, the apparatus database portion 370 can include a variable: Pod1_identifier. Such variable can be stored in a suitable data record in the apparatus database portion 370 (in the controller 350). The RFID tag 410 of the pod 400 can store a unique identifier. For example, the unique identifier might be 1234. In the processing of FIG. 6613, the ACP can read the unique identifier (1234) from the RFID tag—and assign the value (i.e. 1234) to the variable Pod1_identifier. This value can then be used in processing as described below and in particular to access data of the particular pod.

Also in the processing of step 6613, the ACP assigns a value to a further variable: Return_variable. That is, in step 6613, the ACP assigns a value of "1" to the variable Return_variable since it is the pod in bay "1" that is currently being processed. In short, the value contained in the Return_variable allows the ACP to keep track of which bay the ACP is working with—such as in step 6711 described below.

After step 6613, the process passes to step 6614. In step 6614, the ACP performs processing to determine PodX_total_mass for the current PodX. As described above, the current value of PodX is 1234, in the described processing. In the processing of step 6614, subroutine 6700 of FIG. 67 can be called or invoked. As described below in step 6710, the processing of step 6614 and subroutine 6700 yields a value that can be stored in a variable PodX_total_mass. Such value represents total mass of the pod in bay 1. The subroutine 6700 can use the value of PodX, in step 6702 as described below, so as to access the current pod and/or data regarding the current pod.

Further details of the processing of subroutine 6700 (called from step 6614) are described below with reference to FIG. 67.

With further reference to FIG. 66, after step 6614, the process passes to step 6615. In step 6615, the value in the variable PodX_total_mass is assigned to a variable Pod1_total_mass. Both of such variables can be stored in data records in the apparatus database portion 370, such as in the bottle status database 374. The value in the Pod1_total_mass can be used in further processing, such as in step 6630 (FIG. 66). Once the value of PodX_total_mass is assigned to Pod1_total_mass, such PodX_total_mass variable is then available for other processing—such as the processing of Pod2 in steps 6621-6625. Accordingly, subroutine 6700 can be invoked for both the processing of the pod in bay 1 and for the processing of the pod in bay 2.

After step 6615 of FIG. 66, the process passes to step 6621. The further processing of FIG. 66 will be described below.

As described above, subroutine 6700 can be called or invoked in step 6614. Hereinafter, subroutine 6700 will be described with reference to FIG. 67. Subroutine 6700 can be called or invoked in step 6614 (FIG. 66), with value of PodX=1234 and value of Return_variable=1. The process of the subroutine of FIG. 67 starts in step 6700 and passes to step 6701. In step 6701, the PodX_bay variable is assigned, populated with, or "gets" the value of the return variable (i.e. 1 in this described processing). As reflected at 6701', step 6701 can be performed so the ACP knows what bay/receptacle 390 to access the RFID tag, so as to pull data for such particular pod. After step 6701, the process passes to step 6702.

In step 6702, the ACP retrieves or accesses data of PodX in the PodX_bay, which in this case is Pod1 in bay 1. The retrieved data can include attributes of PodX. The retrieved data can be described as "pod data", i.e. data that is retrieved from the pod can be described as pod data. For example, data can be stored on the RFID tag of the pod—and the ACP can retrieve the data from the RFID tag via the RFID reader or device. Then, from the data of PodX, the ACP retrieves a value (representing a mass of the pod in an empty state) and assigns such value to the variable PodX_empty_mass. Such variable PodX_empty_mass can be stored in the bottle status database 374. Then the process passes to step 6704.

In step 6704, the ACP retrieves mass of additive that is remaining in PodX (i.e. PodX_remaining_mass), which can be retrieved from the RFID tag on PodX, i.e. Pod1. The value of PodX_remaining_mass can be determined and/or maintained via the processing of FIG. 68. That is, a purpose of the processing of FIG. 68 is to maintain a current or updated mass of additive or concentrate that is left in the particular pod. As additive is dispensed from Pod1 into the liquid in the chamber 316, the value of PodX_remaining_mass is appropriately decremented.

The processing of FIG. 67 includes retrieving "mass" related data from the RFID of the pod. Accordingly, in this embodiment, it is a "mass" value that is updated on the RFID tag of the particular pod (so as to track additive, as such additive is dispensed over time;). As reflected at 6704' (FIG. 67), alternative processing can be performed. For example, volume (of additive left in the pod) and density (of the additive in the pod) could be retrieved from the RFID tag of the pod, and the mass then calculated by the ACP (based on the retrieved volume and density).

Relatedly, density of additive can be around 1 g/mL, i.e. the density of water. Density can vary based on content of the particular additive. In accordance with at least some embodiments of the disclosure, rather than "density", a density adjustment factor can be used—such that the ACP works off a base density of 1 g/mL, as adjusted based on such adjustment factor. Thus, with such processing, the ACP can read the "density adjustment factor" from the RFID tag of the pod. In other embodiments, the additive can simply be assumed to have a density of 1 g/mL.

After the processing of step 6710 of FIG. 67, the process passes to step 6710. In step 6710, processing is performed to determine the total mass of the pod, which in this processing example is Pod1. In step 6710, the PodX_empty_mass (from step 6703) and the PodX_remaining_mass (from step 6704) are summed together so as to render a value of total mass of the pod which is stored in the variable PodX_total_mass. After step 6710, the process passes onto step 6711.

In step 6711, the ACP determines if the Return_variable has a value of 1. As reflected at 6711', the value of the variable Return_variable controls point of return, of the subroutine 6700, into the higher level processing of FIG. 66.

That is, in step 6613 (FIG. 66), the variable Return_variable is toggled to value 1, as described above. Accordingly, the Return_variable keeps track of whether subroutine 6700 is being performed for Pod1 or Pod2.

That is, in step 6711, if the Return_variable has a value of 1, then the process passes to step 6712. In step 6712, the process passes to step 6615 of FIG. 66. If the Return_variable does not have a value of 1, then the Return_variable necessarily has a value of 2, in accordance with this illustrative embodiment of the disclosure. Accordingly, the process passes onto step 6714. In step 6714, the process passes to step 6625 of FIG. 66.

In FIG. 66, the processing of steps 6611-6615 may collectively be described as constituting step 6610 of FIG. 66, i.e.

PMA adjustment is performed for the pod in bay 1 (in receptacle 1) of the bottle 300.

Further, in FIG. 66, the processing of steps 6621-6625 may collectively be described as constituting step 6620 of FIG. 66, i.e. PMA adjustment is performed for the pod in bay 2 (in receptacle 2) of the bottle 300. That is, step 6620 of FIG. 66 can include steps 6621, 6622, 6623, 664, and 6625. In such steps, processing can be performed so as to determine a total mass of Pod2. Such processing can be similar to the processing in which the mass of Pod1 is determined. The processing of step 6620 can also invoke subroutine 6700. Accordingly, the process can render a Pod2_total_mass in step 6625.

Figure 69:
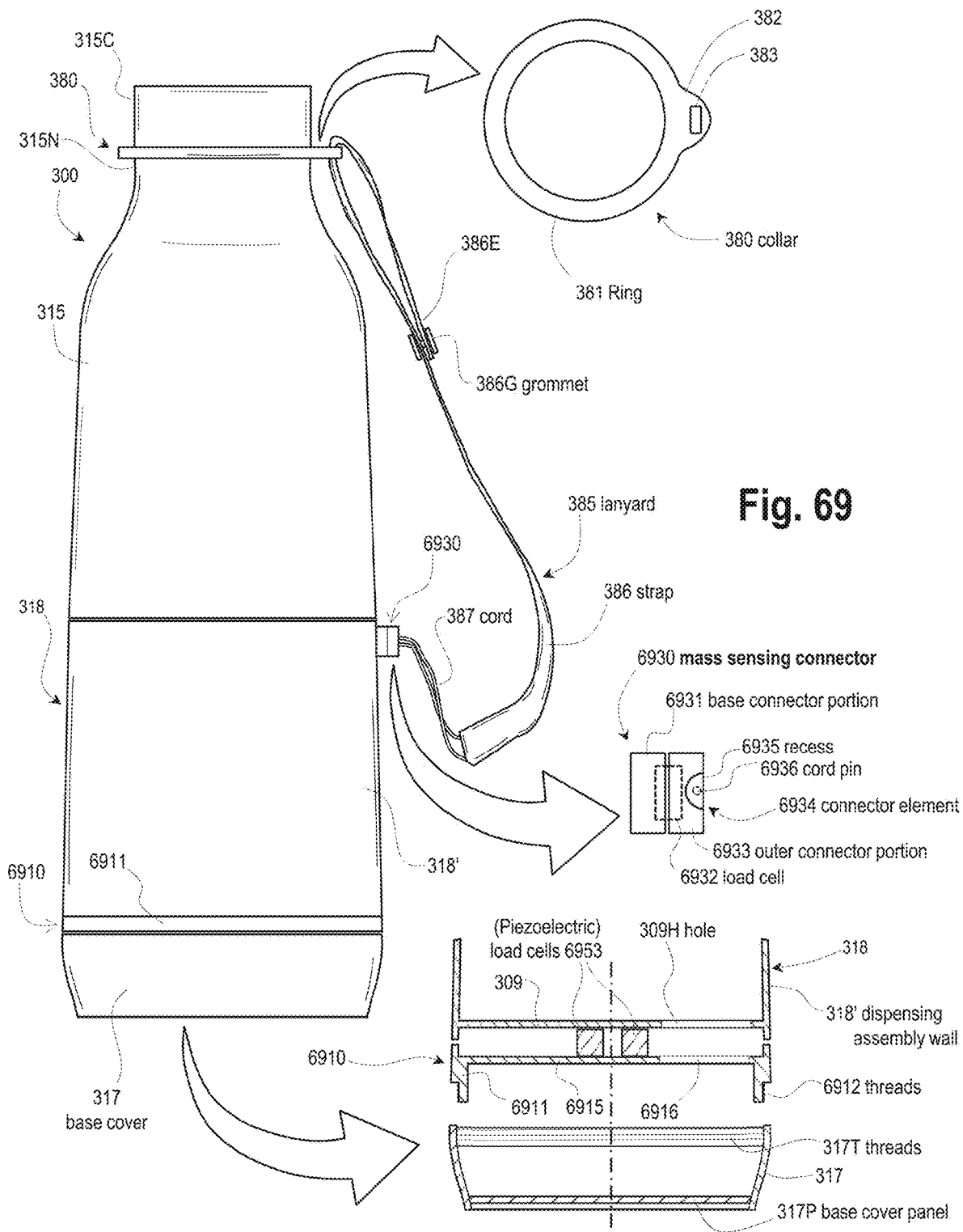
FIG. 69 shows a further beverage apparatus, according to principles of the disclosure.

After either of step 6622 or step 6625, the process passes onto step 6630. In step 6630, the ACP determines a calculated liquid mass of the consumable liquid in the beverage apparatus. That is, the calculated liquid mass can be determined by "subtracting off" appropriate masses from a total mass determined from mass inference, data from the accelerometer, and/or other mass determination methodologies as illustrated in FIG. 69. Such appropriate masses that are subtracted off can include empty mass of the bottle and mass of the various pods, including additive in the pods.

After step 6630, the process passes onto step 6631. In step 6631, the ACP determines a "determined liquid level" or liquid volume based on the determined liquid mass. Then, the process passes onto step 6632. In step 6632, the process advances to step 5805 of FIG. 58. Processing then continues as described above.

FIG. 68 is a flowchart showing details of the ACP tracks additive content in Pod1 step 6800, in accordance with at least one embodiment. The processing of FIG. 68 can also be used for the tracking of additive content in Pod2. The process starts in step 6800 and passes onto step 6801. In step 6801, the ACP inputs an instruction to perform a dispense of additive from the pod. Then, in step 6803, the ACP accesses the RFID tag of the pod to determine the volume of additive in the pod in the current state. That is, how much additive is left in the particular pod. As reflected at 6802', the current volume or Current_mL could reflect that the pod is full, i.e., that no dispenses have been performed on the pod. After step 6802, the process passes onto step 6803.

In step 6803, the ACP accesses the RFID tag of the pod to determine a volume of a dispense. That is, how much of the additive should be dispensed in a dispense event. The ACP can also retrieve the density of the additive in the pod. Then, in step 6804, the ACP performs the dispense from the pod. The dispense can include reciprocating the receptacle with pod disposed therein. The reciprocation of the receptacle can provide the requested dispense. The value of the dispense amount can be stored in a variable Dispense_mL. Then, the process passes onto step 605. In step 6805, the ACP decrements the content of the pod based on the amount of additive that was dispensed. That is, the ACP decrements a current liquid level or mass level (in the pod) by the dispensed amount of additive, and then stores such newly calculated value as the current volume of additive in the pod (Current_mL). After step 6805, the process passes onto step 606. In step 6806, the ACP determines the mass of the additive that is left in the pod by multiplying the volume of additive left in the pod by the density of the additive. In some embodiments, the density of the additive could simply be assumed to equal 1 g/mL. Accordingly, the processing of step 6806 renders the remaining mass of additive retained in Pod1. Then, process passes onto step 6807. In step 6807, the ACP performs processing including: (1) ACP updates the value of Current_mL on the RFID tag of the pod, so as to reflect the determination of step 6805; and (2) the ACP stores the Pod1_remaining_mass value onto the RFID tag (such value is available for step 6703 of FIG. 67). The process of FIG. 68 is then terminated.

FIG. 68 is described as tracking the additive or additive content in Pod1. It should be appreciated that the same or similar processing can be used to track the additive or additive content in Pod2 as well as for additional pods if the particular bottle is provided to retain additional pods.

As reflected at 6807', one objective of processing performed by the ACP can be to determine the liquid volume in the bottle. For example, such data (of liquid volume) allows a dispense amount to be controlled so as to attain a desired concentration of additive and/or to track liquid consumption. As otherwise described herein, liquid data processing can be performed using various representations of data and/or various units including volume of liquid (e.g. milliliters (mL) and mass of liquid (e.g. grams (g)).

As described herein, the controller 350 of the beverage apparatus 300 can use data from an onboard accelerometer 355 to determine mass of the beverage apparatus 300, as well as mass of the liquid contained within the beverage apparatus 300. Once the mass of the liquid in the beverage apparatus 300 is determined—such as for example in the processing of step 5801 of FIG. 58—then the volume of liquid in the beverage apparatus 300 can be determined.

Processing can then be performed based on the mass of the liquid and/or the volume of the liquid. Such processing can include outputting liquid level to a user device or controlling a dispense amount of additive into the liquid. FIG. 69 is a diagram of a bottle or beverage apparatus 300 showing further features relating to determination of mass of the beverage apparatus or bottle 300.

Hereinafter, illustrative processing particulars are described, which may be related to the processing of FIG. 68.

Such particulars are for purposes of illustration and may be varied as desired.

In step, 6806 (FIG. 68), the volume of the additive left in the pod can be converted to mass based on density of the additive. For example, if there is 18 mL of additive left in the pod, and the density of the additive is 1.02 g/mL, then the mass of such remaining additive in the pod can be calculated to be 17.6. Thus, in this example in step 6806 (FIG. 68), the Pod1_remaining_mass value would be 17.6. Such Pod1_remaining_mass value of 17.6 can then be used in the processing of step 6710 (FIG. 67). Alternatively, density of the additive can simply be assumed to be 1.0 g/mL.

Accordingly, for example, if 7 mL of additive is dispensed from a pod (with full volume of 30 mL), then remaining volume is 23 mL with mass of 23 grams.

In step 6631 (FIG. 66), the ACP can determine liquid volume, in the beverage chamber 316, based on an assumption that density of liquid in the chamber 316 is 1.0 g/mL.

This assumption of 1.0 g/mL can be used by the ACP to convert mass of the liquid, as determined in step 6630 (FIG. 66), to volume. As otherwise described herein, such determined volume can then be used to control amount of additive that is dispensed, i.e. so as to attain a desired concentration of additive in consumable liquid in the chamber 316.

In more complex processing, the content of additive dispensed into the chamber 316, i.e. into the consumable liquid, may be tracked so as to factor into the processing. For example and to explain, consumable liquid in the bottle might include 390 mL water (density=1.0 g/mL) and include 10 mL additive/concentrate (density=1.05 g/mL).

Accordingly, the 400 ml of consumable liquid possesses density of: Density=(((390·1.0)+(10·1.05))/400)=1.0. Thus, the additive may make minimal impact on the overall density. Accordingly, it is appreciated that regardless of additive in the consumable liquid, a density of 1.0 may be deemed a reasonable assumption.

FIG. 69 shows a beverage apparatus 300, in accordance with at least some embodiments of the disclosure. The beverage apparatus 300 can contain consumable liquid. The beverage apparatus 300 can include a beverage chamber housing 315. A removable cap 315C can be screwed onto the top of the beverage chamber housing 315.

The beverage chamber housing can include an upper neck 315N. The removable cap 315C can be removed so as to access liquid, i.e. consumable liquid, in the beverage apparatus 300. The beverage apparatus 300 can include a lanyard 385. The lanyard 385 can be used to support the beverage apparatus 300 and to carry the beverage apparatus 300. The lanyard 385, as shown in FIG. 69, can be attached to the beverage apparatus 300 by a collar 380 and a mass sensing connector 6930. The collar 380 can attach a top end of the lanyard 385 to the neck 315N of the beverage apparatus 300. For example, the collar 380 can be "snapped" or positioned in a slot or groove that runs around the neck 315N of the beverage apparatus 300. The collar can be secured, supported or held in place by screwing the removable cap 315C onto the top of the beverage apparatus 300. The collar 380 can include a ring 381 that is constructed to encircle the neck 315N of the beverage apparatus 300. The collar can also include a connection tab 382. The connection tab 382 can be attached to the collar 380 or can be a part the of collar 380. The connection tab 382 can include opening 383. The top of the lanyard 385 can pass through the opening 383 so as to be secured to the collar 380. The lanyard 385 can be looped back on itself so as to form a loop as illustrated in FIG. 69. Relatedly, a grommet 386G or similar structure can be used to attach an end 386E of the lanyard 385 to a middle portion of the lanyard 385, as shown in FIG. 69. The lanyard 385 can include a strap 386 and a cord 387.

The cord 387 can be attached to the strap 386, such as the cord 387 being looped through a loop in the strap 386, the cord 387 being sewed to the strap 386, or the cord 378 and the strap 386 being connected together in some other manner.

At a lower end, the lanyard 385 can be attached to the dispensing assembly 318 using a mass sensing connector 6930. The mass sensing connector 6930 can afford mass sensing capability to the beverage apparatus 300. The mass sensing connector 6930 can include a base connector portion 6931 and an outer connection portion 6933. The base connector portion 6931 can be connected to the outer connection portion via a load cell 6932, with the load cell sensing load that is exerted between the base connector portion 6931 and the outer connector portion 6933. The base connector portion 6931 can be attached to the dispensing assembly 318, such as by fastener or adhesive, for example. The base connector portion 6931 can be integrally formed with the dispensing assembly 318. The base connector portion 6931 can be described as a first support structure and the outer connector portion can be described as a second support structure.

The outer connection portion 6933 can include a connector element 6934. The connector element 6934 can include a recess 6935 that accommodates a pin 6936. The lanyard 385 can be attached to the connector element 6934. For example, the cord 387, of the lanyard 385, can be attached or looped through the connector element 6934. In operation, a user can grab hold of the lanyard 35 at the junction of the strap 386 and the cord 387. Accordingly, the mass or weight of the beverage apparatus, excepting a portion of the lanyard 385, can be supported by the cord 387 as attached to the outer connector portion 6933. That is, the portion of the lanyard 385 that connects onto the collar 380 can be "slack" and not supporting mass of the beverage apparatus 300. In such arrangement, the beverage apparatus or bottle 300 may be disposed in a horizontal or substantially horizontal orientation, i.e., since the mass of the bottle is being supported by the mass sensing connector 6930. In such arrangement, the mass or weight of the beverage apparatus 300 can be supported by the load cell 6932 which connects the outer connector portion 6933 with the base connector portion 6931. Accordingly, the load cell 6932 can detect or sense the mass of the beverage apparatus 300. The load cell 6932 can output a signal or other output to the apparatus controller 350. Based on the output, the load cell 6932 and/or the apparatus controller 350 can determine a mass of the beverage apparatus 300.

Accordingly, such arrangement, with the mass sensing connector 6930, can provide an alternative to determining mass of the beverage apparatus 300 based on output from the accelerometer. Once the mass of the beverage apparatus 300 is determined from output from the load cell 6932, such mass can be appropriately adjusted so as to determine mass of the liquid contained in the chamber 316 of the beverage apparatus 300. For example, the mass as determined from output of the load cell 6932 can be adjusted based on (1) an empty mass of the beverage apparatus 300, and (2) mass of the one or more pods with additive that are disposed in the beverage apparatus 300. According to principles of the disclosure, the mass of the beverage apparatus can be described as including (1) a first mass being the beverage apparatus empty of consumable liquid and without the vessel, (2) a second mass being the vessel with additive, and (3) a third mass being the consumable liquid.

The processing used to perform such adjustment of the mass (input from the mass sensing connector 6930, can include the pod mass adjustment (PMA) processing as performed in FIG. 66, for example. Accordingly, a mass determination from the mass sensing connector 6930 can be utilized instead of the mass as determined from output from the accelerometer (and as reflected in the processing of step 5801 of FIG. 58).

In accordance with at least some embodiments of the disclosure, the load cell 6932 can be mechanically fastened or connected by adhesive to each of the base connector portion 6931 and the outer connector portion 6933. The load cell 6932 can be constructed of the piezoelectric element such that current passing through the load cell 6932 varies as load is varied on the load cell 6932. The load cell 6932 can be connected, such as via wires, to the controller 350.

Accordingly, the controller 350 can input a mass reading or a weight reading from the load cell 6932. Other known load cell technologies or arrangements can be utilized so as to provide the load cell 6932—and so as to detect forces exerted between the outer connector portion 6933 and the base connector portion 6931.

The beverage apparatus 300 can include a further arrangement to measure the mass of the beverage apparatus 300 and liquid in the beverage apparatus 300. To explain, as shown in FIG. 69, the beverage apparatus 300 can include a dispensing assembly 318 that can include a dispensing assembly wall 318'. The beverage apparatus 300 can also be provided with a lower extension 6910. The lower extension 6910 can include a lower extension wall 6911. An outer surface of the lower extension wall 6911 can provide a continuous outer surface with the dispensing assembly wall 318'. The lower extension 6910 can include outer threads 6912. The outer threads 6912 can threadably engage with base cover 317. In particular, the outer threads 6912 can threadably engage with threads 317T of the base cover 317.

The base cover 317 can be removed so as to afford for the user inserting a pod into the beverage apparatus 300 and/or removing a pod. The base cover 317 can include a base cover panel 317P that can cover and protect the pods 400. The base cover panel 317P can be clear or transparent such that the user can see which pods are disposed in the beverage apparatus 300. For example, the user may want to see the flavor or content of the one or more pods in the beverage apparatus 300.

With regard to the mass sensing capability afforded by the lower extension 6910, the lower extension can include a lower extension platform 6915. Additionally, the dispensing assembly 318 can include the bottom support platform 309. The bottom support platform 309 can be connected to and supported by the lower extension platform 6915 via one or more load cells 6920. The bottom support platform 309 can be described as a first support platform or described as an upper platform relative to the lower extension platform 6915. The lower extension platform 6915 can be described as a second support structure or described as a lower platform relative to the bottom support platform 309.

Accordingly, the load cell(s) 6920 can detect or sense mass of the beverage apparatus 300. More specifically, the load cell 6920 can output a signal or other output to the apparatus controller 350. Based on the output, the load cell 6920 and/or the apparatus controller 350 can determine a mass of the beverage apparatus 300. Accordingly, such arrangement, with the load cell 6920, can provide an alternative to determining mass of the beverage apparatus 300 based on output from the accelerometer. Once the mass of the beverage apparatus 300 is determined from output from the load cell 6920, such mass can be appropriately adjusted so as to determine mass of the liquid contained in the chamber 316 of the beverage apparatus 300. For example, the mass as determined from output of the load cell 6932 can be adjusted based on (1) an empty mass of the beverage apparatus 300, and (2) mass of the one or more pods that are disposed in the beverage apparatus 300. Additionally, the sensed mass input from the one or more load cells 6920 can be adjusted so as to account for the mass of the lower extension 6910 and the base cover 317. That is, such elements 6910, 317, can be accounted for since such elements do not contribute to the mass sensed by the load cell 6920, i.e., such elements 6910, 317 are disposed below the load cell(s) 6920 and do not contribute to the sensed mass. The processing used to perform adjustment of the mass (input from the mass sensing connector 6930), can include the pod mass adjustment (PMA) processing as performed in FIG. 66, for example. Accordingly, a mass determination from the mass sensing connector 6930 can be utilized instead of the mass as determined from output from the accelerometer. (and as reflected in the processing of step 5801 of FIG. 58).

The load cell(s) 6920 can be constructed of the piezoelectric element such that current passing through the load cell(s) 6920 varies as load is varied on the load cell(s) 6920. The load cell(s) 6920 can be connected, such as via wires, to the controller 350. Accordingly, the controller 350 can input a mass reading or a weight reading from the load cell(s) 6920. Other known load cell technologies or arrangements can be utilized so as to provide the load cell 6920—and so as to detect forces exerted between the lower extension platform 6915 and the bottom support platform 309. The bottom support platform 309 can be provided with one or more holes 309H so as to accommodate respective inserted additive vessels or pods 400 as well as a receptacle or other structure to support such pods 400. The lower extension platform 6915 can be provided with one or more holes 6916 so as to accommodate respective inserted additive vessels or pods 400 as well as a receptacle or other structure to support such pods 400. Other structure may be utilized so as to support the one or more load cells 6920 in a desired arrangement. Accordingly, the disclosure is not limited to attaching the load cells 6920 to the bottom support platform 309 and the lower extension platform 6915.

According to principles of the disclosure, a load cell or other element can communicate an electrical signal to the apparatus controller 350 and/or the ACP 360 such that the ACP can input a mass attribute of the beverage apparatus.

The mass attribute can be an observed attribute that relates to mass of the beverage apparatus or weight of the beverage apparatus in a particular gravitational field. The mass attribute can be an acceleration of the beverage apparatus that can be represented by acceleration vectors, i.e. data, as described herein. For example, the mass attribute can indeed be a mass value or mass of the beverage apparatus—or a mass of a portion of the beverage apparatus. A load cell or other load sensing device, as described herein, can convert a force (i.e. the force being the mass attribute), that is applied to the load cell, into an electrical signal, i.e. "data". As a force that is applied to the load cell changes, the electrical signal, which is output by the load cell, changes in a proportional manner. The load that is applied to the load cell can include compression, tension, torque, and/or pressure, for example. As the mechanical stress or force on the load cell varies, the voltage output from the load cell can also vary. A charge amplifier can be used to amplify the electrical signal output from a load cell. The charge amplifier can amplify such output electrical signal so as to be easier to read by a controller, user interface device, or other device.

Known load cell technology can be used in the load cells as described herein, as may be desired. For example, a load cell used in the beverage apparatus 300 can include, or be constituted by, a piezoelectric element or a strain gauge element. The piezoelectric element can be constructed of a piezoelectric crystal, such as quartz, for example.

In known manner, the piezoelectric element can produce an electrical charge when placed under mechanical stress or force. A voltage output from the piezoelectric element can be proportional to the mechanical stress. A current output from the piezoelectric element can be proportional to the mechanical stress. A load cell as described herein can also be constructed of other materials. The load cell can include a spring that changes shape as load is applied to the spring.

The change in shape can be detected by elements, such as two capacitive elements that generate different electrical output as distance or spatial relationship between such two elements varies. A load cell of the disclosure can be constructed of wire or other structure that varies in shape as load is applied to the wire. As greater tension force is applied to the wire, the wire extends or elongates such that a proportional change in resistance of the wire changes. Accordingly, tension stretches the wire or other structure—causing the wire to get thinner and result in an increase in resistance. On the other hand, a compressive force can compress the wire or other structure so as to result in the wire to get thicker and a decrease in resistance. A controller or other device can flow electric charge through the load cell so as to detect the change in resistance of the wire or other structure. By processing the variation in detected voltage and/or current, the load exerted on the load cell can be determined.

In the case that a single load cell as described herein is applied to a particular application, a plurality of load cells can be used. In the case that a plurality of load cells are described herein as applied to a particular application, a single load cell can be used, as may be desired.

FIG. 70 is a diagram illustrating the use of neural networks in the processing of the disclosure. FIG. 70 illustrates a neural network 7000. The neural network can include a plurality of nodes or neurons 7001. Sensor input can be input into the neural network 7000. The sensor input can include sensor input 1, sensor input 2, and sensor input 3.

The input can be input via an input layer. Then processing can be performed in a plurality of hidden layers as is shown in FIG. 70. The hidden layers can include a plurality of nodes 7001. A node 7001 can be provided input $x_1$, $x_2$, $x_N$ as illustrated. The node 7001 can assign each input with a respective weight, for example, $w_1$, $w_2$, $w_3$, respectively. Further, the node can utilize a relationship, function, or mechanism so as to generate an output based on input data and weight accorded to such input data. The input data can include temperature values, for example. As shown, there can be multiple hidden or internal layers to the neural network 7000. The neural network 7000 can be trained based on observed decisioning of the neural network as compared to desired decisioning. In training of the neural network, weight assigned to a particular input can be varied. As shown, an output "y" can be output from the node 7001. Processing of the neural network 7000, in this example, can result in both a level output and a certainty output, i.e. a level output and certainty output "pair". Accordingly, the neural network 7000 can be applied to determining the certainty of an input liquid volume or liquid level value, for example.

A beverage apparatus 300 and various related features are described above. For example, various features are described relating to liquid level determination features. FIG. 71 is a schematic diagram of a beverage apparatus 7100 in accordance with principles of the disclosure. The beverage apparatus 7100 can include an internal volume 7102 and a top 7101. The beverage apparatus 7100 can include a variety of liquid level sensors, as reflected at box 7100'. Any of the liquid level sensors shown in FIG. 71 and described with reference thereto can be used alone or in combination with any liquid level sensor or liquid level device described in this disclosure.

The beverage apparatus 7100 of FIG. 71 can include an accelerometer or accelerometer device 7180. Various aspects of an accelerometer and functionality provided by an accelerometer are described above. For example, an accelerometer can provide liquid data, including liquid level, using mass inference processing and related processing, as described in detail above. Mass inference can provide a technique that can be used to infer water level from the effect of mass on acceleration whenever the beverage apparatus or bottle is moved. A given human arm can apply a reasonably consistent force when lifting a bottle to drink or when moving around. Deviations from such reasonably consistent force can be used to predict or detect mass of a beverage apparatus, and thus detect an amount of liquid in the beverage apparatus. Such deviations can be determined based on associations between observed attributes of motion or acceleration vis-à-vis known attributes of motion or acceleration, i.e. known attributes that can be mapped to a particular liquid volume or liquid level. Also, an accelerometer can provide various information to a controller of the beverage apparatus regarding static and dynamic forces experienced by the beverage apparatus, as well as acceleration of the beverage apparatus. An accelerometer can provide angle of tilt of a beverage apparatus. The accelerometer 7180 can be in communication with the controller 7109 so as to exchange data with the controller and/or be powered by the controller. A known accelerometer can be used in a beverage apparatus of the disclosure so as to provide data that an accelerometer can provide in a known manner.

The beverage apparatus 7100 can also include a capacitive device 7120. The capacitive device 7120 can include a parallel plate capacitor. The capacitive device 7120 can be constructed using two metal plates 7121, as shown in FIG. 71, that are positioned a predetermined distance from each other and that are parallel to each other. A capacitance value in Farads, for example, can be determined by an overlapping surface area of the conductive plates and the distance of separation between the conductive plates. An electrostatic field can be provided, i.e. an electrostatic field can be generated by running a current to the plates 7121. Altering values or attributes associated with the capacitive device 7120 can alter the value of capacitance in the device. For example, larger plates and a smaller distance between the plates can vary capacitance of a capacitive device 7120. In the situation of a given capacitive device 7120, a variable that can be varied is matter (or lack thereof) that is positioned between the plates 7121. A dielectric constant can be described as a ratio of the permeability/permittivity of a substance to the permeability/permittivity of free space. That is, in a vacuum, the dielectric constant (0 can be described as a permittivity of free space and can be defined as 1.000. For air, the dielectric constant can be 1.0006. For water, the dielectric constant can be about 80. This large difference or difference between dielectric constant values for air and water is what can cause a measured potential between plates (or measured "fringing off" to the sides of the plates) to be different when air or water, or some combination of both, is seen by the electrostatic field. The capacitive device 7120 is not limited to the particular arrangement shown in FIG. 71. The capacitive device 7120 can be positioned as desired in the beverage apparatus 7100. Additionally more than one capacitive device 7120 can be utilized. In the arrangement shown in FIG. 71, as liquid level in the beverage apparatus 7100 increases, more and more matter, i.e. liquid, will be disposed between the plates 7121. The plates 7121 can be connected to a the controller 7109 and/or a dedicated capacitive device controller that can measure capacitive attributes between the plates 7121. As liquid level varies, capacitive attributes between the plates 7121 can vary. Accordingly, an observed capacitive attribute can be mapped or associated with a known capacitive attribute. The known capacitive attribute can be mapped to a known liquid volume or other liquid value. An observed capacitive attribute can be mapped to a known liquid level. The capacitive device 7120 can be in communication with the controller 7109 so as to exchange data with the controller and/or be powered by the controller 7109. A known capacitive device can be used in a beverage apparatus of the disclosure so as to provide data that a capacitive device can provide in a known manner.

The beverage apparatus 7100 can also include a hydrostatic pressure sensor 7170. The hydrostatic pressure sensor 7170 can include an envelope that is compressible. The envelope can be compressed by pressure of the liquid in which it is immersed. Such pressure of the liquid/water can be described as hydrostatic pressure. This compression of the envelope can result in a change in resistance that corresponds to an amount that the hydrostatic pressure sensor 7170 is immersed. For example, complete immersion can result in greater resistance of a current passed through the sensor 7170 vis-à-vis an empty disposition (of the beverage apparatus 7100) can result in less resistance.

Accordingly, observed resistance can be inversely related to the height of the liquid level. A conductive path can be provided through the envelope of the sensor 7170 and/or through wires or other components that are associated with the envelope of the sensor 7170. Resistance through such conductive path can be the resistance that is measured.

The envelope of the sensor 7170 can extend within the internal volume 7102 a vertical distance as desired. The hydrostatic pressure sensor 7170 can be in communication with the controller 7109 so as to exchange data with the controller and/or be powered by the controller 7109. A known hydrostatic pressure sensor can be used in a beverage apparatus of the disclosure so as to provide data that a hydrostatic pressure sensor can provide in a known manner.

The beverage apparatus 7100 can also include a float device 7150. The float device 7150 can include an arrangement that physically varies as liquid level in the beverage apparatus 7100 varies. The float device 7150 can include a housing 7151. The housing can include a bore 7151B. The float device 7150 can also include a float 7154.

The float 7154 can be affixed atop a sensor pole 7152. The sensor pole 7152 can be slidably received within the bore 7151B. Accordingly, the sensor pole 7152 can slide up and down within the bore 7151B as the liquid level in the beverage apparatus changes. The float device 7150 can be attached to a side wall of the beverage apparatus 7100. The float device 7150 can be supported by a support structure 7159 that is in turn attached or supported by the side wall of the beverage apparatus 7100.

The float 7154 can be constructed so as to be buoyant. Thus, as liquid level changes within the beverage apparatus 7100, position of the float 7154 will also vary. Since the float 7154 is affixed to the sensor pole 7152, position of the sensor pole 7152 will also vary. More specifically, as liquid level in the beverage apparatus 7100 varies, the sensor pole 7152 will slide up or down within the bore 7151B. The sensor pole 7152 can be provided with a plurality of sensor elements 7152' along the length, i.e. vertical extent or height, of the sensor pole 7152. The housing 7151 can be provided with a sensor element 7151'. The sensor element 7151' can interact with one or more of the sensor elements 7152' such that relative position of the sensor pole 7152 vis-à-vis the housing 7151 can be determined. For example, the plurality of sensor elements 7152' can be different in attribute such that the sensor element 7151' can determine, i.e. "knows", which sensor element 7152' is proximate (to the sensor element 7151'). Thus, the relative position of the sensor pole 7152 vis-à-vis the housing 7151 can be determined. Thus, a position of the sensor pole 7152, and consequently position of the float 7154, can be determined. The float 7154 can be assumed to be level with the liquid level. Thus, the liquid level can be determined. It should be appreciated that the various spatial attributes or geometries of the float device 7150 can be varied as desired. The allowed vertical "travel" of the sensor pole 7152 within the housing 7151 can be provided by the structure (of the float device 7150) so as to measure a predetermined range of liquid levels. Travel of the float 7154, up and down in the housing 7151, can be limited by stops or constraints—such as a flange at the bottom of the sensor pole 7152 that limits travel (of the sensor pole within the housing 7151). A plurality of float devices 7150 can be utilized. For example, the sensor element 7152' might be linear Hall sensors or might be Hall effect switches. For example, the sensor element 7151' might be linear Hall sensors or might be Hall effect switches. In general, the sensor pole 7152 can include elements that vary in attribute along the vertical length of the sensor pole 7152—and the housing 7151 be provided with a sensor that can sense such variance.

With the arrangement shown in FIG. 71, the float device 7150 can include the float 7154 that senses water based on density. That is, the density of the float 7154 is less than the density of the liquid disposed in the beverage apparatus 7100—and thus the float "floats". The float 7154 can be of a density between those of the process fluid (for example water) and the headspace vapor (water vapor/air) so as to float at the surface. Thus, the float can accurately "follow" liquid level in the beverage apparatus. The water or liquid level in FIG. 71 is indicated as liquid surface 7199.

In an alternative arrangement, the sensor pole 7152 might also be provided with varying optical properties that vary throughout the length of the sensor pole 7152. The housing 7151 can be provided with a sensor that can ascertain such varying optical properties—so as to determine relative position of the housing 7151 vis-à-vis the sensor pole 7152. Additionally, varying capacitive attributes can be observed. For example, material structure of the sensor pole 7152 can vary along the length of the sensor pole 7152. This variance can be detected by a sensor or mechanism in the housing 7151. Such observed attribute can be compared with known attributes—and the known attributes can be mapped to a liquid level. Accordingly, liquid level can be determined. The float device 7150 can be in communication with the controller 7109 so as to exchange data with the controller and/or be powered by the controller 7109. A known float device can be used in a beverage apparatus of the disclosure so as to provide data that a float device can provide in a known manner.

The beverage apparatus 7100 can also include an optical device 7130. As shown in FIG. 71, the optical device 7130 can be positioned on a sidewall of the beverage apparatus 7100. The optical device 7130 can use or rely on visible, infrared (IR), or lasers, for example, to transmit, reflect, or refract light or energy from a source to a receiver.

For example, an LED (light-emitting diode) can send or emit a constant beam that is then reflected in a prism and into a receiver. As liquid rises, light from the LED is refracted from within the prism into the surrounding liquid.

Such can result in a dispersion of the light. Such can thus result in less intensity reaching the receiver. Accordingly, liquid level can be determined from such variance in intensity of light reaching the receiver. Other arrangements can be utilized that include a light-emitting element and a receiving element. As liquid is interposed between the light-emitting element and the receiving element, attributes of light coming into the receiving element changes. Based on this change (of incoming light attributes) it can be determined whether liquid is or is not disposed between the light emitting element and the receiving element. Another implementation is use of a transmitter on one side to the beverage apparatus and a receiver on the other side of the beverage apparatus. A column of horizontally paired transmitter/receiver can provide an arrangement in which each pair (of transmitter/receiver) is "tripped" as liquid level rises past the particular pair. Related liquid level sensing arrangements and features are described in, in particular, U.S. Pat. Nos. 9,932,217 and 10,231,567 which are incorporated herein by reference in their entirety. Liquid level sensing arrangements, elements, mechanisms, and other features described in such US patents can be used in combination with the features described herein as may be desired.

In a further arrangement, optical level sensing can be provided by utilizing a U-shaped fiber optic cable, which can constitute the optical device 7130. A light source can transmit a pulse through the cable and sensor can pick up, i.e. identify, an amount of light that is received at an opposing end of the fiber-optic cable. When liquid is present, less light is received by the sensor due to refraction of the light into the water. In general, attributes of light traveling through the fiber-optic cable can vary as liquid present, about the cable, varies. The sensor can "pick up" on this variance. The sensor and/or controller can map an observed variance into a known attribute, and such known attribute can in turn be associated with a liquid level. Thus, observed attributes of light passing through the fiber-optic cable can provide liquid level data. The optical device 7130 can be in communication with the controller 7109 so as to exchange data with the controller and/or be powered by the controller 7109. A known optical device can be used in a beverage apparatus of the disclosure so as to provide data that an optical device can provide in a known manner.

The beverage apparatus 7100 can also include a thermal device or thermal sensor 7160. A thermal sensor can rely on thermal conductivity to measure flow in height of water. One manner to implement this is by using a probe that has constant amount of heat input. That is, energy can be input into the probe in a constant manner. When liquid covers the probe, heat is dissipated out of the probe and drops temperature of the probe. This drop in temperature of the probe can result in actuation or "tripping" of a switch. Another configuration can include the use of two probes vertically aligned. One probe can be heated and one probe not heated. A Wheatstone bridge can be utilized. With use of the Wheatstone bridge, the heated probe can cause an imbalance in circuit. When liquid covers both sensors, the probes will reach equilibrium and restore balance. In general, the presence of liquid between the two probes can vary one or more attributes of the probes. For example, in an arrangement, temperature of the non-heated probe can be measured. As liquid is disposed between such nonheated probe and the heated probe, thermal conductivity between the two probes will vary. As a result of this variance in thermal conductivity, the temperature of the nonheated probe can be observed to vary in a predetermined manner. Accordingly, an observed temperature attribute can be mapped or associated with known temperature attributes, wherein such known temperature attributes are associated with a particular liquid level. Thus, liquid level can be determined. The thermal sensor 7160 can be in communication with the controller 7109 so as to exchange data with the controller and/or be powered by the controller 7109. A known thermal sensor can be used in a beverage apparatus of the disclosure so as to provide data that a thermal sensor can provide in a known manner.

The beverage apparatus 7100 can also include an ultrasonic device or ultrasonic sensor 7110. Use of an ultrasonic device is described in detail herein. In accordance with processing aspects of an ultrasonic device or sensor, ultrasonic frequencies can range from 20 kHz to 10 MHz. An ultrasonic device can operate in the 20-50 kHz range.

Higher frequencies can allow for greater resolution and yield a narrower beam. However, higher frequencies may also require more complex circuitry and require greater processing power. Optimal (meaning greater power efficiency, producing higher sound pressure) transducer size can be a function of wavelength. For example, pairs of (frequency (kHz), wavelength (centimeters (cm)) can include (20, 1.70), (30, 1.13), (40, 0.85), (50, 0.68), (60, 0.57), (70, 0.49), (80, 0.43), (90, 0.38), (100, 0.34). It can be that a diameter of the transducer, of the ultrasonic device, does not equal or does not exactly equal wavelength. It may be a scale of a vibration mode that more dictates wavelength of emitted energy. In accordance with an aspect of operation of the ultrasonic device, "ring-down" can be a function of wavelength and amplitude. Such "ring-down" can be described as the decaying oscillation of the transducer (of the ultrasonic device) after the transmitter of the ultrasonic device is turned off. The ultrasonic device or sensor can include a head or other element that emits an energy wave, a sound wave or an ultrasonic wave. The ultrasonic device can be mounted on the bottom of the internal volume 7102 for a "bottom up" approach. The ultrasonic device can be mounted to the outer bottom of the container that holds the liquid. The ultrasonic device can measure a wave reflected back, such as a returned wave that results from the sent wave encountering the top water surface, and "bouncing off" the top water surface. For example, "time of flight" processing can be used. Accordingly, the ultrasonic device can measure a distance of the target, e.g. the surface of the water, by measuring the time between the sending or emission of the wave and reception of the returned wave.

The ultrasonic device can use the same element for sending and receiving the wave. The ultrasonic device can include an element, to send and receive waves, that can be a piezo disk or transducer. An optical sensor may be used that has a transmitter to emit a light wave and a receiver to receive the received light wave, e.g. the light wave that is reflected off the surface of the water. The beverage apparatus can also include an ultrasonic device that is "air coupled" using one or more impedance matching layers. The matching layers can be placed between the ultrasonic device transducer and the liquid—so as to improve energy transfer and efficiency. Plural piezo elements can be used in an ultrasonic device. An ultrasonic device can be mounted on or integrated into a plastic part or other part that faces the liquid to be sensed. The ultrasonic device can be integrated into a cavity of the beverage apparatus. The ultrasonic device may be placed so that a line can be drawn from the center of the transducer to any point on the bottom of the container. Signals reflecting off the sides of the container can cause inaccurate readings and possible destructively interfere with other echoes. The ultrasonic device can be used with a beverage apparatus that is constructed of plastic, polycarbonate and acrylic. Other components as described herein can be constructed of such materials. The ultrasonic device 7110 can be in communication with the controller 7109 so as to exchange data with the controller and/or be powered by the controller 7109. A known ultrasonic device can be used in a beverage apparatus of the disclosure so as to provide data that an ultrasonic device can provide in a known manner.

The beverage apparatus 7100 can also include a load cell or a pressure sensor 7190. In accordance with at least an embodiment, the bottle can include a lower support portion 7105 that is connected to a remainder (upper portion) of the beverage apparatus via a load cell 7190. Such construct can be the same as or similar to the arrangement shown in FIG. 69, i.e. with the load cells 6953. With such arrangement, the weight of the liquid/water in the beverage apparatus can be determined. That is, the weight observed by the load cell 7190 can be input by the controller 7109.

The static weight of bottle and the pods in the bottle can be then be "subtracted out" so as to yield the mass or weight of the liquid in the beverage apparatus. In such processing, the processing of FIG. 66 can be used, for example. With the weight of the liquid known, the liquid level or volume of the liquid can be determined—and processing can be performed thereon. For example, dispensing can be performed based on the known liquid volume.

The load cell or a pressure sensor 7190, i.e. element 7109, can be a piezoelectric element that can be in communication with the controller 7109 so as to determine pressure on the element 7109. The element 7109 can be a strain gauge or a load cell. The element 7109 can be in communication with the controller 7109 so as to exchange data with the controller and/or be powered by the controller 7109. A known load cell or pressure sensor device can be used in a beverage apparatus of the disclosure so as to provide data that a load cell or a pressure sensor can provide in a known manner.

The beverage apparatus 7100 can also include a load cell or a pressure sensor 7140, i.e. element 7140. The element 7140 can be positioned on a bottom of the chamber (of the beverage apparatus 7100) that defines the internal volume 7102. As liquid level in the beverage apparatus varies, the pressure experienced by the element 7140 will also vary in an expected manner. Accordingly, based on the pressure experienced by the element 7140, the liquid level in the beverage apparatus can be determined. For example, the element 7140 can include a deformable membrane—and a mechanism can be provided to sense the deformation of the membrane. For example, deformation in the center point of the membrane can be measured by a sensor. A pneumatic load cell can be used that includes a barometric pressure sensor. The barometric pressure sensor can include a diaphragm. The load of the water can cause the volume of the diaphragm to decrease. The diaphragm can be positioned against a sensor—and the sensor can sense the change in volume of the diaphragm, i.e. as more water is added into the beverage apparatus. An observed attribute, that is sensed by the sensor, can be mapped to a respective liquid volume or level—so as to yield liquid level of liquid volume in the beverage apparatus or bottle 7100. The load cell or pressure sensor 7140, i.e. element 7140, can be a piezoelectric element that can be in communication with the controller 7109 so as to determine pressure on the element 7140. That is, strain measurement, which results from load of the liquid, can come from the deformation of a piezoelectric element. An observed attribute, that is sensed by the piezoelectric element, e.g. current or voltage, can be mapped to a respective liquid volume or level—so as to yield liquid level or liquid volume in the beverage apparatus The element 7140 can be a strain gauge. The element 7140 can be in communication with the controller 7109 so as to exchange data with the controller and/or be powered by the controller 7109. A known load cell or a pressure sensor device can be used in a beverage apparatus of the disclosure so as to provide data that a load cell or a pressure sensor can provide in a known manner.

The beverage apparatus 7100 can include at least one dispensing mechanism 7105'. The dispensing mechanism 7105' can include any of the features shown in FIGS. 17-22, for example, so as to provide for dispensing additive, from a vessel or pod, into the internal volume 7102.

FIG. 71 shows various devices, sensors, arrangements, and other features for purposes of illustration. It should be appreciated that the particulars of such features can be varied as desired. For example, the size and geometry of such features can be varied, as well as the number of such features. For example, one or more capacitive devices 7120 might be utilized. For example, a plurality of thermal devices can be used in the beverage apparatus 7100. For example, each of the thermal devices can be positioned at respective operating positions in the internal volume 7102 of the beverage apparatus 7100. An operating position (of a respective thermal device 7106) can be dictated, in construct of the beverage apparatus, depending on desire to measure liquid level at a particular position. In accordance with at least some embodiments, one level sensor can be used to measure liquid level over a particular range of values and other level sensors can be used to measure liquid level over other ranges. Input from plural level sensors or elements can be collectively processed as described in detail herein.

In various processing described herein and illustrated by flowcharts or otherwise described, variables can be used in various processes. Such processes can include routines, subroutines, and steps, for example. The various variables can be passed between processes as may be needed in accord with the instructions provided to the ACP. The various variables can be global variables that are available to the various processes, such as between a calling process and a subroutine, for example.

In accordance with one or more embodiments, a linear capacitive sensing strip, or other liquid level reader may be mounted within or adjacent to the chamber 316 of the beverage apparatus or bottle 300 within which a consumable liquid may be stored (e.g., retained, contained, etc.). The linear capacitive sensing strip, or other liquid level reader may be configured to determine the level, volume, or quantity (e.g., the amount) of liquid consumable in the bottle 300 at any given time. As such, data about the consumable liquid in the chamber 316 of the bottle 300 may be collected, analyzed, and/or communicated by the bottle 300 (e.g., by a processor and/or other components of the bottle 300), and made available to one or more user devices 106, storage systems or networks and the like. Related features are described in U.S. Publication 2016/0159632, now U.S. Pat. No. 9,932,217, which is incorporated herein by reference in its entirety. Such referenced (patent) is also referenced above. Features as described herein may be used in conjunction with the features described in such U.S. Pat. No. 9,932,217.

Hereinafter, illustrative processing particulars are described. Such particulars are for purposes of illustration and may be varied as desired. One dispense can correspond to 1 full reciprocation, up and down, of the piston 405-390 for example, resulting in a dispense of 1 mL, for example. To control the dispense amount, the ACP can vary travel distance of the reciprocation of the piston 405-390 and/or vary the number of reciprocations of the piston, i.e. the reciprocation(s) up and down of the vessel or pod 400. A dispense command can take on various forms such as a predetermined dispense amount in mL that the ACP translates into movement of the piston, a number of dispenses that the ACP translates into number of reciprocations, a set number of reciprocations to be performed, a mass of liquid to dispense that the ACP translate into reciprocations of the piston, etc. Dispense processing can be "open loop" meaning that the action as controlled by the ACP is independent of the actual output (although the action performed is crafted to generate a particular dispense amount). For example, one reciprocation of the piston down and up can be expected to generate a dispense of 1 mL. Dispense processing can be "closed loop" meaning that the action, as controlled by the ACP, is monitored by a sensor or feedback mechanism. For example, current required to perform the dispense can be monitored—and observed current can be mapped into a corresponding dispense amount.

Alternatively, position of the plunger 409 in the pod can be monitored, such as by a light source/sensor that is positioned so as to detect position of the plunger. If feedback reveals that the desired dispense wasn't obtained, further dispense can be performed. Position of the plunger 409 can directly correspond to additive dispensed from the pod. For example, the mass of a pod empty can be 12 grams (g). The volume of additive in the pod can be 30 mL. The density of the additive can be 1.02 g/mL. Accordingly, the mass of the additive (in a full pod) can be 29.4 g. The additive can be dispensed based on an assumption that 1 mL (milliliter) of additive will be dispensed by one reciprocation of piston 405-390. The "additive" in the pods can also be referred to as "concentrate". The density of the additive may be greater than water or less than water, depending on the content of the additive/concentrate.

Various patterns or schemes can be utilized such that the user can effectively communicate with the beverage apparatus 300, as may be desired. For example, one push of a particular button could dictate to the beverage apparatus 300 that one additive should be released, where as two quick pushes of the particular button could dictate that another additive be dispensed. A push of a button and hold of that same button could also be input by the controller of the beverage apparatus, and dictate that a dispense should be performed.

Teachings of the incorporated by reference patent applications regarding user interface can be utilized in conjunction with the teachings described herein. Other features of the above incorporated patent applications can also be utilized in conjunction with the teachings described herein.

In embodiments of the disclosure, a computer processor of the beverage apparatus 300 may provide information to the user regarding metrics associated with additives or other operation of the beverage apparatus 300.

The beverage apparatus of the disclosure can include one or more sensors to detect relative position of components of the beverage apparatus. For example, a Hall effect sensor in conjunction with one or more magnets can be used to detect whether or not the base cover 317 is on the dispensing assembly 318. That is, a magnet may be provided in the base cover 317 and a Hall effect sensor provided in the dispensing assembly 318, so as to sense proximity of the base cover 317.

As used herein, the indicia <== has been used to denote that a variable is assigned or "gets" a particular value. As used herein, the indicia · has been used to indicate a multiplication operation—for example, 2·3=6. Also, the symbol x has been used to indicate a multiplication operation, for example, 2×3=6.

As described herein, the vessel or pod 400 can be provided with an RFID tag 410 and the ACP 360 can communicate with the RFID tag via a transceiver or transceiver assembly 340. However, it should be appreciated that other communication technologies, protocols or communication channels may be used as desired.

As described herein, a receptacle 390, pod 400, and other structure can extend though one or more platforms, such as the platforms 308 and 309 shown in FIG. 22. Accordingly, suitable apertures or openings may be provided in such platforms so as to accommodate.

As described herein, the tag or RFID tag 410 can contain a wide variety of data. The transceiver 340 can input data from the RFID tag and output data to the RFID tag. The RFID tag, or other data memory of the vessel 400, can provide a data representation of a physical instance of the pod (to which the RFID tag is attached) and can provide a data representation of a physical instance of the bottle or beverage apparatus 300. Accordingly, an event that is observed by the ACP 360, via sensors or other input, can be saved to the memory of the pod and/or to the apparatus database portion 370. For example, various historical data regarding use of the bottle and consumption of a user may be written in data form to the memory of the pod and/or to the apparatus database portion 370. Accordingly, a log or record may be saved and maintained.

Features as disclose herein may be described in context of particular units or dimensions. It is appreciated that alternative units or dimensions can be used as desired. Additionally, conversion can be performed between units or dimensions as may be desired. For example, processing is described herein as using units of degrees, such as 148°. Other units can be used, such as radians, for example.

As described above, the apparatus controller 350 can include an apparatus computer processor (ACP) 360. The ACP 360 may also be described as an apparatus processing portion (APP) 360, a computer processor portion (CPP) 360, a computer processing portion (CPP) 360, or similar language. The ACP 360 can include or be in the form of a central processing unit (CPU).

In this disclosure, quotation marks, such as with "pod mass adjustment", have been used to enhance readability and/or to parse out a term or phrase for clarity.

All documents referenced herein are hereby incorporated by reference in their entirety.

The terms dispersion, dispensing, dispense, and other similar terms have been used herein to convey manipulation of a liquid or other material.

It will be appreciated that features, elements and/or characteristics described with respect to one embodiment of the disclosure may be variously used with other embodiments of the disclosure as may be desired.

It will be appreciated that the effects of the present disclosure are not limited to the above-mentioned effects, and other effects, which are not mentioned herein, will be apparent to those in the art from the disclosure and accompanying claims.

Although the preferred embodiments of the present disclosure have been disclosed for illustrative purposes, those skilled in the art will appreciate that various modifications, additions and substitutions are possible, without departing from the scope and spirit of the disclosure and accompanying claims.

It is appreciated that the various components of embodiments of the disclosure may be made from any of a variety of materials including, for example, plastic, plastic resin, nylon, composite material, foam, rubber, wood, metal, and/or ceramic, for example, or any other material as may be desired.

A variety of production techniques may be used to make the apparatuses as described herein. For example, suitable injection molding and other molding techniques and other manufacturing techniques might be utilized. Also, the various components of the apparatuses may be integrally formed, as may be desired, in particular when using molding construction techniques. Also, the various components of the apparatuses may be formed in pieces and connected together in some manner, such as with suitable adhesive and/or heat bonding.

The various apparatuses and components of the apparatuses, as described herein, may be provided in various sizes and/or dimensions, as desired.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present.

It will be understood that when an element or layer is referred to as being "onto" another element or layer, the element or layer can be directly on another element or layer or intervening elements or layers. Examples include "attached onto", secured onto", and "provided onto". In contrast, when an element is referred to as being "directly onto" another element or layer, there are no intervening elements or layers present. As used herein, "onto" and "on to" have been used interchangeably.

It will be understood that when an element or layer is referred to as being "attached to" another element or layer, the element or layer can be directly attached to the another element or layer or intervening elements or layers. In contrast, when an element is referred to as being "attached directly to" another element or layer, there are no intervening elements or layers present. It will be understood that such relationship also is to be understood with regard to: "secured to" versus "secured directly to"; "provided to" versus "provided directly to"; and similar language.

As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present disclosure.

Spatially relative terms, such as "lower", "upper", "top", "bottom", "left", "right" and the like, may be used herein for ease of description to describe the relationship of one element or feature to another element(s) or feature(s) as illustrated in the drawing figures. It will be understood that spatially relative terms are intended to encompass different orientations of structures in use or operation, in addition to the orientation depicted in the drawing figures.

For example, if a device or apparatus in the drawing figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein should be interpreted accordingly.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, as otherwise noted herein, when a particular feature, structure, or characteristic is described in connection with any embodiment, it is submitted that it is within the purview of one skilled in the art to effect and/or use such feature, structure, or characteristic in connection with other ones of the embodiments.

Embodiments are also intended to include or otherwise cover methods of using and methods of manufacturing any or all of the elements disclosed above.

As otherwise described herein, it is appreciated that a feature of one embodiment of the disclosure as described herein may be used in conjunction with features of one or more other embodiments as may be desired.

As used herein, "data" and "information" have been used interchangeably.

Any motorized structure or other mechanical structure as described herein may utilize gears, linkages, sprocket with chain, or other known mechanical arrangement so as to transfer requisite motion and/or energy.

Hereinafter, further aspects of implementation of the systems and methods of the disclosure will be described.

As described herein, at least some embodiments of the system of the disclosure and various processes, of embodiments, are described as being performed by one or more computer processors, i.e. processors. Such one or more computer processors may be in the form of a "processing machine," i.e. a tangibly embodied machine. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as any of the processing as described herein. Such a set of instructions for performing a particular task may be described as a program, software program, code or simply software.

As noted above, the processing machine, which may be constituted, for example, by the particular system and/or systems described above, can execute the instructions that are stored in the memory or memories to process data.

This processing of data may be in response to commands by a user or users of the processing machine, in response to previous processing, in response to a request by another processing machine and/or any other input, for example.

As noted above, the machine used to implement the disclosure may be in the form of a processing machine. The processing machine may also utilize (or be in the form of) any of a wide variety of other technologies including a special purpose computer, a computer system including a microcomputer, mini-computer or mainframe for example, a programmed microprocessor, a micro-controller, a peripheral integrated circuit element, a CSIC (Consumer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices, or apparatus that is capable of implementing the steps of the processes of the disclosure.

The processing machine used to implement the disclosure may utilize a suitable operating system. Thus, embodiments of the disclosure may include a processing machine running the Windows 10 operating system, the Windows 8 operating system, Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the disclosure as described above, it is not necessary that the processors and/or the memories of the processing machine be physically located in the same geographical place.

That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing is described above can be performed by various components and various memories.

However, it is appreciated that the processing performed by two distinct components as described above may, in accordance with a further embodiment of the disclosure, be performed by a single component. Further, the processing performed by one distinct component as described above may be performed by two distinct components.

In a similar manner, the memory storage performed by two distinct memory portions as described above may, in accordance with a further embodiment of the disclosure, be performed by a single memory portion. Further, the memory storage performed by one distinct memory portion as described above may be performed by two memory portions.

Further, as also described above, various technologies may be used to provide communication between the various processors and/or memories, as well as to allow the processors and/or the memories of the disclosure to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

A set of instructions can be used, in the processing as described herein, on a processing machine, for example. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of apparatus of the disclosure may be in a suitable form such that the processing machine may read the instructions.

For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

A suitable programming language may be used in accordance with the various embodiments of the disclosure. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example.

Further, it is not necessary that a single type of instructions or single programming language be utilized in conjunction with the operation of the systems and methods of the disclosure. Rather, any number of different programming languages may be utilized as is necessary or desirable.

Also, the instructions and/or data used in the practice of the disclosure may utilize any compression or encryption technique or algorithm, as may be desired. An encryption module might be used to encrypt data. Further, files or other data may be decrypted using a suitable decryption module, for example.

As described above, the disclosure may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in practice of the disclosure may take on any of a variety of physical forms or transmissions, for example.

Illustratively, as also described above, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the disclosure.

Further, the memory or memories used in the processing machine that implements the disclosure may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods of the disclosure, a variety of "user interfaces" may be utilized to allow a user to interface with the processing machine or machines that are used to implement the disclosure. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton, light, or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface can be utilized by the processing machine that performs a set of instructions such that the processing machine processes data for a user. The user interface is typically used by the processing machine for interacting with a user either to convey information or receive information from the user. However, it should be appreciated that in accordance with some embodiments of the systems and methods of the disclosure, it is not necessary that a human user actually interact with a user interface used by the processing machine of the disclosure. Rather, it is also contemplated that the user interface of an apparatus of the disclosure might interact, i.e., convey and receive information, with another processing machine, rather than a human user. Accordingly, the other processing machine might be described as a user. Further, it is contemplated that a user interface utilized in the systems and methods of the disclosure may interact partially with another processing machine or processing machines, while also interacting partially with a human user.

Accordingly to principles of the disclosure, in an embodiment 1A, a beverage apparatus can be hand-holdable by a user of the beverage apparatus to be portable, and the beverage apparatus can comprise: (a) a beverage chamber housing that includes a chamber, and the chamber storing a consumable liquid in the chamber; (b) a dispensing assembly that includes a first receptacle, and the first receptacle for retaining a first vessel, and the first vessel including a first electronic tag and containing a first additive, the dispensing assembly operatively controllable by a controller to output the first additive from the first vessel into the consumable liquid; (c) a first element that is a first level sensor, the first level sensor outputs first data regarding level of the consumable liquid level in the chamber; (d) a second element that is a second level sensor, the second level sensor outputs second data regarding level of the consumable liquid in the chamber; (e) an apparatus processing portion (ACP); (f) an apparatus database portion that includes instructions that are performed by the ACP in operation of the beverage apparatus, and the ACP configured to control the dispensing assembly to perform dispensing of the additive from the first vessel into the consumable liquid, and the ACP performing processing including: (i) inputting the first data from the first level sensor; (ii) inputting the second data from the second level sensor; (iii) performing first transform processing, to the first data, to generate a first collective certainty, which is associated with the first level sensor; (iv) performing second transform processing, to the second data, to generate a second collective certainty, which is associated with the second level sensor; (v) generating a final determined liquid level (FDLL) based on the first collective certainty, first data, second collective certainty, and second data; and (vi) performing liquid level processing based on the FDLL.

An embodiment 2A can include the features of the embodiment 1A in which the first data includes a value that is a liquid level of the consumable liquid. An embodiment 3A can include the features of the embodiment 1A in which the first data includes data that represents liquid level of the consumable liquid, and the liquid level processing includes converting the first data to a liquid level of the consumable liquid. An embodiment 4A can include the features of the embodiment 1A in which the liquid level processing includes outputting the FDLL to the user via at least one selected from the group consisting of (a) a GUI of the beverage apparatus and (b) a user device that is in communication with the ACP of the beverage apparatus. An embodiment 5A can include the features of the embodiment 1A in which (a) the first transform processing includes a first transform, and the first transform includes a self weighting process, the first data including a first liquid level value, and (b) the self weighting process including determining, based on the first liquid level value, a first weight, of the first transform processing, that is associated with the first liquid level value. An embodiment 6A can include the features of the embodiment 5A in which the first transform processing includes determining the first collective certainty without input from other sensors, such that the first weight corresponds to the first collective certainty of the first level sensor. An embodiment 7A can include the features of the embodiment 5A in which the beverage apparatus further including a third element that inputs third data, the third data includes ambient data regarding ambient conditions to which the beverage apparatus is exposed; and the first transform processing further including a second transform, and the second transform including determining, based on the third data, a second weight of the first transform processing.

An embodiment 8A can include the features of the embodiment 7A in which the first transform processing includes, to generate the first collective certainty, averaging both the first weight and the second weight. An embodiment 9A can include the features of the embodiment 7A in which the first transform processing includes, to generate the first collective certainty, factoring both the first weight and the second weight.

An embodiment 10A can include the features of the embodiment 7A in which the third sensor is a temperature sensor, and the second transform addresses that the first sensor is more accurate at some temperatures than at other temperatures. An embodiment 11A can include the features of the embodiment 1A in which the first sensor is an ultrasonic sensor, and the second sensor is an angle sensor. An embodiment 12A can include the features of the embodiment 1A in which the first transform processing including: (a) the ACP applying a first transform to the first data to generate a first weight; (b) the ACP applying a second transform to the first data to generate a second weight; and (c) averaging the first weight and the second weight to generate the first collective certainty. An embodiment 13A can include the features of the embodiment 12A in which the second transform processing including: (a) the ACP applying a third transform to the second data to generate a third weight; (b) the ACP applying a fourth transform to second data to generate a fourth weight; and averaging the third weight and the fourth weight to generate the second collective certainty. An embodiment 14A can include the features of the embodiment 1A in which the first transform processing including a first transform and a second transform, OR the first transform processing consisting of a first transform. An embodiment 15A can include the features of the embodiment 1A in which the generating the FDLL includes the ACP: (a) determining that the first collective certainty is of greater certainty than the second collective certainty; (b) determining a level value, based on the first data, including weighting the first data heavier than the second data; and (c) assigning the level value to constitute the FDLL.

Accordingly to principles of the disclosure, in an embodiment 16A, a beverage apparatus can be hand-holdable by a user of the beverage apparatus to be portable, and the beverage apparatus can comprise: (a) a beverage chamber housing that includes a chamber, and the chamber storing a consumable liquid in the chamber; (b) a dispensing assembly that includes a first receptacle, and the first receptacle for retaining a first vessel, and the first vessel including a first electronic tag and containing a first additive, the dispensing assembly operatively controllable by a controller to output the first additive from the first vessel into the consumable liquid; (c) a first element that is a first level sensor, the first level sensor outputs first data regarding level of the consumable liquid level in the chamber; (d) a second element, the second element outputs second data regarding the consumable liquid in the chamber; (e) an apparatus processing portion (ACP); (f) an apparatus database portion that includes instructions that are performed by the ACP in operation of the beverage apparatus, and the ACP configured to control the dispensing assembly to perform dispensing of the additive from the first vessel into the consumable liquid, and the ACP performing processing including: (i) inputting the first data from the first level sensor; (ii) inputting the second data from the second element; (iii) performing first transform processing, to the first data, to generate a first collective certainty, which is associated with the first level sensor; (iv) performing second transform processing, to the first data using the second data, to generate a second collective certainty, which is associated with the first level sensor; (v) generating a final determined liquid level (FDLL) based on the first collective certainty, first data, and second collective certainty; and (vi) performing liquid level processing based on the FDLL.

An embodiment 17A can include the features of the embodiment 16A in which the second element is a sensor that inputs an attribute of the consumable liquid in the beverage chamber. An embodiment 18A can include the features of the embodiment 17A in which the second element is an ultrasonic sensor. An embodiment 19A can include the features of the embodiment 16A in which the first element is an ultrasonic device and the second element is an angle sensor. An embodiment 20A can include the features of the embodiment 16A in which the first element is an ultrasonic device and the second element is an accelerometer.

Accordingly to principles of the disclosure, in an embodiment 1B, a beverage apparatus can be hand-holdable by a user of the beverage apparatus to be portable, and the beverage apparatus can comprise: (A) a beverage chamber housing that includes a chamber, and the chamber storing a consumable liquid in the chamber; (B) a dispensing assembly that includes a first receptacle, and the first receptacle for retaining a first vessel, and the first vessel including a first electronic tag and containing a first additive, the dispensing assembly operatively controllable to output the first additive from the first vessel into the consumable liquid; (C) an element that outputs: (a) first data, in conjunction with a first event, regarding the consumable liquid level in the chamber; and (b) second data, in conjunction with a second event, regarding the consumable liquid level in the chamber; and (D) an apparatus processing portion (ACP); (E) an apparatus database portion that includes instructions that are performed by the ACP in operation of the beverage apparatus, and the ACP configured to control the dispensing assembly to perform dispensing of the additive from the first vessel into the consumable liquid, and the ACP performing first processing including: (a) inputting the first data from the element; (b) identifying a first predetermined attribute of the first data; (c) performing first comparing the first predetermined attribute, of the first data, against predetermined criteria; (d) generating a first determination that the first predetermined attribute satisfies the predetermined criteria; and (e) based on the first determination, the ACP accepting the first data for generating a first liquid level; (F) the ACP performing second processing including: (a) inputting the second data from the element; (b) identifying a second predetermined attribute of the second data; (c) performing second comparing the second predetermined attribute against the predetermined criteria; (d) generating a second determination that the second predetermined attribute does not satisfy the predetermined criteria; and (f) based on the second determination, the ACP rejecting the second data for generating a second liquid level. An embodiment 2B can include the features of the embodiment 1B in which the element is an ultrasonic device that is provided on a bottom of the chamber, and the ultrasonic device for generating generated pulses into the consumable liquid and for observing returned pulses, from said generated pulses, as a result of an echo of the generated pulses. An embodiment 3B can include the features of the embodiment 2B in which the first event includes (a) first generated pulses, and (b) first returned pulses that are an echo of the first generated pulses. An embodiment 4B can include the features of the embodiment 3B in which the performing the first comparing including determining if a shape of the first returned pulses is sufficiently defined.

An embodiment 5B can include the features of the embodiment 4B in which the sufficiently defined relates to determining a correlation of the first returned pulses to the first generated pulses, to determine if shape has been maintained. An embodiment 6B can include the features of the embodiment 4B in which the sufficiently defined relates to determining if shape of the first returned pulses possesses a slew rate that satisfies predetermined criteria.

An embodiment 7B can include the features of the embodiment 6B in which the slew rate includes a ramp up slew rate. An embodiment 8B can include the features of the embodiment 6B in which the slew rate includes a ramp up slew rate. An embodiment 9B can include the features of the embodiment 3B in which the performing the first comparing including determining if a magnitude of the first returned pulses is of a predetermined percentage (%) threshold magnitude relative to a magnitude of generated pulses. An embodiment 10B can include the features of the embodiment 3B in which the performing the first comparing including determining if a magnitude of the first returned pulses is of a predetermined floor threshold value. An embodiment 11B can include the features of the embodiment 3B in which the performing the first comparing including determining if a magnitude of the first returned pulses is within an expected range of magnitude, and such range being defined by a predetermined floor threshold value and a predetermined ceiling threshold value.

An embodiment 12B can include the features of the embodiment 11B in which the expected range of magnitude is assessed over a predetermined time window, and based on pulses in said predetermined time window.

An embodiment 13B can include the features of the embodiment 11B in which the expected range of magnitude is assessed over a single block of pulses. An embodiment 14B can include the features of the embodiment 2B in which the ultrasonic device includes a second processing portion; (A) the beverage apparatus includes a controller that includes a first processing portion, and (B) the ACP including both the first processing portion and the second processing portion such that: (a) the performing first processing is shared between the first processing portion and the second processing portion; and (b) the performing second processing is shared between the first processing portion and the second processing portion. An embodiment 15B can include the features of the embodiment 2B in which the ultrasonic device includes a second processing portion; AND the beverage apparatus includes a controller that includes the ACP such that: (a) the performing first processing is performed by the ACP in the controller; and (b) the performing second processing is performed by the ACP in the controller. An embodiment 16B can include the features of the embodiment 2B in which the ultrasonic device includes a piezoelectric transducer, and the piezoelectric transducer performing: (a) the generating generated pulses; and (b) the observing returned pulses that result from the generated pulses. An embodiment 17B can include the features of the embodiment 2B in which a first portion of the ACP performs the dispensing and a second portion of the ACP performs level processing, and the level processing including the first processing and the second processing. An embodiment 18B can include the features of the embodiment 2B in which the first event includes (a) first generated pulses, and (b) first returned pulses that are an echo of the first generated pulses; and the second event includes (a) second generated pulses, and (b) second returned pulses that are an echo of the second generated pulses.

Accordingly to principles of the disclosure, in an embodiment 1C, a beverage apparatus can be hand-holdable by a user of the beverage apparatus to be portable, and the beverage apparatus can comprise: (A) a beverage chamber housing that includes a chamber, and the chamber storing a consumable liquid in the chamber; (B) a dispensing assembly that includes a first receptacle, and the first receptacle that retains a first vessel, and the first vessel including a first electronic tag and containing a first additive, the dispensing assembly operatively controllable to perform dispensing of the first additive from the first vessel into the consumable liquid; (C) a first element that is an angle sensor, the angle sensor outputs angle data regarding angle that the beverage apparatus is positioned; (D) an apparatus processing portion (ACP); (E) an apparatus database portion that includes instructions that are performed by the ACP in operation of the beverage apparatus, and the ACP configured to control the dispensing assembly to perform the dispensing of the first additive from the first vessel into the consumable liquid, and the ACP performing processing including: (i) inputting the angle data from the angle sensor; (ii) determining volume data regarding the consumable liquid based on the angle data; and (iii) performing processing based on the volume data. An embodiment 2C can include the features of the embodiment 1C in which the volume data includes a liquid volume of the consumable liquid. An embodiment 3C can include the features of the embodiment 1C in which the performing processing based on the volume data includes: (a) the ACP determining an amount of additive to dispense based on the volume data, and (b) the performing processing includes the ACP controlling the dispensing assembly to dispense said amount of additive. An embodiment 4C can include the features of the embodiment 3C in which the apparatus database portion includes a dispense lookup table; and the determining an amount of additive to dispense includes: (a) mapping the volume data into a first value in the dispense lookup table; and (b) identifying a second value that is associated with the first value in the dispense lookup table. An embodiment 5C can include the features of the embodiment 4C in which the first value in the lookup table is a volume value, and the second value in the lookup table is an amount of dispense. An embodiment 6C can include the features of the embodiment 3C in which the determining an amount of additive to dispense includes: determining a volume value based on the volume data; and applying a ratio to the volume value so as to determine the amount of additive to dispense. An embodiment 7C can include the features of the embodiment 1C in which the determining liquid volume data based on the angle data includes: (a) mapping the angle data into a first lookup table item in a lookup table; (b) determining a second lookup table item, in the lookup table, that is associated with the first lookup table item, and the second lookup table item representing a liquid volume of the beverage apparatus. An embodiment 8C can include the features of the embodiment 7C in which the second lookup table item is a liquid level value. An embodiment 9C can include the features of the embodiment 7C in which the second item is a value upon which a quantity of additive dispensed, in the dispensing, is based. An embodiment 10C can include the features of the embodiment 1C in which the angle sensor is at least one selected from the group consisting of an accelerometer and a sensor that includes a gravitational detection element. An embodiment 11C can include the features of the embodiment 1C in which the chamber includes a chamber wall, and the chamber wall includes a wall portion that is disposed at a steepest angle relative to a vertical axis of the beverage apparatus, and such steepest angle constituting a critical tilt angle of the beverage apparatus; and the ACP associating the critical tilt angle with an empty volume determination.

An embodiment 12C can include the features of the embodiment 11C in which the ACP associating the beverage apparatus being fully upright along the vertical axis as a zero tilt angle, (a) the ACP associating the zero tilt angle with a full volume determination; and (b) a difference between the zero tilt angle and the critical tilt angle constituting a drinking angle range. An embodiment 13C can include the features of the embodiment 12C in which the determining the volume data includes: (a) identifying a disposition angle, of the beverage apparatus, that represents an angle that the beverage apparatus is currently positioned; (b) determining a ratio of the disposition angle to the drinking angle range; and (c) determining the volume data based on the ratio, and the volume data including a liquid level of consumable liquid in the beverage apparatus. An embodiment 14C can include the features of the embodiment 13C in which the determining the volume data includes: the ACP providing an adjustment to the ratio based on a corresponding function that reflects a physical geometry of the beverage apparatus. An embodiment 15C can include the features of the embodiment 14C in which the corresponding function reflecting (a) varied first geometry of the chamber at a top of the chamber, (b) uniform geometry of the beverage apparatus along a middle section of the chamber, and (c) varied second geometry of the chamber at a bottom of the chamber; and the chamber physically possessing such geometry. An embodiment 16C can include the features of the embodiment 1C in which the determining volume data regarding the consumable liquid based on the angle data includes: (A) determining a sustained angular position that is maintained for (a) a tilt angle range of angular position, and (b) a time window of time; (B) determining a maximum tip up angle that occurs after the sustained angular position; (C) determining, based on the maximum tip up angle, a volume value; (D) determining a dispense amount based on the volume value; and (E) the performing the processing, based on the volume data, includes performing a dispense of the first additive from the first vessel. An embodiment 17C can include the features of the embodiment 1C in which the angle data includes an angle in degrees that the beverage apparatus is positioned. An embodiment 18C can include the features of the embodiment 1C in which the angle data includes a value that reflects an amount that the beverage apparatus is positioned relative to a vertical axis.

An embodiment 19C can include the features of the embodiment 1C in which the performing processing based on the volume includes adjusting a dispense amount, in the dispensing of the first additive. An embodiment 20C can include the features of the embodiment 1C in which the beverage apparatus further including a second receptacle that retains a second vessel, and (a) the second receptacle for retaining a second vessel, and the second vessel including a second electronic tag and containing a second additive, and (b) the dispensing assembly operatively controllable by the ACP to perform dispensing of the second additive from the second vessel into the consumable liquid.

Accordingly to principles of the disclosure, in an embodiment 1D, a beverage apparatus can be hand-holdable by a user of the beverage apparatus to be portable, and the beverage apparatus can comprise: (A) a beverage chamber housing that includes a chamber, and the chamber storing a consumable liquid in the chamber; (B) a dispensing assembly that includes a first receptacle, and the first receptacle for retaining a first vessel, and the first vessel including a first electronic tag and containing a first additive, the dispensing assembly operatively controllable to output the first additive from the first vessel into the consumable liquid; (C) a first element that detects an attribute of the consumable liquid; (D) a motion detection device; (E) an apparatus computer processor (ACP); and (F) an apparatus database portion that includes instructions that are performed by the ACP in operation of the beverage apparatus, and the ACP configured to control the dispensing assembly to perform dispensing of the first additive from the first vessel into the consumable liquid, and the ACP performing processing including: (a) operating the motion detection device to generate a first output; (b) assessing a state of the beverage apparatus based on the first output; and (c) operating, based on the state of the beverage apparatus, the first element to generate a second output.

An embodiment 2D can include the features of the embodiment 1D in which the assessing the state of the beverage apparatus includes the ACP determining that the beverage apparatus is experiencing movement relative to a predetermined threshold. An embodiment 3D can include the features of the embodiment 2D in which the movement is based on acceleration of the beverage apparatus. An embodiment 4D can include the features of the embodiment 2D in which the movement is based on speed of the beverage apparatus. An embodiment 5D can include the features of the embodiment 2D in which the first element is an ultrasonic device, and (a) the operating, based on the state of the beverage apparatus, the ultrasonic device to generate a second output includes the ACP being configured to: (i) if movement is below the predetermined threshold, then the ultrasonic device outputting a normal pulse sequence, of the generated pulses, and the normal pulse sequence configured to generate first returned pulses, of the returned pulses, from which a liquid level is determined; and (ii) if movement is above the predetermined threshold, then the ultrasonic device outputting a modified pulse sequence, of the generated pulses, and the modified pulse sequence configured to generate an echo, of the returned pulses, based on which the ACP performs echo determination, and the echo determination including determining whether liquid covers an operating element of the ultrasonic device. An embodiment 6D can include the features of the embodiment 5D in which the echo determination including the ACP being configured to perform processing including: (a) if an echo is received, the ACP determining that there is liquid covering the operating element; and (b) if an echo is not received, the ACP determining that there is not liquid covering the operating element and, based thereon, determines an empty state of the beverage apparatus. An embodiment 7D can include the features of the embodiment 5D in which the operating element of the ultrasonic device includes a vibrating plate. An embodiment 8D can include the features of the embodiment 1D in which the assessing the state of the beverage apparatus includes the ACP determining that the beverage apparatus is positioned at an observed angle relative to a predetermined threshold angle. An embodiment 9D can include the features of the embodiment 8D in which the first element is an ultrasonic device, and (a) the operating, based on the state of the beverage apparatus, the ultrasonic device to generate the second output includes the ACP being configured to: perform processing to determine that the observed angle is less than the predetermined threshold angle from upright, and the ultrasonic device outputting a pulse sequence, of the generated pulses, and the pulse sequence configured to generate first returned pulses, of the returned pulses, from which a liquid level is determined. An embodiment 10D can include the features of the embodiment 9D in which the echo determination including the ACP being configured to output a modified pulse sequence if no resultant, returned, first pulses are received by the ultrasonic device. An embodiment 11D can include the features of the embodiment 1D in which an operating element of the first element includes a vibrating plate. An embodiment 12D can include the features of the embodiment 1D in which the motion detection device includes an accelerometer. An embodiment 13D can include the features of the embodiment 1D in which the motion detection device includes at least one gyroscope. An embodiment 14D can include the features of the embodiment 1D in which the motion detection device includes an accelerometer and a gyroscope. An embodiment 15D can include the features of the embodiment 1D in which the motion detection device includes a global positioning system (GPS) and the ACP configured to determine (a) speed of the beverage apparatus and/or (b) acceleration of the beverage apparatus based on the GPS positions observed by the GPS. An embodiment 16D can include the features of the embodiment 1D in which the chamber including a bottom, and the first element device is provided on the bottom.

An embodiment 17D can include the features of the embodiment 1D in which the first element is an ultrasonic device, and the ultrasonic device includes a piezoelectric transducer, and the piezoelectric transducer performing both: (a) generating generated pulses; and (b) observing returned pulses that echo from the generated pulses.

An embodiment 18D can include the features of the embodiment 1D in which the first element is an ultrasonic device, and the ultrasonic device: (a) generating generated pulses directed into the consumable liquid, and (b) observing returned pulses, from said generated pulses, as a result of an echo of the generated pulses. An embodiment 19D can include the features of the embodiment 1D in which the first element is a level sensing device, and the level sensing device includes at least one selected from the group consisting of: an ultrasonic device, a capacitive device, an optical device, a load cell, a float, and a thermal device.

Accordingly to principles of the disclosure, in an embodiment 1E, a beverage apparatus can be hand-holdable by a user of the beverage apparatus to be portable, and the beverage apparatus can comprise: (A) a beverage chamber housing that includes a chamber, and the chamber storing a consumable liquid in the chamber; (B) a dispensing assembly that includes a first receptacle, and the first receptacle retaining a first vessel, and the first vessel containing a first additive, the dispensing assembly operatively controllable to perform dispensing of the first additive from the first vessel into the consumable liquid; (C) a first element that includes an accelerometer, the accelerometer outputting acceleration data regarding acceleration that the beverage apparatus experiences; (D) an apparatus control processor (ACP); (E) an apparatus database portion that includes instructions that are performed by the ACP in operation of the beverage apparatus, and the ACP configured to control the dispensing assembly to perform the dispensing of the first additive from the first vessel into the consumable liquid, and the ACP performing processing including: (a) inputting the acceleration data from the accelerometer; (b) determining volume data, regarding the consumable liquid, based on the acceleration data, and the determining volume data includes comparing the acceleration data with known data; and (c) performing processing based on the volume data.

An embodiment 2E can include the features of the embodiment 1E, the determining volume data, regarding the consumable liquid, based on the acceleration data includes: (a) determining acceleration vectors over time; (b) from the acceleration vectors, culling out an observed set of selected acceleration vectors (SAVs); (c) determining observed attributes of the SAVs; (d) the comparing the acceleration data with known data includes comparing the observed attributes with known attributes of known acceleration vectors of known sets, each of the known sets being associated with a respective known liquid value in the database; (e) determining a chosen set, out of the known sets, based on the comparing; and (f) mapping to a selected liquid value, of the known liquid values, that is associated with the chosen set. An embodiment 3E can include the features of the embodiment 2E in which the performing processing based on the volume data includes: assigning a current liquid level based on the liquid value.

An embodiment 4E can include the features of the embodiment 2E in which the observed attributes include frequency data, which is compared with known frequency data of the known sets. An embodiment 5E can include the features of the embodiment 2E in which the determining the chosen set, out of the known sets, based on the comparing includes: (a) determining a closest known set, of the known sets, that has closest correlation to the observed set, and (b) tagging such closest known set as the chosen set. An embodiment 6E can include the features of the embodiment 2E in which the determining the chosen set, of the known sets, based on the comparing includes: (a) determining a matching known set, of the known sets, that matches with the observed set, and (b) tagging such matching known set as the chosen set. An embodiment 7E can include the features of the embodiment 2E in which the observed set, of SAVs, is culled out by selecting acceleration vectors that occur in a discreet time window.

An embodiment 8E can include the features of the embodiment 7E in which the discreet time window is between 0.5 and 3 seconds in length. An embodiment 9E can include the features of the embodiment 2E in which the SAVs exist in x-y-z space; and the determining observed attributes of the SAVs including: (a) determining x-space acceleration attributes of the SAVs; (b) determining y-space acceleration attributes of the SAVs; and (c) determining z-space acceleration attributes of the SAVs. An embodiment 10E can include the features of the embodiment 9E in which the apparatus database portion including an x-dominate library, a y-dominate library and a z-dominate library; and the determining volume data includes: (a) determining that the x-space acceleration attributes are dominate over both the y-space acceleration attribute and the z-space acceleration attribute, and, based on such determining, accessing the x-dominate library to perform the comparing with favor over both the y-dominate library and the z-dominate library. Similar processing can be used for y-space and z-space. An embodiment 11E can include the features of the embodiment 2E in which the determining observed attributes of the SAVs including: (a) identifying an anchor acceleration vector, in the observed set, based on attributes of the SAVs; (b) identifying follow-up acceleration vectors that occur in time subsequent to the anchor acceleration vector; and (c) the comparing includes comparing (a) the anchor acceleration vector and (b) the follow-up acceleration vectors against (c) known acceleration vectors in the known sets. An embodiment 12E can include the features of the embodiment 11E in which the anchor acceleration vector including x-y-z components and having a magnitude; the determining observed attributes of the SAVs further including: (a) normalizing the anchor acceleration vector by dividing each x-y-z component by the magnitude; (b) the comparing includes the known acceleration vectors in the known sets also being normalized. An embodiment 13E can include the features of the embodiment 11E in which the anchor acceleration vector including x-y-z components and having a magnitude in x-y-z space and direction in x-y-z space; and the determining observed attributes of the SAVs including: (a) determining an x-y-z adjustment factor to adjust the anchor acceleration vector to be parallel with a predetermined common axis; and (b) the comparing includes comparing the x-y-z adjustment factor with respective x-y-z adjustment factors of known acceleration vectors in the known sets. An embodiment 14E can include the features of the embodiment 2E in which the determining observed attributes of the SAVs includes: normalizing at least one SAV of the SAVs. An embodiment 15E can include the features of the embodiment 2E in which the determining observed attributes of the SAVs includes: determining an x-y-z adjustment factor to adjust a SAV, of the SAVs, to be parallel with a predetermined common axis; AND the comparing includes comparing the x-y-z adjustment factor with respective x-y-z adjustment factors of known acceleration vectors in the known sets. An embodiment 16E can include the features of the embodiment 2E in which wherein: (a) the determining observed attributes including determining an observed frequency of the SAVs; and (b) the comparing including comparing the observed frequency with a respective known frequency, of each of the known sets, so as to determine the chosen set. An embodiment 17E can include the features of the embodiment 2E in which wherein: (A) the determining observed attributes including determining a first observed frequency of SAVs in a first observed set; and the comparing including comparing the first observed frequency against respective known frequencies, of the known sets, so as to determine a first chosen set, which is mapped to a first known liquid level; (B) the determining observed attributes including determining a second observed frequency of SAVs in a second observed set; and the comparing including comparing the second observed frequency against respective known frequencies, of the known sets, so as to determine a second chosen set, which is mapped to a second known liquid level; AND (C) the first observed frequency being higher frequency than the second observed frequency, and the first known liquid level being less than the second known liquid level to reflect a relationship that greater mass will exhibit higher frequency in movement as compared to less mass. An embodiment 18E can include the features of the embodiment 2E in which wherein each of the known sets being associated with a respective known liquid value is provided by a lookup table in the database, and each known liquid value is either a known liquid level or a known liquid volume. An embodiment 19E can include the features of the embodiment 2E in which the determining volume data includes inputting data, from the accelerometer, that indicates movement status of the beverage apparatus; AND the comparing includes: (a) the ACP selecting, based on the movement status, one of a either a standing library, a walking library and a running library; the one constituting a selected library; and (b) comparing the observed attributes only with known attributes of the selected library, thereby conserving processing resources.

Accordingly to principles of the disclosure, in an embodiment 1Fa beverage apparatus can be hand-holdable by a user of the beverage apparatus to be portable, and the beverage apparatus can comprise: (A) a beverage chamber housing that includes a chamber, and the chamber storing a consumable liquid in the chamber; (B) a dispensing assembly that includes a first receptacle, and the first receptacle retaining a first vessel, and the first vessel containing a first additive, and the dispensing assembly operatively controllable to perform dispensing of the first additive from the first vessel into the consumable liquid; (C) a first element that includes an accelerometer, the accelerometer outputting acceleration data regarding acceleration that the beverage apparatus experiences; (D) an apparatus processing portion (ACP); (E) an apparatus database portion that includes instructions that are performed by the ACP in operation of the beverage apparatus, and the ACP configured to control the dispensing assembly to perform the dispensing of the first additive from the first vessel into the consumable liquid, and the ACP performing processing including: (a) inputting the acceleration data from the accelerometer; (b) determining volume data, regarding the consumable liquid, based on the acceleration data; and (c) performing processing based on the volume data. An embodiment 2F can include the features of the embodiment 1F in which the volume data includes: a liquid volume of the consumable liquid. An embodiment 3F can include the features of the embodiment 1F in which the performing processing based on the volume data includes: (a) the ACP determining an amount of additive to dispense based on the volume data, and (b) the ACP controlling the dispensing assembly to dispense said amount of additive. An embodiment 4F can include the features of the embodiment 3F in which the apparatus database portion includes a dispense lookup table; and (A) the determining an amount of additive to dispense includes: (a) mapping the volume data into a first value in the dispense lookup table; and (b) identifying a second value that is associated with the first value in the dispense lookup table. An embodiment 5F can include the features of the embodiment 4F in which the first value in the lookup table is a volume value, and the second value in the lookup table is an amount of dispense. An embodiment 6F can include the features of the embodiment 3F in which the determining an amount of additive to dispense based on the volume data includes: (a) determining a volume value based on the volume data; and (b) applying a ratio to the volume value so as to determine the amount of additive to dispense.

An embodiment 7F can include the features of the embodiment 1F in which the determining volume data, regarding the consumable liquid, based on the acceleration data includes: (a) determining acceleration vectors over time; (b) from the acceleration vectors, culling out an observed set of selected acceleration vectors (SAVs); and (c) determining observed attributes of the SAVs. An embodiment 8F can include the features of the embodiment 7F in which the observed attributes include frequency data. An embodiment 9F can include the features of the embodiment 7F in which the determining observed attributes of the SAVs including: (a) identifying an anchor acceleration vector, in the observed set, based on attributes of the SAVs; and (b) identifying follow-up acceleration vectors that occur in time subsequent to the anchor acceleration vector. An embodiment 10F can include the features of the embodiment 9F in which the anchor acceleration vector including x-y-z components and having a magnitude; AND the determining observed attributes of the SAVs further including: normalizing the anchor acceleration vector by dividing each x-y-z component by the magnitude. An embodiment 11F can include the features of the embodiment 9F in which the anchor acceleration vector including x-y-z components and having a magnitude in x-y-z space and direction in x-y-z space; AND the determining observed attributes of the SAVs including: determining an x-y-z adjustment factor to adjust the anchor acceleration vector to be parallel with a predetermined common axis.

An embodiment 12F can include the features of the embodiment 11F in which the common axis is a vertical axis.

An embodiment 13F can include the features of the embodiment 7F in which the determining observed attributes of the SAVs includes: normalizing at least one SAV of the SAVs. An embodiment 14F can include the features of the embodiment 7F in which the culling constituting a first filtering process; and the determining observed attributes constituting a second filtering process. An embodiment 15F can include the features of the embodiment 7F in which the determining volume data includes inputting data, from the accelerometer, that indicates movement status of the beverage apparatus; AND the comparing includes: (a) the ACP selecting, based on the movement status, one of a either a standing library, a walking library and a running library; the one constituting a selected library; and (b) comparing the observed attributes only with known attributes of the selected library, thereby conserving processing resources. An embodiment 16F can include the features of the embodiment 1F in which the volume data includes a liquid level of the consumable liquid.

Accordingly to principles of the disclosure, in an embodiment 1G, a beverage apparatus can be hand-holdable by a user of the beverage apparatus to be portable, and the beverage apparatus can comprise: (A) a beverage chamber housing that includes a chamber, and the chamber storing a consumable liquid in the chamber; (B) a dispensing assembly that includes a receptacle, and the receptacle retaining a vessel, and the vessel containing an additive, the dispensing assembly operatively controllable to perform dispensing of the additive from the vessel into the consumable liquid; (C) an element that senses a mass attribute (e.g. force or acceleration vectors) of the beverage apparatus, and the element outputting first data (e.g. electric voltage or acceleration data) based on the mass attribute, and the mass attribute relating to mass of the beverage apparatus; (D) an apparatus computer processor (ACP); (E) an apparatus database portion that includes instructions that are performed by the ACP in operation of the beverage apparatus, and the ACP configured to control the dispensing assembly to perform the dispensing of the additive from the vessel into the consumable liquid, the ACP being in electronic communication with the element, and the ACP performing processing including: (a) inputting the first data from the element; and (b) determining volume data, regarding the consumable liquid, based on the first data. An embodiment 2G can include the features of the embodiment 1G in which the determining volume data includes determining mass of the beverage apparatus based on the first data. An embodiment 3G can include the features of the embodiment 1G in which the determining volume data includes: (a) determining mass of the beverage apparatus based on the first data; and (b) determining liquid volume of the consumable liquid based on the mass of the beverage apparatus. An embodiment 4G can include the features of the embodiment 1G in which the determining volume data includes: (a) determining mass of the beverage apparatus based on the first data; and (b) determining liquid volume of the consumable liquid based on the mass of the beverage apparatus, and the element is a piezoelectric element that is in electronic communication with the ACP. An embodiment 5G can include the features of the embodiment 1G in which the determining volume data includes determining mass of the beverage apparatus based on the first data; and the mass of the beverage apparatus includes (1) a first mass being the beverage apparatus empty of consumable liquid and without the vessel, (2) a second mass being the vessel with additive, and (3) a third mass being the consumable liquid. An embodiment 6G can include the features of the embodiment 5G in which the determining mass of the beverage apparatus including determining mass of the vessel with additive contained therein. An embodiment 7G can include the features of the embodiment 6G in which the determining mass of the beverage apparatus includes the ACP reading pod data, relating to the second mass, from the vessel. An embodiment 8G can include the features of the embodiment 7G in which the ACP reading pod data from the vessel includes the ACP (1) reading an empty mass of the vessel when in an empty, and (2) reading an amount of additive in the vessel. An embodiment 9G can include the features of the embodiment 7G in which the ACP reading pod data from the vessel includes the ACP reading an amount of additive in the vessel, and the ACP accessing data regarding mass of the vessel when in an empty state.

An embodiment 10G can include the features of the embodiment 9G in which the ACP reading pod data from the vessel includes reading data from an RFID tag, and the RFID tag being attached to a portion of the vessel.

An embodiment 11G can include the features of the embodiment 5G in which the determining volume data, of the consumable liquid, includes deducting from the mass of the beverage apparatus both the first mass and the second mass, so as to render the third mass. An embodiment 12G can include the features of the embodiment 11G in which the ACP determining the second mass including: (a) retrieving mass of the vessel in an empty state, and (b) retrieving additive data that relates to an amount of additive that is retained in the additive vessel, so as to determine mass of additive remaining in the vessel. An embodiment 13G can include the features of the embodiment 12G in which the amount of data that is retained in the additive vessel being in the form of volume of additive. An embodiment 14G can include the features of the embodiment 1G in which the element is an accelerometer and the first data is acceleration data, and the acceleration data representing acceleration that the beverage apparatus experiences. An embodiment 15G can include the features of the embodiment 14G in which the determining volume data includes comparing the acceleration data with known data, and determining a match between the acceleration data and the known data so as to identify a chosen set, and mapping the chosen set to a mass of the beverage apparatus. An embodiment 16G can include the features of the embodiment 1G in which the element is a load cell, and the beverage apparatus including a first support structure and a second support structure, and the load cell connecting the first support structure and the second support structure such that the load cell supports the first support structure, the beverage chamber housing, and the consumable liquid in the chamber. An embodiment 17G can include the features of the embodiment 16G in which the first support structure is an upper platform and the second support structure is a lower platform. An embodiment 18G can include the features of the embodiment 16G in which the first support structure is a base connector portion and the second support structure is an outer connector portion, and the base connector portion, the outer connector portion, and the load cell collectively forming a mass sensing connector. An embodiment 19G can include the features of the embodiment 1G in which the vessel constituting a first vessel and the additive constituting a first additive, and the beverage apparatus further including a second vessel that contains a second additive.

It will be readily understood by those persons skilled in the art that the present disclosure is susceptible to broad utility and application. Many embodiments and adaptations of the present disclosure other than those herein described, as well as many variations, modifications and equivalent arrangements, will be apparent from or reasonably suggested by the present disclosure and foregoing description thereof, without departing from the substance or scope of the disclosure.

Accordingly, while the present disclosure has been described here in detail in relation to its exemplary embodiments, it is to be understood that this disclosure is only illustrative and exemplary of the present disclosure and is made to provide an enabling disclosure. Accordingly, the foregoing disclosure is not intended to be construed or to limit the present disclosure or otherwise to exclude any other such embodiments, adaptations, variations, modifications and equivalent arrangements.

What is claimed is:

1. A beverage apparatus, the beverage apparatus being hand-holdable by a user of the beverage apparatus to be portable, the beverage apparatus comprising:
    a beverage chamber housing that includes a chamber, and the chamber storing a consumable liquid in the chamber;
    a dispensing assembly that includes a first receptacle, and the first receptacle for retaining a first vessel, and the first vessel including a first electronic tag and containing a first additive,
        the dispensing assembly operatively controllable to output the first additive from the first vessel into the consumable liquid;
    a first element that detects an attribute of the consumable liquid;
    a motion detection device;
    an apparatus computer processor (ACP); and
    an apparatus database portion that includes instructions that are performed by the ACP in operation of the beverage apparatus, and the ACP configured to control the dispensing assembly to perform dispensing of the first additive from the first vessel into the consumable liquid, in the chamber, and the ACP performing processing including:
        operating the motion detection device to generate a first output;
        assessing a state of the beverage apparatus based on the first output; and
        operating, based on the state of the beverage apparatus, the first element to generate a second output.

2. The beverage apparatus of claim 1, the assessing the state of the beverage apparatus includes the ACP determining that the beverage apparatus is experiencing movement relative to a predetermined threshold.

3. The beverage apparatus of claim 2, the movement is based on an acceleration of the beverage apparatus.

4. The beverage apparatus of claim 2, the movement is based on a speed of the beverage apparatus.

5. The beverage apparatus of claim 2, the first element is an ultrasonic device that outputs generated pulses and senses returned pulses, and
    the operating, based on the state of the beverage apparatus, the ultrasonic device to generate the second output includes the ACP being configured to:
        if movement is below the predetermined threshold, then the ultrasonic device outputting a normal pulse sequence, of the generated pulses, and the normal pulse sequence configured to generate first returned pulses, of the returned pulses, from which a liquid level, of the consumable liquid, is determined; and
        if movement is above the predetermined threshold, then the ultrasonic device outputting a modified pulse sequence, of the generated pulses, and the modified pulse sequence configured to generate an echo, of the returned pulses, based on which the ACP performs echo determination, and
        the echo determination including determining whether liquid, of the consumable liquid, covers an operating element of the ultrasonic device.

6. The beverage apparatus of claim 5, the echo determination including the ACP being configured to perform processing including:
    if an echo is received, the ACP determining that there is liquid, of the consumable liquid, covering the operating element; and
    if an echo is not received, the ACP determining that there is not liquid, of the consumable liquid, covering the operating element and, based thereon, determines an empty state of the beverage apparatus.

7. The beverage apparatus of claim 5, the operating element of the ultrasonic device includes a vibrating plate.

8. The beverage apparatus of claim 1, the assessing the state of the beverage apparatus includes the ACP determining that the beverage apparatus is positioned at an observed angle relative to a predetermined threshold angle.

9. The beverage apparatus of claim 8, the first element is an ultrasonic device that outputs generated pulses and senses returned pulses, and
    the operating, based on the state of the beverage apparatus, the ultrasonic device to generate the second output includes the ACP being configured to:
        perform processing to determine that the observed angle is less than the predetermined threshold angle, and the ultrasonic device outputting a pulse sequence, of the generated pulses, and the pulse sequence configured to generate first returned pulses, of the returned pulses, from which a liquid level, of the consumable liquid, is determined.

10. The beverage apparatus of claim 9, the ACP being configured to output a modified pulse sequence if no first returned pulses are received by the ultrasonic device.

11. The beverage apparatus of claim 1, an operating element of the first element includes a vibrating plate.

12. The beverage apparatus of claim 1, the motion detection device includes an accelerometer.

13. The beverage apparatus of claim 1, the motion detection device includes at least one gyroscope.

14. The beverage apparatus of claim 1, the motion detection device includes an accelerometer and a gyroscope.

15. The beverage apparatus of claim 1, the motion detection device includes a global positioning system (GPS) and the ACP configured to determine (a) a speed of the beverage apparatus and/or (b) an acceleration of the beverage apparatus based on GPS positions observed by the GPS.

16. The beverage apparatus of claim 1, the chamber including a bottom, and the first element provided on the bottom.

17. The beverage apparatus of claim 1, the first element is an ultrasonic device, and the ultrasonic device includes a piezoelectric transducer, and the piezoelectric transducer performing both:

generating generated pulses; and observing returned pulses that echo from the generated pulses.

18. The beverage apparatus of claim 1, the first element is an ultrasonic device, and the ultrasonic device:
   (a) generating generated pulses directed into the consumable liquid in the chamber, and
   (b) observing returned pulses, from said generated pulses, as a result of an echo of the generated pulses.

19. The beverage apparatus of claim 1, the first element is a level sensing device, and the level sensing device includes at least one selected from the group consisting of: an ultrasonic device, a capacitive device, an optical device, a load cell, a float, and a thermal device; and
   the level sensing device sensing a level of the consumable liquid.

\* \* \* \* \*